(12) United States Patent

Novek

(10) Patent No.: US 12,570,550 B2
(45) Date of Patent: Mar. 10, 2026

(54) SUBSEA DESALINATION SYSTEMS AND METHODS USING FLUID DISPLACEMENT

(71) Applicant: INNOVATOR ENERGY LLC, Houston, TX (US)

(72) Inventor: Ethan Novek, Houston, TX (US)

(73) Assignee: INNOVATOR ENERGY LLC, Houston, TX (US)

( * ) Notice: Subject to any disclaimer, the term of this patent is extended or adjusted under 35 U.S.C. 154(b) by 0 days.

(21) Appl. No.: 18/611,309

(22) Filed: Mar. 20, 2024

(65) Prior Publication Data

US 2024/0228332 A1 Jul. 11, 2024

Related U.S. Application Data

(60) Division of application No. 18/236,229, filed on Aug. 21, 2023, now Pat. No. 11,970,410, which is a (Continued)

(51) Int. Cl.
*C02F 1/44* (2023.01)
*F03B 13/00* (2006.01)
(Continued)

(52) U.S. Cl.
CPC .............. *C02F 1/441* (2013.01); *F03B 13/00* (2013.01); *F03B 13/06* (2013.01);
(Continued)

(58) Field of Classification Search
CPC .. C02F 1/441; C02F 2103/08; C02F 2303/10; C02F 1/442; C02F 2103/10;
(Continued)

(56) References Cited

U.S. PATENT DOCUMENTS 3,794,172 A * 2/1974 Bray ...................... B01D 61/10
210/257.2
4,715,952 A * 12/1987 Casey, Jr. .............. B01D 61/08
210/136

(Continued)

FOREIGN PATENT DOCUMENTS

CA 2192307 A1 * 10/1996

OTHER PUBLICATIONS

Notification of Transmittal of the International Search Report and the Written Opinion of the International Searching Authority issued in PCT/US2024/027660, mailed Sep. 11, 2024, 14 pages.

(Continued)

*Primary Examiner* — Waqaas Ali
(74) *Attorney, Agent, or Firm* — HUNTON ANDREWS KURTH LLP

(57) ABSTRACT

The present application pertains to systems and methods for desalination. In one embodiment the system employs a first storage reservoir configured to be near the surface of a body of water and configured to store a low density fluid. A second storage reservoir is configured to be located below the surface of the body of water. A desalination system is operably connected to the second reservoir. Desalinated water is produced by allowing desalination permeate to displace low density fluid in the second reservoir and transfer the low density fluid from the second reservoir to the first reservoir. Desalinated water is exported by transferring low density fluid from the first reservoir into the second reservoir to displace desalinated water from the second reservoir into a water export pipeline.

15 Claims, 35 Drawing Sheets

(Above)

Related U.S. Application Data continuation-in-part of application No. PCT/US2023/012415, filed on Feb. 6, 2023, which is a continuation of application No. 17/746,813, filed on May 17, 2022, which is a continuation-in-part of application No. 17/678,684, filed on Feb. 23, 2022, now Pat. No. 12,043,556, and a continuation of application No. 17/665,472, filed on Feb. 4, 2022, now Pat. No. 11,981,586, which is a continuation-in-part of application No. PCT/US2021/041931, filed on Jul. 16, 2021, which is a continuation of application No. 17/214,100, filed on Mar. 26, 2021, now Pat. No. 11,286,898, which is a continuation-in-part of application No. 16/932,429, filed on Jul. 17, 2020, now Pat. No. 10,961,975.

(60) Provisional application No. 63/464,244, filed on May 5, 2023.

(51) Int. Cl.
| | |
|---|---|
| *F03B 13/06* | (2006.01) |
| *C02F 103/08* | (2006.01) |
| *H02J 15/00* | (2006.01) |

(52) U.S. Cl.
CPC ...... *C02F 2103/08* (2013.01); *C02F 2303/10* (2013.01); *F05B 2210/11* (2013.01); *F05B 2260/422* (2020.08); *H02J 15/003* (2013.01); *Y02E 60/16* (2013.01)

(58) Field of Classification Search
CPC .......... C02F 2201/008; C02F 2201/009; C02F 2209/03; C02F 2303/08; C02F 2303/22; F03B 13/00; F03B 13/06; F05B 2210/11; F05B 2260/422; F05B 2210/20; F05B 2220/62; F05B 2240/931; F05B 2240/97; H02J 15/003; Y02E 60/16; Y02E 10/20; Y02E 10/30; B01D 2313/246; B01D 2313/36; B01D 2315/06; B01D 2311/20; B01D 61/08; B01D 61/10; B01D 61/025; Y02A 20/131

See application file for complete search history.

(56) References Cited

U.S. PATENT DOCUMENTS

| | | | | |
|---|---|---|---|---|
| 7,763,171 | B2 * | 7/2010 | Beall | B01D 61/025 |
| | | | | 222/105 |
| 2010/0276369 | A1 | 11/2010 | Haag | |
| 2012/0285886 | A1 * | 11/2012 | Liberman | C02F 1/445 |
| | | | | 210/411 |
| 2022/0178337 | A1 | 6/2022 | Novek | |
| 2022/0178338 | A1 | 6/2022 | Novek | |
| 2022/0243695 | A1 | 8/2022 | Novek | |
| 2022/0282697 | A1 | 9/2022 | Novek | |

OTHER PUBLICATIONS

Notification Concerning Transmittal of International Preliminary Report on Patentability dated Nov. 20, 2025 issued in PCT/US2024/027660, 10 pages.

* cited by examiner

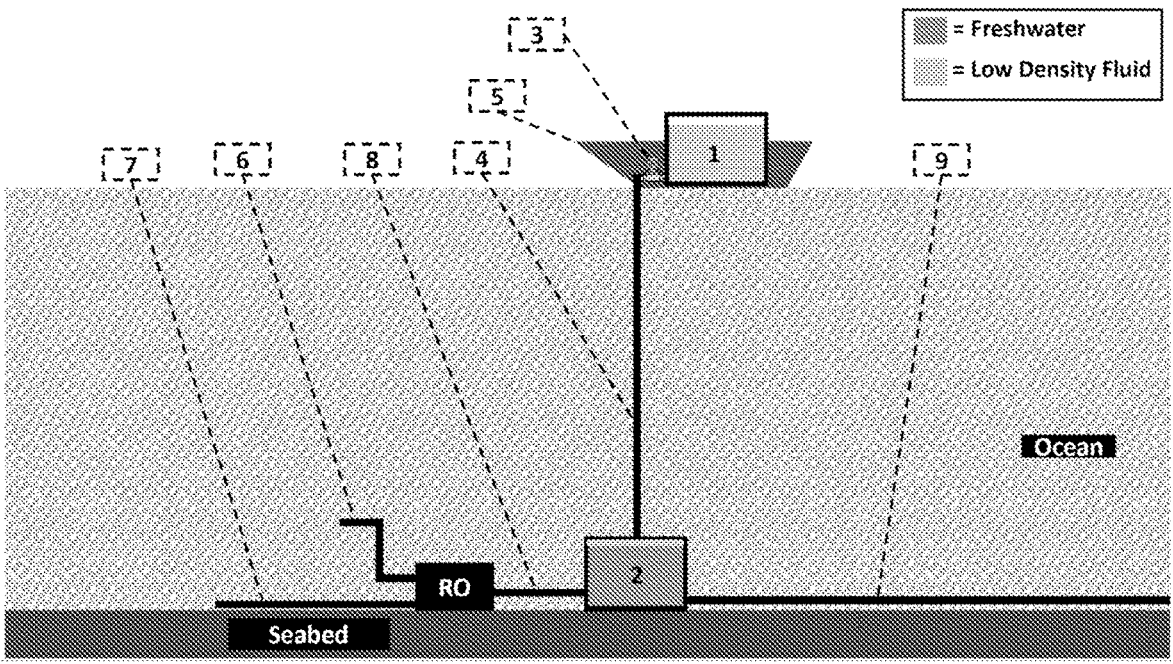
Figure 1 (Above)
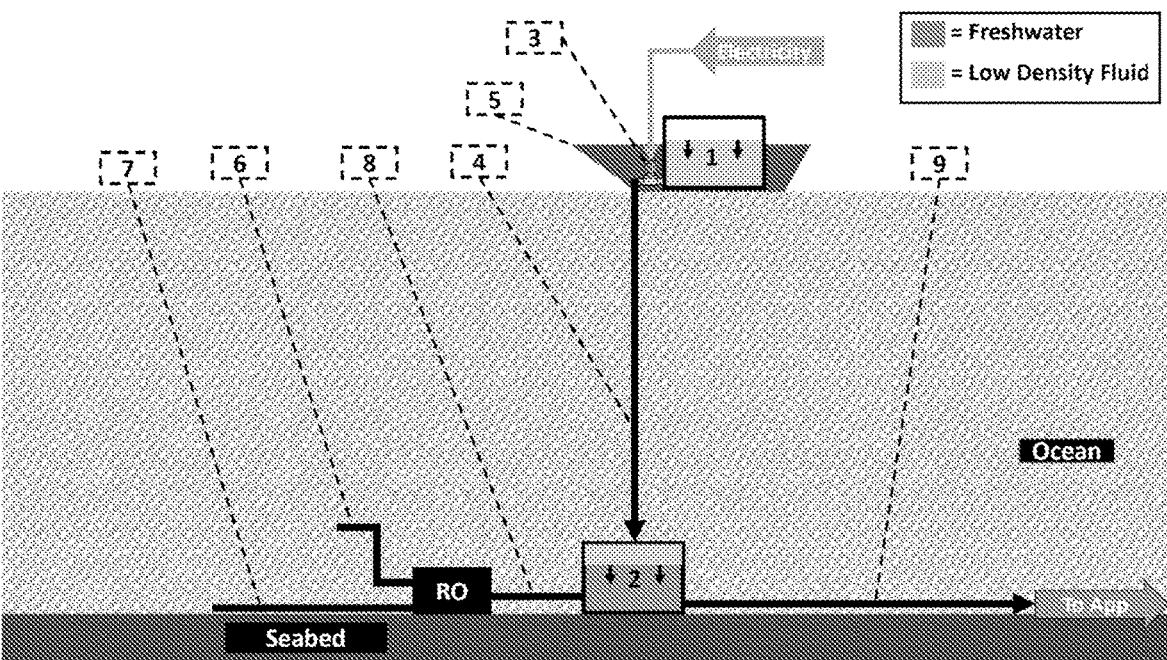
Figure 2 (Above)

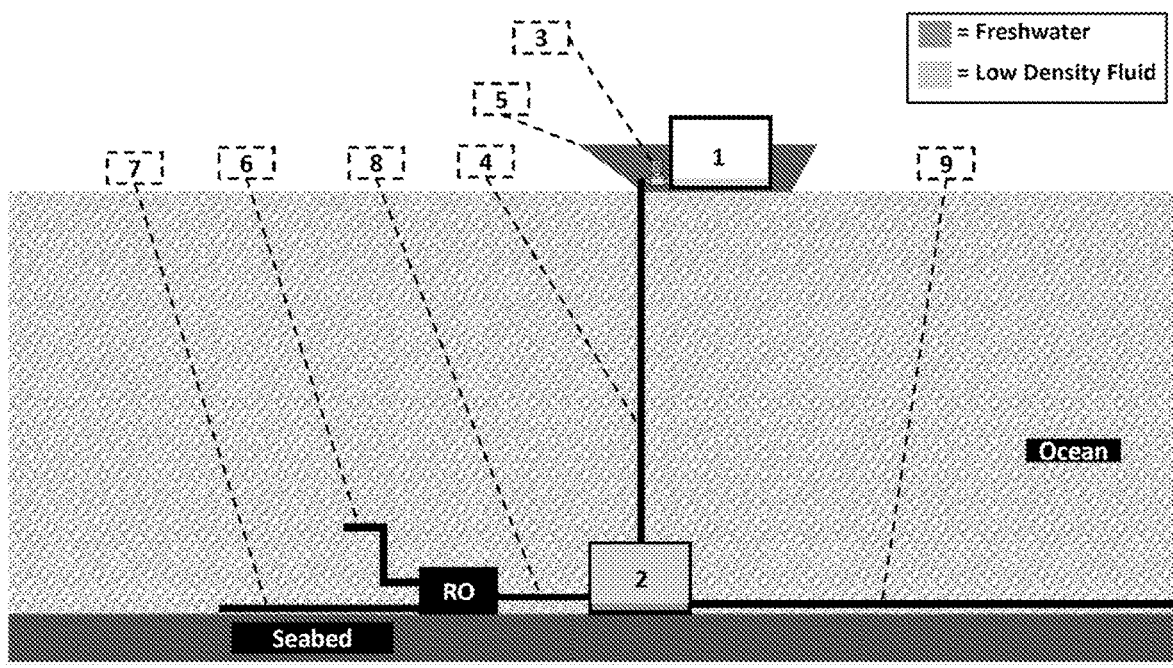
Figure 3 (Above)
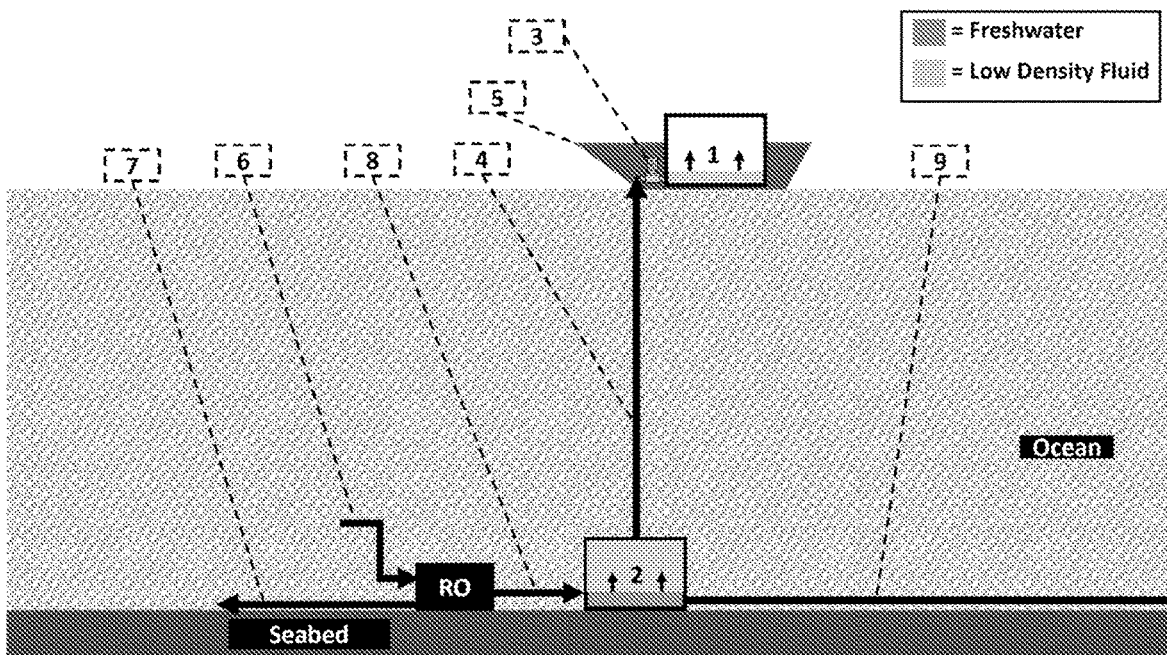
Figure 4 (Above)

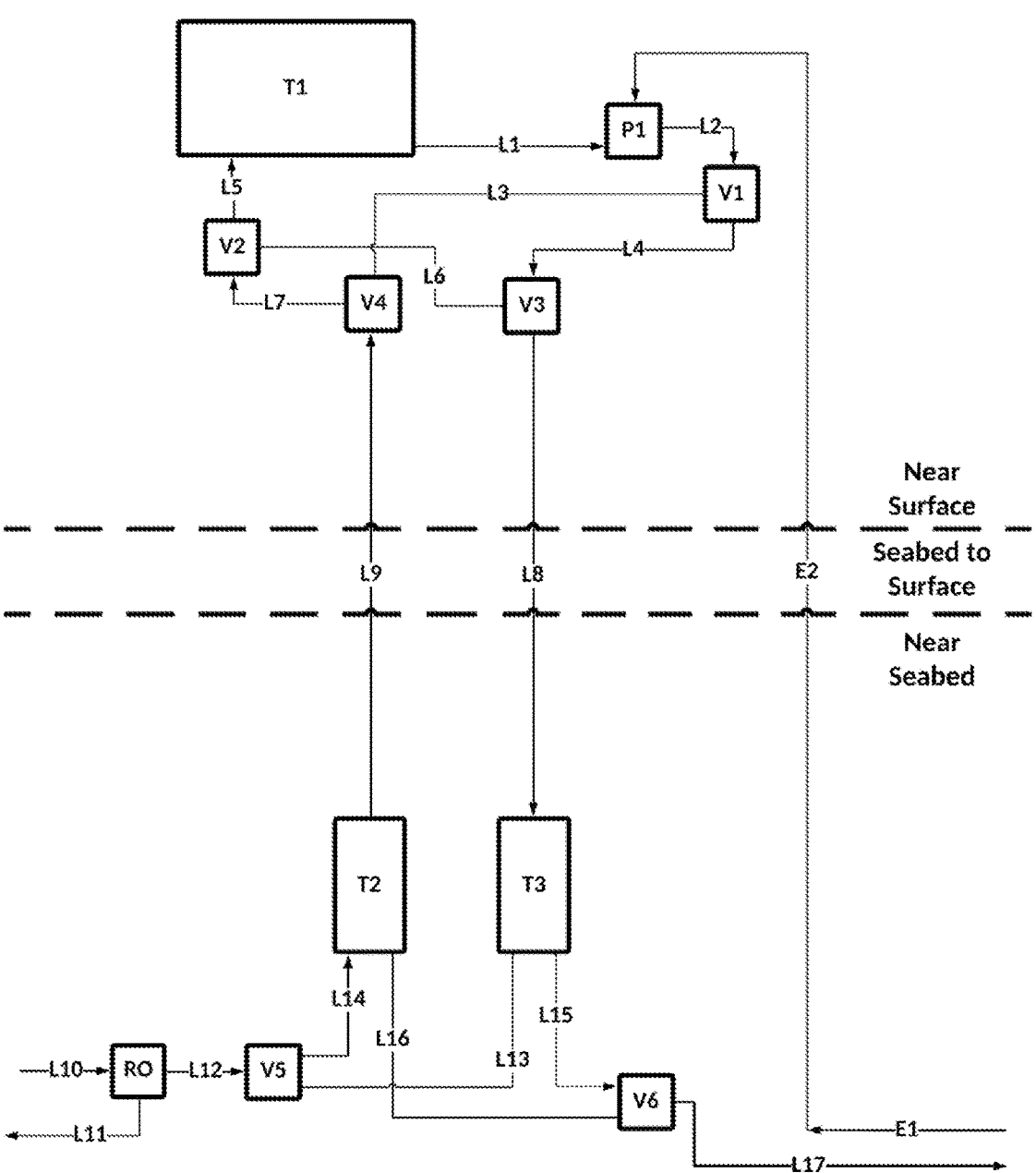
Figure 5 (Above)

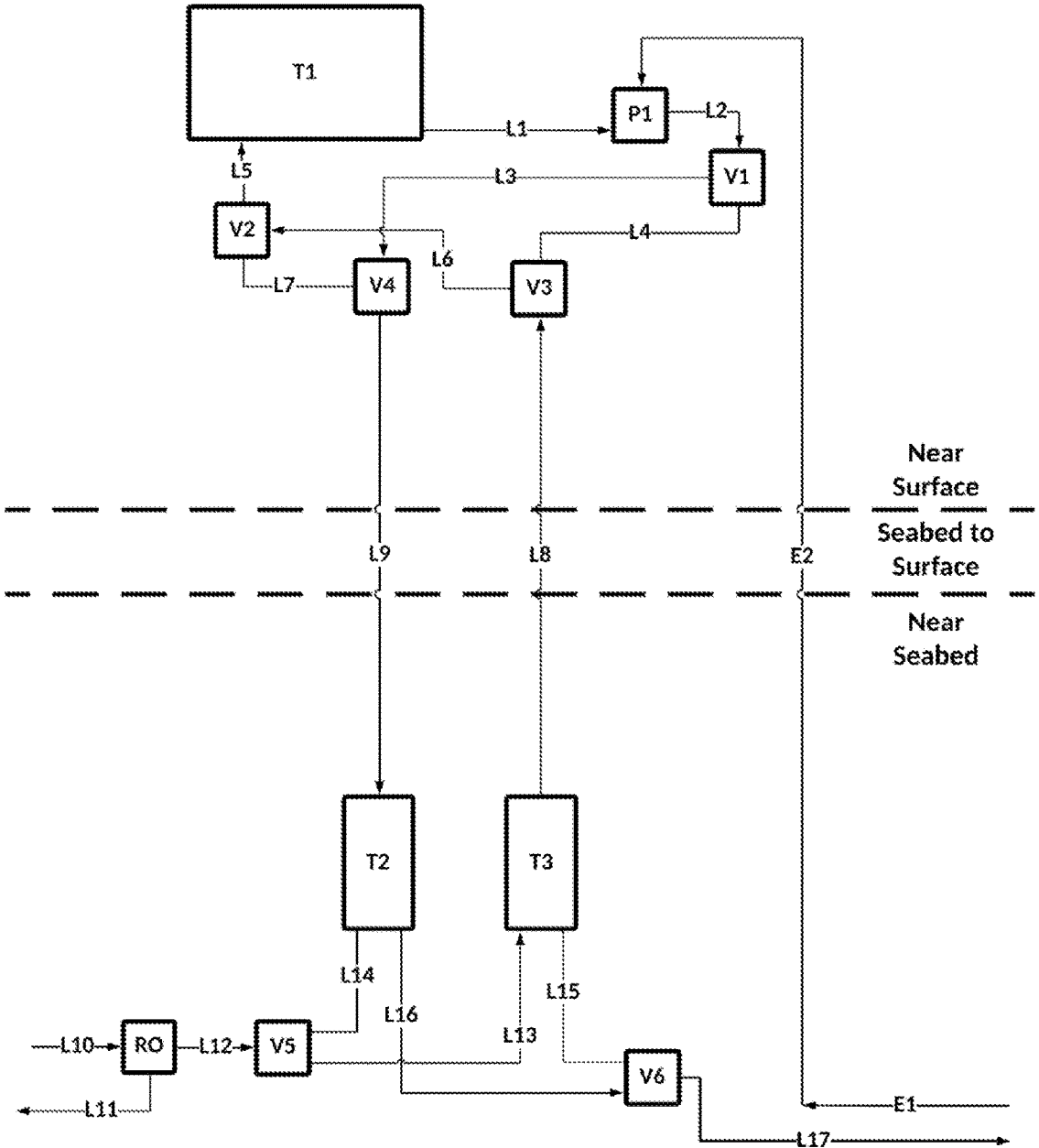
Figure 6 (Above)

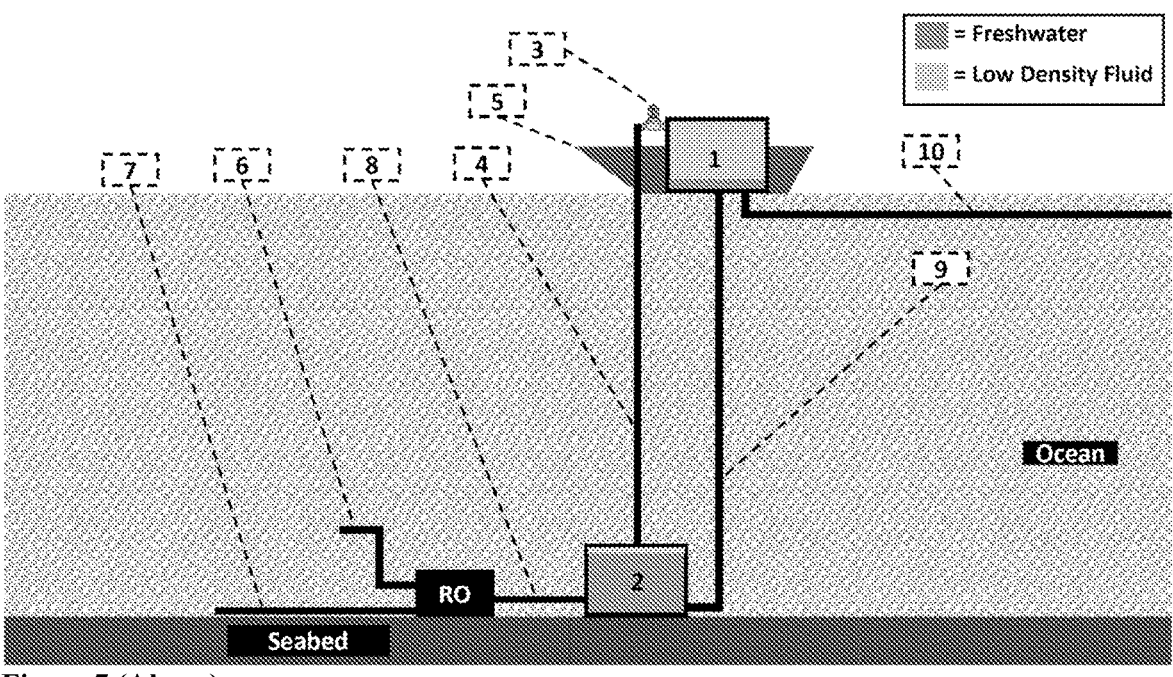
Figure 7 (Above)
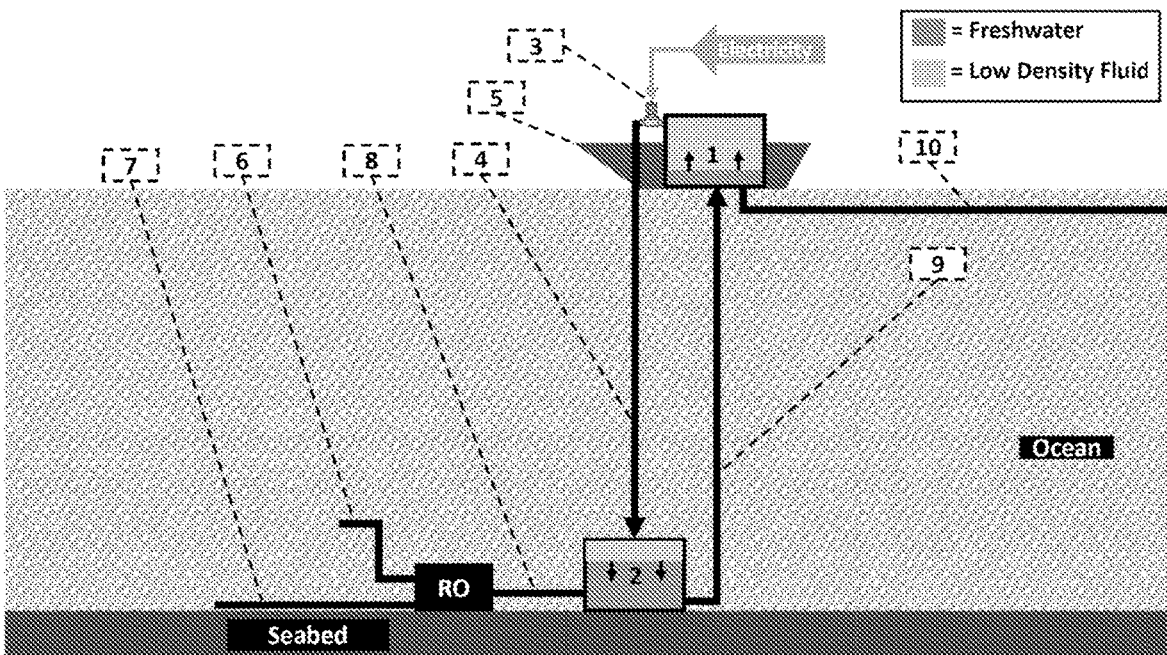
Figure 8 (Above)

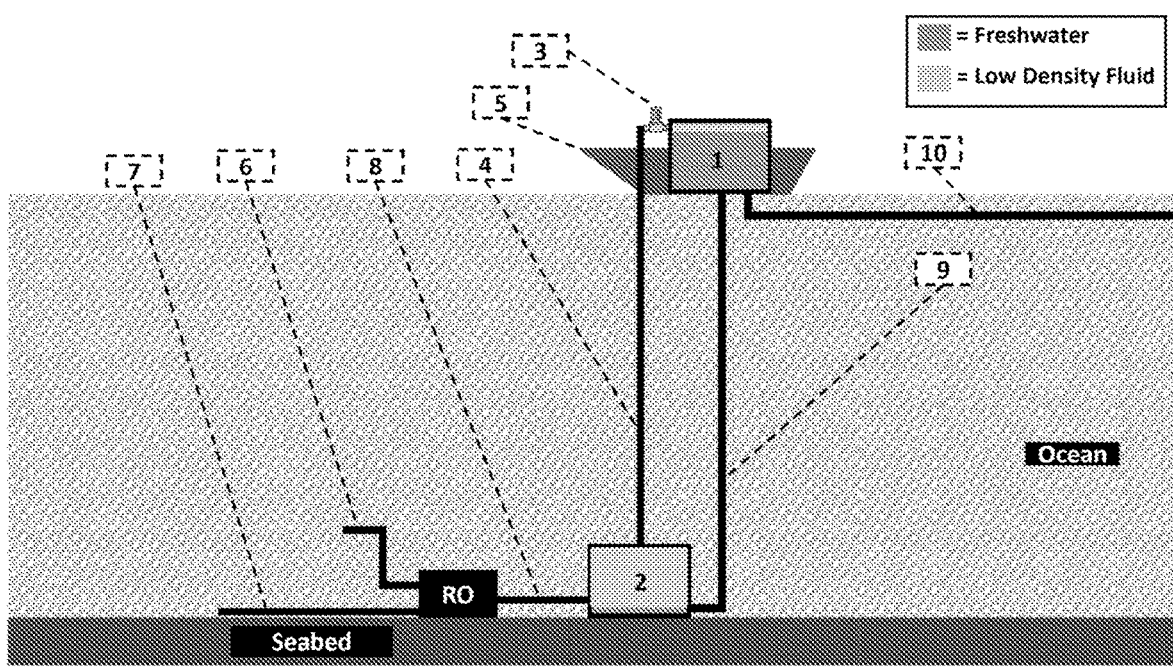
Figure 9 (Above)
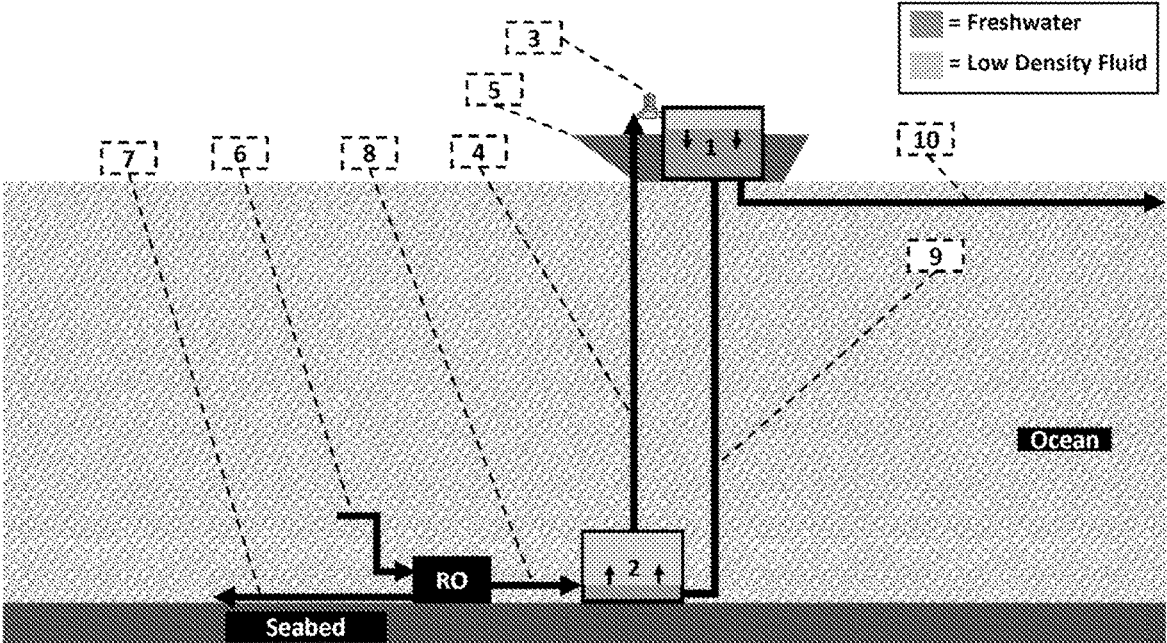
Figure 10 (Above)

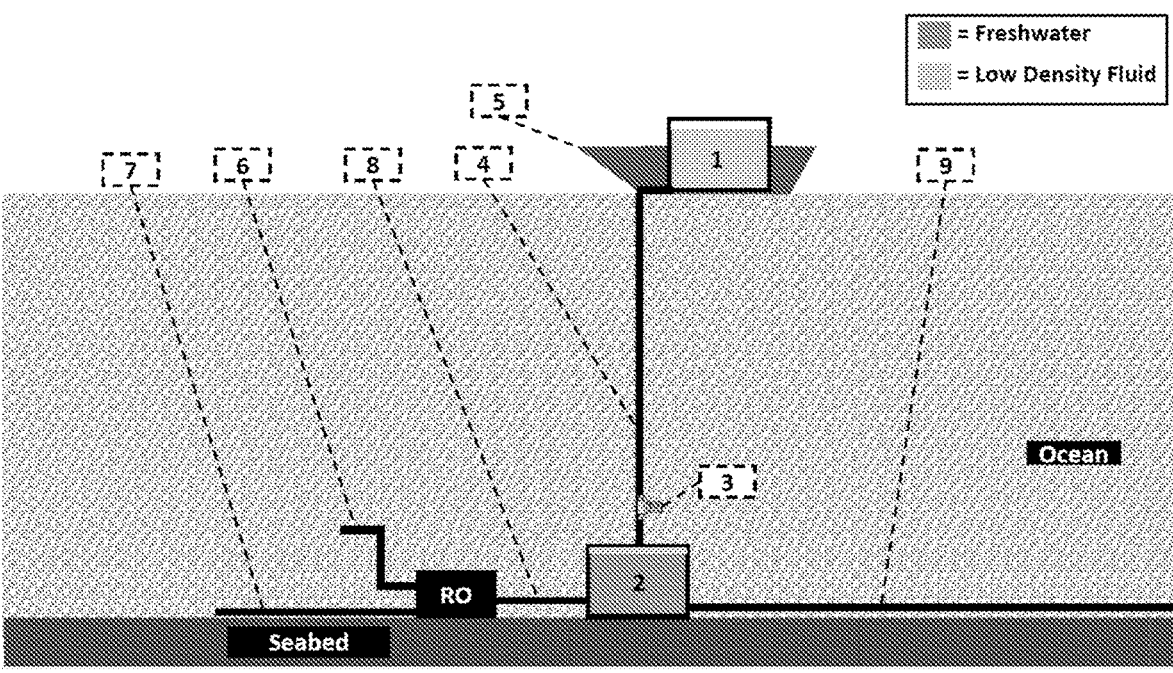
Figure 11 (Above)
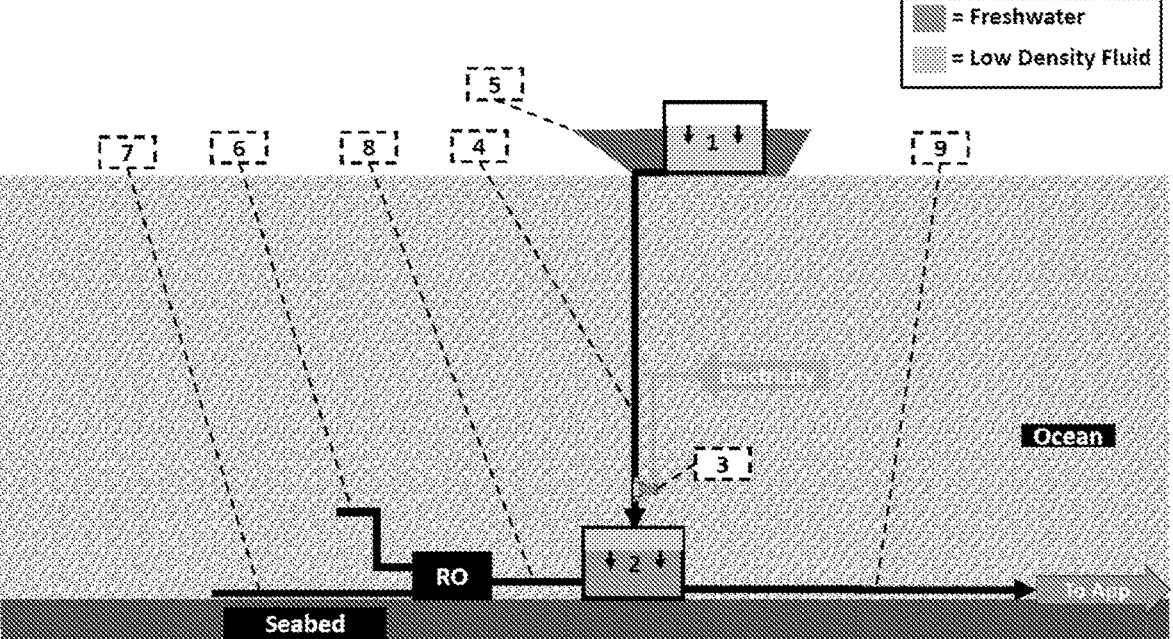
Figure 12 (Above)

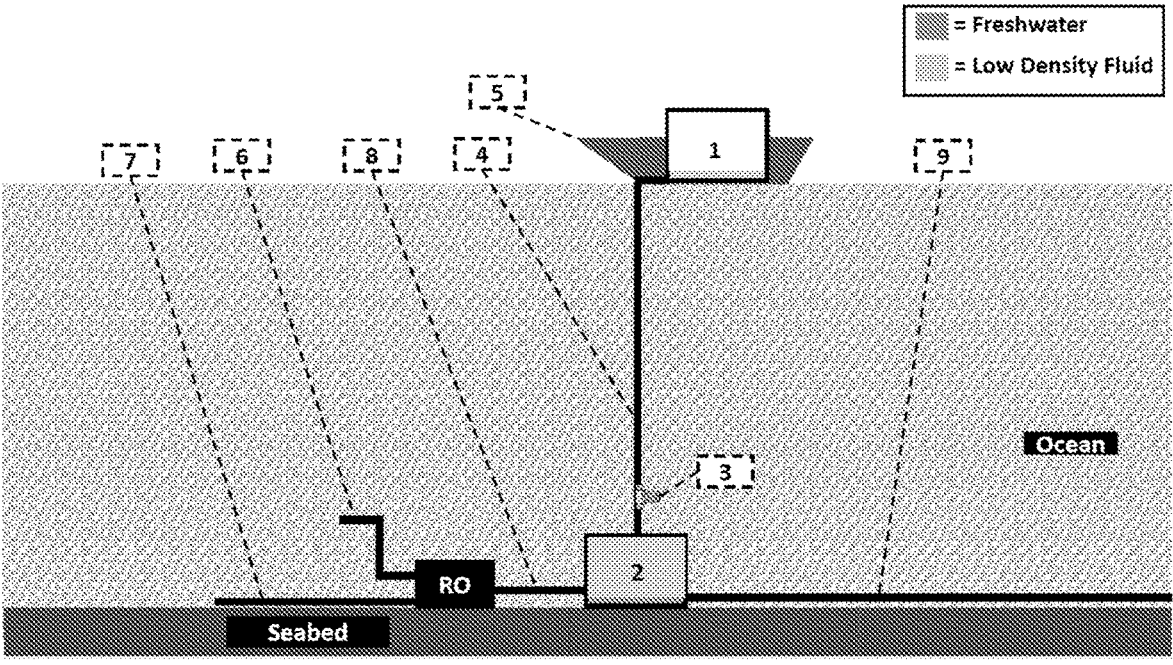
Figure 13 (Above)
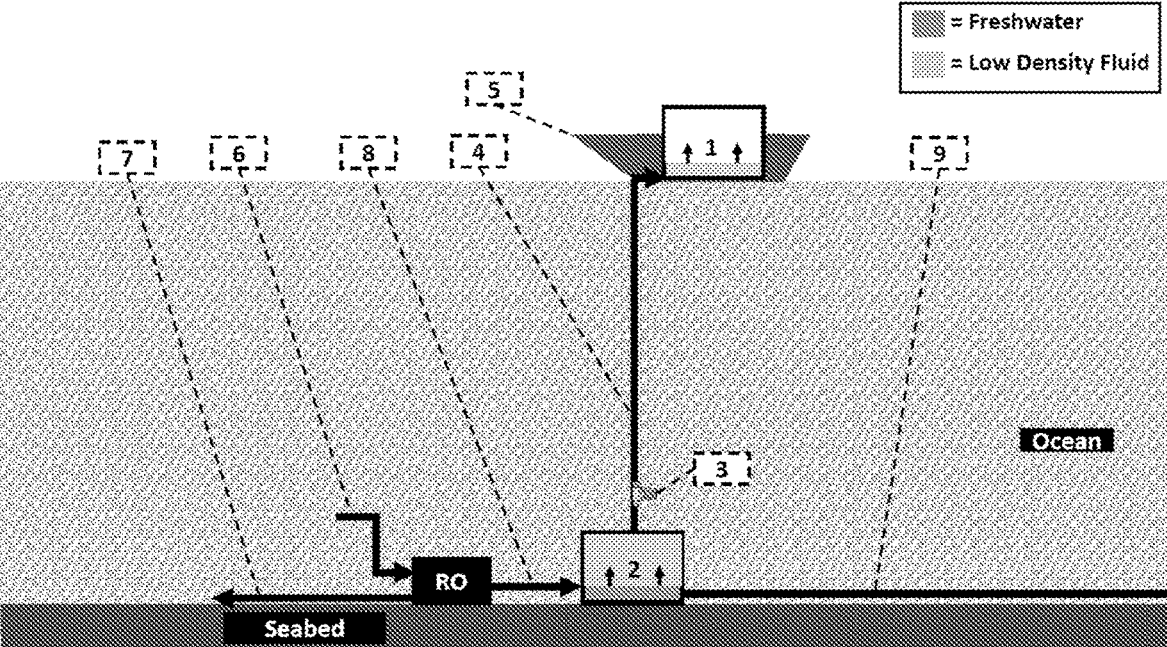
Figure 14 (Above)

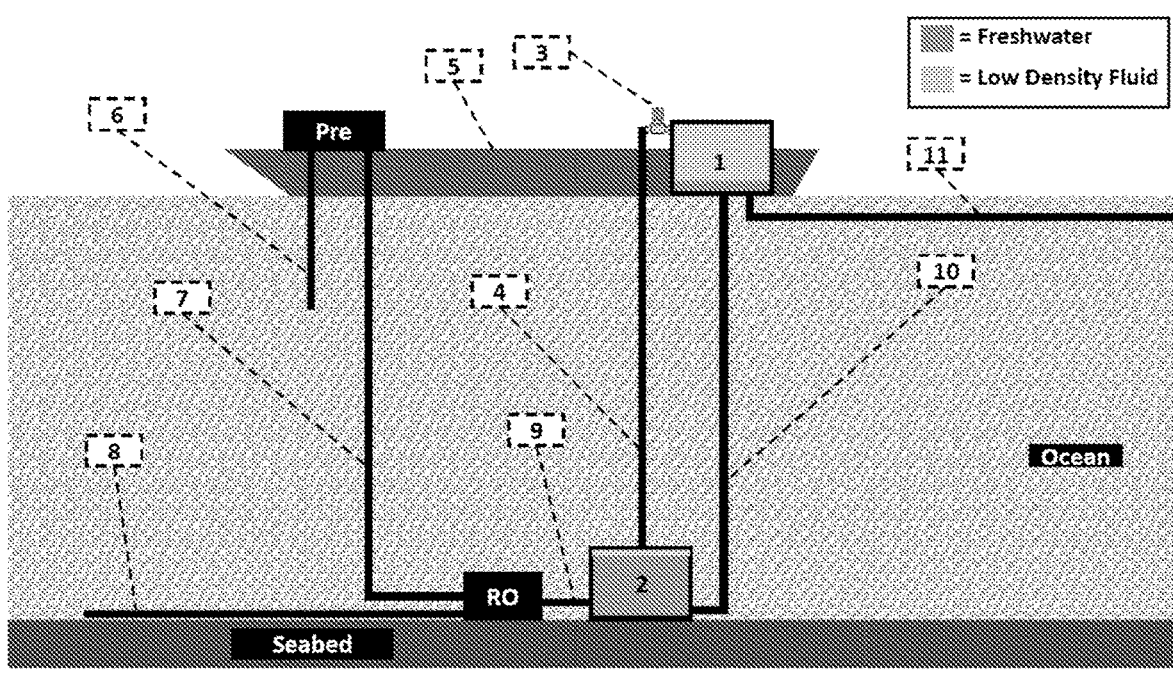
Figure 15 (Above)
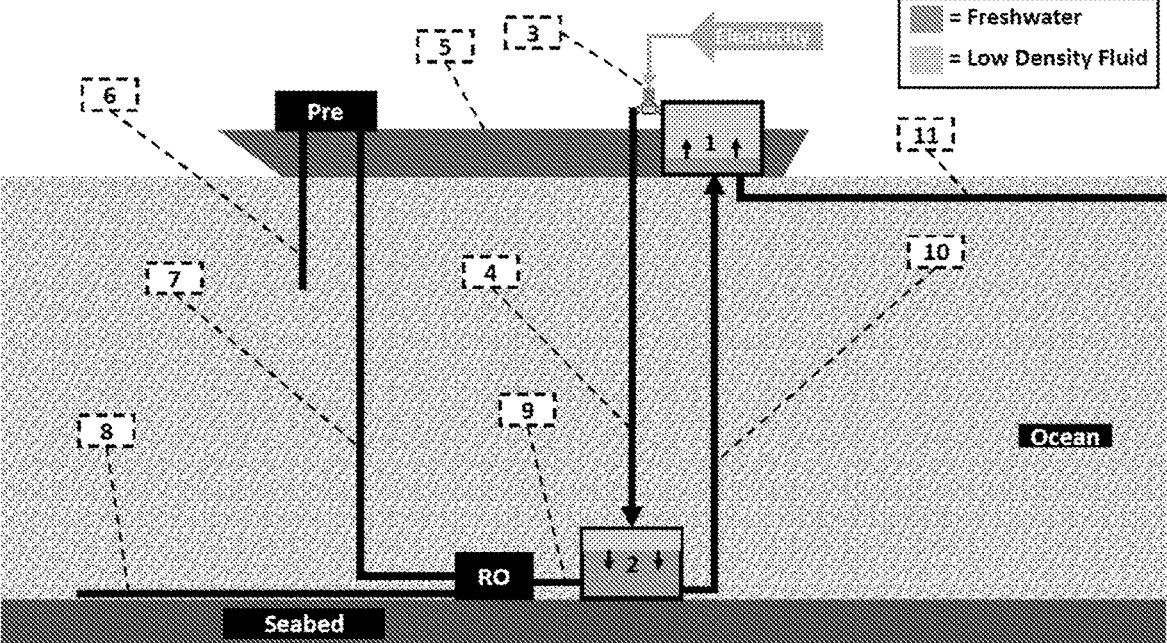
Figure 16 (Above)

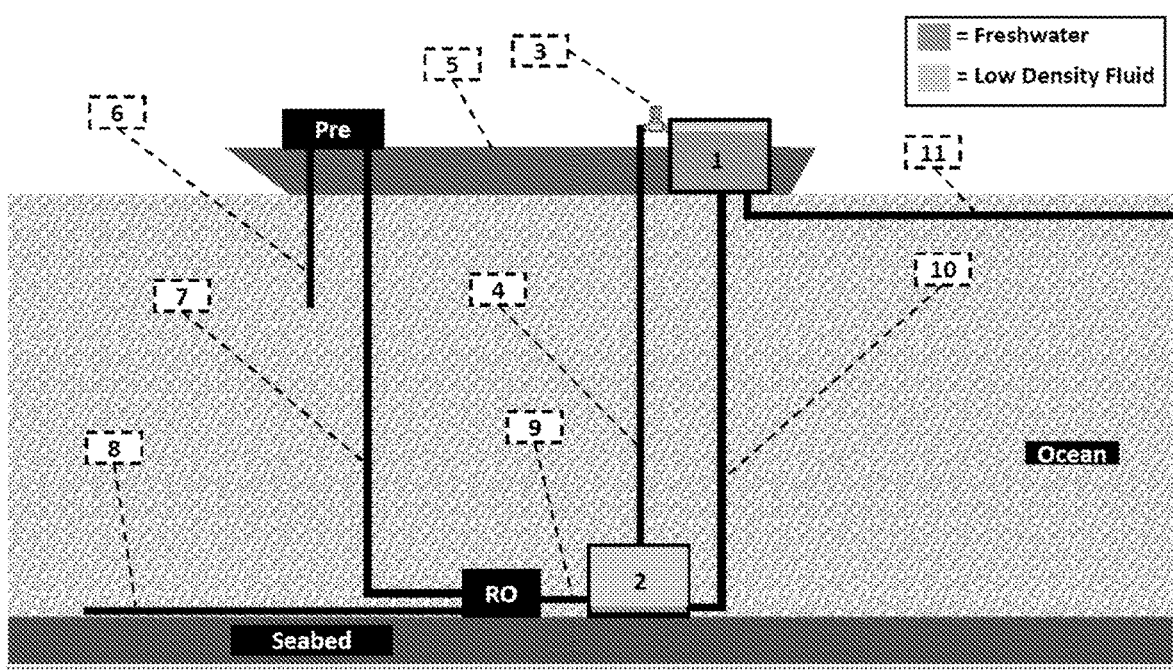
Figure 17 (Above)
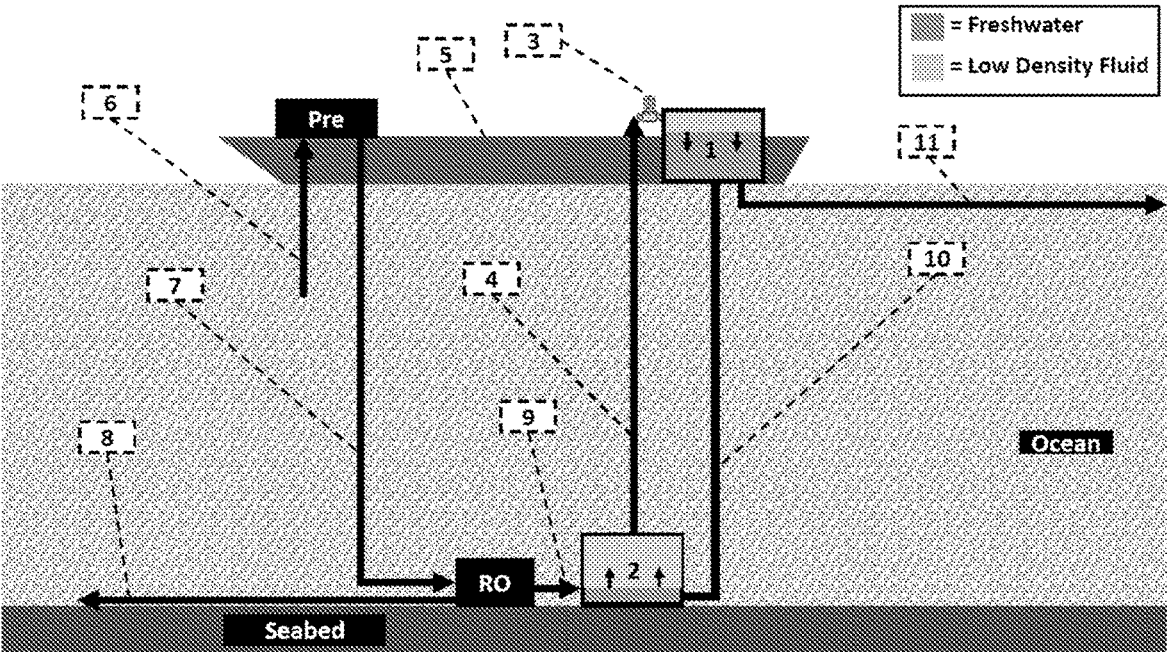
Figure 18 (Above)

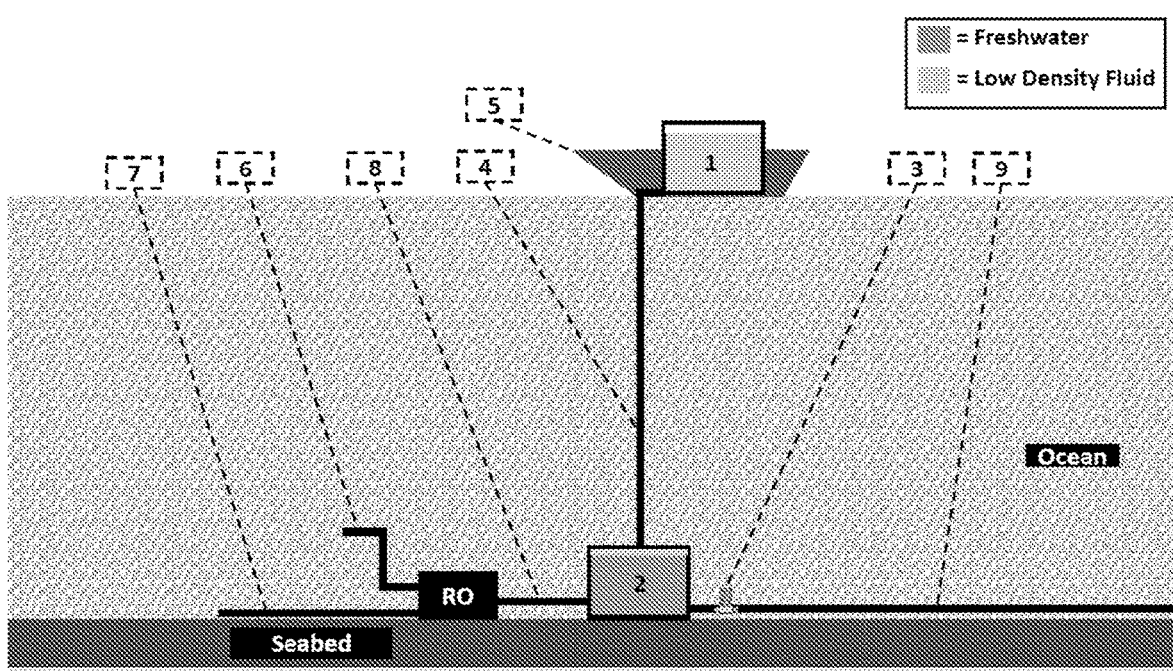
Figure 19 (Above)
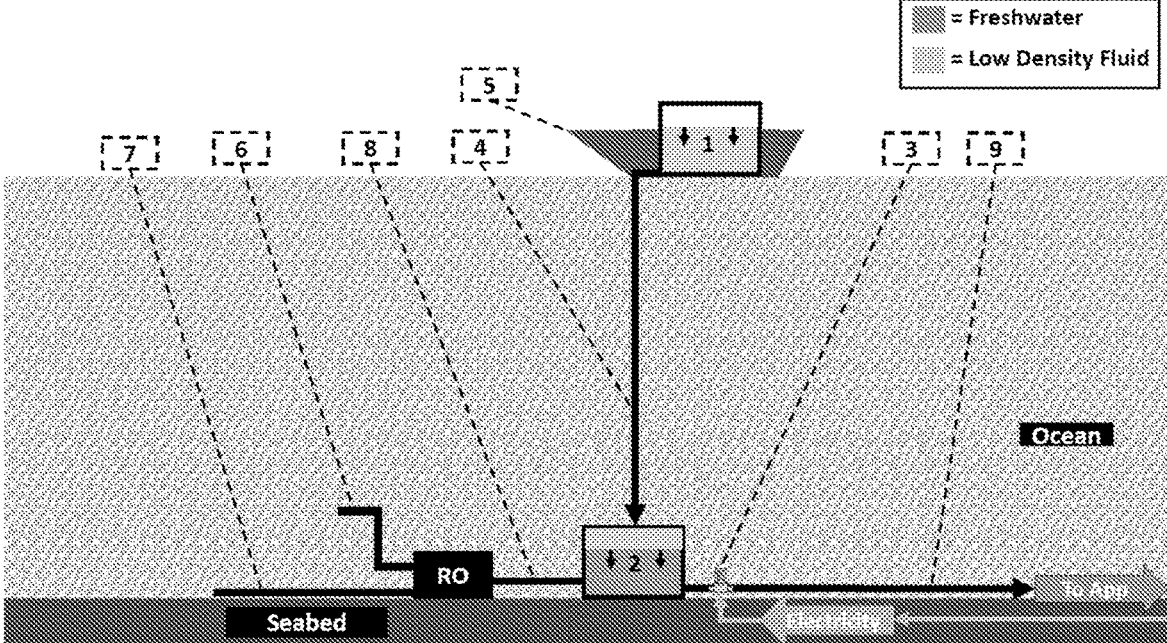
Figure 20 (Above)

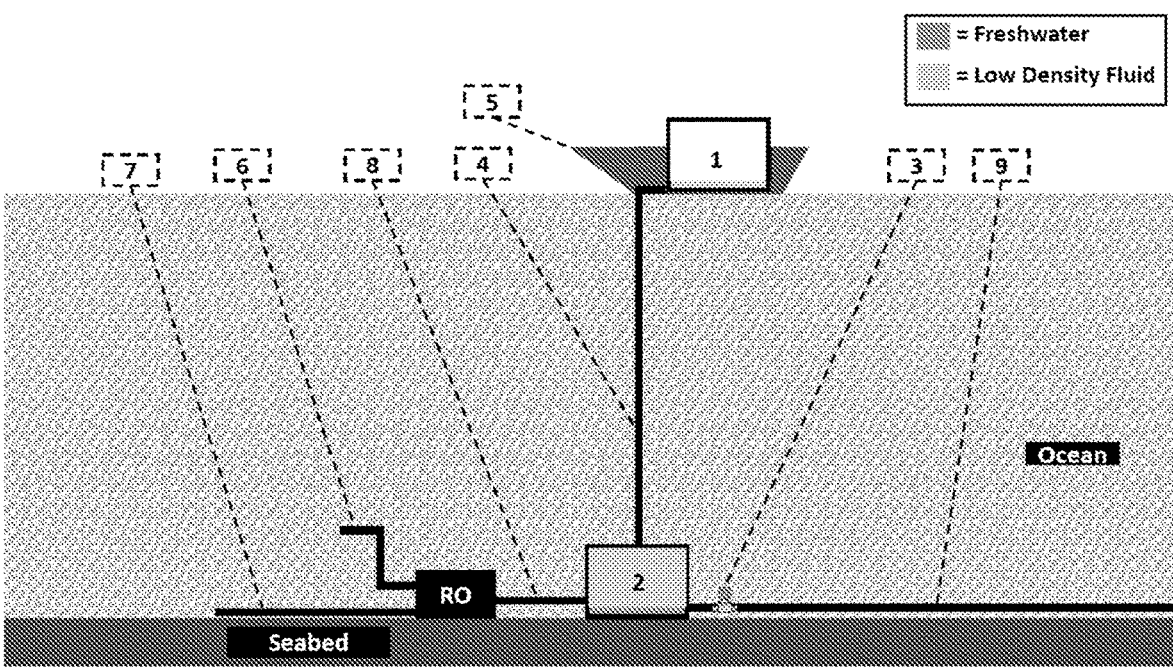
Figure 21 (Above)
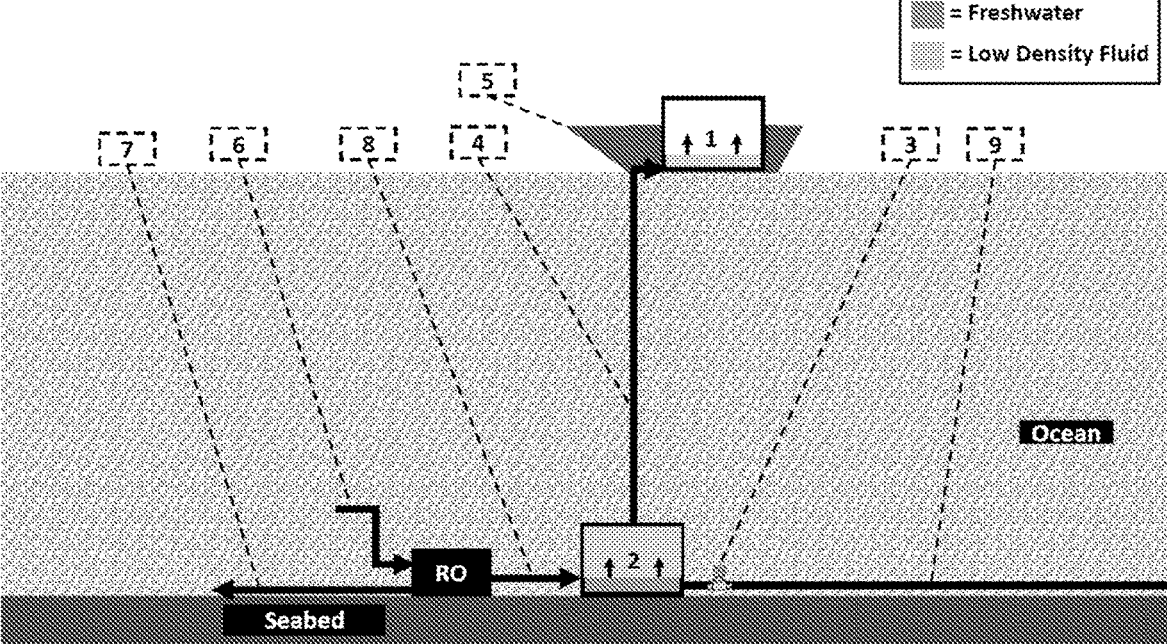
Figure 22 (Above)

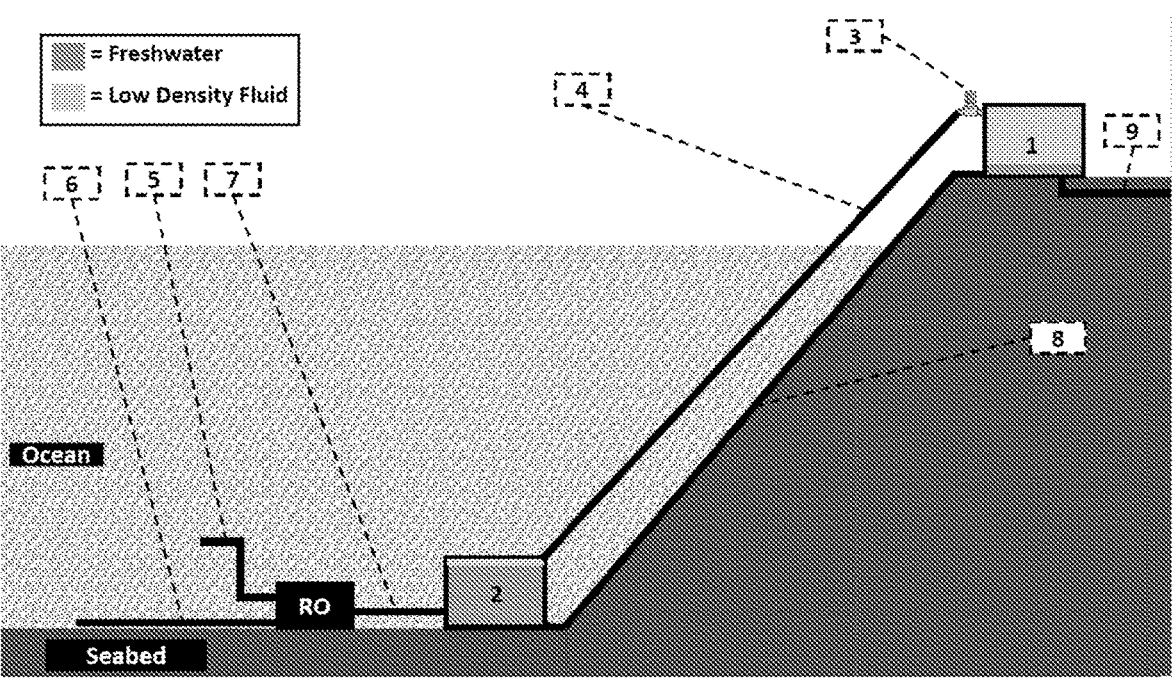
Figure 23 (Above)
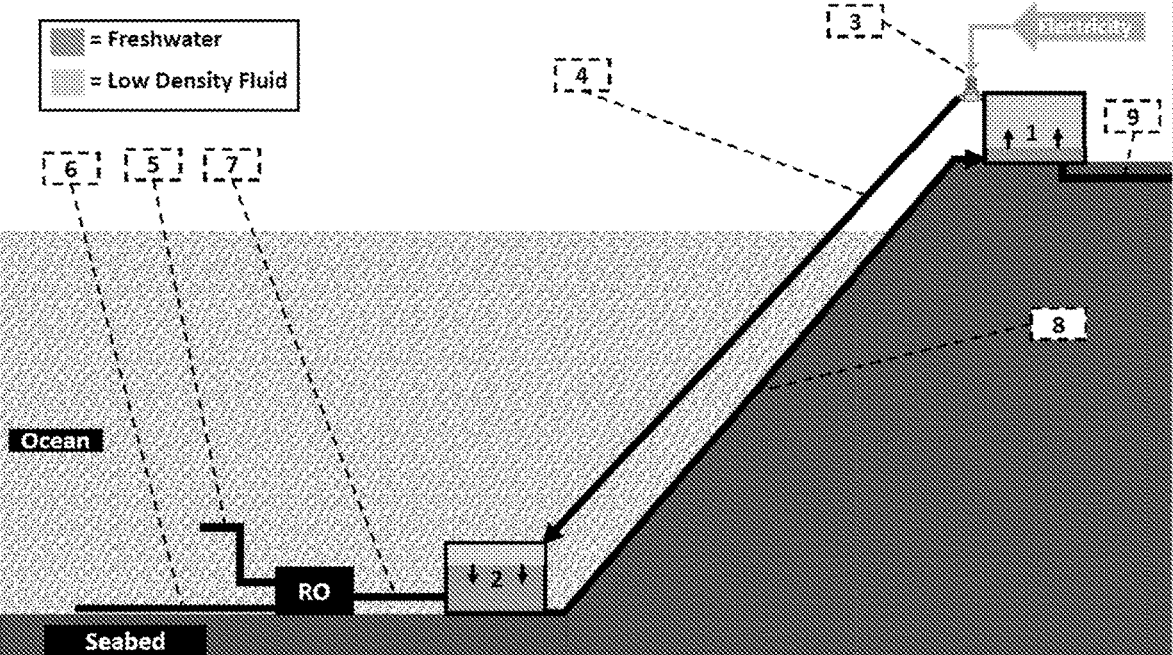
Figure 24 (Above)

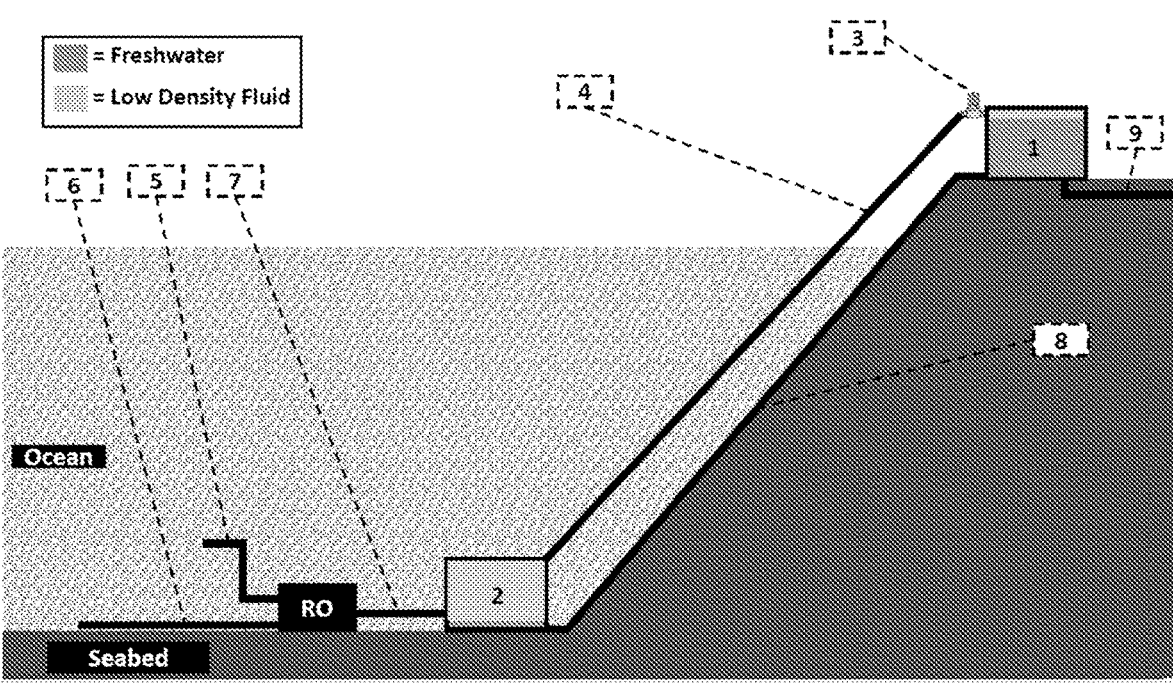
Figure 25 (Above)
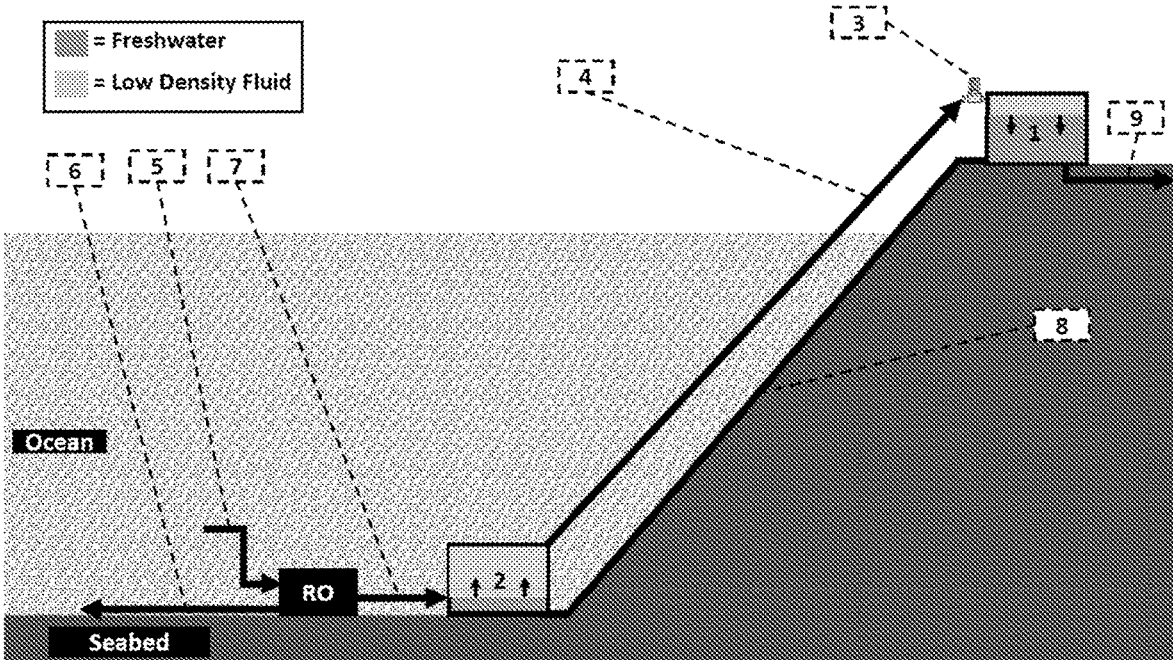
Figure 26 (Above)

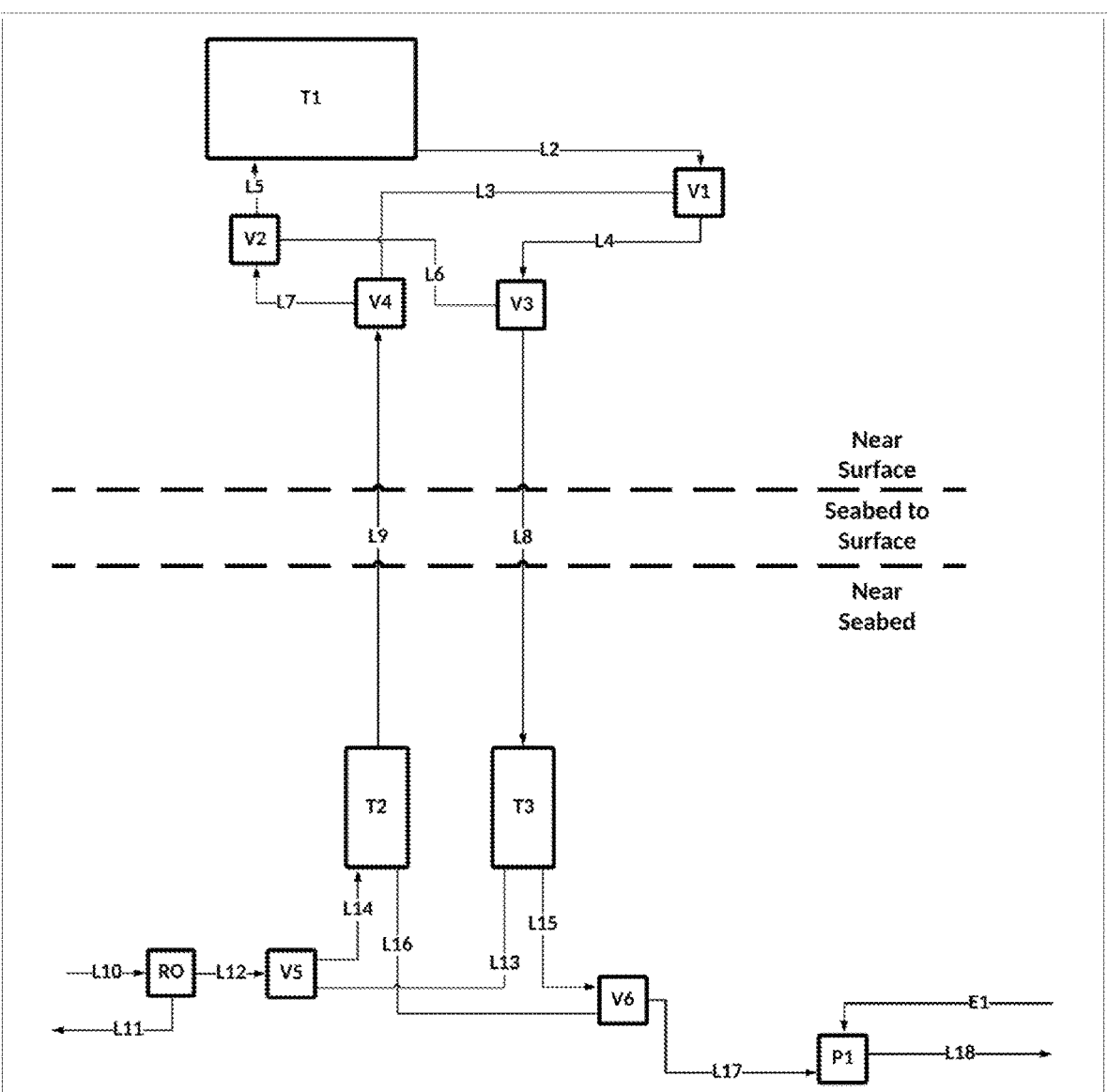
Figure 27 (Above)

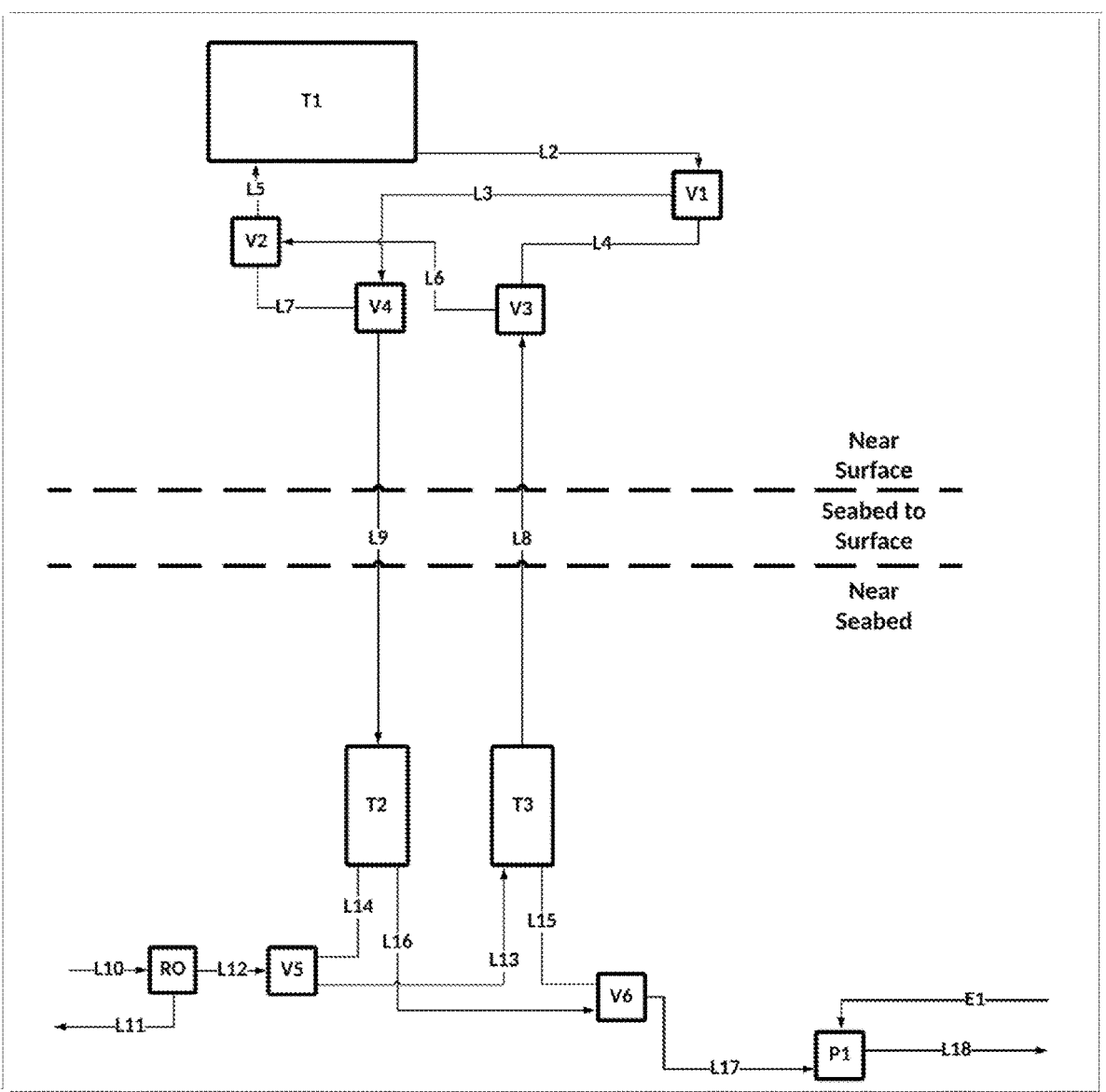
Figure 28 (Above)

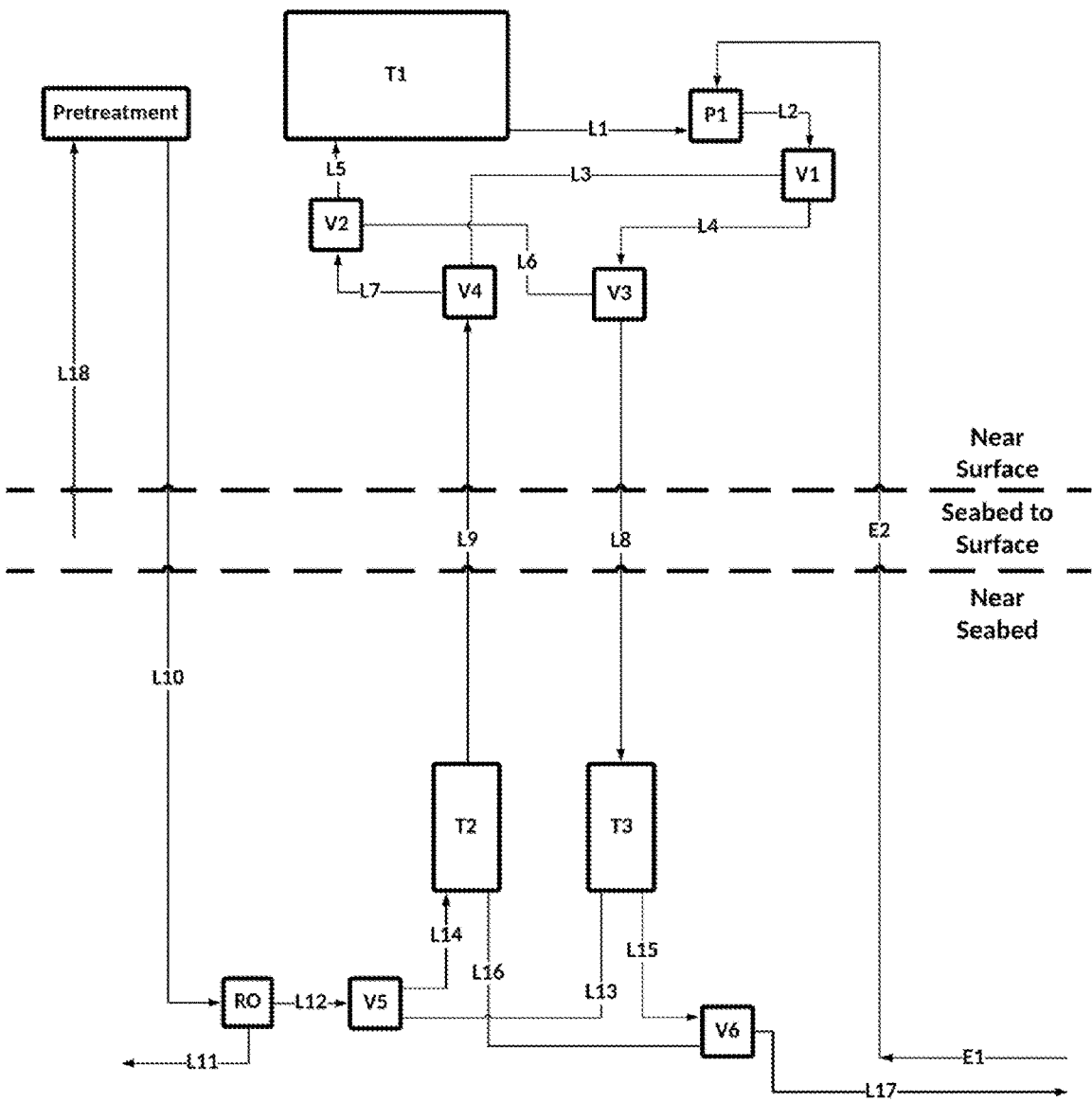
Figure 29 (Above)

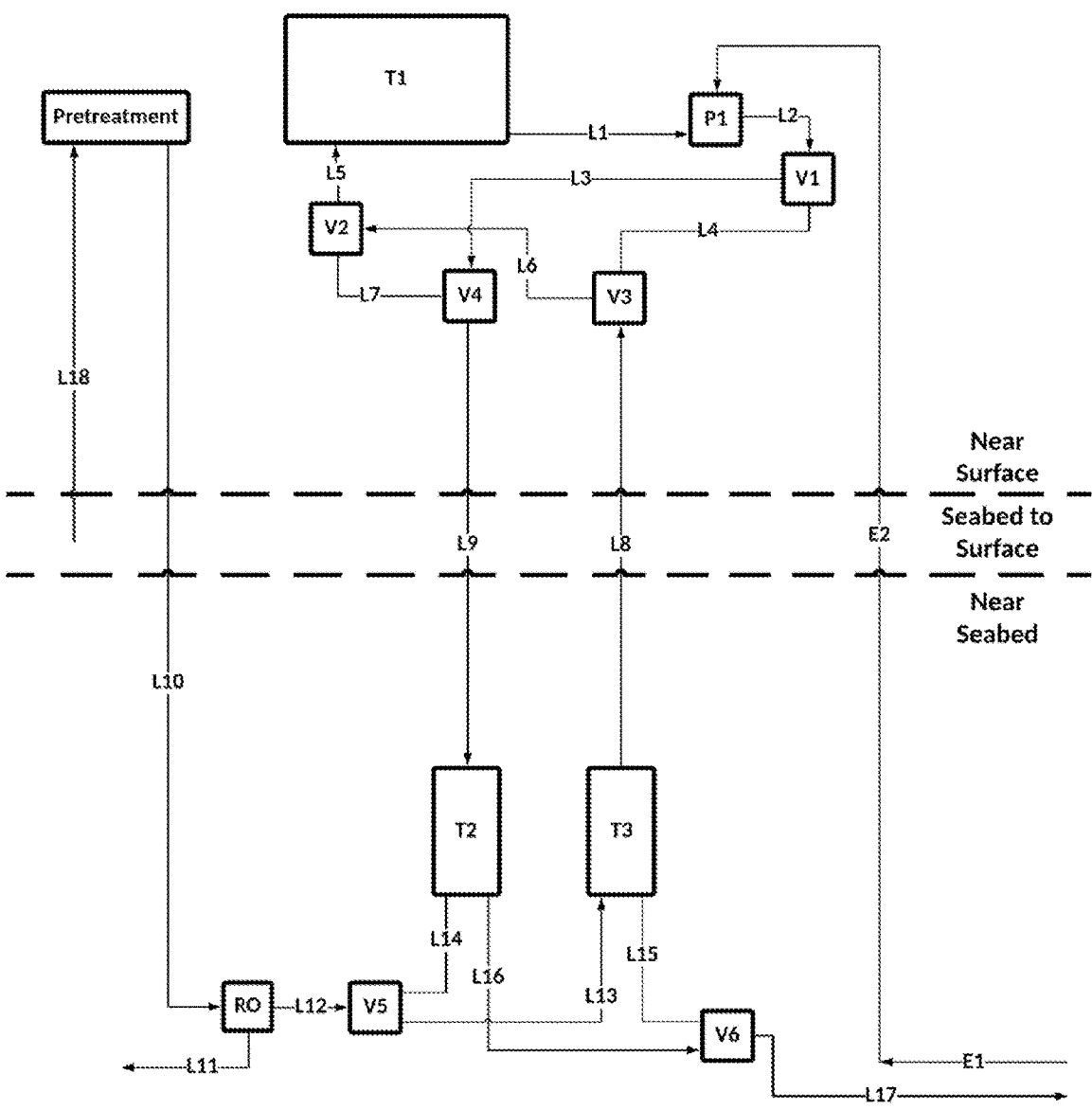
Figure 30 (Above)

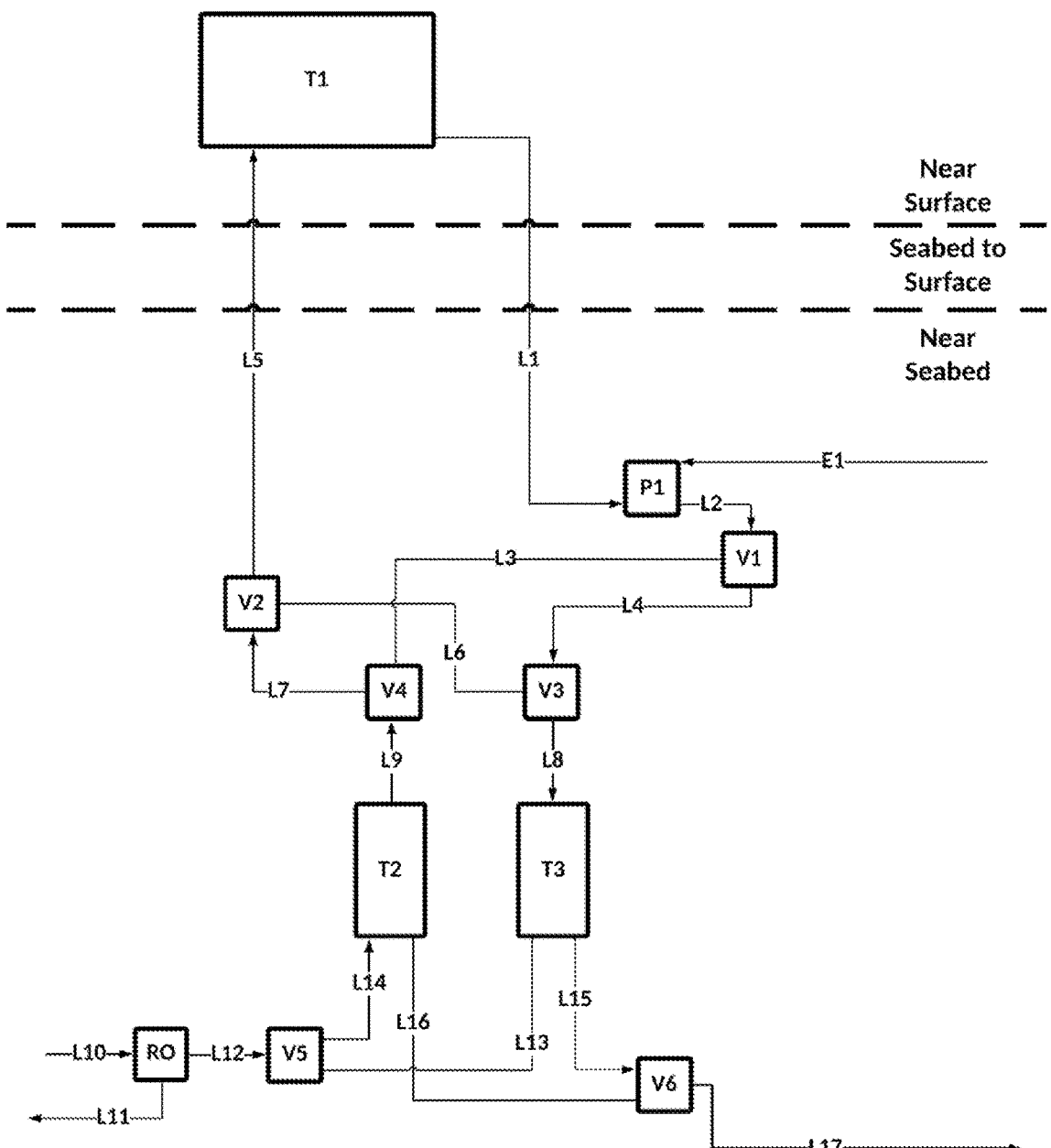
Figure 31 (Above)

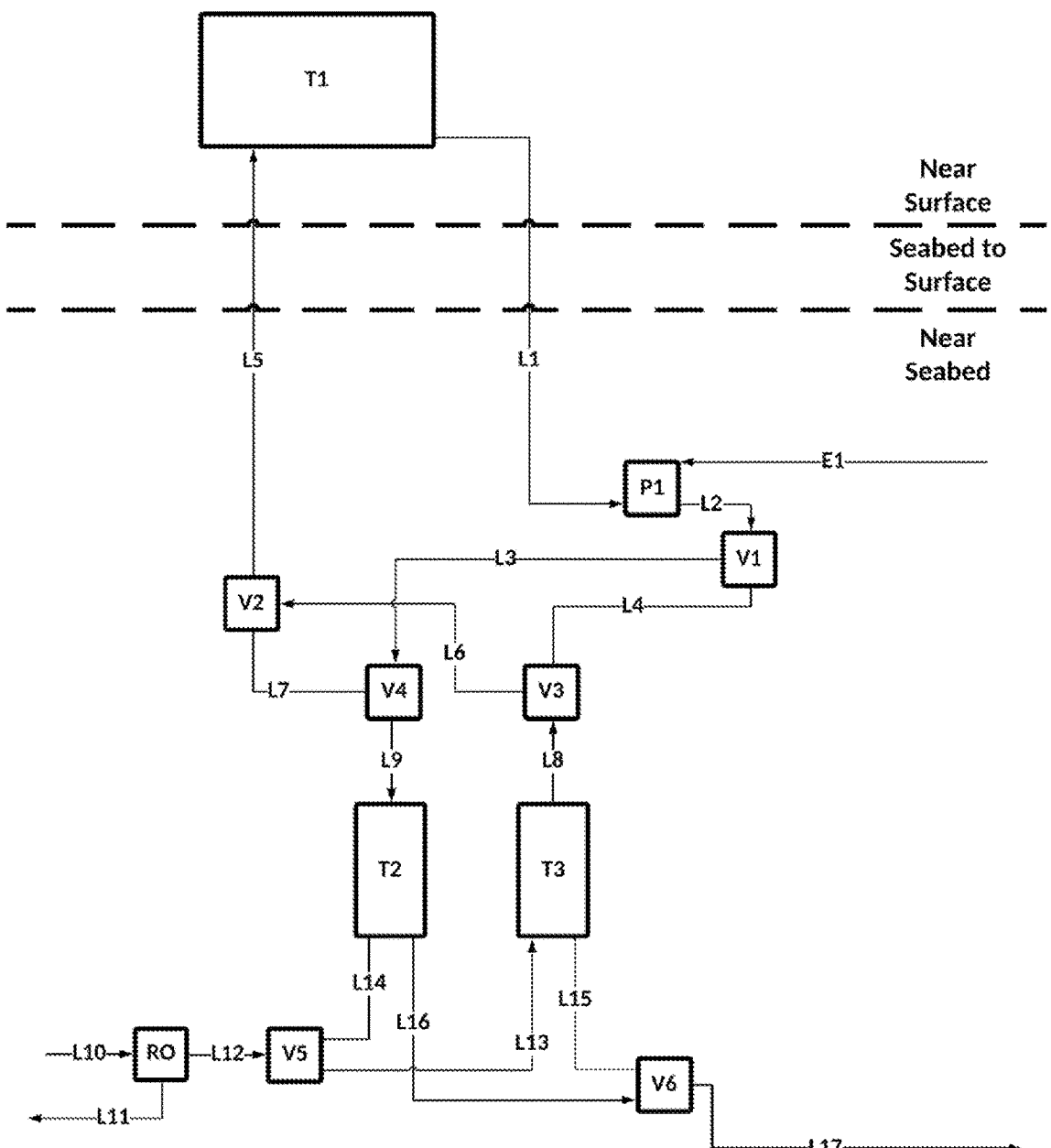
Figure 32 (Above)

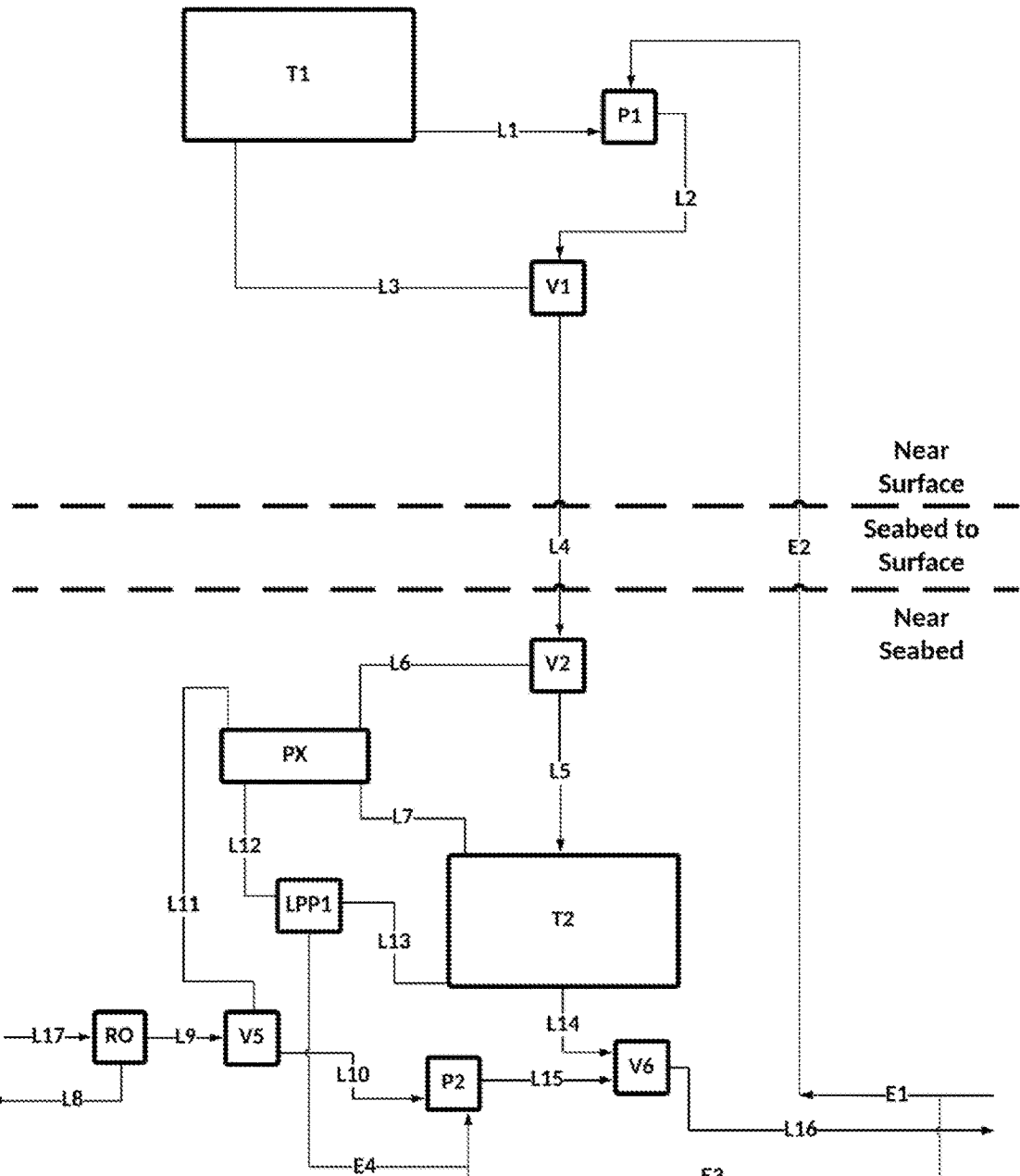
Figure 33 (Above)

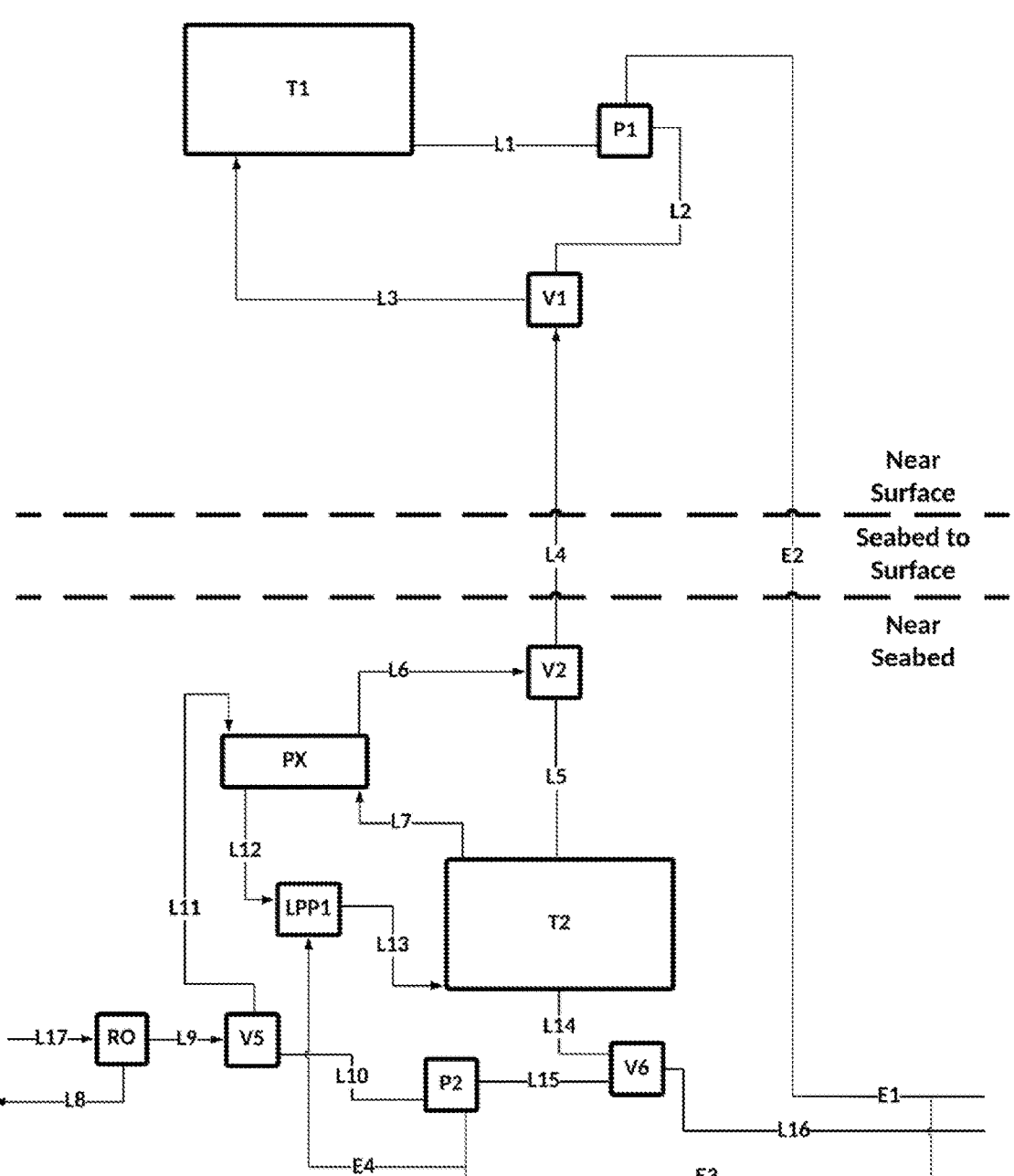
Figure 34 (Above)

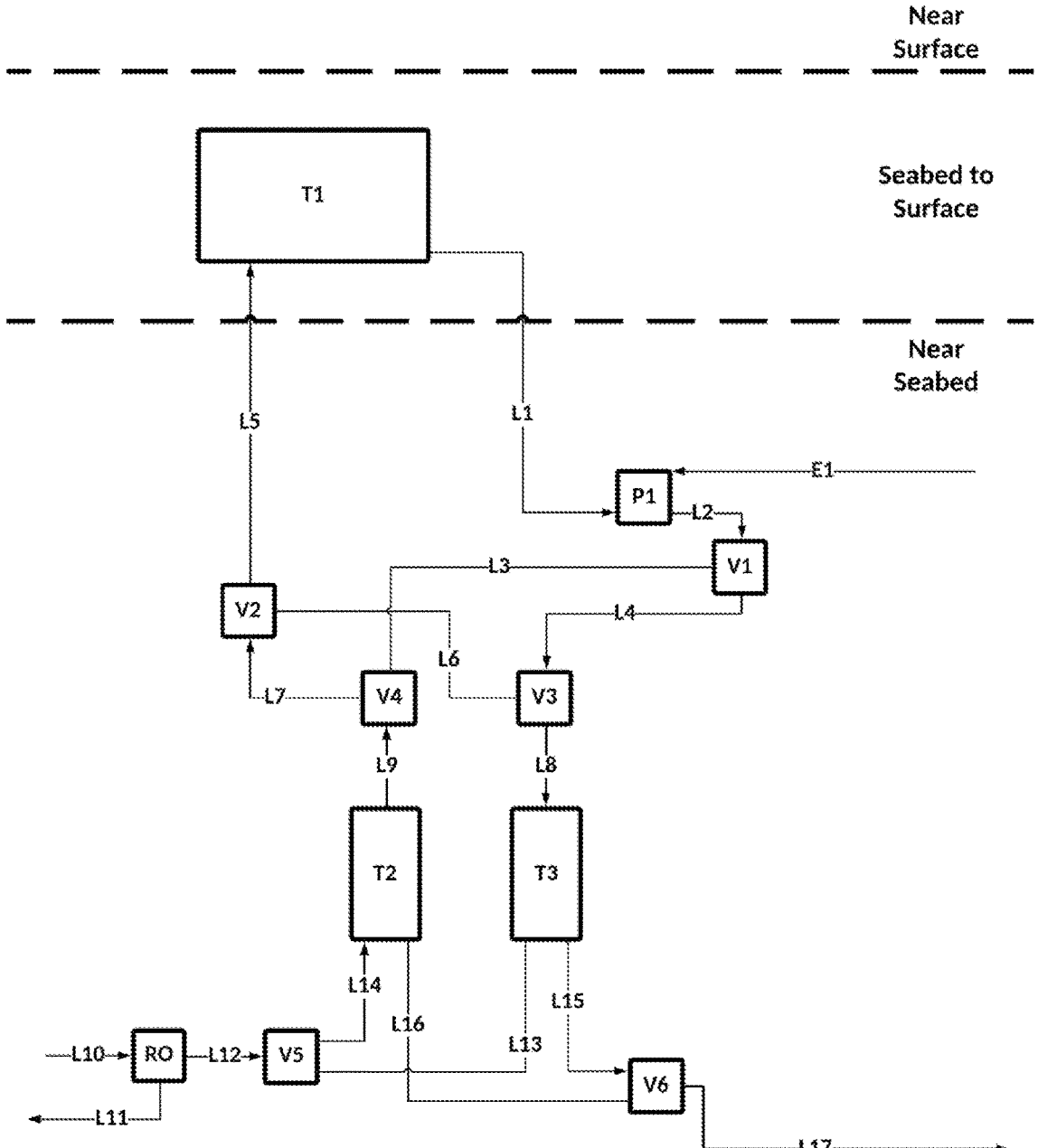
Figure 35 (Above)

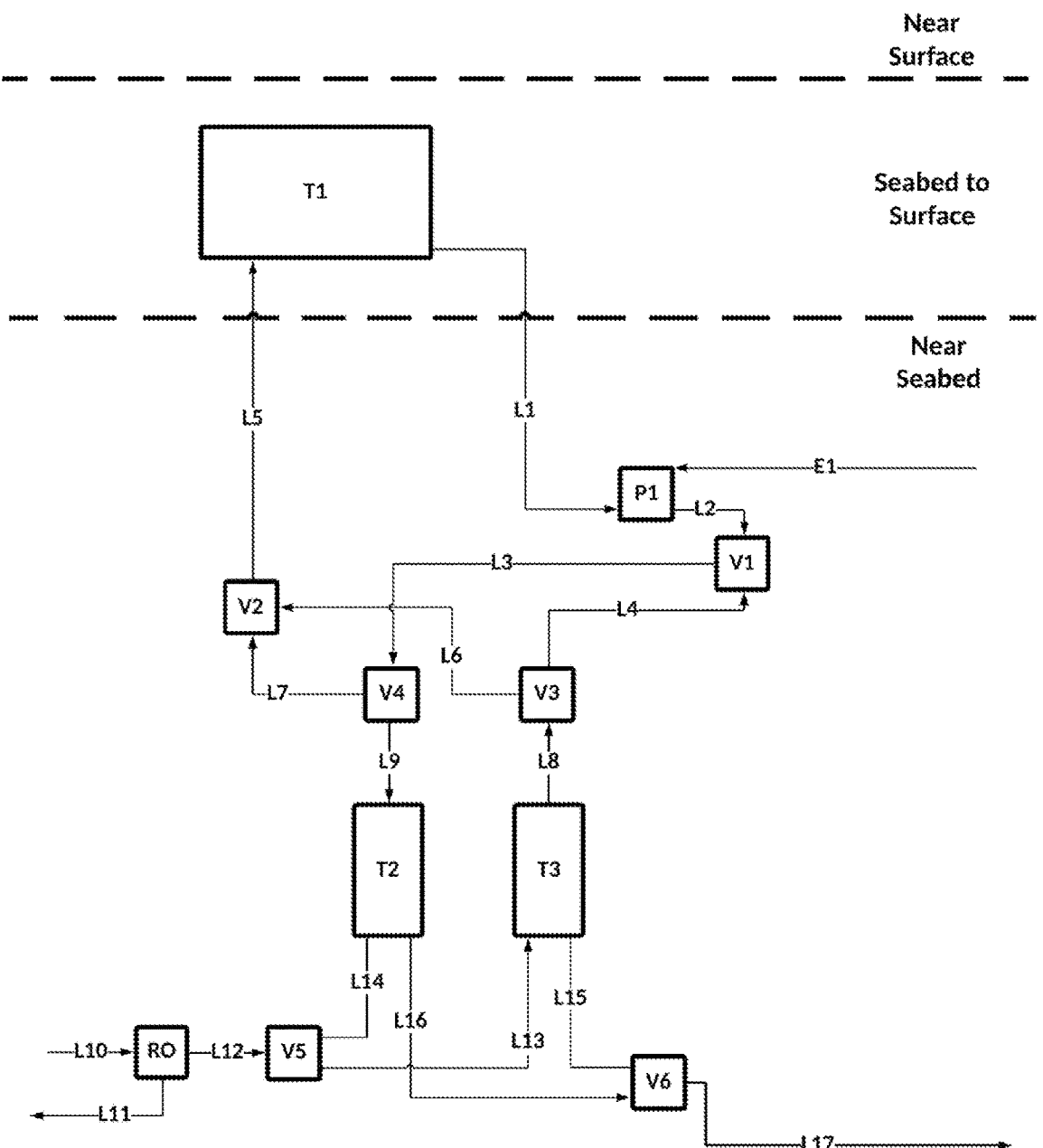
Figure 36 (Above)

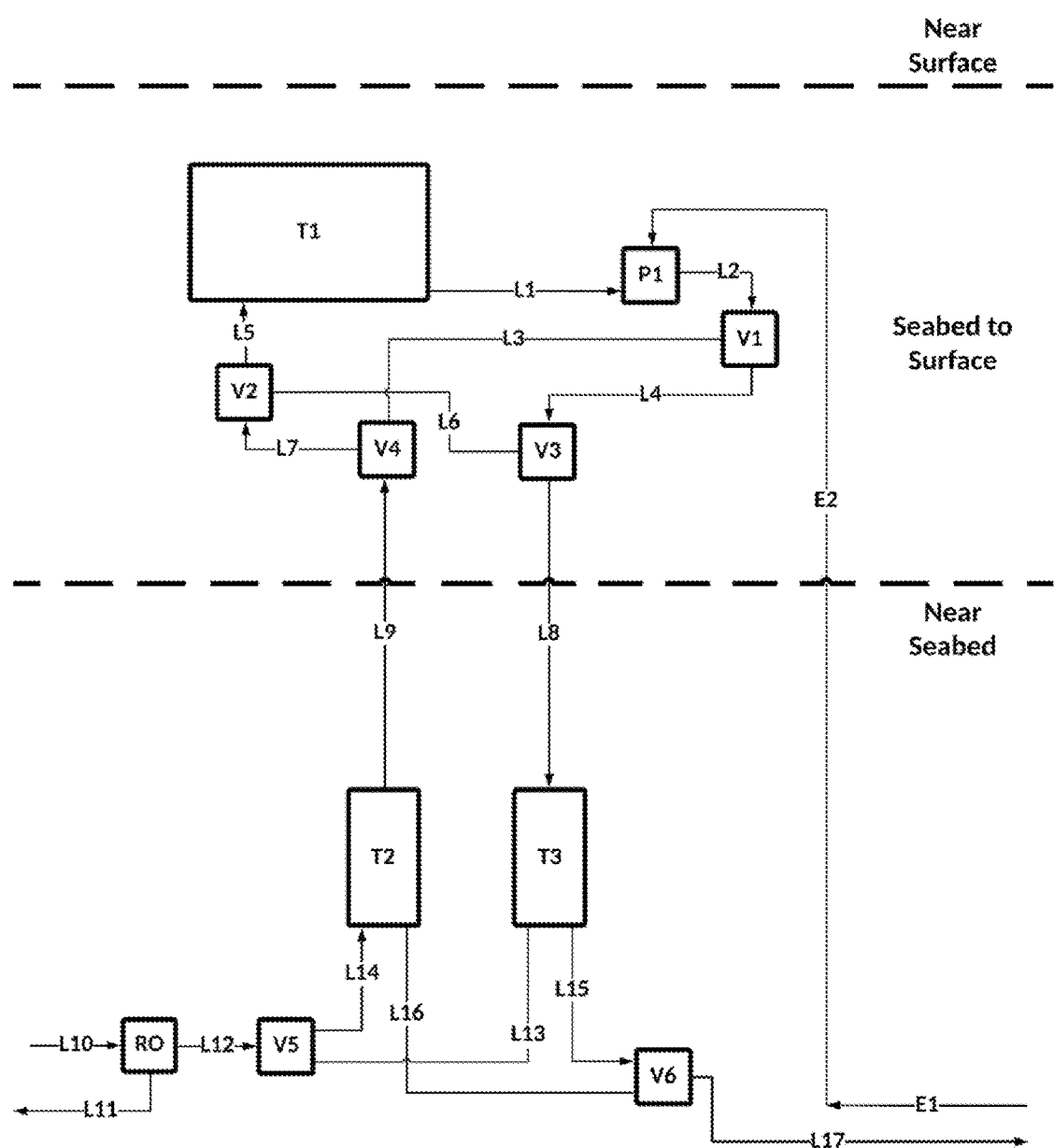
Figure 37 (Above)

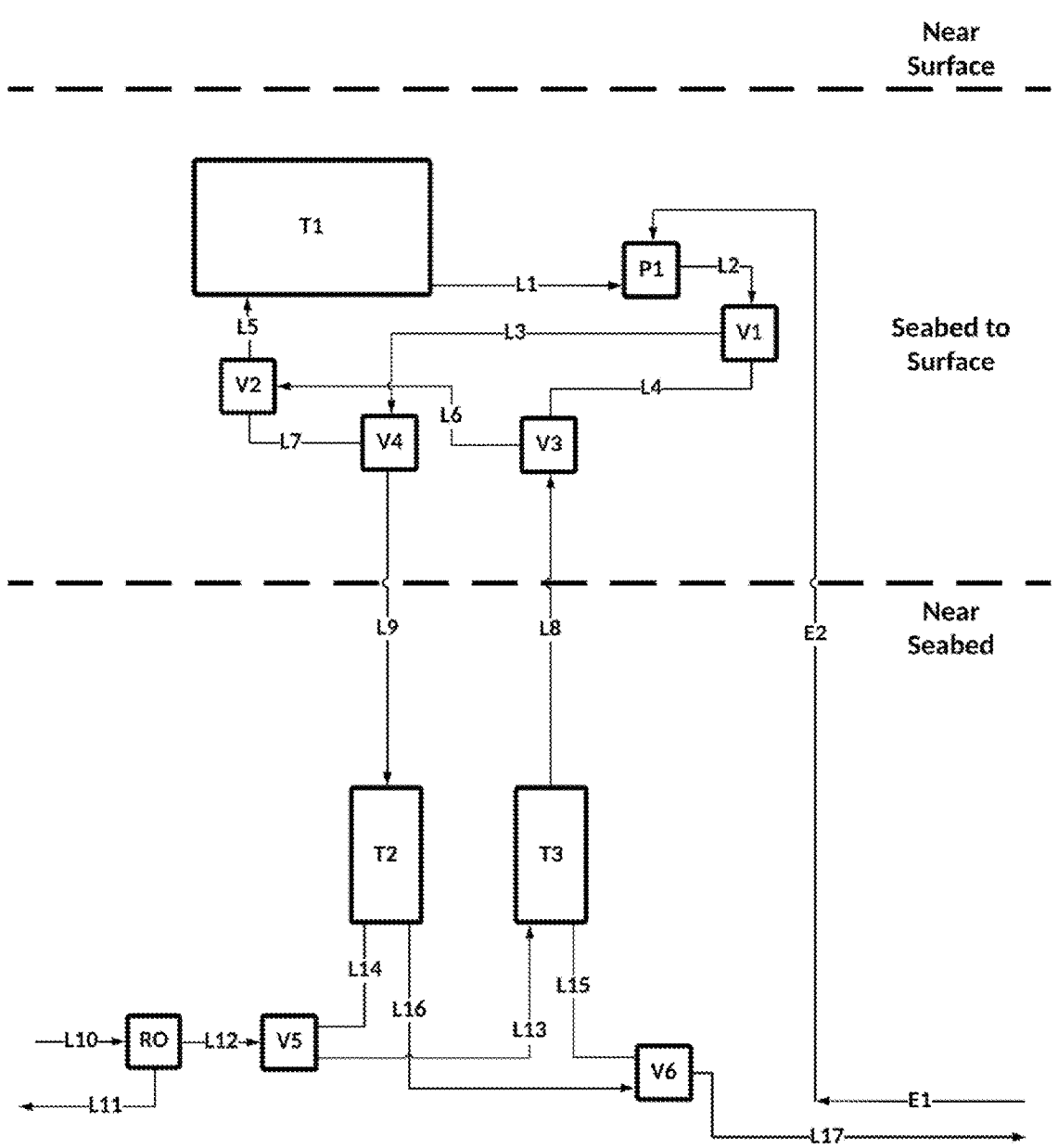
Figure 38 (Above)

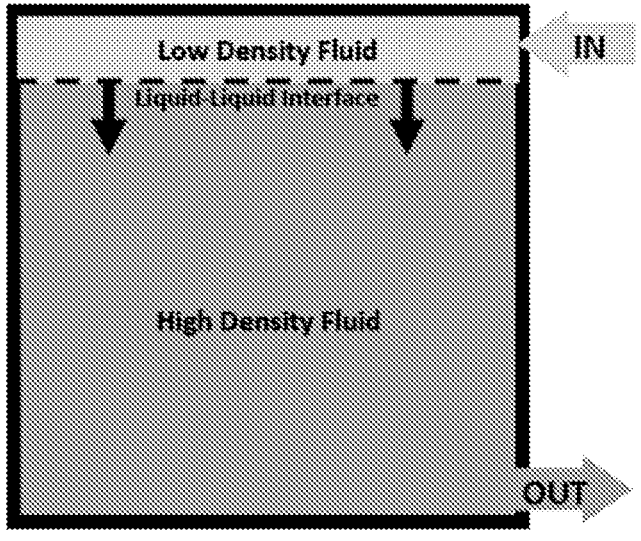
Fig. 39 (Above)
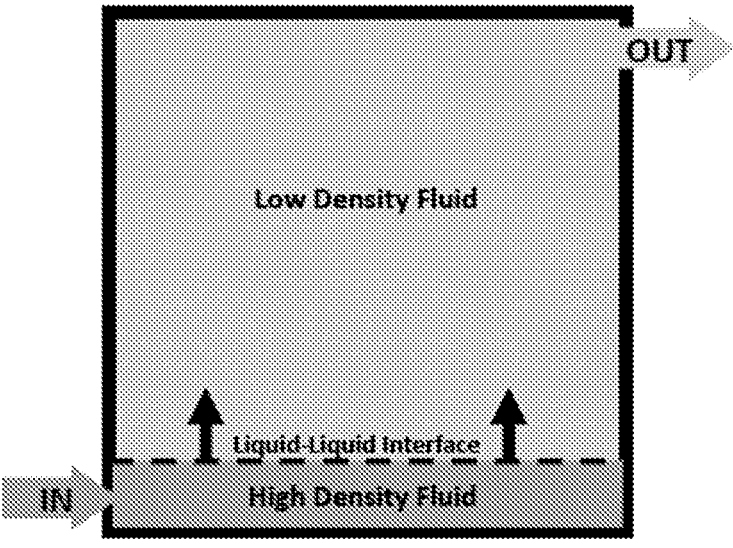
Fig. 40 (Above)

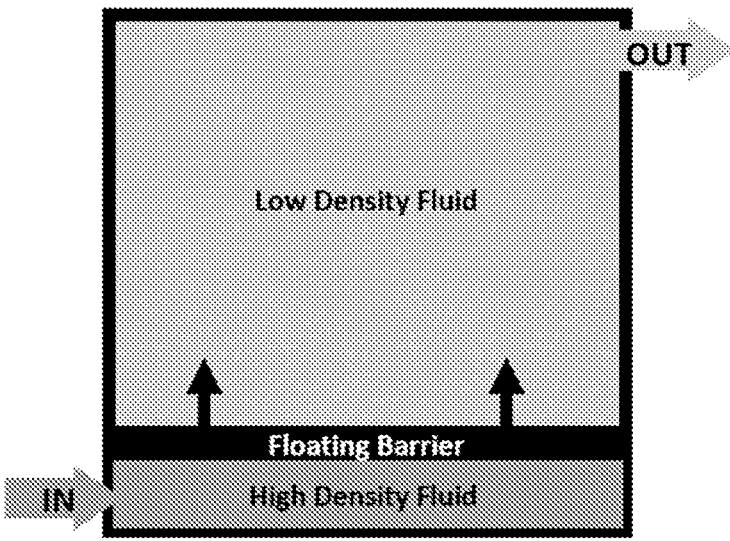
Fig. 41 (Above)
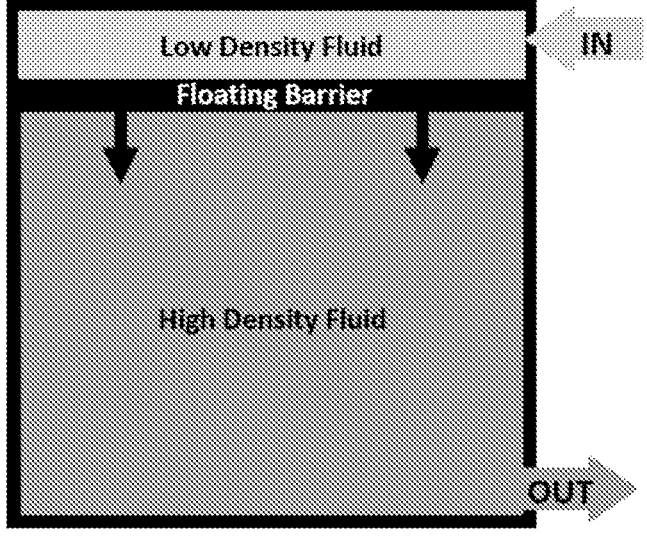
Fig. 42 (Above)

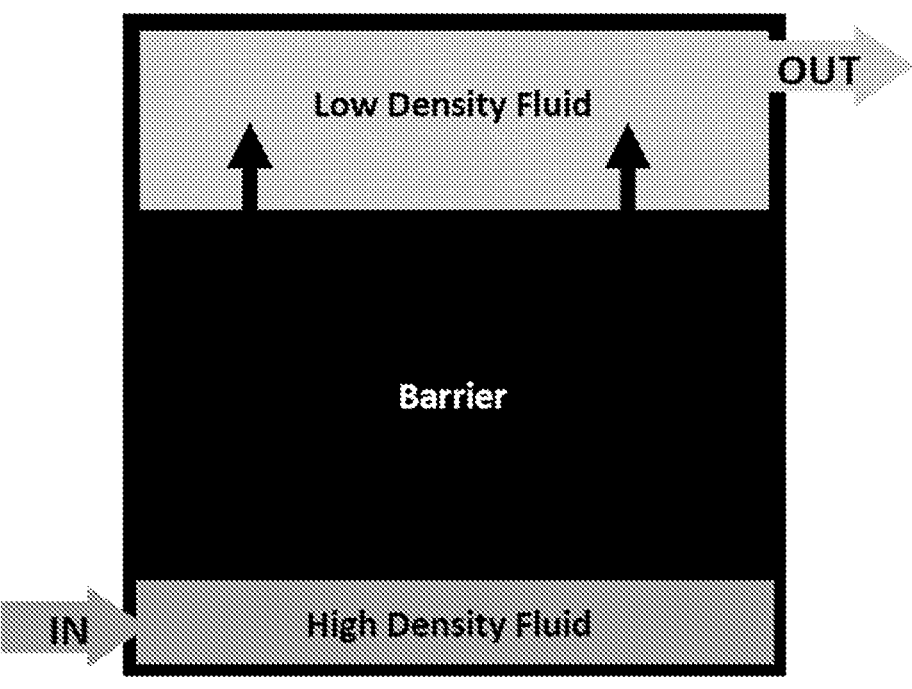
Fig. 43 (Above)
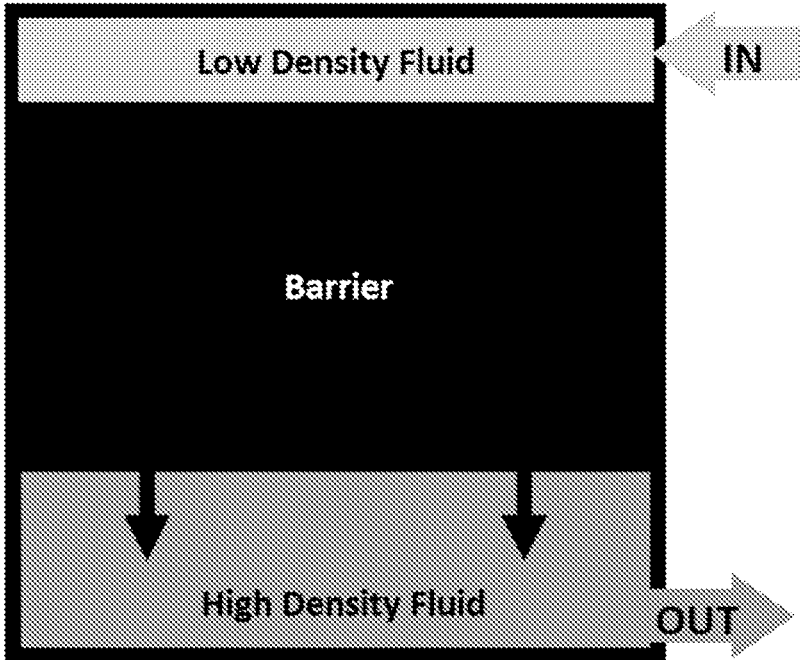
Fig. 44 (Above)

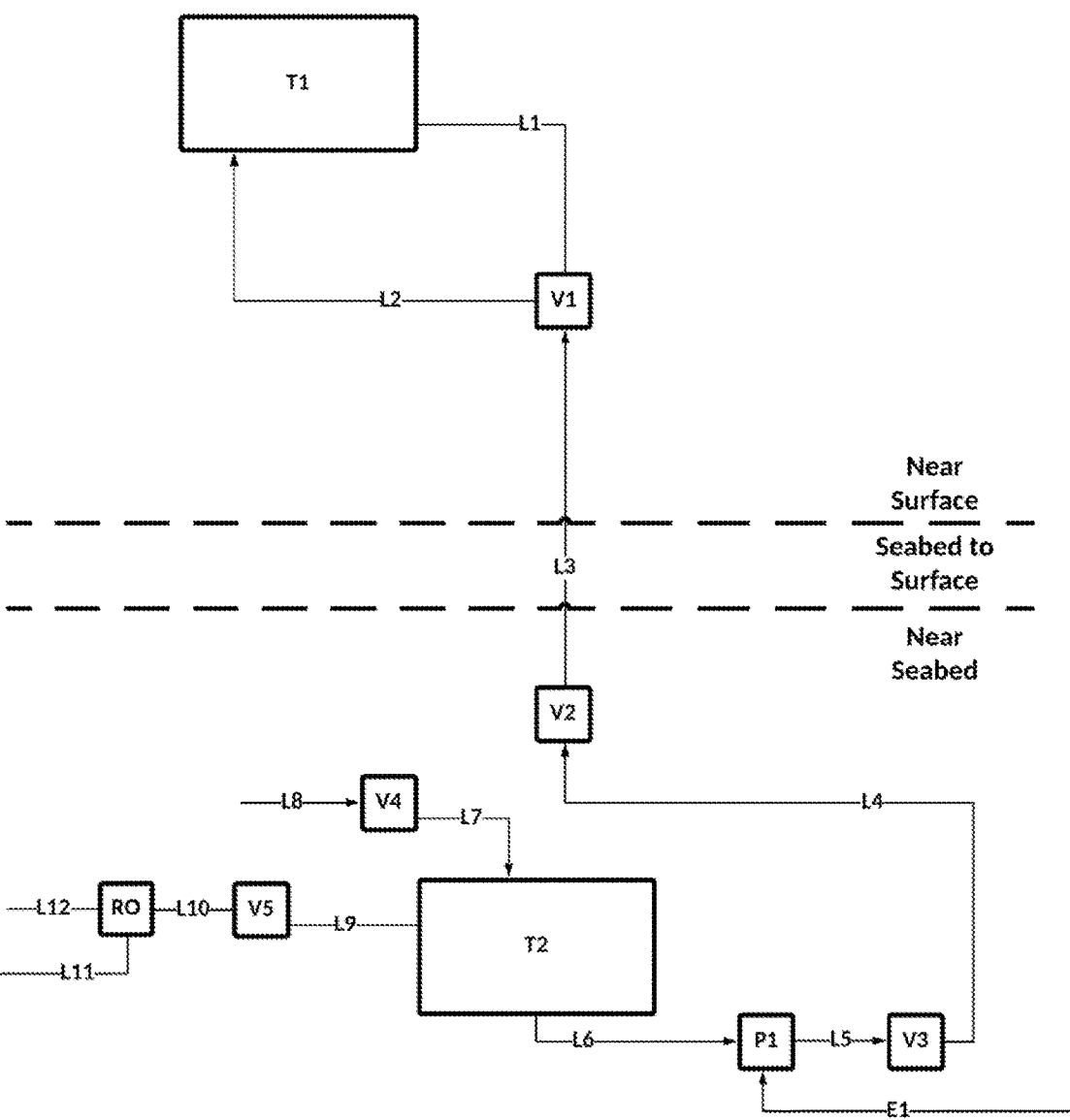
Fig. 45 (Above)

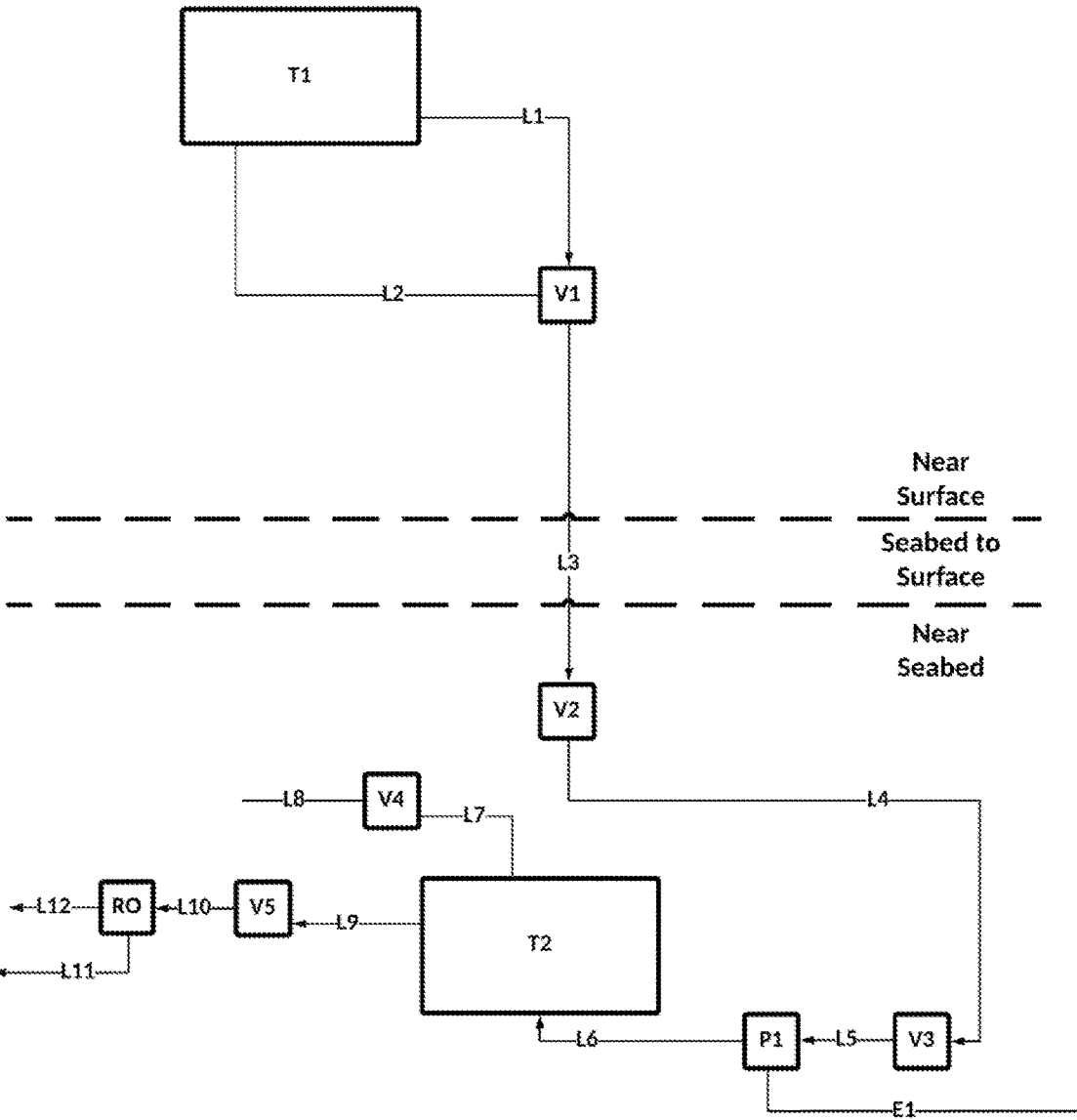
Fig. 46 (Above)

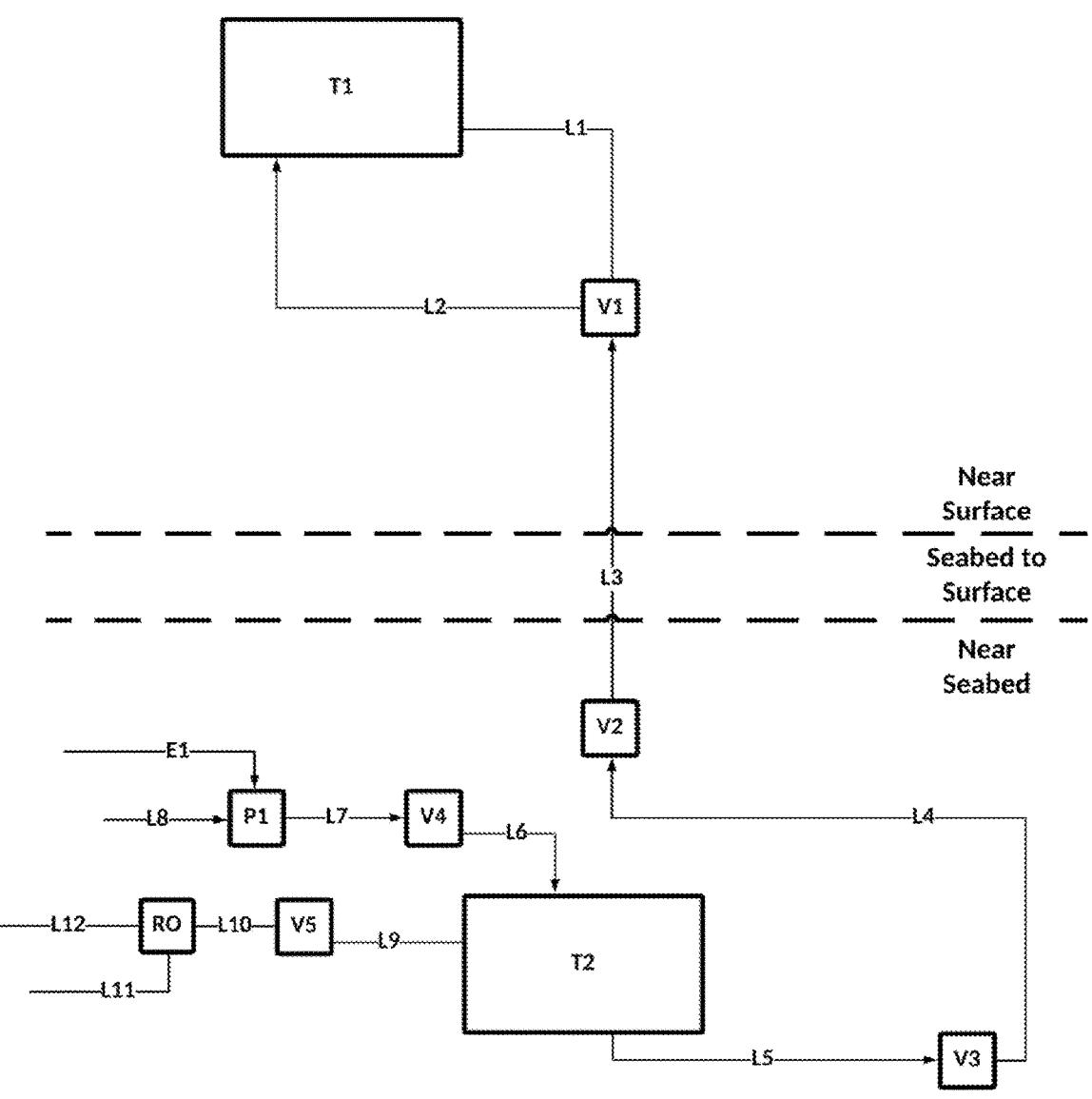
Fig. 47 (Above)

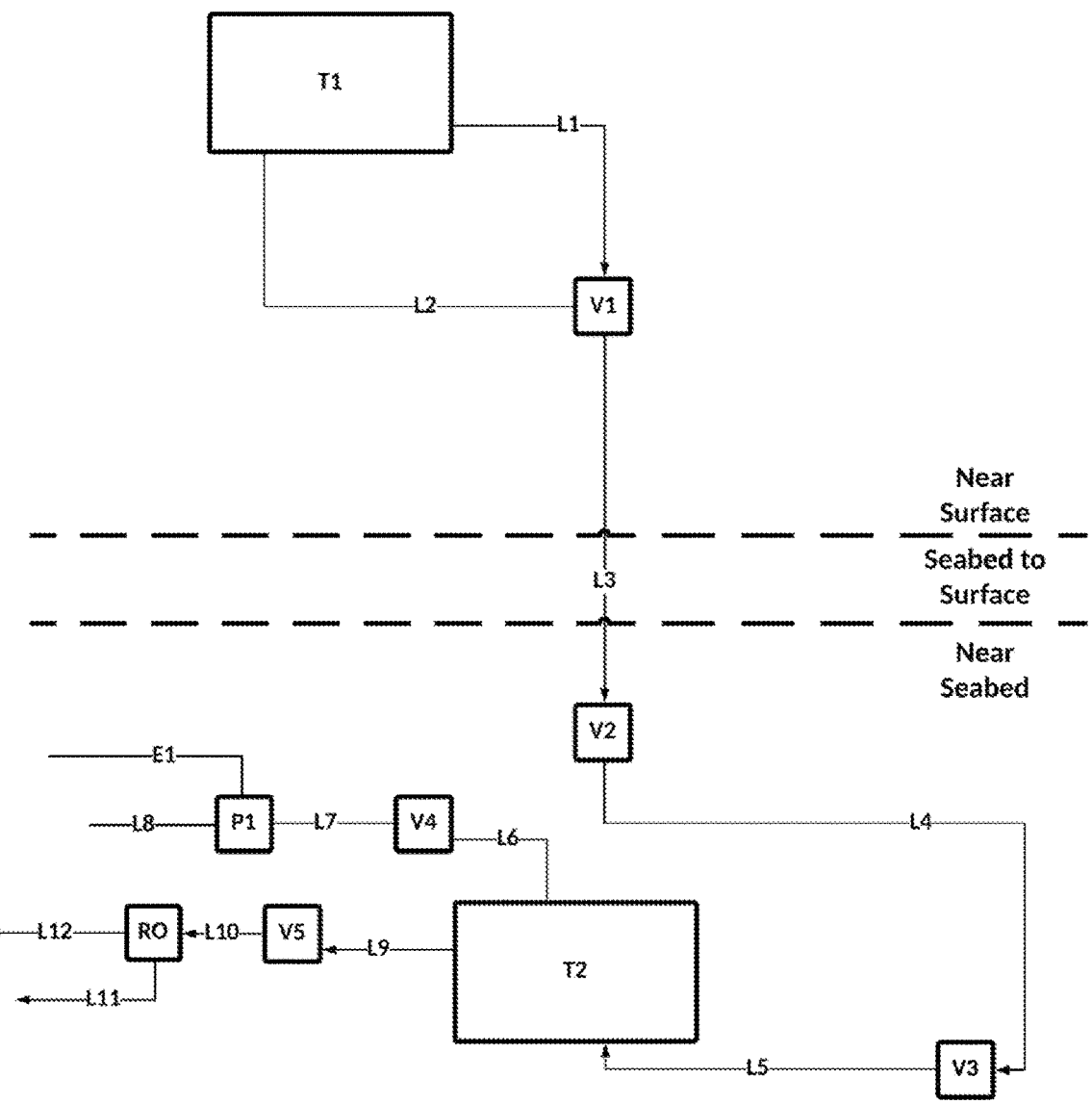
Fig. 48 (Above)

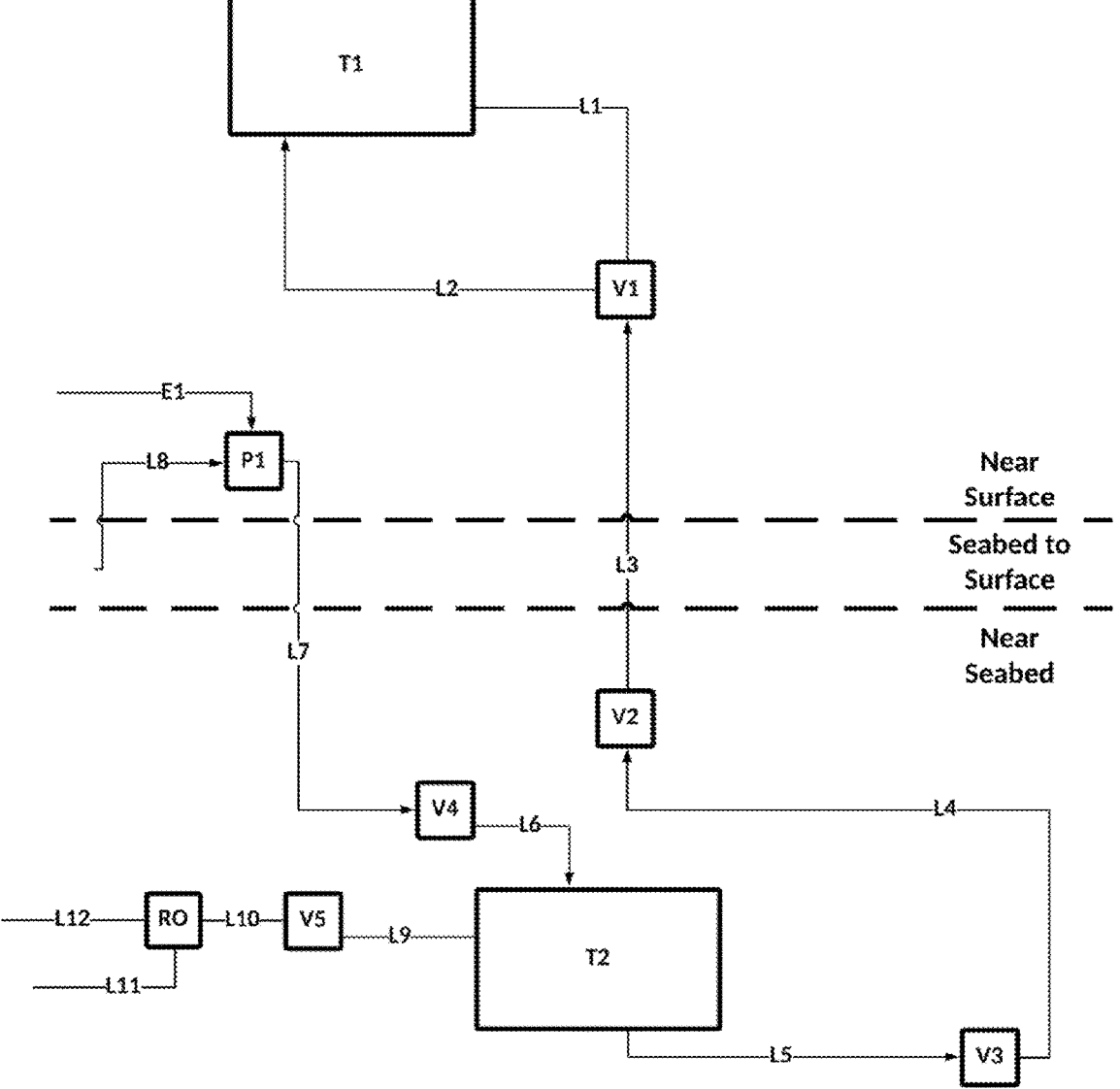
Fig. 49 (Above)

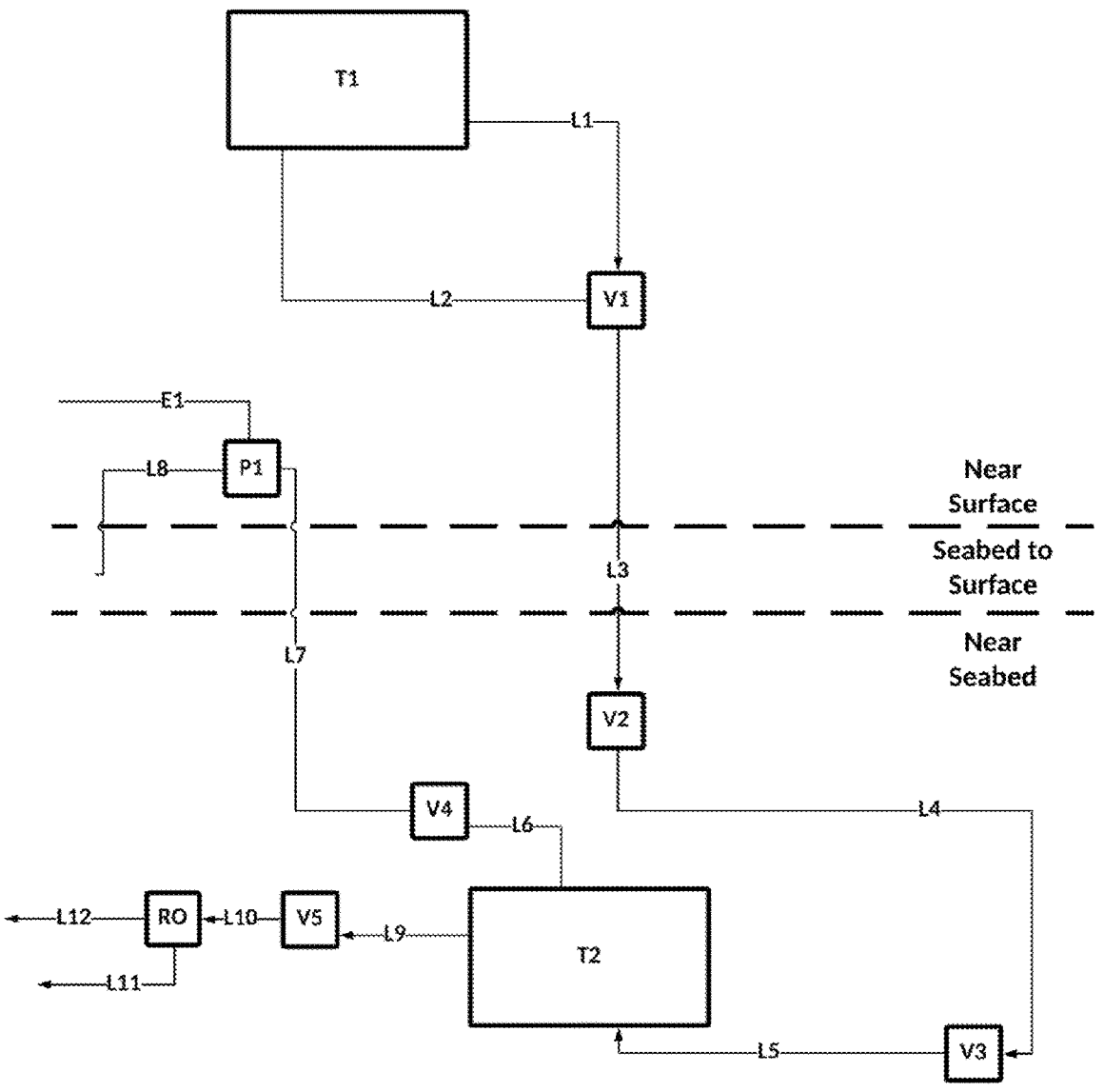
Fig. 50 (Above)

SUBSEA DESALINATION SYSTEMS AND METHODS USING FLUID DISPLACEMENT

CROSS-REFERENCE TO RELATED APPLICATIONS

For U.S. purposes the present application claims priority to and is a divisional of U.S. Ser. No. 18/236,229 filed on Aug. 21, 2023 which is a CIP of and claims priority to PCT/US23/12415 filed on Feb. 6, 2023. PCT/US23/12415 claims priority to U.S. application Ser. No. 17/746,813 filed May 17, 2022 which application is a continuation-in-part of Ser. No. 17/678,684 filed Feb. 23, 2022. U.S. application Ser. No. 17/746,813 is a continuation of U.S. application Ser. No. 17/665,472 filed Feb. 4, 2022 which application is a continuation-in-part of PCT/US21/41931 filed Jul. 21, 2021 published as WO2022/016034 which PCT application claims priority to U.S. application Ser. No. 17/214,100 filed on Mar. 26, 2021 which is a continuation-in-part application of U.S. application Ser. No. 16/932,429 filed Jul. 17, 2020. The application also claims priority to U.S. application No. 63/117,355 filed Nov. 23, 2020; U.S. application No. 63/132,778 filed Dec. 31, 2020 and U.S. application No. 63/139,157 filed Jan. 19, 2021. The application also claims priority to U.S. application No. 63/249,100 filed Sep. 28, 2021 titled FLUID DISPLACEMENT ENERGY STORAGE FOR DESALINATION APPLICATION AND FLOW BATTERY APPLICATION. The application also claims priority to U.S. application No. 63/272,760 filed Oct. 28, 2021 titled FLUID DISPLACEMENT ENERGY STORAGE.

For PCT and U.S. purposes the present application claims priority to U.S. Provisional Application 63/464,244 filed May 5, 2023.

All of the aforementioned applications are hereby incorporated by reference in their entirety.

BACKGROUND AND SUMMARY

There is a need for improved systems and methods for desalination that are more environmentally friendly and cost-effective.

The present invention may pertain to systems and methods for desalination. Some embodiments may comprise desalination systems and methods which may significantly reduce energy efficiency, or reduce energy consumption, or reduce Gibbs free energy of desalination, or lower capital cost, or improve environmental friendliness, or lower operating cost, or reduce mechanically complexity, or enable easier permitting, or improve maintainability, or improve accessibility, or improve accessibility for maintenance, or improve reliability, or reduce the potential for biofouling, or reduce the potential for corrosion, or increase scalability, or enable easier construction and installation at a large scale, or enable easier construction and installation, or enable easier to operation at a large scale, or enable easier operation, or any combination thereof. Some embodiments may enable desalination which inherently comprises energy storage, or comprises embedded or integrated energy storage, which may enable desalination to be powered by intermittent renewables, such as solar, or wind, or wave power, and/or may significantly reduce the energy cost of desalination and/or may significantly reduce the CO2 emissions associated with desalination.

Some embodiments may comprise a subsea desalination system or process which desalinates seawater, or other saline water, or any combination thereof. In some embodiments, seawater may be desalinated by creating a pressure difference between the feed side and permeate side of a desalination membrane by exposing the permeate side of a desalination membrane to the hydrostatic pressure of a low density fluid, such as a low density liquid, and exposing the feed side of a desalination membrane to the hydrostatic pressure of seawater. For example, in some embodiments, the pressure difference between the hydrostatic pressure of the low density fluid and the hydrostatic pressure of the seawater at the depth or elevation of the desalination membrane may be greater than or equal to the pressure difference required for reverse osmosis desalination, or greater than or equal to the osmotic pressure of seawater, or greater than or equal to the osmotic pressure of the desalination feed, or any combination thereof. For example, in some embodiments, a significant hydrostatic pressure difference between the desalination feed and the low density fluid may be due to the significant density difference between the low density fluid and the desalination feed, and/or the depth or elevation of the desalination membrane, and/or the elevation difference between a lower elevation reservoir configured to stored desalinated water and low density and a higher elevation reservoir configured to store low density fluid and/or desalinated water or water.

BRIEF DESCRIPTION OF DRA WINGS

FIG. 1: Fluid displacement desalination system with pump fluidly connected to low density fluid and located near the higher elevation reservoir and with one tank in lower elevation reservoir.

FIG. 2: Fluid displacement desalination system with pump fluidly connected to low density fluid and located near the higher elevation reservoir and with one tank in lower elevation reservoir, wherein low density fluid is being pumped into the tank displacing water.

FIG. 3: Fluid displacement desalination system with pump fluidly connected to low density fluid and located near the higher elevation reservoir and with one tank in lower elevation reservoir.

FIG. 4: Fluid displacement desalination system with pump fluidly connected to low density fluid and located near the higher elevation reservoir and with one tank in lower elevation reservoir, wherein desalinated water is entering the tank, displacing low density fluid.

FIG. 5: Fluid displacement desalination system with lower elevation reservoir comprising two subsea tanks and a pump near the higher elevation reservoir fluidly connected to the low density fluid.

FIG. 6: Fluid displacement desalination system with lower elevation reservoir comprising two subsea tanks and a pump near the higher elevation reservoir fluidly connected to the low density fluid.

FIG. 7: Fluid displacement desalination system with displaced desalinated water transferred to the higher elevation reservoir and exported with a floating or tethered desalination pipeline.

FIG. 8: Fluid displacement desalination system with displaced desalinated water transferred to the higher elevation reservoir and exported with a floating or tethered desalination pipeline.

FIG. 9: Fluid displacement desalination system with displaced desalinated water transferred to the higher elevation reservoir and exported with a floating or tethered desalination pipeline.

FIG. 10: Fluid displacement desalination system with displaced desalinated water transferred to the higher elevation reservoir and exported with a floating or tethered desalination pipeline.

FIG. 11: Fluid displacement desalination system with pump fluidly connected to low density fluid and located near the lower elevation reservoir and with one tank in lower elevation reservoir.

FIG. 12: Fluid displacement desalination system with pump fluidly connected to low density fluid and located near the lower elevation reservoir and with one tank in lower elevation reservoir.

FIG. 13: Fluid displacement desalination system with pump fluidly connected to low density fluid and located near the lower elevation reservoir and with one tank in lower elevation reservoir.

FIG. 14: Fluid displacement desalination system with pump fluidly connected to low density fluid and located near the lower elevation reservoir and with one tank in lower elevation reservoir.

FIG. 15: Fluid displacement desalination system with desalination feed pre-treatment located at least a partially in the higher elevation region or near the higher elevation reservoir.

FIG. 16: Fluid displacement desalination system with desalination feed pre-treatment located at least a partially in the higher elevation region or near the higher elevation reservoir.

FIG. 17: Fluid displacement desalination system with desalination feed pre-treatment located at least a partially in the higher elevation region or near the higher elevation reservoir.

FIG. 18: Fluid displacement desalination system with desalination feed pre-treatment located at least a partially in the higher elevation region or near the higher elevation reservoir.

FIG. 19: Fluid displacement desalination system with a pump fluidly connected to the water in the water export pipeline and located subsea.

FIG. 20: Fluid displacement desalination system with a pump fluidly connected to the water in the water export pipeline and located subsea.

FIG. 21: Fluid displacement desalination system with a pump fluidly connected to the water in the water export pipeline and located subsea.

FIG. 22: Fluid displacement desalination system with a pump fluidly connected to the water in the water export pipeline and located subsea.

FIG. 23: Fluid displacement desalination system with a higher elevation reservoir located on land and fluidly connected to lower elevation reservoir by pipelines.

FIG. 24: Fluid displacement desalination system with a higher elevation reservoir located on land and fluidly connected to lower elevation reservoir by pipelines.

FIG. 25: Fluid displacement desalination system with a higher elevation reservoir located on land and fluidly connected to lower elevation reservoir by pipelines.

FIG. 26: Fluid displacement desalination system with a higher elevation reservoir located on land and fluidly connected to lower elevation reservoir by pipelines.

FIG. 27: Fluid displacement desalination system with a lower elevation reservoir comprising two tanks and a pump is fluidly connected to the water export pipeline.

FIG. 28: Fluid displacement desalination system with a lower elevation reservoir comprising two tanks and a pump is fluidly connected to the water export pipeline.

FIG. 29: Fluid displacement desalination system with a lower elevation reservoir comprising two tanks and desalination feed pre-treatment located in the higher elevation region.

FIG. 30: Fluid displacement desalination system with a lower elevation reservoir comprising two tanks and desalination feed pre-treatment located in the higher elevation region.

FIG. 31: Fluid displacement desalination system with a lower elevation reservoir comprising two tanks and a pump located in the lower elevation region fluidly connected to the low density fluid.

FIG. 32: Fluid displacement desalination system with a lower elevation reservoir comprising two tanks and a pump located in the lower elevation region fluidly connected to the low density fluid.

FIG. 33: Fluid displacement desalination system with a pressure equilibrized subsea tank enabled by an integrated pressure exchanger.

FIG. 34: Fluid displacement desalination system with a pressure equilibrized subsea tank enabled by an integrated pressure exchanger.

FIG. 35: Fluid displacement description system with higher elevation reservoir located subsea.

FIG. 36: Fluid displacement description system with higher elevation reservoir located subsea.

FIG. 37: Fluid displacement description system with higher elevation reservoir located subsea.

FIG. 38: Fluid displacement description system with higher elevation reservoir located subsea.

FIG. 39: Embodiment comprising a tank storing low density fluid and high density fluid with a direct fluid-fluid interface or liquid-liquid interface between the low density fluid and high density fluid and wherein low density fluid is entering the tank and high density fluid is exiting the tank.

FIG. 40: Embodiment comprising a tank storing low density fluid and high density fluid with a direct fluid-fluid interface or liquid-liquid interface between the low density fluid and high density fluid and wherein high density fluid is entering the tank and low density fluid is exiting the tank.

FIG. 41: Embodiment comprising a tank storing low density fluid and high density fluid with a floating barrier between the low density fluid and high density fluid and wherein high density fluid is entering the tank and low density fluid is exiting the tank.

FIG. 42: Embodiment comprising a tank storing low density fluid and high density fluid with a floating barrier between the low density fluid and high density fluid and wherein low density fluid is entering the tank and high density fluid is exiting the tank.

FIG. 43: Embodiment comprising a tank or hydraulic cylinder storing low density fluid and high density fluid with a barrier or plunger hydraulically or mechanically or indirectly exchanging the volumetric flows of low density fluid and high density fluid and wherein high density fluid is entering the tank or hydraulic cylinder and low density fluid is exiting the tank or hydraulic cylinder.

FIG. 44: Embodiment comprising a tank or hydraulic cylinder storing low density fluid and high density fluid with a barrier or plunger hydraulically or mechanically or indirectly exchanging the volumetric flows of low density fluid and high density fluid and wherein high density fluid is entering the tank or hydraulic cylinder and low density fluid is exiting the tank or hydraulic cylinder.

FIG. 45: Fluid displacement desalination comprising high density fluid displacement of a low density fluid comprising desalination feed to desalinate desalination feed employing a subsea pump fluidly connected to the high density fluid.

FIG. 46: Fluid displacement desalination comprising high density fluid displacement of a low density fluid comprising desalination feed to desalinate desalination feed employing a subsea pump fluidly connected to the high density fluid.

FIG. 47: Fluid displacement desalination comprising a high density fluid displacement of a low density fluid comprising desalination feed to desalinate desalination feed employing a subsea pump fluidly connected to the low density fluid.

FIG. 48: Fluid displacement desalination comprising a high density fluid displacement of a low density fluid comprising desalination feed to desalinate desalination feed employing a subsea pump fluidly connected to the low density fluid.

FIG. 49: Fluid displacement desalination comprising a high density fluid displacement of a low density fluid comprising desalination feed to desalinate desalination feed employing a pump fluidly connected to the low density fluid.

FIG. 50: Fluid displacement desalination comprising a high density fluid displacement of a low density fluid comprising desalination feed to desalinate desalination feed employing a pump fluidly connected to the low density fluid.

EXAMPLE DETAILED DESCRIPTION

The present invention may pertain to a higher efficiency, or lower cost, or less mechanically complex, or more reliable, or any combination thereof desalination systems and methods. The present invention may pertain to a higher efficiency, or lower cost, or less mechanically complex, or more reliable, or any combination thereof offshore or marine-based desalination systems and methods. In some embodiments, power or energy for desalination may be provided by pumping or transferring at least a portion of a low density fluid into a subsea tank, displacing at least a portion of the freshwater or desalinated water inside the subsea tank, wherein the displaced desalinated water may transfer into a water pipeline or riser. In some embodiments, water may be desalinated by allowing the desalinated water permeate to displace at least a portion of the low density fluid from inside the subsea tank, wherein the displaced low density fluid may travel through a low density fluid riser or pipe into a higher elevation tank or surface tank. In some embodiments, water may be desalinated using reverse osmosis from the hydrostatic pressure difference, such as gravitational hydrostatic pressure difference, between the seawater desalination feed and a low density fluid, such as a low density liquid, which may possess a density significantly lower than the density of seawater, at a subsea depth or elevation. In some embodiments, a valve fluidly connected to the low density fluid may open, which may allow the reduction of the pressure inside the riser and/or subsea tank to a pressure near the hydrostatic pressure of the low density fluid, which may result a pressure difference between the internal pressure of the subsea tank and the pressure of seawater desalination feed, which may drive or otherwise result in the desalination of at least a portion of desalination feed, forming at least a portion of desalination permeate or desalinated water which may transfer into the subsea tank and/or wherein the desalination permeate displaces at least a portion of low density fluid in the subsea tank.

Some embodiments may enable the volume of liquid pumped, such as low density liquid, to be about the same as or similar to the volume of permeate or desalinated water generated, rather than the volume of seawater desalination feed water, which may reduce energy consumption, or required system sizing. Some embodiments may enable the volume of liquid pumped to be about the same as or similar to the volume of permeate or desalinated water generated, while, for example, enabling the system to be driven by a pump located at, or near, or above the surface of the body of water. Some embodiments may enable the volume of liquid pumped to be about the same as or similar to the volume of permeate or desalinated water generated, rather than the volume of seawater desalination feed water, while enabling the system to be driven by a pump located at, or near, or above the surface of the body of water, which may have multiple benefits, such as increasing energy efficiency, or reducing CAPEX, or increasing scalability or potential scale. In some embodiments, the volume of low density fluid pumped may differ from the volume of the desalination permeate generated due to the liquid compressibility or bulk modulus of the low density fluid and/or any temperature changes or temperature differences. Some embodiments may enable the volume of liquid pumped to be about the same as or similar to the volume of permeate or desalinated water generated, while enabling the pump to be located on, or near, or above the ocean surface, where maintenance may be more accessible, total CAPEX may be lower, and energy efficiency may be greater.

In some embodiments, the pressure inside the subsea tank or the subsea tank internal pressure may vary. For example, in some embodiments, when at least a portion of low density fluid is pumped or otherwise transferred into the subsea tank or lower elevation tank, displacing at least a portion of the water inside the subsea tank or lower elevation tank, the internal pressure of the subsea tank or lower elevation tank may be about the same as or greater than the hydrostatic pressure of the water, or permeate, or desalinated water, or seawater, or desalination feed, or any combination thereof at the depth or elevation or elevation difference. For example, in some embodiments, when at least a portion of permeate enters or transfers into the subsea tank or lower elevation tank, displacing at least a portion of the low density fluid, the internal pressure of the subsea tank or lower elevation tank may be about the same as the hydrostatic pressure of low density fluid at the depth or elevation or elevation difference. For example, in some embodiments, the subsea tank or lower elevation tank may be configured to resist a pressure difference of at least the pressure difference between the hydrostatic pressure of low density fluid at the depth or elevation of the subsea tank or lower elevation tank and the hydrostatic pressure of seawater at the depth or elevation of the subsea tank or lower elevation tank. For example, in some embodiments, the subsea tank or lower elevation tank may be configured to resist a pressure difference of at least the osmotic pressure of seawater, or at least the pressure difference desired for reverse osmosis desalination or other pressure driven desalination process or other membrane based desalination process.

Some embodiments may enable or comprise desalination with inherent energy storage. Some embodiments may enable or comprise desalination with inherent energy storage, which may enable integration with or power from intermittent power sources, such as intermittent renewable energy sources, such as solar, or wind, or tidal power, or wave power, or ocean kinetic energy, or any combination thereof. Some embodiments may enable or comprise desalination with inherent energy storage, which may enable power demand control, or demand response for desalination power demand and/or may enable the desalination system to be powered by grid electricity or electricity wholesale market electricity when desirable or when electricity prices are affordable or desirable.

In some embodiments, the subsea tank or subsea infrastructure may be configured in a manner to enable the subsea tank internal pressure to be similar to or near or about the same as the pressure outside or adjacent to the subsea tank at the same elevation throughout desalination process operation. By enabling the subsea tank to have an internal pressure similar to or about the same as the external pressure, the subsea tank may be constructed with less material, or at a lower cost, or with less pressure difference resistance, or any combination thereof, which may make to constructing or employing a larger volume subsea tank practical and/or affordable.

In some embodiments, a larger subsea tank may enable greater energy storage and/or longer duration energy storage for, for example, desalination. In some embodiments, for example, a power extractor, or a generator, or a mechanical pressure exchanger, or a turbine, or a turbocharger pressure exchanger, or a PX pressure exchanger, or a PX pressure exchanger system, or a pressure exchanger system, or any combination thereof may extract the power or energy in the difference in pressure between the internal pressure of low density fluid (LDF) in the subsea tank and the pressure of LDF in the LDF pipe or riser, and/or may transfer said extracted power or pressure to the desalination permeate, such as 'pumping' the permeate, enabling or power desalination. In some embodiments, the internal pressure of LDF in the subsea tank may be about the same as or similar to the hydrostatic pressure of permeate, or of freshwater, or of seawater, or of desalination feed, or of the adjacent seawater, or the pressure of seawater adjacent to the subsea tank at the same or similar or about the same elevation or depth as the subsea tank. In some embodiments, during power discharge, the pressure of LDF in the LDF pipe or riser may be similar to or about the same as the hydrostatic pressure of LDF at depth or elevation of the subsea tank or at the elevation difference between the lower elevation tank or subsea tank and the higher elevation tank, plus any pressure increase due to required pressure drop in the pipe or other form of transfer. The formed permeate may be transferred into the subsea tank, displacing at least a portion of the low density fluid present in the subsea tank, and/or the internal pressure of the subsea tank may be similar to or about the same as the pressure adjacent to or external to the subsea tank at about the same elevation or depth. In some embodiments, supplemental pump or a small pressure difference or low pressure booster pump or low pressure subsea pump may be employed to increase the pressure of the permeate or transfer permeate to, for example, enable transfer of the permeate into the subsea tank, which may be desirable to, for example, make up for any pressure losses or power losses in the pressure exchange or power exchange.

In some embodiments, desalination feed may comprise seawater which may be provided or sourced from near the lower elevation tank or subsea tank or at an elevation near the lower elevation tank or subsea tank. For example, in some embodiments, it may be desirable to source seawater from near the lower elevation tank or subsea tank or from a subsea depth below the photic zone, or below the dysphotic zone, or below the twilight zone, or any combination thereof, for example, to reduce or minimize the required pre-treatment of seawater and/or reduce or minimize potential interference with marine life or marine ecosystem. In some embodiments, desalination feed may comprise seawater which may be provided or sourced from seawater. In some embodiments, desalination feed may comprise seawater which may be provided or sourced from subsea. In some embodiments, desalination feed may comprise seawater which may be pre-treated near the higher elevation tank or surface tank and/or near or above the surface of the body of water, then the pre-treated desalination feed may be transferred to the desalination system or process. In some embodiments, supplemental pressure or pumping may be applied to pre-treated desalination feed transferred from near or above the surface of the body of water, for example, to facility transfer subsea for desalination and/or the provide additional pressure or driving force for desalination. In some embodiments, desalination feed may comprise seawater which may be pre-treated near the higher elevation tank or surface tank and/or near or above the surface of the body of water, then the pre-treated desalination feed may be transferred to the desalination system or process, which may be located near or at an elevation near the subsea tank or lower elevation tank.

In some embodiments, the subsea tank or lower elevation tank may comprise a rigid tank. In some embodiments, the subsea tank or lower elevation tank may comprise a flexible tank or a bladder tank. In some embodiments, the subsea tank or lower elevation tank may comprise a combination of a rigid tank and a bladder tank or flexible tank. In some embodiments, the subsea tank or lower elevation tank may comprise a rigid tank and a flexible or bladder tank. In some embodiments, the subsea tank or lower elevation tank may be fixed to the seabed. In some embodiments, the subsea tank or lower elevation tank may be located on the seabed. In some embodiments, the subsea tank or lower elevation tank may be tethered above the seabed, or suspended subsea, or any combination thereof. In some embodiments, the subsea tank or lower elevation tank may be anchored to the seabed, or piled to the seabed, or suction piled to the seabed, or suction connected to the seabed, or any combination thereof. In some embodiments, the subsea tank or lower elevation tank may be at a lower elevation, or greater depth, or any combination thereof than the higher elevation tank.

In some embodiments, the surface tank or higher elevation tank or higher elevation storage reservoir or the higher elevation low density fluid storage reservoir may comprise a floating vessel, or offshore structure, or moored vessel, or tethered vessel, or tethered structure, or any combination thereof. In some embodiments, the surface tank or higher elevation tank or higher elevation storage reservoir or the higher elevation low density fluid storage reservoir may comprise a fixed structure or an onshore structure.

In some embodiments, power or energy for desalination may be provided by a low density fluid pump which may be located on or near or at an elevation near the surface tank or higher elevation tank or higher elevation storage reservoir or the higher elevation low density fluid storage reservoir.

In some embodiments, the low density fluid pump may be located on or near or at an elevation near the surface tank or higher elevation tank or higher elevation storage reservoir or the higher elevation low density fluid storage reservoir. In some embodiments, the low density fluid pump may be located above sea-level or on a floating vessel floating on the sea or body of water. For example, in some embodiments, low density fluid may be pumped from the surface tank or higher elevation tank or higher elevation storage reservoir or the higher elevation low density fluid storage reservoir using a nearby or otherwise fluidly connected pump, wherein the low density fluid may be transferred from the higher elevation tank or higher elevation storage reservoir to the lower elevation tank or subsea tank using a pipe, or riser pipe, or pipeline. For example, in some embodiments, low density fluid may be allowed to transfer from the lower elevation reservoir or subsea tank through a pipe or riser pipe into the higher elevation tank or higher elevation storage reservoir. For example, in some embodiments, low density fluid may be allowed to transfer from the lower elevation reservoir or subsea tank through a pipe or riser pipe into the higher elevation tank or higher elevation storage reservoir, wherein it may be desirable for the low density fluid to bypass the pump or for valves or fluidly connected valves to be at least partially open to allow the flow of low density fluid into the higher elevation tank or higher elevation storage reservoir. In some embodiments, it may be desirable to locate the on or near or at an elevation near the surface tank or higher elevation tank or higher elevation storage reservoir or the higher elevation low density fluid storage reservoir, to, for example, including, but not limited to, one or more or any combination of the following: enable greater maintainability of the LDF pump and/or power electronics, or enable greater accessibility of the LDF pump and/or power electronics, or enable the use of higher efficiency pumps, or enable the use of lower cost or lower CAPEX or more widely available pumps, or enable greater pump or system scale, or enable greater pump energy efficiency.

In some embodiments, the pressure of the permeate side of the desalination process or system and the pressure of the internal pressure of the subsea tank may be significantly different during charging, as in when the low density fluid displaces the desalinated water permeate, and about the same during discharging, as in when the desalinated water permeate displaces the low density fluid.

In some embodiments, power or energy for desalination may be provided by a low density fluid pump or a pump which transfers or supplies hydraulic pressure to the low density fluid. In some embodiments, the low density fluid pump may be located on the vessel or structure or near the vessel or structure comprising the higher elevation tank or higher elevation reservoir. In some embodiments, the low density fluid pump may comprise a subsea pump. In some embodiments, the low density fluid pump may comprise a subsea pump which be located on or near or at an elevation near or at about the same elevation as the subsea tank or lower elevation reservoir and/or may be fluidly connected to the LDF riser or pipe. In some embodiments, a subsea pump pumping low density fluid may have lower potential or propensity for biofouling, or corrosion, or scaling, which may enable greater pump longevity or lifespan and/or reduce required pump maintenance. For example, some low density fluids, such as, for example, n-butane, or n-butane comprising <0.1% butadiene, may possess an ultra-low propensity for biofouling, or corrosion, or scaling, or dissolving salts, or any combination thereof compared to water. In some embodiments, it may be desirable to locate the LDF pump subsea to reduce the potential power requirements of a dynamic power cable, or to avoid the need for a dynamic power cable, or to reduce potential hydraulic losses, or any combination thereof.

In some embodiments, power or energy for desalination may be provided by a subsea pump fluidly connected to the desalinated water output pipe.

For example, in some embodiments, during charging or storing power or energy, a valve fluidly connected to the desalinated water or desalinated water permeate input pipe to a subsea tank may be closed, and a valve fluidly connected to the low density fluid pipe or riser may be open, and a valve fluidly connected to the desalinated water output pipe may be open. A subsea pump fluidly connected to the desalinated water output pipe may pump at least a portion of desalinated water from the subsea tank into or through the desalinated water output pipe. A subsea pump fluidly connected to the desalinated water output pipe may pump at least a portion of desalinated water from the subsea tank into or through the desalinated water output pipe, which may comprise providing the power or pressure difference to overcome the difference in pressure between the internal pressure of the subsea tank and the internal pressure of the desalinated water output pipe. Low density fluid may transfer through the low density fluid pipe into the subsea tank and may displace at least a portion the desalinated water in the subsea tank or occupy the volume of the subsea tank previously occupied by the portion of desalinated water transferred from or out of the subsea tank. In some embodiments, the pressure inside the subsea tank or the internal pressure of the subsea tank may be about the same as or near the hydrostatic pressure or gravitational hydrostatic pressure of the low density fluid at the depth or elevation difference between the subsea tank or lower elevation tank and the higher elevation tank minus any pressure drop or losses.

For example, in some embodiments, during stored power discharging or producing desalinated water or producing desalinated water permeate, a valve fluidly connected to the desalinated water or desalinated water permeate input pipe to a subsea tank may be open, and a valve fluidly connected to the low density fluid pipe or riser may be open, and a valve fluidly connected to the desalinated water output pipe may be closed. The permeate side of the desalination process may be exposed to the lower pressure of the internal pressure of the subsea tank, which may result in the production of at least a portion of desalinated water permeate and transferred into the subsea tank, displacing at least a portion of low density fluid in the subsea tank from the subsea tank or displacing at least a portion of the low density fluid in the subsea tank or occupy the volume of the subsea tank previously occupied by the portion of low density fluid transferred from or out of the subsea tank. At least a portion of low density fluid in the subsea tank may transfer from the subsea tank through the low density fluid pipe into the higher elevation tank. In some embodiments, the pressure inside the subsea tank or the internal pressure of the subsea tank may be about the same as or near the hydrostatic pressure or gravitational hydrostatic pressure of the low density fluid at the depth or elevation difference between the subsea tank or lower elevation tank and the higher elevation tank plus any pressure drop or losses.

In some embodiments, employing a subsea pump on the desalinated water output pipe may be desirable, due to, for example, enabling the subsea tank to remain at a more consistent or relatively consistent pressure between charging and discharging, or reduce the required power capacity or need for a dynamic power cable, or any combination thereof.

In some embodiments, the pressure of the permeate side of the desalination process or system and the pressure of the internal pressure of the subsea tank may be about the same during charging, as in when the low density fluid displaces the desalinated water permeate, and about the same during discharging, as in when the desalinated water permeate displaces the low density fluid.

In some embodiments, power or energy for desalination may be provided by a subsea pump, which may be fluidly connected to the desalinated water permeate output from the desalination process or system and/or fluidly connected to the desalinated water input pipe transferring desalinated water from the desalination system or process to the subsea tank.

In some embodiments, power or energy for desalination may be provided by a subsea pump, which may be fluidly connected to the desalinated water permeate output from the desalination process or system and/or fluidly connected to the desalinated water input pipe transferring desalinated water from the desalination system or process to the subsea tank. In some embodiments, said subsea pump may comprise a pressure and/or power exchanging system or method, which may comprise transferring pressure or power from at least a portion of the low density fluid exiting or transferred out of the subsea tank to pump or otherwise transfer desalinated water permeate into the subsea tank. In some embodiments, said subsea pump may comprise an electric and/or hydraulically powered pump to pump or otherwise transfer desalinated water permeate into the subsea tank. In some embodiments, said subsea pump may pump or otherwise transfer desalinated water permeate into the subsea tank, wherein the pump may overcome or provide the pressure difference between the pressure of the permeate side of the desalination system or process and the pressure of the internal pressure of the subsea tank. For example, in some embodiments, the internal pressure of the subsea tank may be about the same as, for example, including but not limited to, on or more or any combination of the following: the gravitational hydrostatic pressure of seawater, or the pressure of the body of water adjacent to the subsea tank at the same depth or elevation of the subsea tank, or the gravitational hydrostatic pressure of desalinated water plus or minus any pressure drop or losses. In some embodiments, the pressure difference between the permeate side of the desalination process or system and the internal pressure of the subsea tank may be about the same as the pressure difference desired to enable or drive reverse osmosis desalination, plus or minus any losses or frictional losses or pressure drop.

Some embodiments may comprise subsea desalination with subsea desalinated water storage. In some embodiments, desalinated water may be stored in a rigid subsea tank or a subsea tank. In some embodiments, desalinated water may be stored in a bladder tank or flexible tank. In some embodiments, subsea water storage may comprise or employ the displacement of a low density fluid with water to store water, or displacement of water with low density fluid to release or transfer stored water.

In some embodiments, desalination pumps or hydraulic systems may be powered by electricity, or hydraulic pressure transfer, or pneumatic pressure transfer, or hydraulic systems, or mechanical transfer, or mechanical systems, or thermal systems, or pressure based systems, or light-based systems, or heat-based systems, or osmotic systems, or any combination thereof.

In some embodiments, desalinated water may be transferred or piped by means of a pipeline to shore or an application requiring desalinated water. In some embodiments, desalinated water may be transferred or piped by means of a floating pipeline, or a suspended pipeline, or tethered pipeline. In some embodiments, desalinated water may be transferred by pipeline located on, or beneath, or connected to, or any combination thereof the seabed. In some embodiments, desalinated water may be transferred to a storage reservoir. For example, in some embodiments, desalinated water may be transferred to a subsea storage tank. For example, in some embodiments, desalinated water may be transferred to a subsea storage reservoir, or a sub-terranean aquifer, or any combination thereof. For example, in some embodiments, desalinated water may be transferred to a floating storage reservoir, or to a storage tank located in the same vessel or adjacent to the low density fluid storage tank, or higher elevation tank, or higher elevation reservoir. In some embodiments, desalinated water may be transferred to a higher elevation, then may be transferred to an application requiring desalinated water, or a municipal water system, or to shore, or any combination thereof. In some embodiments, desalinated water may be transferred by ship, or marine vessel, or floating vessel, or airplane, or aircraft, or train, or barge, or watercraft, or land based vehicle, or tunnel, or pipeline, or any combination thereof.

In some embodiments, desalination may be enabled by a pressure difference between the desalination feed and the desalination permeate comprising freshwater. In some embodiments, desalination may be powered by or driven by the displacement of low density fluid with desalination permeate water due to, for example, the hydrostatic pressure difference between the gravitational hydrostatic pressure of desalination feed, such as seawater, and the gravitational hydrostatic pressure of a low density fluid, which may be due to the significant density difference between the density of desalination feed, such as seawater, and the density of the low density fluid and the elevation difference or depth which may comprise the liquid column of the low density fluid and the liquid column of the desalination feed. In some embodiments, the desalination feed may comprise seawater. In some embodiments, the desalination feed may comprise a saline water or water comprising total dissolved solids greater than desalination permeate or desalinated water or freshwater. In some embodiments, the pressure difference may exceed the osmotic pressure of the desalination feed comprising seawater, which may enable the permeation and/or formation of at least a portion of a permeate comprising freshwater and the rejection and/or formation of at least a portion of a retentate comprising salt water or desalination brine. In some embodiments, the pressure difference may exceed the osmotic pressure of the desalination feed comprising seawater, which may enable the permeation and/or formation of at least a portion of a permeate comprising freshwater and the rejection and/or formation of at least a portion of a retentate comprising salt water or desalination brine, wherein the desalination brine formed may comprise a greater concentration or total dissolved solids concentration than the desalination feed comprising seawater and/or the desalination brine may be diffused or released into the sea. In some embodiments, said pressure difference may be created or enabled by or may comprise the difference in hydrostatic pressure between the hydrostatic pressure of a liquid column comprising a low density liquid or fluid at a depth and the hydrostatic pressure of a seawater or desalination feed comprising seawater at a water or a liquid column comprising seawater at a depth. In some embodiments, said pressure difference may be created or enabled by or may comprise the difference in hydrostatic pressure between the hydrostatic pressure of a liquid column comprising a low density liquid or fluid at a depth and the hydrostatic pressure of a seawater or desalination feed at a water or a liquid column comprising seawater at a depth, wherein said depth of the low density liquid or fluid may be about the same as the depth of the seawater or desalination feed. In some embodiments, the low density liquid or fluid may comprise a liquid or fluid with a density less than the density of desalination feed or seawater, which may enable the hydrostatic pressure of the low density liquid or fluid across an elevation difference, or at the bottom of a liquid or fluid column, or at a depth, or any combination thereof to be less than the hydrostatic pressure of the desalination feed or seawater. In some embodiments, the low density liquid or fluid may comprise a liquid or fluid with a density less than the density of desalination feed or seawater, which may enable the hydrostatic pressure of the low density liquid or fluid across an elevation difference or at or near the bottom of a liquid or fluid column or at a depth to be less than the hydrostatic pressure of the desalination feed or seawater at about the same elevation difference or at or near the bottom of about the same liquid or fluid column or at about the same depth.

In some embodiments, it may be desirable for the low density liquid or fluid to comprise a liquid to, for example, reduce or minimize the potential compressibility to, for example, enable greater hydraulic efficiency and/or reduce or minimize the change in volume with depth and/or enable applicability to greater or increasing seawater depths.

In some embodiments, it may be desirable for the low density liquid or fluid to possess limited or low solubility or to be insoluble or to be practically insoluble in seawater or freshwater or desalinated water or desalination permeate. In some embodiments, it may be desirable for the low density liquid or fluid to be non-toxic and/or marine friendly.

In some embodiments, formation of the hydrostatic pressure difference and/or the resulting or enabled desalination may be conducted in a multi-step process. For example, in some embodiments:

1. A first step may comprise forming a liquid or fluid column comprising low density liquid. For example, a first step may comprise occupying at least a portion of a subsea tank, which may be located at a desired depth, with a low density liquid. For example, in some embodiments, a subsea tank may be occupied by at least a portion of water, which may comprise, for example, desalinated water, or freshwater, or seawater. For example, in some embodiments, a low density liquid may be pumped into a subsea tank, displacing at least a portion of the water in the subsea tank. In some embodiments, if, for example, the displaced water comprises desalinated water or freshwater, it may be desirable for the displaced water to be piped or transferred to an application using freshwater or desalinated water, or to a freshwater or desalinated water storage or distribution system. In some embodiments, for example, in the first step, the pressure inside the subsea tank may be about the same as or greater than the hydrostatic pressure of freshwater or seawater at the depth of the subsea tank.

2. A second step may comprise enabling or creating the pressure difference to facilitate or enable or drive desalination. A second step may comprise enabling the liquid column and/or subsea tank to decrease in pressure or decrease in pressure to a pressure approaching or near the hydrostatic pressure of low density liquid at the depth or elevation difference of the liquid column and/or subsea tank. For example, a valve in the water output pipe may close and a valve in the low density liquid pipe may open. By closing the output pipe, water may be prevented from exiting the subsea tank and water may be prevented from entering the subsea tank through the output pipe (for example, reverse flow may be prevented). By opening the low density liquid pipe or enabling the low density liquid pipe to reverse flow or flow from the subsea tank to another tank or to a storage reservoir or tank near the surface, the pressure inside the subsea tank or the internal pressure of the subsea tank may decrease to a pressure near or about the same as the hydrostatic pressure of low density liquid at the liquid column or elevation difference between the near surface tank and the subsea tank or at the depth of the subsea tank.

3. A third step may comprise exposing the permeate side of a pressure difference driven desalination system, such as a reverse osmosis system, which may be located subsea, to the pressure of the low density liquid column or the pressure inside the subsea tank or internal pressure of the subsea tank from the second step. In some embodiments, the feed side of the desalination system may comprise seawater or saline water, which may possess a pressure or hydrostatic pressure greater than the pressure of the hydrostatic pressure low density liquid. In some embodiments, if the permeate side of the desalination system is exposed to the or opened to the pressure of the low density liquid column or the pressure inside the subsea tank or internal pressure of the subsea tank from the second step, then the pressure of the permeate side may decrease to a pressure about the same as or near the pressure of the pressure of the low density liquid column or the pressure inside the subsea tank or internal pressure of the subsea tank from the second step. In some embodiments, if the permeate side of a pressure difference driven desalination system is exposed to or opened to the pressure of the low density liquid column or the pressure inside the subsea tank or internal pressure of the subsea tank from the second step, then the pressure difference between the desalination feed side and the desalination permeate side may be sufficient to enable at least a portion of desalination. For example, in some embodiments, a valve in the desalinated water permeate input pipe may open, exposing the permeate side of the desalination system or the desalination permeate to the hydrostatic pressure of the low density liquid and/or the internal pressure of the subsea tank, which may result in the pressure of the permeate side or permeate decreasing to a pressure near or about the same as the hydrostatic pressure of the low density liquid and/or the internal pressure of the subsea tank. Due to the pressure difference between the desalination feed side and the desalination permeate side, desalinated water or permeate comprising desalinated water may form and may transfer into the subsea tank, displacing at least a portion of the low density liquid in the subsea tank.

In some embodiments, more than one subsea tank may be employed, which may enable the low density fluid pump and/or the desalinated water pipeline or desalinated water export pipeline to operate continuously or at a higher capacity factor. For example, in some embodiments, desalinated water (which may comprise reverse osmosis permeate) may be displacing low density fluid from a first subsea tank (which may have an internal pressure about the same as the gravitational hydrostatic pressure of low density fluid) into low density fluid riser and/or into the higher elevation reservoir, while simultaneously low density fluid may be pumped into or transferred into a second subsea tank (which may have an internal pressure about the same as the gravitational hydrostatic pressure of freshwater) displacing desalinated water into a desalinated water export pipeline, or a desalinated water pipeline, or a desalinated water riser, or any combination thereof. After a sufficient or desired amount of desalinated water is in the first subsea tank and a sufficient or desired amount of low density fluid is in the second subsea tank, the operations may be swapped, wherein, for example, desalinated water (which may comprise reverse osmosis permeate) may be displacing low density fluid from the second subsea tank (which may have an internal pressure about the same as the gravitational hydrostatic pressure of low density fluid) into low density fluid riser and/or into the higher elevation reservoir, while simultaneously low density fluid may be pumped into or transferred into the first subsea tank (which may have an internal pressure about the same as the gravitational hydrostatic pressure of freshwater) displacing desalinated water into a desalinated water export pipeline, or a desalinated water pipeline, or a desalinated water riser, or any combination thereof. Said swapping may be conducted continuously or in a cycle. It may be desirable for said swapping to be conducted in a manner such that the low density fluid pump and/or desalinated water export pipeline may operate continuously or at a high capacity factor. It may be desirable to employ a pressure buffering, or pressure compensating system, or flow buffering, or flow compensating system, or buffer tank, or any combination thereof smooth potential flow fluctuations or pressure fluctuations which may occur when a subsea tank changes, or switches, or swaps operating modes. In some embodiments, the internal pressure of the subsea tanks or lower elevation reservoirs and the low density fluid risers or pipes may change or fluctuate, for example, between a pressure near the gravitational hydrostatic pressure of low density fluid and a pressure near the gravitational hydrostatic pressure of freshwater or seawater. Some embodiments may have significantly more subsea tanks in the lower elevation reservoir, such as, for example, greater than or equal to 2, or 4, or 6, or 8, or 10, or 12, or 14, or 16, or 18 or 20, or any combination thereof subsea tanks. In some embodiments, subsea tanks may be skid mounted or installed on a skid or platform or connected platform structure. In some embodiments, said swapping may occur in regular or set periods or time intervals, which may include, but are not limited to, less than, or greater than, or equal to, one or more or any combination of the following: 1 second, or 5 seconds, or 10 seconds, or 15 seconds, or 20 seconds, or 25 seconds, or 30 seconds, or 1 minute, or 2 minutes, or 3 minutes, or 4 minutes, or 5 minutes, or 10 minutes, or 15 minutes, or 20 minutes, or 25 minutes, or 30 minutes, or 45 minutes, or 1 hours, or 1.5 hours, or 2 hours. In some embodiments, said swapping may occur when the volume or amount of low density fluid or freshwater in a subsea tank reaches a desired proportion of the total capacity of the subsea tank. For example, in some embodiments, swapping may occur when low density fluid volume in a subsea tank comprises greater than 70%, or 80%, or 90%, or any combination thereof of a subsea tank's volumetric capacity. For example, in some embodiments, swapping may occur when desalinated volume in a subsea tank comprises greater than 70%, or 80%, or 90%, or any combination thereof of a subsea tank's volumetric capacity. In some embodiments, it may be desirable to maintain a liquid-liquid interface between the desalinated water and the low density fluid in subsea tanks or the lower elevation reservoir, to, for example, minimize any undesired mixing of the low density fluid and the desalinated water.

In some embodiments, the higher elevation tank or surface tank may maintain about the same LDF liquid volume or the volume of LDF in the higher elevation or surface tank may remain relatively consistent. In some embodiments, for example, employing two or more subsea tanks, or employing tank swapping, or wherein LDF may be transferred into a first subsea tank while simultaneously LDF may be transferred out of a second subsea tank, or any combination thereof, the higher elevation tank or surface tank may maintain about the same LDF liquid volume or the volume of LDF in the higher elevation or surface tank may remain relatively consistent. For example, in some embodiments, the higher elevation or surface tank may function as a buffer tank. For example, in some embodiments, the higher elevation or surface tank may supply LDF, or supply storage capacity, or any combination thereof if, for example, there is a discrepancy between the flow rate of LDF transferring into the subsea tank(s) or transferring from the surface tank or higher elevation reservoir or tank and the flow rate of LDF transferring into the surface tank or higher elevation reservoir from the subsea tank or lower elevation reservoir.

In some embodiments, the volume or amount of low density fluid in the higher elevation reservoir may remain relatively constant due to, for example, the flow rate of low density fluid entering or being transferred into at least a first subsea tank being about the same as the flow rate of low density fluid exiting or being transferred out of at least a second subsea tank, which may be occurring simultaneously.

In some embodiments, the higher elevation reservoir, or higher elevation tank, or higher elevation storage reservoir, or higher elevation storage tank, or any combination thereof may be located subsea or underwater, or under the surface of a body of water, or any combination thereof. In some embodiments, the higher elevation reservoir, or higher elevation tank, or higher elevation storage reservoir, or higher elevation storage tank, or any combination thereof may be located subsea or underwater, or under the surface of a body of water, or any combination thereof at an elevation higher than the elevation of the lower elevation reservoir, or lower elevation tank, or subsea tank, or any combination thereof. In some embodiments, the higher elevation reservoir, or higher elevation tank, or higher elevation storage reservoir, or higher elevation storage tank, or any combination thereof may be located subsea or underwater, or under the surface of a body of water, or any combination thereof at a lesser depth than the elevation of the lower elevation reservoir, or lower elevation tank, or subsea tank, or any combination thereof. For example, in some embodiments, a higher elevation reservoir may be tethered to the seafloor, or suspended above the seafloor, or tethered to float, or any combination thereof. In some embodiments, the higher elevation reservoir may comprise at least a portion of low density fluid, which may provide buoyancy or may enable the higher elevation reservoir to have a bulk density less than the density of seawater or the body of water. In some embodiments, it may be desirable for the higher elevation reservoir to further comprise additional density or mass to reduce upward buoyancy force, which may need to be counteracted by a tether or mooring cable or system. For example, in some embodiments, additional density or mass may be added to the higher elevation reservoir or the higher elevation reservoir may employ additional density or mass in the form of, for example, including, but not limited to, one or more or any combination of the following: steel, or concrete, or cement, or aggregate, or rocks, or rock fill, or sand, or density module, or brine, or high density liquid, or high density fluid, or high density slurry, or any combination thereof. In some embodiments, the pipe or riser between the higher elevation reservoir and the lower elevation reservoir may provide or function as a liquid column which may enable the hydrostatic pressure difference between low density fluid and desalination feed, which may function as at least a portion of the driving force for desalination. In some embodiments, the higher elevation reservoir may function as or comprise, for example, including, but not limited to, a buffer tank to smooth any inconsistencies in flow, or a storage tank, or a storage tank for low density fluid, or a storage tank for desalinated water, or a storage tank for high density fluid, or any combination thereof. In some embodiments, the higher elevation reservoir or tank may be located on the seabed or seafloor at an elevation higher than the lower elevation reservoir or tank. In some embodiments it may be desirable for the higher elevation reservoir or tank to be underwater, or under the sea surface to, for example, to protect or reduce exposure to body of water waves and/or other kinetic energy typically concentrated near the ocean surface, which may, for example, including, but not limited to, one or more or any combination of the following: reduce riser fatigue, or reduce vessel fatigue, or increase longevity or lifespan or design life, or reduce cost, or reduce amount of material required, or any combination thereof. In some embodiments, it may be desirable for the elevation or depth of the higher elevation reservoir or tank to be sufficiently deep or beneath the surface of the body of water to minimize biofouling, or corrosion, or scaling, or dissolved oxygen exposure, or any combination thereof, which may be more prevalent or accentuated at the surface of a body of water. In some embodiments, it may be desirable for the higher elevation reservoir or higher elevation tank to be located at an elevation or depth accessible to commercial divers, or lower cost ROVs, or more common remotely operated vehicles, or more common submarines, or any combination thereof to, for example, reduce the potential timeline or cost of maintenance and/or enable greater accessibility. In some embodiments, it may be desirable to locate a pump, or a low density fluid pump, or any combination thereof in or connected to the same vessel or structure as the higher elevation reservoir or tank and/or at about the same elevation or depth as the higher elevation reservoir or tank. It may be important to note that embodiments herein may employ a higher elevation reservoir or tank which may be subsea or underwater. Example figures may include, but are not limited to, for example, FIG. 35, or FIG. 36, or FIG. 37, or FIG. 38, or any combination thereof. It may be important to note other embodiments or figures herein may employ a higher elevation reservoir or tank which may be subsea, or underwater, or at least partially beneath the surface of a body of water, or beneath the surface of a body of water, or any combination thereof. It may be important to note other embodiments or figures herein may employ a higher elevation reservoir or tank which may be subsea, or underwater, or at least partially beneath the surface of a body of water, or beneath the surface of a body of water, or any combination thereof, for example, wherein the higher elevation reservoir or tank may be at an elevation higher than the lower elevation reservoir.

In some embodiments, it may be desirable to locate the subsea tank or lower elevation reservoir at a depth or elevation sufficiently deep such that the gravitational hydrostatic pressure difference between the seawater, or seawater desalination feed, and the low density fluid is greater than the osmotic pressure of seawater or greater than the pressure difference required to power reverse osmosis desalination, such as a pressure difference greater than, for example, including but not limited to, one or more or any combination of the following: 25 Bar, or 30 Bar, or 35 Bar, or 40 Bar, or 45 Bar, or 50 Bar, or 55 Bar, or 60 Bar, or 65 Bar, or 70 Bar, or 75 Bar, or 80 Bar, or 85 Bar, or 90 Bar.

In some embodiments, it may be desirable for the low density fluid to comprise a liquid or a fluid which may be practically incompressible or a fluid which possesses minimal compressibility, such as compressibility typically measured using bulk modulus. In some embodiments, it may be desirable for the low density fluid to be practically insoluble in water, or have a solubility in water less than 50 g/L, or 25 g/L, or 10 g/L, or 5 g/L, or 1 g/L, or 0.1 g/L, or any combination thereof at room temperature pressure (RTP) conditions. Some embodiments may avoid or eliminate the need for a high pressure difference subsea pump, or may substantially avoid or eliminate the need for a subsea pump. In some embodiments, it may be desirable for the low density fluid to be a non-hydrate former, or a fluid which does not tend to form hydrates with water. For example, in some embodiments, if n-Butane is employed, it may be desirable to minimize the concentration or presence of any propane, or ethane, or methane, or other potential hydrate formers. It may be desirable for the low density fluid to be non-toxic to human health and low toxicity or non-toxic to marine life. It may be desirable for low density fluids to be of very high purity before use to minimize presence of any potential contaminants or toxins. For example, if n-Butane is employed as a low density fluid, it may be desirable for the n-Butane to comprise significantly less than 0.1 wt % of 1,3-Butadiene.

Example Potential Suitable Low Density Fluids

| Chemical Name | Liquid Density (kg/m3) | Solubility in Water |
|---|---|---|
| n-Butane | 590 | 0.061 g/L |
| n-Pentane | 626 | 0.038 g/L |
| Mineral Oil | 800 | Insoluble |
| Envirosol USF04 | 820 | Insoluble |
| Petroleum Ether | 640 | ~0.050 g/L |

Example Gravitational Hydrostatic Pressure Differences Between Seawater (1,025 kg/m3) and Example Selected Low Density Fluids vs. Water Depth Chemical (Right),

| Depth (Down) | n-Butane | n-Pentane | Hexane | Mineral Oil | Envirosol USF04 |
|---|---|---|---|---|---|
| 500 meters | 21.34 Bar | 19.57 Bar | 17.85 Bar | 11.04 Bar | 10.06 Bar |
| 1,000 meters | 42.67 Bar | 39.14 Bar | 35.71 Bar | 22.07 Bar | 20.11 Bar |
| 1,500 meters | 64.01 Bar | 58.71 Bar | 53.56 Bar | 33.11 Bar | 30.17 Bar |
| 2,000 meters | 85.35 Bar | 78.28 Bar | 71.42 Bar | 44.15 Bar | 40.22 Bar |
| 2,500 meters | 106.68 Bar | 97.85 Bar | 89.27 Bar | 55.18 Bar | 50.28 Bar |
| 3,000 meters | 128.02 Bar | 117.43 Bar | 107.13 Bar | 66.22 Bar | 60.33 Bar |

In some embodiments, the subsea tank or lower elevation tank may be configured with a floating barrier, which may float at or separate at least a portion of the liquid-liquid interface between the desalinated water and the low density fluid in the subsea tank or lower elevation tank. For example, in some embodiments, a floating or suspended barrier may have a density greater than low density fluid and less than desalinated water, enabling the floating or suspended barrier to float on the water and sink or sit below the low density fluid, which may enable at least a portion of separation between the low density fluid and the water in the subsea tank. In some embodiments, a floating barrier may reduce the potential surface area or contact area between the low density fluid and the desalinated water, reducing or minimizing potential dissolution of any low density fluid into the desalinated water.

For example, in some embodiments, hydrate forming low density fluids, such as propane, or iso-butane, or ethane, or any combination thereof may be employed, or a soluble low density fluid, such as methanol, or ethanol, or diethyl ether, or dimethyl ether, or acetone, or isopropyl alcohol, or any combination thereof may be employed. In some embodiments, a hydrate forming low density fluid, or soluble low density fluid, or any combination thereof may be employed due to separation or isolation of the low density fluid from the water. For example, in some embodiments, a bladder tank, or a floating barrier, or a suspended barrier, or a piston, or any combination thereof may be employed. For example, in some embodiments, a hydrate forming low density fluid may be employed by operating at least a portion of the system or liquid-liquid interface or near liquid-liquid interface at a temperature above the hydrate formation temperature. For example, in some embodiments, a floating barrier between the water and the low density fluid may be heated to minimize or prevent formation of hydrates. For example, in some embodiments, the low density fluid may be heated, or may be heated in the higher elevation reservoir or LDF pipe or riser, or any combination thereof. For example, in some embodiments, the subsea tank may be heated or insulated. For example, in some embodiments, the LDF and/or desalinated water permeate may be heat exchanged. For example, in some embodiments, heat may be recovered using countercurrent heat exchangers to maintain the subsea tank, or liquid-liquid interface, or any combination thereof at a temperature above the hydrate formation temperature, while, for example, reducing or conserving energy.

In some embodiments, it may be desirable to reduce potential surface area contact, or mixing, or potential mixing, or liquid-liquid interface, or contact area, or turbulence, or surface area of liquid-liquid interface, or any combination thereof between low density fluid and water or desalinated water or high density fluid. For example, in some embodiments, it may be desirable to prevent or reduce at a portion of any potential dissolution or transfer of low density fluid into the desalinated water, or water, or high density fluid.

For example, in some embodiments, it may be desirable to employ a diffusers. In some embodiments, for example, it may be desirable to employ diffusers near the bottom of the interior of a tank for high density fluid and employ diffusers near the top of the interior of the tank for low density fluid. For example, in some embodiments, low density fluid may enter or exit the tank through diffusers located near the top of the tank and high density fluid may enter or exit the tank through diffusers located near the bottom of the tank. In some embodiments, for example, diffusers may enable low density fluid and/or high density fluid to flow into and/or out of a tank while reduce or preventing turbulence or mixing. For example, in some embodiments, transferring low density fluid through an inlet or outlet near the top of a tank and high density fluid through an inlet or outlet near the bottom of a tank may enable the flows of low density fluid and high density fluid to be separated by distance and may reduce potential transfer of low density fluid into high density fluid or high density fluid into low density fluid. In some embodiments, for example, the use of diffusers may enable or facilitate the formation potentially stable fluid layers which may be driven by density, such as a low density fluid layer in the top portion of the tank and a high density fluid layer in the bottom portion of the tank. In some embodiments, for example, if a fluid-fluid interface or liquid-liquid interface may exist between the low density fluid and high density fluid, a boundary layer or a stratification or a mixed layer or cline or any combination thereof may occur at or near the interface. In some embodiments, it may be desirable for the volume of said boundary layer or a stratification or a mixed layer or cline or any combination thereof to remain inside the tank during filing with low density fluid, or filing with high density fluid, or any combination thereof. In some embodiments, it may be desirable to avoid direct contact of the boundary layer or a stratification or a mixed layer or cline or any combination thereof with a diffuser or a fluid inlet or outlet. In some embodiments, it may be desirable to avoid direct contact of the boundary layer or a stratification or a mixed layer or cline or any combination thereof with a diffuser or a fluid inlet or outlet to, for example, reduce the potential transfer of low density fluid into high density fluid or high density fluid into low density fluid. In some embodiments, it may be desirable to directly contact of the boundary layer or a stratification or a mixed layer or cline or any combination thereof with a diffuser or a fluid inlet or outlet. In some embodiments, it may be desirable to directly contact of the boundary layer or a stratification or a mixed layer or cline or any combination thereof with a diffuser or a fluid inlet or outlet to enable greater volume utilization of a tank. In some embodiments, a fluid-fluid separation or liquid-liquid separation system or process may be employed on the low density fluid exiting a tank or the high density fluid exiting a tank to, for example, separation at least a portion of any low density fluid in the high density fluid or high density fluid in the low density fluid. In some embodiments, for example, if the low density fluid may be insoluble or possess low solubility in the high density fluid, the boundary layer or a stratification or a mixed layer or cline or any combination thereof may be volumetrically small relative to the volume of the tank. In some embodiments, for example, if the low density fluid may be soluble or possess an appreciable solubility in the high density fluid, the boundary layer or a stratification or a mixed layer or cline or any combination thereof may be volumetrically larger relative to the volume of the tank. In some embodiments, it may be desirable to reduce the rate of mixing, or reduce any turbulence, or to promote laminar flow within a tank. In some embodiments, diffusers may be employed in a tank to reduce mixing of fluids, or prevent dissolution between fluids, or enable flow stability, or enable layer stability, or any combination thereof. In some embodiments it may be desirable for the volume of a mixing layer, or cline, or stratification layer, or any combination thereof to comprise less than or equal to 50%, or 35%, or 20%, or 15%, or 10%, or 9%, or 8%, or 7%, or 6%, or 5%, or 4%, or 3%, or 2%, or 1%, or 0.5%, or 0.1%, or any combination thereof the volume of the tank. In some embodiments, a diffuser system or process may enable or facilitate the volume of a mixing layer, or cline, or stratification layer, or any combination thereof to comprise less than or equal to 50%, or 35%, or 20%, or 15%, or 10%, or 9%, or 8%, or 7%, or 6%, or 5%, or 4%, or 3%, or 2%, or 1%, or 0.5%, or 0.1%, or any combination thereof the volume of the tank.

For example, in some embodiments, it may be desirable to employ a form of barrier or partial barrier between the low density fluid and water or desalinated water or high density fluid. For example, some embodiments may employ a floating barrier or divider, which may comprise a material which occupies at least a portion of the liquid-liquid interface between the low density fluid and water or desalinated water or high density fluid, or a material which reduces the contact area or contact surface area between the low density fluid and water or desalinated water or high density fluid. For example, in some embodiments, a floating barrier or divider may reduce the contact surface area, or the surface area of a liquid-liquid interface, or any combination thereof between the low density fluid and water or desalinated water or high density fluid by more than 50% in a tank compared to the same tank without a floating barrier. For example, in some embodiments, a floating barrier may reduce the contact surface area, or the surface area of a liquid-liquid interface, or any combination thereof between the low density fluid and water or desalinated water or high density fluid by more than 10%, or 20%, or 30%, or 40%, or 50%, or 60%, or 70%, or 80%, or 90%, or 95%, or 99%, or 99.9%, or any combination thereof compared to the same tank without a floating barrier. In some embodiments, a floating barrier or divider may comprise a material with a density or bulk density greater than the low density fluid and less than the high density fluid, or water, or desalinated water, or any combination thereof. In some embodiments, a floating barrier or divider may float on the higher density fluid and may sink below the lower density fluid. For example, in some embodiments, if the liquid level of the higher density fluid rises, the floating barrier may rise or position or elevation may increase. For example, in some embodiments, if the liquid level of the higher density fluid decreases, the position or elevation of floating barrier may decrease.

In some embodiments, a barrier or divider may comprise a solid, or a liquid, or a fluid, or any combination thereof. In some embodiments, it may be desirable for the wetted materials or wetted surfaces of the barrier or divider to be compatible with the low density fluid, or higher density fluid, or water, or brine, or seawater, or any combination thereof. For example, in some embodiments, it may be desirable for the wetted materials of the barrier or divider to be insoluble or practically insoluble in the fluids stored in the tank in which the barrier or divider is located. In some embodiments, it may be desirable for a barrier or divider to comprise a material which may be rigid, or flexible, or any combination thereof. In some embodiments, for example, it may be desirable for a barrier or divider to comprise multiple materials. For example, in some embodiments, it may be desirable for a barrier or divider to comprise a composite material. For example, in some embodiments, it may be desirable for a barrier or divider to comprise a rigid material, while the edges of the barrier or divider or the portions of the barrier or divider in contact with the interior walls of a tank, may comprise a flexible material to, for example, facilitate movement of the barrier or divider in response to changes in fluid level in the tank or relative fluid volumes in the tank or the volume of the higher density fluid in the tank, or to prevent or reduce the potential for the floating barrier to become stuck or lodged, or to facilitate the movement of the floating barrier to follow changes in liquid levels of low density fluid and water in a tank, or any combination thereof.

In some embodiments, a physical separation may isolate or separate low density fluid from high density fluid. In some embodiments, for example, pressure or kinetic energy may be hydraulically or mechanically exchanged between low density fluid and the high density fluid.

In some embodiments, a tank may comprise a rigid tank. Some embodiments may employ a hydraulic cylinder, or a piston without seals, or a plunger cylinder, or any combination thereof. Some embodiments may employ a piston with seals or a hydraulic piston. In some embodiments, for example, a low density fluid may hydraulically or mechanically exchange with a high density fluid using a hydraulic cylinder, or a plunger cylinder, or a piston, or a hydraulic piston, or any combination thereof. In some embodiments, a lower elevation reservoir or lower elevation reservoir tank may comprise a hydraulic cylinder, or a plunger cylinder, or a piston, or a hydraulic piston, or any combination thereof. In some embodiments, a higher elevation reservoir or higher elevation reservoir tank may comprise a hydraulic cylinder, or a plunger cylinder, or a piston, or a hydraulic piston, or any combination thereof. In some embodiments, for example, low density fluid may hydraulically or mechanically exchange with a high density fluid using a hydraulic cylinder, or a plunger cylinder, or a piston, or a hydraulic piston, or any combination thereof. In some embodiments, for example, a hydraulic cylinder may be configured such that tank surfaces in contact with or wetted by low density fluid may be separate from tank surfaces in contacted with or wetted by high density fluid. In some embodiments, for example, a hydraulic cylinder may be configured such that tank surfaces in contact with or wetted by low density fluid may remain wetted by low density fluid during charging and discharging. In some embodiments, for example, a hydraulic cylinder may be configured such that tank surfaces in contact with or wetted by high density fluid may remain wetted by high density fluid during charging and discharging. In some embodiments, a hydraulic cylinder, or a hydraulic cylinder, or a piston, or a hydraulic piston, or any combination thereof may substantially prevent low density fluid from wetting or contacting the high density fluid, which may prevent or reduce potential transfer of low density fluid into high density fluid. In some embodiments, a tank may comprise a storage region configured to storage low density fluid, a separate storage region configured to store high density fluid, and a solid material, such as a piston rod or plunger or floating barrier, or any combination thereof, wherein when low density fluid is transferred into the low density fluid storage region, the solid material moves to displace high density fluid from the high density fluid storage region, and/or wherein when high density fluid is transferred into the high density fluid storage region, the solid material moves to displace low density fluid from the low density fluid storage region. In some embodiments, additional seals or containment may be employed to reduce or prevent fluid mixing or transfer. Some embodiments may employ a piston. Some embodiments may employ a hydraulic cylinder, or a piston without seals, or a plunger cylinder, or any combination thereof. Some embodiments may employ a piston with seals or a hydraulic piston.

In some embodiments, a tank may comprise a bladder tank. In some embodiments, a tank may comprise a bladder tank housed within a rigid tank. In some embodiments, low density fluid may be stored in a bladder tank within a rigid tank, or high density fluid may be stored in a bladder tank within a rigid tank, or both, or any combination thereof. In some embodiments, a bladder tank may be employed to enable low density fluid to hydraulically or volumetrically exchange with high density fluid, while, for example, preventing or reducing the potential mixing of low density fluid with high density fluid. In some embodiments, a bladder tank may comprise a flexible material. In some embodiments, a bladder tank may be integrated with a piston, or floating barrier, or a divider, or any combination thereof.

In some embodiments, low density fluid may be insoluble in high density fluid. In some embodiments low density fluid may have a solubility in high density fluid of less than, for example, one or more or any combination of the following: 0.01 g/L, or 0.1 g/L, or 1 g/L, or 5 g/L, or 10 g/L, or 15 g/L, or 20 g/L, or 30 g/L, or 40 g/L, or 50 g/L.

In some embodiments, low density fluid may be partially soluble in high density fluid.

In some embodiments, low density fluid may be miscible in high density fluid.

In some embodiments, low density fluid may be a non-hydrate former with water. In some embodiments, low density fluid may be a hydrate former with water.

In some embodiments, the high density fluid may comprise desalinated water and the low density fluid may comprise a fluid with a density lower than the density of water. In some embodiments, the low density fluid may comprise seawater, or treated seawater, or treated desalination feed, or desalinated water, or brackish water, or any combination thereof and the higher density fluid may comprise a brine with a salinity greater than the salinity of the desalination feed, or a density greater than the low density fluid, or a salinity greater than desalinated water, or a salinity greater than brackish water, or any combination thereof. In some embodiments, the higher density fluid may comprise desalinated water and the low density fluid may comprise a fluid with a density lower than the density of water. In some embodiments, the low density fluid may comprise seawater, or treated seawater, or treated desalination feed, or desalinated water, or any combination thereof and the higher density fluid may comprise a brine with a salinity greater than the salinity of the desalination feed or a density greater than the density of low density fluid.

Example Low Density Fluids

A low density fluid may comprise a fluid with a density less than a high density fluid in the same system or process. A low density fluid may comprise a fluid with a density less than a high density fluid which the low density fluid displaces during at least a portion of process or system operation. A low density fluid may comprise a fluid with a density less than a high density fluid which the low density fluid displaces during the storing of power or energy or charging.

A low density fluid may comprise including, but not limited to, one or more or any combination of the following: a hydrocarbon, or an alkane, or an alkene, or an alkyne, or an aromatic hydrocarbon, or an organic solvent, or butane, or n-butane, or iso-butane, or propane, or cyclopropane, or cyclobutane, cyclobutene, or cyclopentane, or cyclohexane, or ethane, or LPG, or pentane, or hexane, or Mineral oil, or a mineral oil saturated hydrocarbon (MOSH), or oil, or environmental oil, or marine friendly oil, or biofuel, or an organic solvent, or a e-fuel, or ammonia, or methanol, or ethanol, or water, or desalinated water, or brackish water, or seawater, or desalination feed, or treated seawater, or treated desalination feed, or an ether, or a ketone, or an alcohol, or an aldehyde, or aliphatic hydrocarbons, or aromatic hydrocarbons, or amines, or esters, or ethers, or ketones, or nitrated, or chlorinated hydrocarbons, or acetone, or acetonitrile, or 1-butanol, or 2-butanol, or 2-butanone, or t-butyl alcohol, or cyclohexane, or diethyl ether, or dimethyl ether, or dimethoxymethane, or dimethoxyethane, or dimethylformamide (DMF), or dimethyl sulfoxide (DMSO) or ethanol, or ethyl acetate, methyl acetate, or heptane, or hexane, or methanol, methyl t-butyl ether (MTBE), or petroleum ether (ligroine), or 1-propanol, or 2-propanol, or isopropanol, or pyridine, or tetrahydrofuran (THF), or toluene, or ammonia, or triethyl amine, or amine, or organic nitrogen compound, or o-xylene, or m-xylene, or p-xylene, or a gas, or a compressed gas, or a supercritical fluid, or a suspended gas-liquid fluid, or a froth, or bubbles, or a supercritical fluid-liquid mixture.

Example High Density Fluids

A high density fluid may comprise a fluid with a density greater than a low density fluid in the same system or process. A high density fluid may comprise a fluid with a density greater than a low density fluid which the high density fluid displaces during at least a portion of process or system operation. A high density fluid may comprise a fluid with a density less than a low density fluid which the high density fluid displaces during the storing of power or energy or charging.

A high density fluid may comprise including, but not limited to, one or more or any combination of the following: water, or desalinated water, or brackish water, or seawater, or desalination feed, or treated seawater, or treated desalination feed, or brine, or saline water, or a solution comprising a salt of sodium, or a solution comprising a salt of an alkali, or a solution comprising a salt of an alkaline earth, or a solution comprising a salt of calcium, or a solution comprising a salt of magnesium, or a solution comprising a salt, or a solution comprising a chloride, or a solution comprising a sulfate, or a solution comprising an acetate, or a solution comprising a carboxylate, or a solution comprising a salt of potassium, or a solution comprising a carbonate, or a solution comprising a bicarbonate, or a solution comprising sodium chloride, or a solution comprising magnesium sulfate, or a solution comprising magnesium chloride, or a solution comprising calcium chloride, or a solution comprising potassium carbonate, or a solution comprising potassium acetate, or a solution comprising calcium nitrate, or a solution comprising a nitrate, or a solution comprising a bromide, or a solution comprising urea, or a solution comprising a phosphate salt, or a solution comprising a silicon compound, or a silicon compound, or a solution comprising a glycol, or a solvent comprising a glycol, or a polyol, or a diol, or a glycol ether, or a glycol, or an aqueous glycol solution, or ethylene glycol, or propylene glycol, or glycerol, or diethylene glycol, or triethylene glycol, or diglyme, or glyme, or a solution comprising ammonia, or a solution comprising an ammonium salt, or a solution comprising a nitrogenous compound, or a liquid comprising a nitrogenous compound, or a liquid comprising sulfur, or sulfur, or an acid, or a mineral acid, or a transition metal salt, or a solution comprising a salt, or a solution comprising a transition metal salt, or a liquid salt, or a liquid metal, or a carboxylic acid, or a carboxylate, or a formate, or liquid carbon dioxide, or a solid-liquid mixture, or a solid-liquid suspension, or a mud, or an emulsion, or a stable emulsion, or an unstable emulsion, or a ferrofluid, or a Newtonian fluid, or a non-newtonian fluid, or a maxwell fluid, or a suspended nanoparticle fluid, or liquid sulfur dioxide, or liquid nitrogen oxide, or liquid sulfur trioxide, or bromine, or a high density hydrocarbon, or chloroform, or carbon tetrachloride, or 1,2-dichloroethane, or N-methyl-2-pyrrolidinone (NMP), or methylene chloride, or a fluorocarbon, or a halogenated compound.

Example Description Desalination Feed Fluid Displacement Desalination

Some embodiments may comprise a higher elevation reservoir configured to store a high density fluid, or a lower elevation reservoir configured to store low density fluid, or a pipe or riser pipe transferring high density fluid between the higher elevation reservoir and the lower elevation reservoir, or a pump, or any combination thereof. Some embodiments may comprise a higher elevation reservoir configured to store a high density fluid comprising a brine with a density greater than the density of seawater, or a lower elevation reservoir configured to store a low density fluid comprising seawater or desalination feed and/or a high density fluid comprising a brine, or a pipe or riser pipe transferring high density fluid between the higher elevation reservoir and the lower elevation reservoir, or a pump, or a desalination system or process, or any combination thereof.

In some embodiments, the desalination may be conducted or may be driven by the hydrostatic pressure difference between a low density fluid and a high density fluid, due to, for example, the density difference between the low density fluid and high density fluid and/or the elevation difference between a higher elevation reservoir and a lower elevation reservoir. In some embodiments, the low density fluid may comprise seawater, or a body of water, or may be sourced from a body of water, or may comprise treated seawater, or desalination feed, or any combination thereof. In some embodiments, a high density fluid may comprise a fluid with a density greater than the low density fluid, and/or may comprise, for example, a brine or saline water or saline solution. In some embodiments, displaced pressurized low density fluid comprising desalination feed, which may be pressurized by displacement with high density fluid, may be transferred into a desalination system or process, which may result in the formation of a desalination permeate, which may comprise desalinated water, and a desalination retentate or concentrate. In some embodiments, a lower elevation reservoir comprising a subsea tank, or tank, or hydraulic cylinder, or any combination thereof which may be configured to store low density fluid, such as desalination feed, and a high density fluid, such as a brine. In some embodiments, the system or process may be charged by transferring low density fluid, such as desalination feed, into the lower elevation reservoir, and/or by transferring high density fluid, such as brine, out of the lower elevation reservoir and into a higher elevation reservoir. In some embodiment, the system or process may be discharged or desalination feed may be at least partially desalinated by, for example, allowing high density fluid, such as brine, to transfer into the lower elevation reservoir to displace low density fluid, such as desalination feed, from the lower elevation, and/or the displaced desalination feed, which may be pressurized by the high density fluid, may be transferred into a desalination system or process to produce desalination permeate or desalinated water or freshwater and/or desalination concentrate or retentate.

In some embodiments, a pump may be fluidly connected to the seawater input, or seawater intake, or desalination feed, or treated seawater intake, or treated desalination feed, or any combination thereof, which may comprise a low density fluid.

In some embodiments, during charging, at least a portion of desalination feed, which may comprise a low density fluid, may be pumped or otherwise transferred into a lower elevation reservoir, displacing at least a portion of high density fluid in the lower elevation reservoir, which may comprise a brine, and/or at least a portion of the displaced brine may be transferred from the lower elevation reservoir, through a riser or pipe or riser pipe, into a higher elevation reservoir.

In some embodiments, during discharging, at least a portion of high density fluid, which may comprise brine, may be allowed to transfer from the higher elevation reservoir, through a pipe or riser or riser pipe, into the lower elevation reservoir, and/or displacing at least a portion of the low density fluid, which may comprise desalination feed, in the lower elevation reservoir, and/or at least a portion of the displaced desalination feed may be transferred from the lower elevation reservoir through a pipe or conduit to the desalination system or process, which may result in the formation of desalinated water and desalination retentate or concentrate. In some embodiments, desalinated water formed may be transferred to an application for desalinated water, or desalinated water storage, or any combination thereof. In some embodiments, the desalination system or process may comprise membrane-based process or pressure driven process, such as reverse osmosis desalination.

In some embodiments, a pump fluidly connected to the desalination feed may be located at an elevation near or about the same as the lower elevation reservoir. In some embodiments, a pump fluidly connected to the desalination feed may be located at an elevation near or about the same as the higher elevation reservoir. In some embodiments, a pump fluidly connected to the desalination feed may be located at an elevation above the elevation of the lower elevation reservoir and below the elevation of the higher elevation reservoir.

In some embodiments, a pump may be fluidly connected to high density fluid, which may comprise a brine.

In some embodiments, during charging, at least a portion of high density fluid, which may comprise a brine, may be pumped or otherwise transferred from a lower elevation reservoir, for example, through a pipe or riser or riser pipe into a higher elevation reservoir. In some embodiments, at least a portion of low density fluid, which may comprise a desalination feed, may transfer into the lower elevation reservoir while at least a portion of the high density fluid may be transferred out of the lower elevation reservoir. In some embodiments, it may be desirable for the low density fluid entering the lower elevation reservoir or tank to displace or occupy a volume inside the lower elevation tank or reservoir about the same as the volume of high density fluid exiting to the lower elevation reservoir or tank.

In some embodiments, during discharging, at least a portion of high density fluid, which may comprise brine, may be allowed to transfer from the higher elevation reservoir, through a pipe or riser or riser pipe, into the lower elevation reservoir, and/or displacing at least a portion of the low density fluid, which may comprise desalination feed, in the lower elevation reservoir, and/or at least a portion of the displaced desalination feed may be transferred from the lower elevation reservoir through a pipe or conduit to the desalination system or process, which may result in the formation of desalinated water and desalination retentate or concentrate. In some embodiments, desalinated water formed may be transferred to an application for desalinated water, or desalinated water storage, or any combination thereof. In some embodiments, the desalination system or process may comprise membrane-based process or pressure driven process, such as reverse osmosis desalination.

In some embodiments, low density fluid may comprise desalination feed and high density fluid may comprise brine.

In some embodiments, more than one lower elevation tank may be employed. For example, in some embodiments, it may be desirable for a first tank to be undergoing charging simultaneous to a second tank undergoing discharging. For example, in some embodiments, it may be desirable to transfer low density fluid into a first tank and to transfer high density fluid transfer out of the first tank simultaneously to transferring low density fluid into a second tank and transferring high density fluid out of the second tank. In some embodiments, it may be desirable to periodically swap operating modes of tanks, such as, for example, swapping the operating mode of a first tank with a second tank or a second tank with a first tank. In some embodiments, employing two or more tanks and/or employing swapping may enable desalination of desalination feed to be conducted continuously, if desired.

In some embodiments, it may be desirable for the pump to be fluidly connected to the high density fluid or brine due to, for example, including, but not limited to, one or more or any combination of the following: lower propensity for biofouling, or ability to include biocides or antimicrobials or biostatics to the chemical composition to lower potential fouling, or ability to include anti-scalants to prevent scaling, or ability to include anticorrosion chemicals to reduce potential corrosion, or ability to include oxygen scavengers, or lower compressibility or lower bulk modulus due to the generally lower bulk modulus with increasing density of fluids, or any combination thereof.

In some embodiments, it may be desirable for the high density fluid to comprise non-toxic or non-hazardous, or low toxicity, or low hazard, or any combination thereof chemicals. In some embodiments, it may be desirable for the high density fluid to comprise at least a portion of the chemical constituents of seawater, or desalination feed, or any combination thereof. In some embodiments, it may be desirable for the high density fluid to comprise at least a portion of the chemical constituents of seawater, or desalination feed, or any combination thereof, although, at, for example, a higher concentration.

In some embodiments, it may be desirable for the high density fluid to have a higher density, as in, in some embodiments, for example, the greater the density of the high density fluid or the greater the density difference between the low density fluid and high density fluid, the less elevation difference or depth may be required to achieve a hydrostatic pressure difference between the low density fluid and the high density fluid sufficient for desalination, or the greater the potential hydrostatic pressure difference or hydrostatic pressure difference available. For example, in some embodiments, some examples of high density fluids or brines which may be meet one or more or any combination of the potentially desirable criteria may include, but are not limited to, one or more or any combination of the following: solution comprising aqueous sodium chloride, or solution comprising aqueous magnesium chloride, or solution comprising aqueous calcium chloride, or solution comprising aqueous magnesium sulfate, or solution comprising aqueous potassium carbonate, or solution comprising aqueous potassium acetate, or solution comprising aqueous potassium nitrate, or solution comprising aqueous calcium nitrate, or solution comprising aqueous sodium bromide, or solution comprising aqueous calcium bromide, or solution comprising aqueous potassium bromide, or solution comprising aqueous magnesium bromide.

Example Figure Summaries and Figure Keys

FIGS. 1-4 Summary: FIGS. 1-4 may comprise an example embodiment comprising one subsea tank for fluid displacement desalination. In some embodiments of FIGS. 1-4, the higher elevation reservoir may be configured to store low density fluid.

Some embodiments may comprise an integrated process or system for energy storage and desalination. For example, in some embodiments, FIGS. 1-4 and/or FIGS. 7-10 may store power or energy for desalination by pumping low density fluid into the lower elevation reservoir or subsea tank to displace desalinated water (for example, may be shown in FIG. 2 and FIG. 8). For example, in some embodiments, FIGS. 1-4 and/or FIGS. 7-10 may desalinate water using the stored power or energy by allowing the low density fluid into the lower elevation reservoir or subsea tank to be displaced by the desalinated water which may be generated by reverse osmosis from, for example, the pressure difference between the hydrostatic pressure of seawater adjacent to the lower elevation reservoir and the hydrostatic pressure of low density fluid (for example, may be shown in FIG. 2 and FIG. 8).

Example FIGS. 1-4 Key

Label Description

1 '1' may comprise a higher elevation storage reservoir or higher elevation reservoir which may be configured to store low density fluid. In some embodiments, '1' may comprise a floating roof tank. In some embodiments, '1' may comprise a fluid storage tank comprising a floating vessel, such as a floating storage vessel. In some embodiments, '1' may further comprise a vapor recovery system. In some embodiments, '1' may comprise a positive pressure tank, or a tank with an internal pressure or an internal vapor pressure greater than the ambient pressure or greater than atmospheric pressure at sea-level. For example, in some embodiments, '1' may store a low density liquid or low density fluid with a vapor pressure greater than the atmospheric pressure and/or the internal pressure of '1' may be about the same as the vapor pressure of the low density fluid at the temperature of the low density fluid. For example, if n-Butane is the LDF and the LDF temperature is 10° C., the vapor pressure inside the higher elevation storage reservoir may be 1.15 Bar gauge pressure.

In some embodiments, the higher elevation storage reservoir or higher elevation reservoir may comprise a headspace comprising air, or inert gas, or inert gas system. For example, in some embodiments, if a portion of low density fluid is transferred from or out of the higher elevation reservoir, a portion of air or inert gas may be transferred into or occupy the volume in the higher elevation reservoir previously occupied by the liquid transferred. For example, in some embodiments, if a portion of low density fluid is transferred into the higher elevation reservoir, a portion of air or inert gas may be transferred out of the higher elevation reservoir and/or treated with a vapor recovery system to, for example, recovery at least a portion of any potential low density fluid vapors which may be in the portion of air or inert gas transferred out of the higher elevation reservoir.

2 '2' may comprise a lower elevation reservoir or a subsea tank which may be configured to store low density fluid and/or high density fluid or desalinated water. In some embodiments, '2' may be desired or configured to withstand or resist a pressure difference greater than or equal to or about the same as or any combination thereof the hydrostatic pressure difference between the low density fluid and the adjacent seawater at about the same depth or elevation as the lower elevation reservoir. In some embodiments, a lower elevation storage reservoir or subsea tank may possess fluctuating or changing internal pressure. For example, when LDF is pumped or transferred into the lower elevation reservoir to displace freshwater in the lower elevation reservoir into the freshwater pipeline, the internal pressure of the lower elevation reservoir may be greater than or equal or about the same as the hydrostatic pressure of freshwater at the elevation or depth of the lower elevation reservoir or subsea tank plus the pressure of any pressure drop which may need to be overcome transferring low density fluid and/or freshwater. For example, when freshwater, which may comprise desalination permeate, transfers into the lower elevation reservoir or subsea tank to displace the LDF in the lower elevation reservoir into the LDF riser or pipe to the higher elevation reservoir, the internal pressure in the lower elevation reservoir or subsea tank may be about the same as the hydrostatic pressure of LDF at the elevation or depth of the lower elevation reservoir or subsea tank plus any pressure drop. In some embodiments, '2' may be anchored to the seabed, or 'piled' to the seabed, or tethered to the seabed, or weighted, or ballasted, or any combination thereof.

3 '3' may comprise a pump. For example, '3' may comprise a hydraulic pump or a low density fluid pump. In some embodiments, '3' may be configured to pump liquids, and/or may be designed to provide pressure about the same as or greater than the gravitational hydrostatic pressure difference between the low density fluid and freshwater, or low density fluid and seawater, or low density fluid and freshwater plus any pressure drop to overcome in the freshwater pipeline to application, or any combination thereof.

4 '4' may comprise a pipe or riser pipe transferring low density fluid (LDF) between the higher elevation reservoir or tank and the lower elevation reservoir or subsea tank. In some embodiments, '4' may comprise a riser in a lazy wave configuration, or a tension leg riser or pipe. In some embodiments, '4' may further comprise a power cable or power source or dynamic power cable, which may be installed separately or together with '4'. In some embodiments, a submarine power cable may transfer power from an source of power to a the system or to a dynamic power cable in the system.

5 '5' may comprise a vessel, which may comprise the higher elevation reservoir or storage tank and/or pump and/or mooring and/or electrical and control equipment. In some embodiments, '5' may be moored. For example, in some embodiments, '5' may be moored using a spread mooring system, or a tension leg moored system or TLP, or a semisub mooring system, or a turret mooring system, or a disconnectable mooring system, or a disconnectable buoy mooring system, or any combination thereof. For example, in some embodiments, '5' may comprise a floating storage vessel, or a FSO, or a ship-shaped vessel, or a semi-submersible vessel, or a Tension Leg Platform or TLP vessel, or a cylindrical storage vessel, or any combination thereof.

6 '6' may comprise desalination feed intake pipe, which may comprise a seawater intake pipe. For example, in some embodiments, '6' may transfer seawater from a water depth or deep water depth, which may possess lower concentrations of biological activity and/or lower concentrations of foulants, which may reduce required pre-treatment of desalination feed water. In some embodiments, '6' may further comprise a pre-treatment step.

RO 'RO' may comprise a reverse osmosis system, which, in some embodiments, may be located subsea. In some embodiments, the reverse osmosis system may be comprise semi-permeable membranes which may desalinate water by rejecting at least a portion of dissolved salt ions, while allowing the water molecules to permeate. Reverse osmosis may be powered by a pressure difference between the feed side and permeate side of the membrane, wherein the pressure difference may need to be greater than the osmotic pressure of the seawater or desalination feed. In some embodiments, the reverse osmosis system may be powered by the pressure difference between the gravitation hydrostatic pressure of seawater at the water depth or elevation of the seawater intake or reverse osmosis system the hydrostatic pressure of a low density fluid or liquid with a density lower than the density of freshwater at about the same depth or elevation. For example, in some embodiments, the low density fluid may comprise a liquid, which may be practically incompressible compared to a gas, and/or may have a density lower than the density of freshwater and/or may be practically insoluble in water or possess a minimal or ultra-low solubility in water. For example, in some embodiments, the low density fluid may comprise, for example, including, but not limited to, liquid n-Butane or liquid Pentane.

7 '7' may comprise desalination brine discharge. In some embodiments, it may be desirable for the desalination brine discharge outlet to be located a sufficient distance from the desalination feed intake, to, for example, prevent or minimize the mixing or presence of brine in the seawater entering the desalination feed intake.

8 '8' may comprise desalinated water permeate or reverse osmosis permeate, which may transfer from the reverse osmosis system to the lower elevation reservoir or subsea tank. It may be desirable for '8' to be at a pressure about the same as the internal pressure of the lower elevation reservoir or subsea tank.

9 '9' may comprise a desalinated water pipeline or freshwater pipeline. For example, in some embodiments, '9' may transfer desalinated water produced by the system to an application requiring desalinated water. In some embodiments, '9' may comprise a submarine power cable.

Ocean 'Ocean' may comprise a body of water. 'Ocean' may comprise a saline body of water which may be a source of feed water for desalination. For example, 'Ocean' may comprise a sea, or bay, or estuary, or lake, or ocean, or region of an ocean, or any combination thereof.

Seabed 'Seabed' may comprise a seafloor or land or solid surface beneath the surface of a body of water.

Freshwater In some embodiments, 'Freshwater' may comprise water with a salinity lower than the salinity of seawater. In some embodiments, 'Freshwater' may comprise water with a lower salinity than the desalination feed or seawater desalination feed. In some embodiments, 'Freshwater' may comprise desalinated water produced by a desalination system.

Low Density Fluid 'Low density fluid' may comprise a fluid with a density lower than the density of seawater, or desalinated water, or freshwater, or any combination thereof. In some embodiments, a low density fluid may comprise a liquid at the temperature of the 'ocean' or body of water and at the pressure of the lower elevation reservoir or subsea tank. For example, in some embodiments, the low density fluid may comprise a liquid in '1', '4', and '2'. For example, in some embodiments, in the higher elevation reservoir or higher elevation tank or '1', the low density fluid may comprise a liquid and/or the headspace above the stored low density fluid may comprise low density fluid vapor. For example, if the low density fluid comprises n-Butane, the higher elevation tank may store n-Butane liquid and the head space above the n-Butane liquid in the tank may comprise n-Butane vapor, which may be desirable, due to, the ability to transfer n-Butane into or out of the tank while enabling the headspace to comprise n-Butane and/or by enabling the higher elevation reservoir to be potentially at least partially pressurized or at a pressure greater than atmospheric pressure at sea-level, which may prevent or reduce potential cavitation of low density liquid entering the pump when pumping.

To App 'To App' may represent the application which may use the desalinated water, such as a desalination Electricity 'Electricity' may comprise a power or electricity input. In some embodiments, power or electricity may be provided by a submarine power cable and/or dynamic power cable. In some embodiments, power or electricity may be provided by an electricity grid, or a power plant, or an offshore wind farm, or offshore solar farm, or wave energy, or nuclear power, or a renewable energy source, or a non-renewable energy source, or any combination thereof. In some embodiments, may be provided by a power station or power generating system located on or adjacent to or within the integrated system or process. For example, the higher elevation reservoir or floating vessel may further comprise a power station or power generating system and/or method. For example, a power station may comprise, including, but not limited to, one or more or any combination of the following: a combustion powered power station, or a renewable energy power station, or a nuclear power station, or an LNG power station, or an LPG power station, or a methanol power station, or an ammonia power station, or a hydrogen power station, or a natural gas power station, or an oil power station, or a diesel power station, or a kerosene power station, or a gasoline power station.

FIGS. 5-6 Summary: FIGS. 5-6 may comprise an example embodiment comprising two or more subsea tanks for fluid displacement desalination. Some embodiments of FIGS. 5-6 may be desirable for continuous desalination, or may enable higher capacity utilization or capacity factor desalination.

In some embodiments, the volume or amount of low density fluid in the higher elevation reservoir may remain relatively constant due to, for example, the flow rate of low density fluid entering or being transferred into at least a first subsea tank being about the same as the flow rate of low density fluid exiting or being transferred out of at least a second subsea tank, which may be occurring simultaneously.

It may be important to note it may be desirable to configure the system with two or more subsea tanks for continuous fluid displacement desalination (for example, which may be shown in FIGS. 5-6) to, for example, enable the low density fluid pump to operate continuously or more continuously, which may improve efficiency and capacity utilization and reduce required maintenance, and/or to enable the desalinated water pipeline or export pipeline to flow continuously or more continuously, which may improve capacity utilization and/or reduce cost.

Example FIGS. 5-6 Key

Label Description

L1 'L1' may comprise low density fluid transferred from 'T1' to 'P1'. In some embodiments, L1 may have a pressure about the same as the internal pressure of 'T1'.

L2 'L2' may comprise low density fluid transferred from 'P1' to 'V1'. In some embodiments, L2 may have a pressure about the same as the difference in pressure between gravitational hydrostatic pressure of desalinated water and the gravitational hydrostatic pressure of low density fluid across the elevation different between the higher elevation reservoir and lower elevation reservoir, plus pressure drop or other pressure difference required to be overcome in low density fluid transfer and desalinated water transfer.

L3 'L3' may comprise low density fluid transferred from V1 to V4. 'L3' may have a pressure about the same as the difference in pressure between gravitational hydrostatic pressure of desalinated water and the gravitational hydrostatic pressure of low density fluid across the elevation different between the higher elevation reservoir and lower elevation reservoir, plus pressure drop or other pressure difference required to be overcome in low density fluid transfer and desalinated water transfer.

L4 'L4' may comprise low density fluid transferred from V1 to V3. 'L4' may have a pressure about the same as the difference in pressure between gravitational hydrostatic pressure of desalinated water and the gravitational hydrostatic pressure of low density fluid across the elevation different between the higher elevation reservoir and lower elevation reservoir, plus pressure drop or other pressure difference required to be overcome in low density fluid transfer and desalinated water transfer.

L5 'L5' may comprise low density fluid transferred from V2 to T1. 'L5' may be at a pressure about the same as the internal pressure of T1, plus any pressure drop to be overcome in low density fluid transfer into T1.

L6 'L6' may comprise low density fluid transferred from V3 to V2. 'L6' may be at a pressure about the same as the internal pressure of T1, plus any pressure drop to be overcome in low density fluid transfer.

L7 'L7' may comprise low density fluid transferred from V4 to V2. 'L7' may be at a pressure about the same as the internal pressure of T1, plus any pressure drop to be overcome in low density fluid transfer.

L8 'L8' may comprise a pipe or riser transferring low density fluid between or to or from the lower elevation region (e.g. 'Near Seabed') and the higher elevation reservoir (e.g. 'Near Surface'). 'L8' may comprise a pipe or riser transferring low density fluid between T3 and the higher elevation reservoir (e.g. 'Near Surface'). In some embodiments, 'L8' may comprise a riser in a lazy wave configuration, or a tension leg riser or pipe.

L9 'L9' may comprise a pipe or riser transferring low density fluid between or to or from the lower elevation region (e.g. 'Near Seabed') and the higher elevation reservoir (e.g. 'Near Surface'). 'L9' may comprise a pipe or riser transferring low density fluid between T2 and the higher elevation reservoir (e.g. 'Near Surface'). In some embodiments, 'L9' may comprise a riser in a lazy wave configuration, or a tension leg riser or pipe.

L10 'L10' may comprise seawater desalination feed and/or may comprise the seawater intake to the desalination system or method. L10 may comprise desalination feed intake pipe, which may comprise a seawater intake pipe. For example, in some embodiments, L10 may transfer seawater from a water depth or deep water depth, which may possess lower concentrations of biological activity and/or lower concentrations of foulants, which may reduce required pre-treatment of desalination feed water. In some embodiments, L10 may further comprise a pre-treatment step.

L11 'L11' may comprise desalination brine discharge. In some embodiments, it may be desirable for the desalination brine discharge outlet to be located a sufficient distance from the desalination feed intake, to, for example, prevent or minimize the mixing or presence of brine in the seawater entering the desalination feed intake.

L12 'L12' may comprise reverse osmosis permeate or desalinated water transferred from RO to V5. In some embodiments, when flowing, L12 may be at a pressure about the same as the gravitational hydrostatic pressure of low density fluid in the elevation difference between the lower elevation reservoir and the higher elevation reservoir, plus any pressure drop which may need to be overcome to displace the low density fluid from the lower elevation reservoir at a desired flow rate.

L13 'L13' may comprise reverse osmosis permeate or desalinated water transferred from V5 to T3. In some embodiments, when flowing, L13 may be at a pressure about the same as the gravitational hydrostatic pressure of low density fluid in the elevation difference between the lower elevation reservoir and the higher elevation reservoir, plus any pressure drop which may need to be overcome to displace the low density fluid from the lower elevation reservoir at a desired flow rate.

L14 'L14' may comprise reverse osmosis permeate or desalinated water transferred from V5 to T2. In some embodiments, when flowing, L14 may be at a pressure about the same as the gravitational hydrostatic pressure of low density fluid in the elevation difference between the lower elevation reservoir and the higher elevation reservoir, plus any pressure drop which may need to be overcome to displace the low density fluid from the lower elevation reservoir at a desired flow rate.

L15 'L15' may comprise desalinated water transferred from T3 to V6. In some embodiments, when flowing, L15 may be at a pressure about the same as the hydrostatic pressure of the desalinated water in the elevation difference between the lower elevation reservoir and the application of the desalinated water, and/or plus any pressure drop which may need to be overcome to displace the desalinated water from the lower elevation reservoir at a desired flow rate.

L16 'L16' may comprise desalinated water transferred from T2 to V6. In some embodiments, when flowing, L16 may be at a pressure about the same as the hydrostatic pressure of the desalinated water in the elevation difference between the lower elevation reservoir and the application of the desalinated water, and/or plus any pressure drop which may need to be overcome to displace the desalinated water from the lower elevation reservoir at a desired flow rate.

L17 'L17' may comprise a desalinated water pipeline. L17 may transfer desalinated water from the desalination system or process to the application requiring desalinated water. In some embodiments, L17 may be located on the seabed, or suspended above the seabed, or tethered in the water body, or floating, or any combination thereof.

E1 'E1' may comprise a subsea power cable.

E2 'E2' may comprise a dynamic power cable or a power source transferring power to the low density fluid pump.

'E2' may comprise a power or electricity input. In some embodiments, power or electricity may be provided by a submarine power cable and/or dynamic power cable. In some embodiments, power or electricity may be provided by an electricity grid, or a power plant, or an offshore wind farm, or offshore solar farm, or wave energy, or nuclear power, or a renewable energy source, or a non-renewable energy source, or any combination thereof. In some embodiments, may be provided by a power station or power generating system located on or adjacent to or within the integrated system or process. For example, the higher elevation reservoir or floating vessel may further comprise a power station or power generating system and/or method. For example, a power station may comprise, including, but not limited to, one or more or any combination of the following: a combustion powered power station, or a renewable energy power station, or a nuclear power station, or an LNG power station, or an LPG power station, or a methanol power station, or an ammonia power station, or a hydrogen power station, or a natural gas power station, or an oil power station, or a diesel power station, or a kerosene power station, or a gasoline power station. In some embodiments, power may be provided by a hydraulic or pneumatic source. In some embodiments, power may be provided by a pressure exchanger or turbocharger device.

V1 'V1' may comprise a valve. 'V1' may direct the flow of low density fluid to T2 or T3 from 'P1'. 'V1' may switch or swap flow of low density fluid in synchronization with or simultaneous to the switching or swapping of flow of low density fluid of 'V2'. In FIG. 5, V1 is directing the flow of low density fluid from P1 to T3. In FIG. 6, V1 is directing the flow of low density fluid from P1 to T2.

V2 'V2' may comprise a valve. 'V2' may direct the flow of low density fluid to T2 or T3 to T1. 'V2' may switch or swap flow of low density fluid in synchronization with or simultaneous to the switching or swapping of flow of low density fluid of 'V3'. In FIG. 5, V2 is directing the flow of low density fluid from T2 to T1. In FIG. 6, V2 is directing the flow of low density fluid from T3 to T1.

V3 'V3' may comprise a valve. 'V3' may direct the flow of low density fluid to or from T3. In FIG. 5, 'V3' may direct the flow of low density fluid from T1 or P1 to T3. In FIG. 6, 'V3' may direct the flow of low density fluid from T3 to T1.

V4 'V4' may comprise a valve. 'V4' may direct the flow of low density fluid to or from T2. In FIG. 5, 'V4' may direct the flow of low density fluid from T3 to T1. In FIG. 6, 'V4' may direct the flow of low density fluid from T1 or P1 to T3.

V5 'V5' may comprise a valve. 'V5' may direct the flow of reverse osmosis permeate or desalinated water to T2 or T3. In FIG. 5, V5 may direct the flow of reverse osmosis permeate or desalinated water to T2. In FIG. 6, V5 may direct the flow of reverse osmosis permeate or desalinated water to T3.

V6 'V6' may comprise a valve. 'V6' may direct the flow of desalinated water from T2 or T3 to a desalinated water export pipeline, or an application for desalinated water, or any combination thereof. In FIG. 5, V6 may direct the flow of desalinated water from T3 to L17. In FIG. 6, V6 may direct the flow of desalinated water from T2 to L17.

RO 'RO' may comprise a reverse osmosis system, which, in some embodiments, may be located subsea. In some embodiments, the reverse osmosis system may be comprise semi-permeable membranes which may desalinate water by rejecting at least a portion of dissolved salt ions, while allowing the water molecules to permeate. Reverse osmosis may be powered by a pressure difference between the feed side and permeate side of the membrane, wherein the pressure difference may need to be greater than the osmotic pressure of the seawater or desalination feed. In some embodiments, the reverse osmosis system may be powered by the pressure difference between the gravitation hydrostatic pressure of seawater at the water depth or elevation of the seawater intake or reverse osmosis system the hydrostatic pressure of a low density fluid or liquid with a density lower than the density of freshwater at about the same depth or elevation. For example, in some embodiments, the low density fluid may comprise a liquid, which may be practically incompressible compared to a gas, and/or may have a density lower than the density of freshwater and/or may be practically insoluble in water or possess a minimal or ultra-low solubility in water. For example, in some embodiments, the low density fluid may comprise, for example, including, but not limited to, liquid n-Butane or liquid Pentane.

T1 'T1' may comprise a higher elevation storage reservoir or higher elevation reservoir which may be configured to store low density fluid. In some embodiments, 'T1' may comprise a fluid storage tank comprising a floating vessel, such as a floating storage vessel.

In some embodiments, '1' may be moored. For example, in some embodiments, '1' may be moored using a spread mooring system, or a tension leg moored system or TLP, or a semisub mooring system, or a turret mooring system, or a disconnectable mooring system, or a disconnectable buoy mooring system, or any combination thereof. For example, in some embodiments, '1' may comprise a floating storage vessel, or an FSO, or a ship-shaped vessel, or a semi-submersible vessel, or a Tension Leg Platform or TLP vessel, or a cylindrical storage vessel, or any combination thereof.

In some embodiments, T1 may comprise a liquid buffer tank. For example, in some embodiments, if the T1 may provide storage volume or stored liquid in, for example, the event the flow rate of low density fluid entering T1 is different than the flow rate of low density fluid exiting T1.

In some embodiments, the volume or amount of low density fluid in T1 or the higher elevation reservoir may remain relatively constant due to, for example, the flow rate of low density fluid entering or being transferred into at least a first subsea tank being about the same as the flow rate of low density fluid exiting or being transferred out of at least a second subsea tank, which may be occurring simultaneously.

P1 'P1' may comprise a low density fluid pump. P1 may pump low density fluid from a higher elevation region or the higher elevation reservoir to the lower elevation region or reservoir or subsea tank(s). For example, 'P1' may comprise a hydraulic pump or a low density fluid pump. In some embodiments, 'P1' may be configured to provide pressure about the same as or greater than the gravitational hydrostatic pressure difference between the low density fluid and desalinated water, or low density fluid and seawater, or low density fluid and desalinated water plus any pressure drop to overcome in the freshwater pipeline to application, or any combination thereof.

T2 'T2' may comprise a subsea tank or a portion of the lower elevation reservoir. 'T2' may be located at a depth or elevation to ensure the hydrostatic pressure difference between the low density fluid and seawater is sufficient to provide driving force or enable desalination or reverse osmosis desalination. 'T2' may be configured to withstand or resist the pressure difference between the gravitational hydrostatic pressure of seawater or desalinated water and the gravitational hydrostatic pressure of low density fluid at the depth or elevation of the subsea tank or lower elevation reservoir. In some embodiments, low density fluid may be transferred into T2 while low density fluid is displaced out of T3. In some embodiments, low density fluid may be transferred into T3 while low density fluid is displaced out of T2.

'T2' may comprise a lower elevation reservoir or a subsea tank which may be configured to store low density fluid and/or high density fluid or desalinated water. In some embodiments, 'T2' may be desired or configured to withstand or resist a pressure difference greater than or equal to or about the same as or any combination thereof the hydrostatic pressure difference between the low density fluid and the adjacent seawater at about the same depth or elevation as the lower elevation reservoir. In some embodiments, a lower elevation storage reservoir or subsea tank may possess fluctuating or changing internal pressure. For example, when LDF is pumped or transferred into the lower elevation reservoir to displace freshwater in the lower elevation reservoir into the freshwater pipeline, the internal pressure of the lower elevation reservoir may be greater than or equal or about the same as the hydrostatic pressure of freshwater at the elevation or depth of the lower elevation reservoir or subsea tank plus the pressure of any pressure drop which may need to be overcome transferring low density fluid and/or freshwater. For example, when freshwater, which may comprise desalination permeate, transfers into the lower elevation reservoir or subsea tank to displace the LDF in the lower elevation reservoir into the LDF riser or pipe to the higher elevation reservoir, the internal pressure in the lower elevation reservoir or subsea tank may be about the same as the hydrostatic pressure of LDF at the elevation or depth of the lower elevation reservoir or subsea tank plus any pressure drop. In some embodiments, 'T2' may be anchored to the seabed, or 'piled' to the seabed, or tethered to the seabed, or weighted, or ballasted, or any combination thereof.

T3 'T3' may comprise a subsea tank or a portion of the lower elevation reservoir. 'T3' may be located at a depth or elevation to ensure the hydrostatic pressure difference between the low density fluid and seawater is sufficient to provide driving force or enable desalination or reverse osmosis desalination. 'T3' may be configured to withstand or resist the pressure difference between the gravitational hydrostatic pressure of seawater or desalinated water and the gravitational hydrostatic pressure of low density fluid at the depth or elevation of the subsea tank or lower elevation reservoir. In some embodiments, low density fluid may be transferred into T3 while low density fluid is displaced out of T2. In some embodiments, low density fluid may be transferred into T2 while low density fluid is displaced out of T3.

'T3' may comprise a lower elevation reservoir or a subsea tank which may be configured to store low density fluid and/or high density fluid or desalinated water. In some embodiments, 'T3' may be desired or configured to withstand or resist a pressure difference greater than or equal to or about the same as or any combination thereof the hydrostatic pressure difference between the low density fluid and the adjacent seawater at about the same depth or elevation as the lower elevation reservoir. In some embodiments, a lower elevation storage reservoir or subsea tank may possess fluctuating or changing internal pressure. For example, when LDF is pumped or transferred into the lower elevation reservoir to displace freshwater in the lower elevation reservoir into the freshwater pipeline, the internal pressure of the lower elevation reservoir may be greater than or equal or about the same as the hydrostatic pressure of freshwater at the elevation or depth of the lower elevation reservoir or subsea tank plus the pressure of any pressure drop which may need to be overcome transferring low density fluid and/or freshwater. For example, when freshwater, which may comprise desalination permeate, transfers into the lower elevation reservoir or subsea tank to displace the LDF in the lower elevation reservoir into the LDF riser or pipe to the higher elevation reservoir, the internal pressure in the lower elevation reservoir or subsea tank may be about the same as the hydrostatic pressure of LDF at the elevation or depth of the lower elevation reservoir or subsea tank plus any pressure drop. In some embodiments, 'T3' may be anchored to the seabed, or 'piled' to the seabed, or tethered to the seabed, or weighted, or ballasted, or any combination thereof.

RO 'RO' may comprise a reverse osmosis system, which, in some embodiments, may be located subsea. In some embodiments, the reverse osmosis system may be comprise semi-permeable membranes which may desalinate water by rejecting at least a portion of dissolved salt ions, while allowing the water molecules to permeate. Reverse osmosis may be powered by a pressure difference between the feed side and permeate side of the membrane, wherein the pressure difference may need to be greater than the osmotic pressure of the seawater or desalination feed. In some embodiments, the reverse osmosis system may be powered by the pressure difference between the gravitation hydrostatic pressure of seawater at the water depth or elevation of the seawater intake or reverse osmosis system the hydrostatic pressure of a low density fluid or liquid with a density lower than the density of freshwater at about the same depth or elevation. For example, in some embodiments, the low density fluid may comprise a liquid, which may be practically incompressible compared to a gas, and/or may have a density lower than the density of freshwater and/or may be practically insoluble in water or possess a minimal or ultra-low solubility in water. For example, in some embodiments, the low density fluid may comprise, for example, including, but not limited to, liquid n-Butane or liquid Pentane.

Near Surface 'Near Surface' may indicate a higher elevation. For example, in some embodiments, figure components above the 'Near Surface' line may be at a higher elevation, or an elevation about the same as the first reservoir. For example, in some embodiments, figure components above the 'Near Surface' line may comprise 'Near Surface' components.

In some embodiments, the equipment or components above the 'Near Surface' line may comprise an integrated vessel or platform or floating platform. For example, in some embodiments, the equipment or components above 'Near Surface' line may be moored using a spread mooring system, or a tension leg moored system or TLP, or a semisub mooring system, or a turret mooring system, or a disconnectable mooring system, or a disconnectable buoy mooring system, or any combination thereof. For example, in some embodiments, the equipment or components above 'Near Surface' line may comprise a floating storage vessel, or an FSO, or a ship-shaped vessel, or a semi-submersible vessel, or a Tension Leg Platform or TLP vessel, or a cylindrical storage vessel, or any combination thereof.

Seabed to Surface 'Seabed to Surface' may indicate an elevation between the lower elevation and a higher elevation. For example, in some embodiments, 'Seabed to Surface' may comprise an elevation lower than a higher elevation and higher than a lower elevation. For example, in some embodiments, 'Seabed to Surface' may comprise an elevation where risers or pipes transfer fluid between the higher elevation reservoir or first reservoir and the lower elevation reservoir or second reservoir. For example, in some embodiments, 'Seabed to Surface' may comprise an elevation where dynamic power cables or power cables transfer power between the higher elevation reservoir and the lower elevation reservoir.

Near Seabed 'Near Seabed' may indication a lower elevation. For example, in some embodiments, figure components below the 'Near Seabed' line may be at a lower elevation, or an elevation about the same as the second reservoir. For example, in some embodiments, figure components below the 'Near Seabed' line may comprise 'Near Seabed' components. In some embodiments, at least a portion of the 'Near Seabed' components may be skid mounted to, for example, facilitate installation.

FIGS. 7-10 Summary: FIGS. 7-10 may comprise an example embodiment comprising one subsea tank for fluid displacement desalination. In some embodiments of FIGS. 7-10, the higher elevation reservoir may be configured to store low density fluid and desalinated water.

Some embodiments may comprise an integrated process or system for energy storage and desalination. For example, in some embodiments, FIGS. 1-4 and/or FIGS. 7-10 may store power or energy for desalination by pumping low density fluid into the lower elevation reservoir or subsea tank to displace desalinated water (for example, may be shown in FIG. 2 and FIG. 8). For example, in some embodiments, FIGS. 1-4 and/or FIGS. 7-10 may desalinate water using the stored power or energy by allowing the low density fluid into the lower elevation reservoir or subsea tank to be displaced by the desalinated water which may be generated by reverse osmosis from, for example, the pressure difference between the hydrostatic pressure of seawater adjacent to the lower elevation reservoir and the hydrostatic pressure of low density fluid (for example, may be shown in FIG. 2 and FIG. 8).

Example FIGS. 7-10 Key

Label Description

1 '1' may comprise a higher elevation storage reservoir or higher elevation reservoir which may be configured to store low density fluid and desalinated water. In some embodiments, '1' may comprise a fluid storage tank comprising a floating vessel, such as a floating storage vessel. In some embodiments, '1' may comprise a positive pressure tank, or a tank with an internal pressure or an internal vapor pressure greater than the ambient pressure or greater than atmospheric pressure at sea-level. For example, in some embodiments, '1' may store a low density liquid or low density fluid with a vapor pressure greater than the atmospheric pressure and/or the internal pressure of '1' may be about the same as the vapor pressure of the low density fluid at the temperature of the low density fluid. For example, if n-Butane is the LDF and the LDF temperature is 10° C., the vapor pressure inside the higher elevation storage reservoir may be 1.15 Bar gauge pressure.

2 '2' may comprise a lower elevation reservoir or a subsea tank which may be configured to store low density fluid and/or high density fluid or desalinated water. In some embodiments, '2' may be desired or configured to withstand or resist a pressure difference greater than or equal to or about the same as or any combination thereof the hydrostatic pressure difference between the low density fluid and the adjacent seawater at about the same depth or elevation as the lower elevation reservoir. In some embodiments, a lower elevation storage reservoir or subsea tank may possess fluctuating or changing internal pressure. For example, when LDF is pumped or transferred into the lower elevation reservoir to displace freshwater in the lower elevation reservoir into the freshwater pipeline, the internal pressure of the lower elevation reservoir may be greater than or equal or about the same as the hydrostatic pressure of freshwater at the elevation or depth of the lower elevation reservoir or subsea tank plus the pressure of any pressure drop which may need to be overcome transferring low density fluid and/or freshwater. For example, when freshwater, which may comprise desalination permeate, transfers into the lower elevation reservoir or subsea tank to displace the LDF in the lower elevation reservoir into the LDF riser or pipe to the higher elevation reservoir, the internal pressure in the lower elevation reservoir or subsea tank may be about the same as the hydrostatic pressure of LDF at the elevation or depth of the lower elevation reservoir or subsea tank plus any pressure drop. In some embodiments, '2' may be anchored to the seabed, or 'piled' to the seabed, or tethered to the seabed, or weighted, or ballasted, or any combination thereof.

3 '3' may comprise a pump. For example, '3' may comprise a hydraulic pump or a low density fluid pump. In some embodiments, '3' may be configured to pump liquids, and/or may be designed to provide pressure about the same as or greater than the gravitational hydrostatic pressure difference between the low density fluid and freshwater, or low density fluid and seawater, or low density fluid and freshwater plus any pressure drop to overcome in the freshwater pipeline to application, or any combination thereof.

4 '4' may comprise a pipe or riser pipe transferring low density fluid (LDF) between the higher elevation reservoir or tank and the lower elevation reservoir or subsea tank. In some embodiments, '4' may comprise a riser in a lazy wave configuration, or a tension leg riser or pipe. In some embodiments, '4' may further comprise a power cable or power source or dynamic power cable, which may be installed separately or together with '4'. In some embodiments, a submarine power cable may transfer power from an source of power to a the system or to a dynamic power cable in the system.

5 '5' may comprise a vessel, which may comprise the higher elevation reservoir or storage tank and/or pump and/or mooring and/or electrical and control equipment. In some embodiments, '5' may be moored. For example, in some embodiments, '5' may be moored using a spread mooring system, or a tension leg moored system or TLP, or a semisub mooring system, or a turret mooring system, or a disconnectable mooring system, or a disconnectable buoy mooring system, or any combination thereof. For example, in some embodiments, '5' may comprise a floating storage vessel, or a FSO, or a ship-shaped vessel, or a semi-submersible vessel, or a Tension Leg Platform or TLP vessel, or a cylindrical storage vessel, or any combination thereof.

6 '6' may comprise desalination feed intake pipe, which may comprise a seawater intake pipe. For example, in some embodiments, '6' may transfer seawater from a water depth or deep water depth, which may possess lower concentrations of biological activity and/or lower concentrations of foulants, which may reduce required pre-treatment of desalination feed water. In some embodiments, '6' may further comprise a pre-treatment step.

RO 'RO' may comprise a reverse osmosis system, which, in some embodiments, may be located subsea. In some embodiments, the reverse osmosis system may be comprise semi-permeable membranes which may desalinate water by rejecting at least a portion of dissolved salt ions, while allowing the water molecules to permeate. Reverse osmosis may be powered by a pressure difference between the feed side and permeate side of the membrane, wherein the pressure difference may need to be greater than the osmotic pressure of the seawater or desalination feed. In some embodiments, the reverse osmosis system may be powered by the pressure difference between the gravitation hydrostatic pressure of seawater at the water depth or elevation of the seawater intake or reverse osmosis system the hydrostatic pressure of a low density fluid or liquid with a density lower than the density of freshwater at about the same depth or elevation. For example, in some embodiments, the low density fluid may comprise a liquid, which may be practically incompressible compared to a gas, and/or may have a density lower than the density of freshwater and/or may be practically insoluble in water or possess a minimal or ultra-low solubility in water. For example, in some embodiments, the low density fluid may comprise, for example, including, but not limited to, liquid n-Butane or liquid Pentane.

7 '7' may comprise desalination brine discharge. In some embodiments, it may be desirable for the desalination brine discharge outlet to be located a sufficient distance from the desalination feed intake, to, for example, prevent or minimize the mixing or presence of brine in the seawater entering the desalination feed intake.

8 '8' may comprise desalinated water permeate or reverse osmosis permeate, which may transfer from the reverse osmosis system to the lower elevation reservoir or subsea tank. It may be desirable for '8' to be at a pressure about the same as the internal pressure of the lower elevation reservoir or subsea tank.

9 '9' may comprise a desalinated water pipe which may transfer desalinated water from the lower elevation reservoir to the higher elevation reservoir. For example, in some embodiments, when a portion of low density fluid is pumped or transferred into the lower elevation reservoir to displace a portion of the desalinated water in the lower elevation reservoir, the displaced desalinated water may transfer through a pipe or riser, '9', into the higher elevation reservoir.

10 '10' may comprise a desalinated water pipeline or freshwater pipeline. For example, in some embodiments, '10' may transfer desalinated water produced by the system to an application requiring desalinated water. In some embodiments, '10' may comprise a power cable. In some embodiments, '10' may comprise a tethered or suspended or floating desalinated water pipeline.

Ocean 'Ocean' may comprise a body of water. 'Ocean' may comprise a saline body of water which may be a source of feed water for desalination. For example, 'Ocean' may comprise a sea, or bay, or estuary, or lake, or ocean, or region of an ocean, or any combination thereof.

Seabed 'Seabed' may comprise a seafloor or land or solid surface beneath the surface of a body of water.

Freshwater In some embodiments, 'Freshwater' may comprise water with a salinity lower than the salinity of seawater. In some embodiments, 'Freshwater' may comprise water with a lower salinity than the desalination feed or seawater desalination feed. In some embodiments, 'Freshwater' may comprise desalinated water produced by a desalination system.

Low Density Fluid 'Low density fluid' may comprise a fluid with a density lower than the density of seawater, or desalinated water, or freshwater, or any combination thereof. In some embodiments, a low density fluid may comprise a liquid at the temperature of the 'ocean' or body of water and at the pressure of the lower elevation reservoir or subsea tank. For example, in some embodiments, the low density fluid may comprise a liquid in '1', '4', and '2'. For example, in some embodiments, in the higher elevation reservoir or higher elevation tank or '1', the low density fluid may comprise a liquid and/or the headspace above the stored low density fluid may comprise low density fluid vapor. For example, if the low density fluid comprises n-Butane, the higher elevation tank may store n-Butane liquid and the head space above the n-Butane liquid in the tank may comprise n-Butane vapor, which may be desirable, due to, the ability to transfer n-Butane into or out of the tank while enabling the headspace to comprise n-Butane and/or by enabling the higher elevation reservoir to be potentially at least partially pressurized or at a pressure greater than atmospheric pressure at sea-level, which may prevent or reduce potential cavitation of low density liquid entering the pump when pumping.

To App 'To App' may represent the application which may use the desalinated water, such as a desalination Electricity 'Electricity' may comprise a power or electricity input. In some embodiments, power or electricity may be provided by a submarine power cable and/or dynamic power cable. In some embodiments, power or electricity may be provided by an electricity grid, or a power plant, or an offshore wind farm, or offshore solar farm, or wave energy, or nuclear power, or a renewable energy source, or a non-renewable energy source, or any combination thereof. In some embodiments, may be provided by a power station or power generating system located on or adjacent to or within the integrated system or process. For example, the higher elevation reservoir or floating vessel may further comprise a power station or power generating system and/or method. For example, a power station may comprise, including, but not limited to, one or more or any combination of the following: a combustion powered power station, or a renewable energy power station, or a nuclear power station, or an LNG power station, or an LPG power station, or a methanol power station, or an ammonia power station, or a hydrogen power station, or a natural gas power station, or an oil power station, or a diesel power station, or a kerosene power station, or a gasoline power station.

FIGS. 11-14 Summary: FIGS. 11-14 may comprise an example embodiment for subsea fluid displacement desalination employing a subsea low density fluid pump. In some embodiments of FIGS. 11-14, the higher elevation reservoir may be configured to store low density fluid.

Some embodiments may comprise an integrated process or system for energy storage and desalination. For example, in some embodiments, FIGS. 11-14 may store power or energy for desalination by pumping low density fluid into the lower elevation reservoir or subsea tank to displace desalinated water (for example, may be shown in FIG. 2 and FIG. 8). For example, in some embodiments, FIGS. 11-14 may desalinate water using the stored power or energy by allowing the low density fluid into the lower elevation reservoir or subsea tank to be displaced by the desalinated water which may be generated by reverse osmosis from, for example, the pressure difference between the hydrostatic pressure of seawater adjacent to the lower elevation reservoir and the hydrostatic pressure of low density fluid FIGS. 11-14 may show an embodiment employing a subsea low density fluid pump. In some embodiments, by locating the low density fluid pump subsea, the system or process may avoid or reduce the need for a dynamic power cable and/or the subsea pump may be powered using a subsea or submarine power cable. In some embodiments, the subsea pump low density fluid may avoid or be less prone to biofouling or require less maintenance, than, for example, pumps in direct contact with water, because the low density fluid being pumped or wetting the pump may comprise fluid less prone to biofouling or scaling or corrosion than, for example, water, such as, for example, n-Butane. For example, n-Butane may be also known for its chemical stability, and may be less prone to degradation than, for example, some other hydrocarbons.

Example FIGS. 11-14 Key

Label Description

1 '1' may comprise a higher elevation storage reservoir or higher elevation reservoir or higher elevation tank which may be configured to store low density fluid. In some embodiments, '1' may comprise a floating roof tank. In some embodiments, '1' may comprise a fluid storage tank comprising a floating vessel, such as a floating storage vessel. In some embodiments, '1' may further comprise a vapor recovery system. In some embodiments, '1' may comprise a positive pressure tank, or a tank with an internal pressure or an internal vapor pressure greater than the ambient pressure or greater than atmospheric pressure at sea-level. For example, in some embodiments, '1' may store a low density liquid or low density fluid with a vapor pressure greater than the atmospheric pressure and/or the internal pressure of '1' may be about the same as the vapor pressure of the low density fluid at the temperature of the low density fluid. For example, if n-Butane is the LDF and the LDF temperature is 10° C., the vapor pressure inside the higher elevation storage reservoir may be 1.15 Bar gauge pressure.

In some embodiments, the higher elevation storage reservoir or higher elevation reservoir may comprise a headspace comprising air, or inert gas, or inert gas system. For example, in some embodiments, if a portion of low density fluid is transferred from or out of the higher elevation reservoir, a portion of air or inert gas may be transferred into or occupy the volume in the higher elevation reservoir previously occupied by the liquid transferred. For example, in some embodiments, if a portion of low density fluid is transferred into the higher elevation reservoir, a portion of air or inert gas may be transferred out of the higher elevation reservoir and/or treated with a vapor recovery system to, for example, recovery at least a portion of any potential low density fluid vapors which may be in the portion of air or inert gas transferred out of the higher elevation reservoir.

In some embodiments, a higher density fluid may be stored in the higher elevation reservoir along with the low density fluid. In some embodiments, if a portion of low density fluid exits the higher elevation reservoir, the high density fluid may displace or occupy at least a portion of the volume previously occupied by the low density fluid. In some embodiments, by displacing a low density liquid with a high density liquid, or vise versa, for example, the liquid volume inside the higher elevation reservoir may remain relatively constant and/or the need for vapor recovery systems or inert gas systems may be avoided or minimized or reduced.

2 '2' may comprise a lower elevation reservoir or a subsea tank which may be configured to store low density fluid and/or high density fluid or desalinated water. In some embodiments, '2' may be desired or configured to withstand or resist a pressure difference greater than or equal to or about the same as or any combination thereof the hydrostatic pressure difference between the low density fluid and the adjacent seawater at about the same depth or elevation as the lower elevation reservoir. In some embodiments, a lower elevation storage reservoir or subsea tank may possess fluctuating or changing internal pressure. For example, when LDF is pumped or transferred into the lower elevation reservoir to displace freshwater in the lower elevation reservoir into the freshwater pipeline, the internal pressure of the lower elevation reservoir may be greater than or equal or about the same as the hydrostatic pressure of freshwater at the elevation or depth of the lower elevation reservoir or subsea tank plus the pressure of any pressure drop which may need to be overcome transferring low density fluid and/or freshwater. For example, when desalination permeate transfers into the lower elevation reservoir or subsea tank to displace the LDF in the lower elevation reservoir into the LDF riser or pipe to the higher elevation reservoir, the internal pressure in the lower elevation reservoir or subsea tank may be about the same as the hydrostatic pressure of LDF at the elevation or depth of the lower elevation reservoir or subsea tank plus any pressure drop. In some embodiments, '2' may be anchored to the seabed, or 'piled' to the seabed, or tethered to the seabed, or weighted, or ballasted, or any combination thereof.

3 '3' may comprise a subsea pump. For example, '3' may comprise a hydraulic pump or a low density fluid pump. In some embodiments, '3' may be configured to pump liquids, and/or may be designed to provide pressure about the same as or greater than the gravitational hydrostatic pressure difference between the low density fluid and freshwater, or low density fluid and seawater, or low density fluid and freshwater plus any pressure drop to overcome in the freshwater pipeline to application, or any combination thereof. In some embodiments, electricity or power for the subsea pump may be provided by a subsea or submarine power cable.

4 '4' may comprise a pipe or riser pipe transferring low density fluid (LDF) between the higher elevation reservoir or tank and the lower elevation reservoir or subsea tank. In some embodiments, '4' may comprise a riser in a lazy wave configuration, or a tension leg riser or pipe. In some embodiments, '4' may further comprise a power cable, or power source, or subsea power power cable, or a submarine power cable, or a dynamic power cable, or any combination thereof, which may be installed separately or together with '4'.

5 '5' may comprise a vessel, which may comprise the higher elevation reservoir or storage tank and/or pump and/or mooring and/or electrical and control equipment. In some embodiments, '5' may be moored. For example, in some embodiments, '5' may be moored using a spread mooring system, or a tension leg moored system or TLP, or a semisub mooring system, or a turret mooring system, or a disconnectable mooring system, or a disconnectable buoy mooring system, or any combination thereof. For example, in some embodiments, '5' may comprise a floating storage vessel, or a FSO, or a ship-shaped vessel, or a semi-submersible vessel, or a Tension Leg Platform or TLP vessel, or a cylindrical storage vessel, or any combination thereof.

6 '6' may comprise desalination feed intake pipe, which may comprise a seawater intake pipe. For example, in some embodiments, '6' may transfer seawater from a water depth or deep water depth, which may possess lower concentrations of biological activity and/or lower concentrations of foulants, which may reduce required pre-treatment of desalination feed water. In some embodiments, '6' may further comprise a pre-treatment step.

RO 'RO' may comprise a reverse osmosis system, which, in some embodiments, may be located subsea. In some embodiments, the reverse osmosis system may be comprise semi-permeable membranes which may desalinate water by rejecting at least a portion of dissolved salt ions, while allowing at least a portion of water molecules to permeate. Reverse osmosis may be powered by a pressure difference between the feed side and permeate side of the membrane, wherein the pressure difference may need to be greater than the osmotic pressure of the seawater or desalination feed. In some embodiments, the reverse osmosis system may be powered by the pressure difference between the gravitation hydrostatic pressure of seawater at the water depth or elevation of the seawater intake or reverse osmosis system and the hydrostatic pressure of a low density fluid or liquid with a density lower than the density of freshwater at about the same depth or elevation. For example, in some embodiments, the low density fluid may comprise a liquid, which may be practically incompressible or possess orders of magnitude lower compressibility compared to a gas, and/or may have a density lower than the density of freshwater and/or may be practically insoluble in water or possess a minimal or ultra-low solubility in water. For example, in some embodiments, the low density fluid may comprise, for example, including, but not limited to, liquid n-Butane.

7 '7' may comprise desalination brine discharge. In some embodiments, it may be desirable for the desalination brine discharge outlet to be located a sufficient distance from the desalination feed intake, to, for example, prevent or minimize the mixing or presence of brine in the seawater entering the desalination feed intake.

8 '8' may comprise desalinated water permeate or reverse osmosis permeate, which may transfer from the reverse osmosis system to the lower elevation reservoir or subsea tank. It may be desirable for '8' to be at a pressure about the same as the internal pressure of the lower elevation reservoir or subsea tank.

9 '9' may comprise a desalinated water pipeline or freshwater pipeline or desalinated water pipe. For example, in some embodiments, '9' may transfer desalinated water produced by the system to an application requiring desalinated water. In some embodiments, '9' may further comprise a submarine power cable. In some embodiments, '9' may further comprise a submarine power cable, which may installed separately or together with the water pipe.

Ocean 'Ocean' may comprise a body of water. 'Ocean' may comprise a saline body of water which may be a source of feed water for desalination. For example, 'Ocean' may comprise a sea, or bay, or estuary, or lake, or ocean, or region of an ocean, or any combination thereof.

Seabed 'Seabed' may comprise a seafloor or land or solid surface beneath the surface of a body of water.

Freshwater In some embodiments, 'Freshwater' may comprise water with a salinity lower than the salinity of seawater. In some embodiments, 'Freshwater' may comprise water with a lower salinity than the desalination feed or seawater desalination feed. In some embodiments, 'Freshwater' may comprise desalinated water produced by a desalination system.

Low Density Fluid 'Low density fluid' may comprise a fluid with a density lower than the density of seawater, or desalinated water, or freshwater, or any combination thereof. In some embodiments, a low density fluid may comprise a liquid at the temperature of the 'ocean' or body of water and at the pressure or hydrostatic pressure of the lower elevation reservoir or subsea tank. For example, in some embodiments, the low density fluid may comprise a liquid in '1', '4', and '2'. For example, in some embodiments, in the higher elevation reservoir or higher elevation tank or '1'. For example, in some embodiments, the low density fluid may comprise a liquid. For example, in some embodiments, in the higher elevation reservoir or higher elevation tank or '1', the low density fluid may comprise a liquid and/or the headspace above the stored low density fluid may comprise low density fluid vapor. For example, in some embodiments, if, for example, the low density fluid comprises n-Butane, the higher elevation tank may store n-Butane liquid and the head space above the n-Butane liquid in the tank may comprise n-Butane vapor, which may be desirable, due to, the ability to transfer n-Butane into or out of the tank while enabling the headspace to comprise n-Butane and/or by enabling the higher elevation reservoir to be potentially at least partially pressurized or at a pressure greater than atmospheric pressure at sea-level, which may prevent or reduce potential cavitation of low density liquid entering the pump when pumping.

To App 'To App' may represent the application which may use the desalinated water, such as a desalination Electricity 'Electricity' may comprise a power or electricity input. In some embodiments, power or electricity may be provided by a submarine power cable and/or dynamic power cable. In some embodiments, power or electricity may be provided by an electricity grid, or a power plant, or an offshore wind farm, or offshore solar farm, or wave energy, or nuclear power, or a renewable energy source, or a non-renewable energy source, or any combination thereof. In some embodiments, may be provided by a power station or power generating system located on or adjacent to or within the integrated system or process. For example, the higher elevation reservoir or floating vessel may further comprise a power station or power generating system and/or method. For example, a power station may comprise, including, but not limited to, one or more or any combination of the following: a combustion powered power station, or a renewable energy power station, or floating solar, or floating wind, or fixed wind, or wave power, or tidal power, or current power, or ocean thermal energy conversion power station, or ocean kinetic energy power station, or a nuclear power station, or an LNG power station, or an LPG power station, or a methanol power station, or an ammonia power station, or a hydrogen power station, or a natural gas power station, or an oil power station, or a diesel power station, or a kerosene power station, or a gasoline power station.

FIGS. 15-18 Summary: FIGS. 15-18 may comprise an embodiment of subsea fluid displacement desalination wherein seawater intake may be conducted on or near the higher elevation reservoir and/or wherein the system or process may be configured such that desalination feed pre-treatment or pre-treatment may be conducted on the higher elevation reservoir and/or wherein treated desalination feed may be transferred from the higher elevation to subsea desalination system or process located at a lower elevation.

In some embodiments, FIGS. 15-18 may be similar to FIGS. 7-10, except may differ in the elevation or location of the desalination pre-treatment and the source or elevation of the seawater intake and/or desalination feed. In some embodiments, it may be desirable to locate at least a portion of the desalination pre-treatment processes on or near the higher elevation reservoir or in an environment near atmospheric air to, for example, facilitate maintainability, or accessibility, or enable the use of available desalination pre-treatment equipment, or enable greater scalability, or reduce capital cost, or improve efficiency, or enable greater quality pre-treatment to minimize or reduce required maintenance of subsea desalination systems, or any combination thereof. In some embodiments, at least a portion for the desalination pre-treatment processes may be located at a higher elevation or on or near the sea surface, however the seawater intake or seawater source may be located at a significant water depth or at an elevation significantly below or depth significantly below the elevation of the higher elevation tank or higher elevation reservoir. For example, it may be desirable to locate the intake at a water depth wherein less biological growth or less particulates are present, to, for example, reduce the intensity, or level, or amount, or cost, or any combination thereof of the required desalination pre-treatment systems or processes.

In some embodiments, it may be desirable for the seawater intake to be located at an elevation or depth within the dysphotic zone, or twilight zone, of a sea or ocean. In some embodiments, it may be desirable for the seawater intake to be located at an elevation or depth within the aphotic zone of a sea or ocean. In some embodiments, it may be desirable for the seawater intake to be located at an elevation or depth below the euphotic zone, or below the dysphotic zone, or any combination thereof.

In some embodiments, it may be desirable for the seawater intake to be located near the sea surface, or body of water surface, or near the higher elevation reservoir or tank, or any combination thereof. For example, in some embodiments, it may be more economical, or simpler, or easier to maintain, or more desirable, or any combination thereof, to source seawater or locate the seawater intake in the euphotic zone.

Desalination pre-treatment systems or processes may include, but are not limited to, one or more or any combination of the following: systems or processes for reducing potential biological fouling, or systems or processes for reducing potential particle fouling, or systems or processes for reducing potential colloidal fouling, or systems or processes for reducing potential organic fouling, or systems or processes for reducing potential inorganic fouling, or systems or processes for reducing potential inorganic fouling, or systems or processes for reducing potential mineral fouling, or systems or processes for reducing potential oxidant fouling, or systems or processes for reducing potential corrosion, or systems or processes for reducing potential scaling, or Filtration, or Chlorination, or chemical treatment, or ozonation, or Coagulation, or Coagulation+Filtration, or Flocculation, or sedimentation, or Activated carbon adsorption, or Ultrafiltration, or Antiscalant dosing, or Acidification, or Basification, or Oxidant scavenger dosing, or Sodium (meta)bilsulfite, or Granulated Activated Carbon, or Potassium permanganate, or bromination.

In some embodiments, a seawater intake may be suspended or floating or tethered subsea. For example, in some embodiments, a seawater intake or seawater intake module may be suspended above the seafloor, or suspended a sufficient elevation above the seafloor to prevent or reduce potential disturbance of the seafloor or seabed and/or prevent or reduce the potential for sediments or solids from dislodging from the seafloor or seabed and/or prevent or reduce the potential for sediments or solids from entering the seawater intake. In some embodiments, the seawater intake module and/or the riser transferring seawater intake may be suspended or floating or tethered using, for example, buoyancy modules and/or anchoring or mooring systems or methods.

In some embodiments, brine discharge outlet may be suspended or floating or tethered using, for example, buoyancy modules and/or anchoring or mooring systems or methods.

In some embodiments, the desalination pre-treatment may further comprise supplemental pumping to, for example, facilitate the transfer of the pre-treated desalination feed to the desalination system or process and/or provide supplemental pressure to facilitate desalination. For example, in some embodiments, the desalination system may be located at a depth wherein the hydrostatic pressure difference between the low density fluid and the desalination feed or seawater may be insufficient or less than desired for desalination. For example, in some embodiments, supplemental pumping or supplemental pressure may be provided by a pump fluidly connected to the desalination feed, or a pump fluidly connected to the desalination feed to increase the pressure of the desalination feed, or a pump fluidly connected to the desalination permeate, or a pump fluidly connected to the desalination permeate to reduce the pressure of the desalination permeate, or a pump fluidly connected to the low density fluid, or a pump fluidly connected to the low density fluid to lower the pressure of the low density fluid, or a pump fluidly connected to the desalinated water output pipe or desalinated water output, or a pump fluidly connected to the desalinated water output pipe or desalinated water output to lower the pressure of the desalination output on the side of the subsea tank and/or the permeate side of the desalination membrane, or any combination thereof.

The Example FIGS. 15-18 Key may show the example labeled components in FIGS. 15-18 which may be significantly different from FIGS. 7-10. In FIGS. 15-18, the numerical labels for 8, or, 9, or 10, or 11, or any combination thereof may be equivalent to the numerical labels for 7, or 8, or 9, or 10 of FIGS. 7-10, plus 1. For example, label '9' in FIGS. 7-10 may be similar to label '10' in FIGS. 15-18.

Example FIGS. 15-18 Key

Label Description

6 '6' may comprise a seawater intake and/or seawater intake pipe or riser. In some embodiments, seawater may be transferred from subsea through a pipeline into a pre-treatment system or process. In some embodiments, a subsea pump or submerged may be employed to facilitate the transfer of water from subsea into the pre-treatment process. In some embodiments, the pre-treatment process may be located at an elevation below the surface of the body of water, which may enable seawater to naturally flow through the seawater intake, through the seawater pipe or riser, and/or into the pre-treatment process. In some embodiments, the pre-treatment process may be located at an elevation below the surface of the body of water, which may enable seawater to naturally flow through the seawater intake, through the seawater pipe or riser, and/or into the pre-treatment process, wherein said transfer or flow may be facilitated by a pump, such as a surface pump, or a pump located in air, or a subsea pump, or any combination thereof. In some embodiments, the seawater intake or inlet may be located at a depth or elevation significantly lower than the elevation of the pre-treatment system or process.

Pre 'Pre' may comprise a seawater pre-treatment or desalination feed pre-treatment or any combination thereof pre-treatment system or process. In some embodiments, a pretreatment process may be located at an elevation near the elevation of the higher elevation reservoir or tank, or on a floating vessel, or above sealevel, or above or on a body of water. In some embodiments, a pretreatment process may be located subsea.

7 '7' may comprise a desalination feed or treated desalination feed or at least partially treated desalination feed transferred from a pre-treatment system or process to a desalination system or process. In some embodiments, '7' may comprise a pipe or riser transferring at least partially treated desalination feed water, which may comprise treated seawater, from a pre-treatment process, or storage tank, or any combination thereof to a desalination system or process, or a storage tank, or any combination thereof. In some embodiments, '7' may further comprise a pump to facilitate the transfer of desalination feed or treated desalination feed to the desalination system or process and/or to provide supplemental pressure.

FIGS. 19-22 Summary: FIGS. 19-22 may comprise an embodiment of subsea fluid displacement desalination employing a subsea pump fluidly connected to the desalinated water outlet or desalinated water transfer pipe or pipeline. FIGS. 19-22 may comprise an embodiment of subsea fluid displacement desalination wherein power for desalination may be provided by a subsea pump fluidly connected to the desalinated water outlet or desalinated water transfer pipeline, which may transfer desalinated water from the subsea tank or lower elevation reservoir to an application for desalinated water.

In some embodiments, employing the pump in the desalination process or system on the desalinated water outlet pipeline or export pipe may enable the subsea tank to operate at near or about a consistent internal pressure. For example, in some embodiments, at least a portion of water may be pumped from the subsea tank or lower elevation tank or lower elevation reservoir using a subsea pump fluidly connected to the desalinated water export pipeline, wherein low density fluid may transfer into the subsea tank to displace or occupy the volume of the subsea tank occupied or previously occupied by the water exiting subsea tank. For example, in some embodiments, to enable at least a portion of low density fluid to transfer into the subsea tank to displace at least a portion of the water in the subsea tank, the internal pressure of the subsea tank or the pressure of water entering the subsea pump may need to be less than or equal to the hydrostatic pressure of low density fluid at the depth or elevation of the subsea tank. For example, in some embodiments, water may be due to the pressure difference between the desalination feed side of a desalination membrane and desalination permeate side of a desalination permeate side, wherein water may permeate through a membrane from the desalination feed side to the desalination permeate side, generating permeate or desalinated water. In some embodiments, at least a portion of the difference in pressure driving desalination may be formed by the difference in hydrostatic pressure between the desalination feed, which may comprise saline water or seawater, and the hydrostatic pressure of the low density fluid, which may occupy at least a portion of the subsea tank or lower elevation reservoir, for example, wherein at least a portion of desalinated water or permeate formed may displace at least a portion of the low density fluid in the subsea tank. In some embodiments, it may be desirable for internal pressure of the subsea tank to be less than the hydrostatic pressure of the desalination feed, and near the hydrostatic pressure of the low density fluid, to form the pressure difference required or desired for desalination and to enable the formation of desalination permeate which may occupy at least a portion of the subsea tank or displace at least a portion of the low density fluid in the subsea tank.

Example FIGS. 19-22 Figure Key

Example FIGS. 19-22 Key

Label Description

1 '1' may comprise the higher elevation reservoir, or higher elevation tank, or higher elevation storage reservoir, or higher elevation storage tank, or any combination thereof.

2 '2' may comprise the lower elevation reservoir, or subsea tank, or lower elevation storage reservoir, or subsea storage tank, or any combination thereof.

3 '3' may comprise a subsea pump. '3' may comprise a subsea pump fluidly connected to the desalinated water outlet pipe, which may be fluidly connected to the subsea tank. '3' may pump at least a portion of desalinated water or water from the subsea tank and/or '3' may allow or enable at least a portion of low density fluid to displace desalinated water or water from the subsea tank. '3' may be powered by, for example, including, but not limited to, one or more or any combination of the following: a subsea power cable, or submarine power cable, or a dynamic power cable, or an electricity cable, or any combination thereof.

4 '4' may comprise a low density fluid riser or pipe. '4' may transfer low density fluid between the lower elevation reservoir and the higher elevation reservoir. '4' may transfer low density fluid between the lower elevation region and the higher elevation region. '4' may comprise a liquid column or pipe connecting the higher elevation region and the lower elevation region.

5 '5' may comprise a vessel or structure which may comprise the low density fluid storage reservoir, or the higher elevation reservoir, or the higher elevation tank, or the higher elevation region, or any combination thereof.

6 '6' may comprise a desalination feed intake. '6' may comprise a seawater intake or seawater feed intake. In some embodiments, '6' may further comprise one or more or any combination of pre-treatment, or seawater pre-treatment, or desalination pre-treatment, or any combination thereof steps, or processes, or any combination thereof.

7 '7' may comprise a desalination brine, or desalination retentate and/or may comprise an outflow pipe or outflow pipeline. It may be desirable for '7' to discharge or release desalination brine or retentate a significant distance away from the desalination feed intake to, for example, prevent potentially undesirable increase in salinity of the desalination feed. '7' may comprise diffusers or other systems or methods for distributing or dissolving desalination brine.

8 '8' may comprise desalination permeate or desalinated water, which may be transferred between the desalination system or process and the subsea tank. In some embodiments, during, for example, the desalinating of water, it may be desirable for '8' to be at about the same pressure as the internal pressure of the subsea tank and/or otherwise be fluidly connected to the subsea tank.

9 '9' may comprise a desalinated water outlet or export or transfer pipe or pipeline. '9' may transfer water or desalinated water to one or more or any combination of applications for water, or to water storage, or any combination thereof.

RO 'RO' may comprise a desalination system or process. 'RO' may comprise a membrane based desalination system or process, or a pressure driven desalination system or process, or any combination thereof. 'RO', for example, may comprise a reverse osmosis desalination system or process. 'RO' may be located in the lower elevation region, or at an elevation about the same as or near the elevation of the lower elevation reservoir.

Seabed 'Seabed' may comprise the seafloor or land near comprising the bottom of a body of water.

Ocean 'Ocean' may comprise a body of water, such as a sea, or ocean.

Freshwater 'Freshwater' may comprise desalinated water, or water produced from the desalination system or process, or water stored in the subsea tank, or water transferred from the subsea tank, or water with a salinity less than desalination feed, or any combination thereof.

Low Density Fluid 'Low density fluid' may comprise a fluid with a density lower than the density of desalination feed, or freshwater, or any combination thereof. In some embodiments, 'low density fluid' may comprise a liquid.

FIGS. 23-26 Summary: FIGS. 23-26 may comprise an embodiment of fluid displacement desalination wherein the higher elevation tank or higher elevation reservoir may be located on land, or on land above sea level, while, for example, the subsea tank or lower elevation tank may be located subsea or underwater or beneath a body of water. In some embodiments, one or more pipes may be located on the seabed or land or both to transfer low density fluid and/or water or desalinated water between the lower elevation region or the subsea tank and the higher elevation region or higher elevation tank. In some embodiments, a pump may be located on land near the higher elevation reservoir, and may pump low density fluid from the higher elevation reservoir to the subsea tank or lower elevation reservoir. In some embodiments, pumping or otherwise transferring low density fluid from the higher elevation reservoir or higher elevation tank to the subsea tank or lower elevation reservoir may displace at least a portion of water or desalinated water in the subsea tank, and/or the displaced desalinated water may be transferred to water storage located near or at the higher elevation region or the higher elevation reservoir and/or may be transferred to an application for water, such as a municipal water grid, or municipal water system, or water pipeline, or water consumer.

Example FIGS. 23-26 Key

Label Description

1 '1' may comprise the higher elevation reservoir, or higher elevation tank, or higher elevation storage reservoir, or higher elevation storage tank, or any combination thereof. '1' may be located on land, or on the ocean, or on a fixed structure, or any combination thereof.

2 '2' may comprise the lower elevation reservoir, or subsea tank, or lower elevation storage reservoir, or subsea storage tank, or any combination thereof.

3 '3' may comprise a pump or low density fluid pump. '3' may be located on land or near the higher elevation reservoir.

4 '4' may comprise a low density fluid pipe or pipeline. '4' may be located on land, or buried, or on the seabed, or in a tunnel, or trenched, or crossing the coastline, or crossing where land meets water, or any combination thereof. '4' may transfer low density fluid between the lower elevation reservoir and the higher elevation reservoir. '4' may transfer low density fluid between the lower elevation region and the higher elevation region. '4' may comprise a liquid column or pipe connecting the higher elevation region and the lower elevation region.

5 '5' may comprise a desalination feed intake. '5' may comprise a seawater intake or seawater feed intake. In some embodiments, '5' may further comprise one or more or any combination of pre-treatment, or seawater pre-treatment, or desalination pre-treatment, or any combination thereof steps, or processes, or any combination thereof.

6 '6' may comprise a desalination brine, or desalination retentate and/or may comprise an outflow pipe or outflow pipeline. It may be desirable for '6' to discharge or release desalination brine or retentate a significant distance away from the desalination feed intake to, for example, prevent potentially undesirable increase in salinity of the desalination feed. '6' may comprise diffusers or other systems or methods for distributing or dissolving desalination brine.

7 '7' may comprise desalination permeate or desalinated water, which may be transferred between the desalination system or process and the subsea tank. In some embodiments, during, for example, the desalinating of water, it may be desirable for '7' to be at about the same pressure as the internal pressure of the subsea tank and/or otherwise be fluidly connected to the subsea tank.

8 '8' may comprise desalinated water pipeline, which may transfer water from the subsea tank to the higher elevation reservoir, or to the higher elevation region, or to an application requiring water, or any combination thereof. '8' may be located on land, or buried, or on the seabed, or in a tunnel, or trenched, or crossing the coastline, or crossing where land meets water, or any combination thereof.

9 '9' may comprise a desalinated water outlet or export or transfer pipe or pipeline. '9' may transfer water or desalinated water to one or more or any combination of applications for water, or to water storage, or any combination thereof.

RO 'RO' may comprise a desalination system or process. 'RO' may comprise a membrane based desalination system or process, or a pressure driven desalination system or process, or any combination thereof. 'RO', for example, may comprise a reverse osmosis desalination system or process. 'RO' may be located in the lower elevation region, or at an elevation about the same as or near the elevation of the lower elevation reservoir. 'RO' may be located subsea.

Seabed 'Seabed' may comprise the seafloor or land near comprising the bottom of a body of water. Underneath the higher elevation reservoir and/or pump, and/or water export pipeline, the 'Seabed' may comprise land, or land above sealevel, or any combination thereof.

Ocean 'Ocean' may comprise a body of water, such as a sea, or ocean.

Freshwater 'Freshwater' may comprise desalinated water, or water produced from the desalination system or process, or water stored in the subsea tank, or water transferred from the subsea tank, or water with a salinity less than desalination feed, or any combination thereof.

Low Density Fluid 'Low density fluid' may comprise a fluid with a density lower than the density of desalination feed, or freshwater, or any combination thereof. In some embodiments, 'low density fluid' may comprise a liquid.

FIGS. 27-28 Summary: FIGS. 27-28 may comprise an embodiment of fluid displacement desalination comprising two or more subsea tanks, which may enable desalination or desalinating to be conducted continuously. FIGS. 27-28 may comprise an embodiment of fluid displacement desalination employing a subsea pump, which may be fluidly connected to the desalinated water outlet pipe or pipeline, or the water export pipeline, or may pump water from the subsea tank, or any combination thereof.

In some embodiments, desalination may be conducted continuously by employing two or more subsea tanks. For example, in some embodiments, the desalinated water permeate side of a desalination system or process may be fluidly connected to a first subsea tank, such that desalinated water or permeate may be generated by the desalination process and transfer into the first subsea tank, displacing at least a portion of the low density fluid in the first subsea tank. In some embodiments, desalination may be enabled or driven by the significantly lower internal pressure inside the subsea tank relative to the pressure of the desalination feed due to, for example, the significantly lower hydrostatic pressure of the low density fluid at the depth or elevation of the subsea tank compared to the hydrostatic pressure of the desalination feed. The lower pressure of the first subsea tank may cause water to permeate in the desalination system or process and transfer into the subsea tank. In some embodiments, the pressure of the permeating water or the desalinated water formed may be greater than the hydrostatic pressure of the low density fluid, which may result in the permeating water transferring into the subsea tank and displacing at least a portion of the low density fluid in the subsea tank. In some embodiments, simultaneously, at least a portion of water may be pumped from or out of a second subsea tank into a water pipe or water pipeline or water export pipeline using, for example, a subsea pump and/or at least a portion of low density fluid may transfer into the second storage tank and may displace or occupy the volume of the subsea tank previously occupied by the water or desalinated water pumped out of the subsea tank. When the first subsea tank reaches or contains the desired capacity or amount or volume of water or desalinated water and/or the second subsea tank reached or contains the desired capacity or amount or volume of low density fluid, the operation of the two tanks may be swapped by, for example, employing valves, or opening and closing valves, or redirecting fluid flows, or any combination thereof.

In some embodiments, the internal pressure of the subsea tank may vary less or may change by a less significant amount or pressure due to, for example, water being transferred from the subsea tank by pumping out or by subsea water pump, rather than, for example, by positive displacement or by pumping, using a low density fluid pump, a low density fluid into the subsea tank to displace the water. In some embodiments, if low density fluid is pumped into a subsea tank to displace water from the subsea tank into a water pipeline or water export pipeline, the required internal pressure or required pressure applied or provided by the low density fluid may need to be greater than the gravitational hydrostatic pressure of the water or the desalinated water and/or plus any pressure drop in the water export pipeline. In some embodiments, if low density fluid is pumped from the subsea tank, from example, with a subsea pump fluidly connected to a water export pipeline or the water outlet of the subsea tank, the internal pressure of the subsea tank may be about the same as the hydrostatic pressure of the low density fluid minus any pressure drop of the low density fluid in the low density fluid pipe or riser during the transfer or pumping of water from the subsea tank. In some embodiments, it may be desirable for the pressure in the subsea tank to remain relatively near or about the same as the hydrostatic pressure of the low density fluid, which, for example, may be enabled by locating the pump on or fluidly connected to the subsea water outlet or subsea water export pipe or pipeline and/or pumping water from a subsea tank or lower elevation reservoir.

In some embodiments, it may be desirable to employ a subsea pump to avoid or reduce the need for or reduce the required capacity of, for example, dynamic power cables. In some embodiments, for example, by locating the pump subsea or at an elevation near the lower elevation reservoir or subsea tank or lower elevation region, the subsea pump may be located in a stable environmental or fixed location or at least partially fixed location, which may enable the subsea pump to be powered directly by a submarine cable or subsea cable, while potentially avoiding or reducing the need for a high power dynamic power cable.

Example FIGS. 27-28 Key

Label Description

L2 'L2' may comprise a pipe transferring low density fluid between a higher elevation tank or higher elevation reservoir and a valve, 'V1'.

L3 'L3' may comprise a pipe transferring low density fluid between a valve, 'V1,' and a valve, 'V4.'

L4 'L4' may comprise a pipe transferring low density fluid between a valve, 'V1,' and a valve, 'V3.'

L5 'L5' may comprise a pipe transferring low density fluid between a higher elevation tank or higher elevation reservoir and a valve, 'V2'.

L6 'L6' may comprise a pipe transferring low density fluid between a valve, 'V2,' and a valve, 'V3.'

L7 'L7' may comprise a pipe transferring low density fluid between a valve, 'V2,' and a valve, 'V4.'

L8 'L8' may comprise a pipe, or riser, or dynamic pipe, or any combination thereof transferring low density fluid between a valve, 'V3,' and a subsea tank, T3. 'L8' may transfer low density fluid between the higher elevation reservoir or region and the lower elevation reservoir or region.

L9 'L9' may comprise a pipe, or riser, or dynamic pipe, or any combination thereof transferring low density fluid between a valve, 'V4,' and a subsea tank, T2. 'L9' may transfer low density fluid between the higher elevation reservoir or region and the lower elevation reservoir or region.

L10 'L10' may comprise a desalination feed intake, or seawater intake, or desalination feed pipe, or any combination thereof. In some embodiments, 'L10' may further comprise desalination pre-treatment systems or methods and/or pre-treated desalination feed pipe transferring pre-treated desalination feed into a desalination system or process. In some embodiments, it may be desirable for the desalination feed to be sourced or intake from an elevation sufficiently higher than the seabed to prevent substantial disturbance of the seabed, or formation of substantial sediments or solids or contaminants which may increase required desalination pre-treatment, or any combination thereof.

L11 'L11' may comprise desalination brine, or a desalination brine outlet pipe, or a desalination brine discharge pipe, or desalination retentate, or desalination concentrate, or any combination thereof. In some embodiments, it may be desirable for 'L11' to comprise diffusers or other systems or methods for facilitating the dissolution or distribution of desalination brine or concentrate. In some embodiments, it may be desirable for 'L11' to be located at an elevation sufficiently higher than the seabed to prevent substantial disturbance of the seabed, or formation of substantial sediments, or prevent substantial accumulation of brine on the seabed. In some embodiments, it may be desirable for 'L11' to be located a sufficient distance from the seawater intake or desalination feed intake to, for example, prevent or reduce a potential localized increase in salinity from the desalination brine from potentially undesirably substantially increasing the salinity of the desalination feed or the intake seawater.

L12 'L12' may comprise desalination permeate, or freshwater, or desalinated water, or water with a lower salinity than desalination feed, or any combination thereof. 'L12' may comprise a pipe transferring and/or fluidly connecting desalination permeate to a valve, 'V5,' or to at least one or more subsea tanks.

L13 'L13' may comprise desalination permeate, or freshwater, or desalinated water, or water with a lower salinity than desalination feed, or water, or any combination thereof, which may be transferred from a valve, V5, to a subsea tank, T3. In some embodiments, for example, 'L13' may only operate or transfer water when T3 is in a power or energy discharging mode, which may comprise when T3 is filling with water and displacing or emptying or transferring out low density fluid from T3.

L14 'L14' may comprise desalination permeate, or freshwater, or desalinated water, or water with a lower salinity than desalination feed, or water, or any combination thereof, which may be transferred from a valve, V5, to a subsea tank, T2. In some embodiments, for example, 'L14' may only operate or transfer water when T2 is in a power or energy discharging mode, which may comprise when T2 is filling with water and displacing or emptying or transferring out low density fluid from T2.

L15 'L15' may comprise desalination permeate, or freshwater, or desalinated water, or water with a lower salinity than desalination feed, or water, or any combination thereof, which may be transferred from a subsea tank, T3, to a valve, V6, or fluidly connected with a subsea pump, or fluidly connected to a water outlet or water export pipeline.

L16 'L16' may comprise desalination permeate, or freshwater, or desalinated water, or water with a lower salinity than desalination feed, or water, or any combination thereof, which may be transferred from a subsea tank, T2, to a valve, V6, or fluidly connected with a subsea pump, or fluidly connected to a water outlet or water export pipeline or pipe.

L17 'L17' may comprise desalination permeate, or freshwater, or desalinated water, or water with a lower salinity than desalination feed, or water, or any combination thereof, which may be transferred from or between a valve, 'V6', or a subsea tank, or any combination thereof, and a subsea pump, P1, and/or a water outlet or water export pipeline or pipe, L18.

L18 'L18' may comprise a water export pipe or pipeline, or a desalinated water export pipe or pipeline, or water outlet, or any combination thereof. In some embodiments, 'L18' may transfer water to storage, or to an application using or consuming water, or any combination thereof. In some embodiments, it may be desirable to employ one or more subsea or surface pumping systems or methods, if, for example, water may be transferred over a long distance, or elevation gain, or any combination thereof.

V1 'V1' may comprise a valve which may transfer or direct low density fluid from L2 to L3 or to L4, for example, depending on the mode of operation or operating mode of the system or process.

V2 'V2' may comprise a valve which may transfer or direct low density fluid to L5 from L6 or L7, for example, depending on the mode of operation or operating mode of the system or process.

V3 'V3' may comprise a valve which may transfer or direct low density fluid between L8 and L6 or LA and L8, for example, depending on the mode of operation or operating mode of the system or process.

V4 'V4' may comprise a valve which may transfer or direct low density fluid between L9 and L7 or L3 and L9, for example, depending on the mode of operation or operating mode of the system or process.

V5 'V5' may comprise a valve which may transfer or direct permeate, or desalinated water permeate, or water, or any combination thereof between L12 and L13 or L14, for example, depending on the mode of operation or operating mode of the system or process.

V6 'V6' may comprise a valve which may transfer or direct permeate, or desalinated water permeate, or water, or any combination thereof to L17 from L15 or L16, for example, depending on the mode of operation or operating mode of the system or process.

P1 'P1' may comprise a subsea pump or a subsea water pump. 'P1' may be fluidly connected to the water outlet or water outlets of one or more subsea tanks. 'P1' may be fluidly connected to the water outlet or water outlets of one or more subsea tanks, which may be periodically swapped or alternated to enable continuous or semi-continuous operation of the subsea pump. 'P1' may transfer water from a subsea tank to a water export pipe or pipeline, L18. In some embodiments, power for P1 may be supplied by a subsea power cable, which may comprise a subsea power cable, or a submarine power cable, or a dynamic power cable, or any combination thereof. In some embodiments, 'P1' may provide a pressure difference or may pump water from a subsea tank, which may be at a pressure near or about the same as the hydrostatic pressure of the low density fluid at the depth of the subsea tank, to a pressure near or about the same as the hydrostatic pressure of desalinated water or water at the depth of the subsea pump plus any pressure drop associated with pumping or transferring water or desalinated water through at least a portion of the water pipeline or water export pipe or pipeline.

E1 'E1' may comprise a power cable, or power source, or subsea power cable, or submarine power cable, or an electrical cable, or any combination thereof. In some embodiments, 'E1' may power or provide power to a pump, or subsea pump, or subsea water pump, or any combination thereof.

T1 'T1' may comprise a higher elevation tank, or higher elevation reservoir, or higher elevation storage tank, or high elevation storage reservoir, or any combination thereof. 'T1' may store low density fluid, or water, or any combination thereof.

T2 'T2' may comprise a subsea tank, or lower elevation tank, or lower elevation reservoir, or lower elevation storage tank, or lower elevation storage reservoir, or lower elevation subsea tank, or any combination thereof. In some embodiments, more than one T2 tank may be located subsea and/or may be interconnected or fluidly connected. T2 may store low density fluid, or water, or any combination thereof.

T3 'T3' may comprise a subsea tank, or lower elevation tank, or lower elevation reservoir, or lower elevation storage tank, or lower elevation storage reservoir, or lower elevation subsea tank, or any combination thereof. In some embodiments, more than one T3 tank may be located subsea and/or may be interconnected or fluidly connected. T3 may store low density fluid, or water, or any combination thereof.

RO 'RO' may comprise a desalination system or process. 'RO' may comprise a membrane based desalination system or process, or a pressure driven desalination system or process, or any combination thereof. 'RO', for example, may comprise a reverse osmosis desalination system or process. 'RO' may be located in the lower elevation region, or at an elevation about the same as or near the elevation of the lower elevation reservoir. 'RO' may be located subsea.

Near Surface 'Near Surface' may indicate a higher elevation. For example, in some embodiments, figure components above the 'Near Surface' line may be at a higher elevation, or an elevation about the same as the first reservoir. For example, in some embodiments, figure components above the 'Near Surface' line may comprise 'Near Surface' components.

In some embodiments, the equipment or components above the 'Near Surface' line may comprise an integrated vessel or platform or floating platform. For example, in some embodiments, the equipment or components above 'Near Surface' line may be moored using a spread mooring system, or a tension leg moored system or TLP, or a semisub mooring system, or a turret mooring system, or a disconnectable mooring system, or a disconnectable buoy mooring system, or any combination thereof. For example, in some embodiments, the equipment or components above 'Near Surface' line may comprise a floating storage vessel, or an FSO, or a ship-shaped vessel, or a semi-submersible vessel, or a Tension Leg Platform or TLP vessel, or a cylindrical storage vessel, or any combination thereof.

Seabed to Surface 'Seabed to Surface' may indicate an elevation between the lower elevation and a higher elevation. For example, in some embodiments, 'Seabed to Surface' may comprise an elevation lower than a higher elevation and higher than a lower elevation. For example, in some embodiments, 'Seabed to Surface' may comprise an elevation where risers or pipes transfer fluid between the higher elevation reservoir or first reservoir and the lower elevation reservoir or second reservoir. For example, in some embodiments, 'Seabed to Surface' may comprise an elevation where dynamic power cables or power cables transfer power between the higher elevation reservoir and the lower elevation reservoir.

Near Seabed 'Near Seabed' may indication a lower elevation. For example, in some embodiments, figure components below the 'Near Seabed' line may be at a lower elevation, or an elevation about the same as the second reservoir. For example, in some embodiments, figure components below the 'Near Seabed' line may comprise 'Near Seabed' components. In some embodiments, at least a portion of the 'Near Seabed' components may be skid mounted to, for example, facilitate installation.

FIGS. 29-30 Summary: FIGS. 29-30 may comprise an embodiment of fluid displacement desalination comprising two or more subsea tanks, which may enable desalination or desalinating to be conducted continuously. FIGS. 29-30 may comprise an embodiment wherein a process or system for desalination feed pretreatment, or desalination pre-treatment, or seawater pretreatment, or any combination thereof may be conducted in a higher elevation region, or near or on or above the surface of a body of water, or any combination thereof. FIGS. 29-30 may show an embodiment wherein pre-treated desalination feed may be transferred from the higher elevation region to the lower elevation region or to the desalination system or process.

In some embodiments, for example, it may be desirable to locate at least a portion of the desalination pre-treatment in the higher elevation region to, for example, including, but not limited to, one or more or any combination of the following: improve accessibility for maintenance, or to enable use of more easily scalable or readily available pre-treatment equipment, or to enable simply replacements of potential consumables or waste products, such as filters or activated carbon or pre-treatment chemicals or pre-treatment coagulants or pre-treatment products. In some embodiments, it may be desirable to source desalination feed or locate the seawater intake at a water depth or seawater depth or subsea depth sufficiently deep to minimize or reduce the potential required desalination pre-treatment. For example, in some embodiments, it may be desirable to source seawater or desalination feed from near the lower elevation tank or subsea tank or from a subsea depth below the photic zone, or below the dysphotic zone, or below the twilight zone, or any combination thereof, for example, to reduce or minimize the required pre-treatment of seawater and/or reduce or minimize potential interference with marine life or marine ecosystem.

Example FIGS. 29-30 Key

Label Description

L1 'L1' may comprise a pipe transferring low density fluid between a higher elevation tank or higher elevation reservoir and a pump or a low density fluid pump, P1.

L2 'L2' may comprise a pipe transferring low density fluid between a pump or low density fluid pump, P1, and a valve, 'V1'.

L3 'L3' may comprise a pipe transferring low density fluid between a valve, 'V1,' and a valve, 'V4.'

L4 'L4' may comprise a pipe transferring low density fluid between a valve, 'V1,' and a valve, 'V3.'

L5 'L5' may comprise a pipe transferring low density fluid between a higher elevation tank or higher elevation reservoir and a valve, 'V2'.

L6 'L6' may comprise a pipe transferring low density fluid between a valve, 'V2,' and a valve, 'V3.'

L7 'L7' may comprise a pipe transferring low density fluid between a valve, 'V2,' and a valve, 'V4.'

L8 'L8' may comprise a pipe, or riser, or dynamic pipe, or any combination thereof transferring low density fluid between a valve, 'V3,' and a subsea tank, T3. 'L8' may transfer low density fluid between the higher elevation reservoir or region and the lower elevation reservoir or region.

L9 'L9' may comprise a pipe, or riser, or dynamic pipe, or any combination thereof transferring low density fluid between a valve, 'V4,' and a subsea tank, T2. 'L9' may transfer low density fluid between the higher elevation reservoir or region and the lower elevation reservoir or region.

L10 'L10' may comprise pipe, or riser, or dynamic pipe, or any combination thereof for transferring pre-treated seawater, or pre-treated desalination feed, or desalination feed between a pre-treatment system or process and a desalination system or process. In some embodiments, 'L10' may comprise or further comprise a pump to facilitate the transfer of desalination feed and/or supplement or facilitate desalination, if desired.

L11 'L11' may comprise desalination brine, or a desalination brine outlet pipe, or a desalination brine discharge pipe, or desalination retentate, or desalination concentrate, or any combination thereof. In some embodiments, it may be desirable for 'L11' to comprise diffusers or other systems or methods for facilitating the dissolution or distribution of desalination brine or concentrate. In some embodiments, it may be desirable for 'L11' to be located at an elevation sufficiently higher than the seabed to prevent substantial disturbance of the seabed, or formation of substantial sediments, or prevent substantial accumulation of brine on the seabed. In some embodiments, it may be desirable for 'L11' to be located a sufficient distance from the seawater intake or desalination feed intake to, for example, prevent or reduce a potential localized increase in salinity from the desalination brine from potentially undesirably substantially increasing the salinity of the desalination feed or the intake seawater.

L12 'L12' may comprise desalination permeate, or freshwater, or desalinated water, or water with a lower salinity than desalination feed, or any combination thereof. 'L12' may comprise a pipe transferring and/or fluidly connecting desalination permeate to a valve, 'V5,' or to at least one or more subsea tanks.

L13 'L13' may comprise desalination permeate, or freshwater, or desalinated water, or water with a lower salinity than desalination feed, or water, or any combination thereof, which may be transferred from a valve, V5, to a subsea tank, T3. In some embodiments, for example, 'L13' may only operate or transfer water when T3 is in a power or energy discharging mode, which may comprise when T3 is filling with water and displacing or emptying or transferring out low density fluid from T3.

L14 'L14' may comprise desalination permeate, or freshwater, or desalinated water, or water with a lower salinity than desalination feed, or water, or any combination thereof, which may be transferred from a valve, V5, to a subsea tank, T2. In some embodiments, for example, 'L14' may only operate or transfer water when T2 is in a power or energy discharging mode, which may comprise when T2 is filling with water and displacing or emptying or transferring out low density fluid from T2.

L15 'L15' may comprise desalination permeate, or freshwater, or desalinated water, or water with a lower salinity than desalination feed, or water, or any combination thereof, which may be transferred from a subsea tank, T3, to a valve, V6, or fluidly connected to a water outlet or water export pipe or pipeline, or any combination thereof.

L16 'L16' may comprise desalination permeate, or freshwater, or desalinated water, or water with a lower salinity than desalination feed, or water, or any combination thereof, which may be transferred from a subsea tank, T2, to a valve, V6, or fluidly connected to a water outlet or water export pipe or pipeline, or any combination thereof.

L17 'L17' may comprise a water export pipe or pipeline, or a desalinated water export pipe or pipeline, or water outlet, or any combination thereof. In some embodiments, 'L17' may transfer water to storage, or to an application using or consuming water, or any combination thereof. In some embodiments, it may be desirable to employ one or more subsea or surface pumping systems or methods, if, for example, water may be transferred over a long distance, or elevation gain, or any combination thereof.

L18 'L18' may comprise a feed, or seawater intake, or untreated desalination feed, or desalination feed intake, or a process or system for sourcing seawater, or a process or system for sourcing or intaking desalination feed, or any combination thereof. In some embodiments, it may be desirable for the desalination feed to be sourced or intake from an elevation sufficiently higher than the seabed to prevent substantial disturbance of the seabed, or formation of substantial sediments or solids or contaminants which may increase required desalination pre-treatment, or any combination thereof. In some embodiments, the desalination feed inlet or seawater feed inlet or seawater intake may be suspended above the seabed, or tethered, or suspended using buoyancy modules, or the pipe or riser or pipeline may be at least partially suspended or supported by buoyancy modules or supplemental buoyancy, or tethered to anchors or moorings, or any combination thereof.

V1 'V1' may comprise a valve which may transfer or direct low density fluid from L2 to L3 or to L4, for example, depending on the mode of operation or operating mode of the system or process.

V2 'V2' may comprise a valve which may transfer or direct low density fluid to L5 from L6 or L7, for example, depending on the mode of operation or operating mode of the system or process.

V3 'V3' may comprise a valve which may transfer or direct low density fluid between L8 and L6 or L4 and L8, for example, depending on the mode of operation or operating mode of the system or process.

V4 'V4' may comprise a valve which may transfer or direct low density fluid between L9 and L7 or L3 and L9, for example, depending on the mode of operation or operating mode of the system or process.

V5 'V5' may comprise a valve which may transfer or direct permeate, or desalinated water permeate, or water, or any combination thereof between L12 and L13 or L14, for example, depending on the mode of operation or operating mode of the system or process.

V6 'V6' may comprise a valve which may transfer or direct permeate, or desalinated water permeate, or water, or any combination thereof to L17 from L15 or L16, for example, depending on the mode of operation or operating mode of the system or process.

P1 'P1' may comprise a low density fluid pump. In some embodiments, 'P1' may be located in the higher elevation region. In some embodiments, 'P1' may pump low density fluid from the higher elevation reservoir or higher elevation tank to the lower elevation tank or subsea tank to, for example, displace water or desalination permeate and/or power or supply energy or supply stored energy to the desalination system, or process or to power desalination, or any combination thereof. In some embodiments, for example, the pressure difference provided by the low density fluid pump or 'P1' may be about the same as or greater than the hydrostatic pressure of the freshwater or desalinated water at the elevation or depth of the subsea tank or the lower elevation reservoir, plus, for example, any pressure drop in, for example, the water export pipe or pipeline and/or the pressure difference between the hydrostatic pressure of low density fluid at the elevation or depth of the subsea tank or lower elevation reservoir, plus any pressure drop in, for example, the riser or pipe. In some embodiments, P1 may be powered by electricity or power provided by a dynamic power cable, or subsea power cable, or any combination thereof. In some embodiments, P1 may be powered by electricity or mechanical power or power from on-board power. For example, in some embodiments, on-board power may comprise, for example, including, but not limited to, one or more or any combination of the following: nuclear power, or floating nuclear power plant, or combustion power plant, or natural gas power plant, or associated gas power plant, or diesel or oil power plant, or fossil fuel power plant, or renewable fuel power plant, or low carbon fuel power plant, or zero carbon fuel power plant, or hydrogen power plant, or ammonia power plant, or methanol power plant, or e-fuel power plant, or solar power, or wind power, or wave power, or tidal power, or ocean or marine or body of water kinetic energy power, or salinity power, or density difference power, or ocean thermal energy conversion power plant.

E1 'E1' may comprise a power cable, or power source, or subsea power cable, or submarine power cable, or an electrical cable, or any combination thereof. In some embodiments, 'E1' may power or provide power to a pump, or subsea pump, or subsea water pump, or any combination thereof. In some embodiments, 'E1' may be connected to a power source, or an electrical grid, or a power substation, or any combination thereof.

E2 'E2' may comprise a dynamic power cable, or power source, or subsea power cable, or submarine power cable, or an electrical cable, or any combination thereof. In some embodiments, 'E2' may transfer power from a lower elevation region to a higher elevation region. In some embodiments, 'E2' may power or provide power to a pump, or subsea pump, or subsea water pump, or any combination thereof. In some embodiments, 'E2' may be connected to a power source, or an electrical grid, or a power substation, or any combination thereof.

T1 'T1' may comprise a higher elevation tank, or higher elevation reservoir, or higher elevation storage tank, or high elevation storage reservoir, or any combination thereof. 'T1' may store low density fluid, or water, or any combination thereof.

T2 'T2' may comprise a subsea tank, or lower elevation tank, or lower elevation reservoir, or lower elevation storage tank, or lower elevation storage reservoir, or lower elevation subsea tank, or any combination thereof. In some embodiments, more than one T2 tank may be located subsea and/or may be interconnected or fluidly connected. T2 may store low density fluid, or water, or any combination thereof.

T3 'T3' may comprise a subsea tank, or lower elevation tank, or lower elevation reservoir, or lower elevation storage tank, or lower elevation storage reservoir, or lower elevation subsea tank, or any combination thereof. In some embodiments, more than one T3 tank may be located subsea and/or may be interconnected or fluidly connected. T3 may store low density fluid, or water, or any combination thereof.

Pretreatment 'Pretreatment' may comprise a seawater pre-treatment or desalination feed pre-treatment or any combination thereof pre-treatment system or process. In some embodiments, a pretreatment process may be located at an elevation near the elevation of the higher elevation reservoir or tank, or on a floating vessel, or above sealevel, or above or on a body of water. In some embodiments, a pretreatment process may be located subsea. In some embodiments, pre-treatment may include, but is not limited to, one or more or any combination of systems or methods of pretreatment described herein or one or more or any combination of systems or methods of pretreatment described or known in the art.

RO 'RO' may comprise a desalination system or process. 'RO' may comprise a membrane based desalination system or process, or a pressure driven desalination system or process, or any combination thereof. 'RO', for example, may comprise a reverse osmosis desalination system or process. 'RO' may be located in the lower elevation region, or at an elevation about the same as or near the elevation of the lower elevation reservoir. 'RO' may be located subsea.

Near Surface 'Near Surface' may indicate a higher elevation or higher elevation region. For example, in some embodiments, figure components above the 'Near Surface' line may be at a higher elevation, or an elevation about the same as the first reservoir. For example, in some embodiments, figure components above the 'Near Surface' line may comprise 'Near Surface' components.

In some embodiments, the equipment or components above the 'Near Surface' line may comprise an integrated vessel or platform or floating platform. For example, in some embodiments, the equipment or components above 'Near Surface' line may be moored using a spread mooring system, or a tension leg moored system or TLP, or a semisub mooring system, or a turret mooring system, or a disconnectable mooring system, or a disconnectable buoy mooring system, or any combination thereof. For example, in some embodiments, the equipment or components above 'Near Surface' line may comprise a floating storage vessel, or an FSO, or a ship-shaped vessel, or a semi-submersible vessel, or a Tension Leg Platform or TLP vessel, or a cylindrical storage vessel, or any combination thereof.

Seabed to Surface 'Seabed to Surface' may indicate an elevation between the lower elevation and a higher elevation. For example, in some embodiments, 'Seabed to Surface' may comprise an elevation lower than a higher elevation and higher than a lower elevation. For example, in some embodiments, 'Seabed to Surface' may comprise an elevation where risers or pipes transfer fluid between the higher elevation reservoir or first reservoir and the lower elevation reservoir or second reservoir. For example, in some embodiments, 'Seabed to Surface' may comprise an elevation where dynamic power cables or power cables transfer power between the higher elevation reservoir and the lower elevation reservoir.

Near Seabed 'Near Seabed' may indicate a lower elevation or lower elevation region. For example, in some embodiments, figure components below the 'Near Seabed' line may be at a lower elevation, or an elevation about the same as the second reservoir. For example, in some embodiments, figure components below the 'Near Seabed' line may comprise 'Near Seabed' components. In some embodiments, at least a portion of the 'Near Seabed' components may be skid mounted to, for example, facilitate installation.

FIGS. 31-32 Summary: FIGS. 31-32 may comprise an embodiment of fluid displacement desalination comprising two or more subsea tanks, which may enable desalination or desalinating to be conducted continuously. FIGS. 31-32 may comprise an embodiment with a low density fluid pump located subsea, or a subsea low density fluid pump. FIGS. 31-32 may comprise an embodiment with a low density fluid pump in the lower elevation region, or at an elevation or depth near or about the same as a subsea tank or lower elevation reservoir, or lower elevation tank.

In some embodiments, for example, it may be desirable to employ a subsea low density fluid pump to reduce the need for, or reduce the required capacity of, or reduce the cost of, or any combination thereof a dynamic power cable or dynamic electrical cable.

In some embodiments, for example, a subsea low density fluid pump may require significantly less maintenance than, for example, a subsea water pump, depending on the type of low density fluid. For example, some low density fluids may possess a lower propensity for biofouling or microbial activity than water, such as, for example, n-Butane. For example, potential scalants may be insoluble or practically insoluble in some low density fluids, while said potential scalants may be soluble in water.

In some embodiments, for example, a subsea low density fluid pump may be more energy efficient than a subsea water pump. For example, in some embodiments, the low density fluid may possess a lower viscosity than water, or may enable the pump to be configured in a more energy efficient configuration or design, or any combination thereof.

Example FIGS. 31-32 Key

Label Description

L1 'L1' may comprise a pipe, or riser, or dynamic riser, or any combination thereof transferring low density fluid between a higher elevation tank or higher elevation reservoir and a lower elevation region. For example, 'L1' may comprise a pipe transferring low density fluid from a higher elevation tank or higher elevation reservoir and a pump, or a low density fluid pump, or subsea pump, P1. 'L1' may transfer low density fluid between the higher elevation reservoir or region and the lower elevation reservoir or region.

L2 'L2' may comprise a pipe transferring low density fluid between a pump or low density fluid pump, P1, and a valve, 'V1'.

L3 'L3' may comprise a pipe transferring low density fluid between a valve, 'V1,' and a valve, 'V4.'

L4 'L4' may comprise a pipe transferring low density fluid between a valve, 'V1,' and a valve, 'V3.'

L5 'L5' may comprise a pipe, or riser, or dynamic riser, or any combination thereof transferring low density fluid between a lower elevation region and a higher elevation tank or higher elevation reservoir. For example, 'L5' may comprise a pipe transferring low density fluid from a valve, V2, which may be located in a lower elevation region and a higher elevation tank, or higher elevation reservoir located in a higher elevation region, T1. 'L5' may transfer low density fluid between the higher elevation reservoir or region and the lower elevation reservoir or region.

L6 'L6' may comprise a pipe transferring low density fluid between a valve, 'V3,' and a valve, 'V2.'

L7 'L7' may comprise a pipe transferring low density fluid between a valve, 'V4,' and a valve, 'V2.'

L8 'L8' may comprise a pipe transferring low density fluid between a valve, 'V3,' and a subsea tank, T3.

L9 'L9' may comprise a pipe transferring low density fluid between a valve, 'V4,' and a subsea tank, T2.

L10 'L10' may comprise a desalination feed intake, or seawater intake, or desalination feed pipe, or desalination feed or any combination thereof. In some embodiments, 'L10' may further comprise desalination pre-treatment systems or methods and/or pre-treated desalination feed pipe transferring pre-treated desalination feed into a desalination system or process. In some embodiments, it may be desirable for the desalination feed to be sourced or intake from an elevation sufficiently higher than the seabed to prevent substantial disturbance of the seabed, or formation of substantial sediments or solids or contaminants which may increase required desalination pre-treatment, or any combination thereof.

L11 'L11' may comprise desalination brine, or a desalination brine outlet pipe, or a desalination brine discharge pipe, or desalination retentate, or desalination concentrate, or any combination thereof. In some embodiments, it may be desirable for 'L11' to comprise diffusers or other systems or methods for facilitating the dissolution or distribution of desalination brine or concentrate. In some embodiments, it may be desirable for 'L11' to be located at an elevation sufficiently higher than the seabed to prevent substantial disturbance of the seabed, or formation of substantial sediments, or prevent substantial accumulation of brine on the seabed. In some embodiments, it may be desirable for 'L11' to be located a sufficient distance from the seawater intake or desalination feed intake to, for example, prevent or reduce a potential localized increase in salinity from the desalination brine from potentially undesirably substantially increasing the salinity of the desalination feed or the intake seawater.

L12 'L12' may comprise desalination permeate, or freshwater, or desalinated water, or water with a lower salinity than desalination feed, or any combination thereof. 'L12' may comprise a pipe transferring and/or fluidly connecting desalination permeate to a valve, 'V5,' or to at least one or more subsea tanks.

L13 'L13' may comprise desalination permeate, or freshwater, or desalinated water, or water with a lower salinity than desalination feed, or water, or any combination thereof, which may be transferred from a valve, V5, to a subsea tank, T3. In some embodiments, for example, 'L13' may only operate or transfer water when T3 is in a power or energy discharging mode, which may comprise when T3 is filling with water and displacing or emptying or transferring out low density fluid from T3.

L14 'L14' may comprise desalination permeate, or freshwater, or desalinated water, or water with a lower salinity than desalination feed, or water, or any combination thereof, which may be transferred from a valve, V5, to a subsea tank, T2. In some embodiments, for example, 'L14' may only operate or transfer water when T2 is in a power or energy discharging mode, which may comprise when T2 is filling with water and displacing or emptying or transferring out low density fluid from T2.

L15 'L15' may comprise desalination permeate, or freshwater, or desalinated water, or water with a lower salinity than desalination feed, or water, or any combination thereof, which may be transferred from a subsea tank, T3, to a valve, V6, or fluidly connected to a water outlet or water export pipe or pipeline, or any combination thereof.

L16 'L16' may comprise desalination permeate, or freshwater, or desalinated water, or water with a lower salinity than desalination feed, or water, or any combination thereof, which may be transferred from a subsea tank, T2, to a valve, V6, or fluidly connected to a water outlet or water export pipe or pipeline, or any combination thereof.

L17 'L17' may comprise a water export pipe or pipeline, or a desalinated water export pipe or pipeline, or water outlet, or any combination thereof. In some embodiments, 'L17' may transfer water to storage, or to an application using or consuming water, or any combination thereof. In some embodiments, it may be desirable to employ one or more subsea or surface pumping systems or methods, for example, if water may be transferred over a long distance, or elevation gain, or any combination thereof.

V1 'V1' may comprise a valve which may transfer or direct low density fluid from L2 to L3 or L4, for example, depending on the mode of operation or operating mode of the system or process.

V2 'V2' may comprise a valve which may transfer or direct low density fluid to L5 from L6 or L7, for example, depending on the mode of operation or operating mode of the system or process.

V3 'V3' may comprise a valve which may transfer or direct low density fluid between L8 and L6 or L4 and L8, for example, depending on the mode of operation or operating mode of the system or process.

V4 'V4' may comprise a valve which may transfer or direct low density fluid between L9 and L7 or L3 and L9, for example, depending on the mode of operation or operating mode of the system or process.

V5 'V5' may comprise a valve which may transfer or direct permeate, or desalinated water permeate, or water, or any combination thereof between L12 and L13 or L14, for example, depending on the mode of operation or operating mode of the system or process.

V6 'V6' may comprise a valve which may transfer or direct permeate, or desalinated water permeate, or water, or any combination thereof to L17 from L15 or L16, for example, depending on the mode of operation or operating mode of the system or process.

P1 'P1' may comprise a low density fluid pump. In some embodiments, 'P1' may be located in the lower elevation region. In some embodiments, 'P1' may pump low density fluid from the higher elevation reservoir or higher elevation tank to the lower elevation tank or subsea tank to, for example, displace water or desalination permeate and/or power or supply energy or supply stored energy to the desalination system, or process or to power desalination, or any combination thereof. In some embodiments, for example, the pressure difference provided by the low density fluid pump or 'P1' may be about the same as or greater than the hydrostatic pressure of the freshwater or desalinated water at the elevation or depth of the subsea tank or the lower elevation reservoir, plus, for example, any pressure drop in, for example, the water export pipe or pipeline and/or the pressure difference between the hydrostatic pressure of low density fluid at the elevation or depth of the subsea tank or lower elevation reservoir, plus any pressure drop in, for example, the riser or pipe. In some embodiments, P1 may be powered by electricity or power provided by a subsea power cable, or a dynamic power cable, or any combination thereof. In some embodiments, P1 may be powered by electricity or mechanical power or power from on-board power. For example, in some embodiments, on-board power may comprise, for example, including, but not limited to, one or more or any combination of sources of power or onboard power described herein.

E1 'E1' may comprise a power cable, or power source, or subsea power cable, or submarine power cable, or an electrical cable, or any combination thereof. In some embodiments, 'E1' may power or provide power to a pump, or subsea pump, or subsea water pump, or any combination thereof. In some embodiments, 'E1' may be connected to a power source, or an electrical grid, or a power substation, or any combination thereof.

T1 'T1' may comprise a higher elevation tank, or higher elevation reservoir, or higher elevation storage tank, or high elevation storage reservoir, or any combination thereof. 'T1' may store low density fluid, or water, or any combination thereof.

T2 'T2' may comprise a subsea tank, or lower elevation tank, or lower elevation reservoir, or lower elevation storage tank, or lower elevation storage reservoir, or lower elevation subsea tank, or any combination thereof. In some embodiments, more than one T2 tank may be located subsea and/or may be interconnected or fluidly connected. T2 may store low density fluid, or water, or any combination thereof.

T3 'T3' may comprise a subsea tank, or lower elevation tank, or lower elevation reservoir, or lower elevation storage tank, or lower elevation storage reservoir, or lower elevation subsea tank, or any combination thereof. In some embodiments, more than one T3 tank may be located subsea and/or may be interconnected or fluidly connected. T3 may store low density fluid, or water, or any combination thereof.

RO 'RO' may comprise a desalination system or process. 'RO' may comprise a membrane based desalination system or process, or a pressure driven desalination system or process, or any combination thereof. 'RO', for example, may comprise a reverse osmosis desalination system or process. 'RO' may be located in the lower elevation region, or at an elevation about the same as or near the elevation of the lower elevation reservoir. 'RO' may be located subsea.

Near Surface 'Near Surface' may indicate a higher elevation. For example, in some embodiments, figure components above the 'Near Surface' line may be at a higher elevation, or an elevation about the same as the first reservoir. For example, in some embodiments, figure components above the 'Near Surface' line may comprise 'Near Surface' components.

In some embodiments, the equipment or components above the 'Near Surface' line may comprise an integrated vessel or platform or floating platform. For example, in some embodiments, the equipment or components above 'Near Surface' line may be moored using a spread mooring system, or a tension leg moored system or TLP, or a semisub mooring system, or a turret mooring system, or a disconnectable mooring system, or a disconnectable buoy mooring system, or any combination thereof. For example, in some embodiments, the equipment or components above 'Near Surface' line may comprise a floating storage vessel, or an FSO, or a ship-shaped vessel, or a semi-submersible vessel, or a Tension Leg Platform or TLP vessel, or a cylindrical storage vessel, or any combination thereof.

Seabed to Surface 'Seabed to Surface' may indicate an elevation between the lower elevation and a higher elevation. For example, in some embodiments, 'Seabed to Surface' may comprise an elevation lower than a higher elevation and higher than a lower elevation. For example, in some embodiments, 'Seabed to Surface' may comprise an elevation where risers or pipes transfer fluid between the higher elevation reservoir or first reservoir and the lower elevation reservoir or second reservoir. For example, in some embodiments, 'Seabed to Surface' may comprise an elevation where dynamic power cables or power cables transfer power between the higher elevation reservoir and the lower elevation reservoir.

Near Seabed 'Near Seabed' may indication a lower elevation. For example, in some embodiments, figure components below the 'Near Seabed' line may be at a lower elevation, or an elevation about the same as the second reservoir. For example, in some embodiments, figure components below the 'Near Seabed' line may comprise 'Near Seabed' components. In some embodiments, at least a portion of the 'Near Seabed' components may be skid mounted to, for example, facilitate installation.

FIGS. 33-34 Summary: FIGS. 33-34 may comprise an embodiment of fluid displacement desalination comprising a pressure equilibrized subsea tank, which may enable larger subsea storage volumes, or lower cost subsea tank or lower elevation reservoir, or thinner wall subsea tank or lower elevation reservoir, or longer duration energy storage, or higher energy storage capacity, or any combination thereof.

In some embodiments, the lower elevation reservoir may be maintained or may be enabled to be maintained at a relatively consistent pressure. In some embodiments, the lower elevation reservoir may be maintained or may be enabled to be maintained at a relatively consistent pressure, which may be near or about the same as the hydrostatic pressure of the seawater adjacent to the lower elevation reservoir at about the same elevation, plus or minus a tolerance pressure, or about the same as the hydrostatic pressure of desalinated water or freshwater at about the same elevation or depth as the lower elevation reservoir, plus or minus as tolerance pressure. For example, a tolerance pressure may comprise a pressure difference which a subsea tank or other tank or other reservoir may be capable of resisting or may be designed to resist. In some embodiments, during storing of power, low density fluid may be pumped into or otherwise transferred into a lower elevation reservoir, displacing water in the lower elevation reservoir with the low density fluid. In some embodiments, for example, the pressure required for low density fluid to displace water in a subsea tank, for example, may be greater than or equal to the hydrostatic pressure of desalinated water or water at the depth or elevation of the subsea tank or lower elevation reservoir, plus any pressure drop which may be overcome in the water outlet pipe or water export pipe, wherein at least a portion of displaced desalinated water or water may be transferred. In some embodiments, for example, during generating power, such as desalinating water or generating power in the form of desalinating water, low density fluid in the lower elevation reservoir, which may be at a pressure about the same as the hydrostatic pressure of freshwater or seawater at the elevation or depth of the lower elevation reservoir, may be transferred from the lower elevation reservoir into a low density fluid riser pipe, wherein the pressure inside the low density fluid riser pipe may be about the same as the hydrostatic pressure of low density fluid at the elevation or depth of the lower elevation reservoir. In some embodiments, for example, the pressure difference between the low density fluid with a pressure about the same as the internal pressure of the subsea tank and the low density fluid in the riser pipe may be significant, due to, for example, the difference in gravitational hydrostatic pressure between water and low density fluid due to, for example, the density difference between water and low density fluid. In some embodiments, power may be extracted from the difference in pressure between the low density fluid exiting the lower elevation reservoir, which may be at a pressure about the same as the internal pressure of the lower elevation reservoir, and the low density fluid in the riser pipe, which may be at a pressure about the same as the low density fluid hydrostatic pressure. In some embodiments, power may be extracted from said pressure difference by a power generation system or method, or a pressure exchanger, or a power exchanger, or any combination thereof. For example, in some embodiments, low density fluid exiting the lower elevation reservoir may be pressure exchanged with desalinated water permeate or the desalinated water permeate side of a desalination system or process, which may reduce the pressure of the low density fluid to a pressure near or about the same as the pressure of the low density fluid in the riser pipe, and which may increase the pressure of the desalinated water permeate to a pressure near or about the same as the internal pressure of the lower elevation reservoir. In some embodiments, the pressure exchange may result in the transferring or pumping of desalinated water permeate from the desalination system or process into the lower elevation reservoir, which may result in the desalinating of water and/or the displacement of at least a portion of low density fluid in the lower elevation reservoir with water or desalinated water. In some embodiments, a low pressure difference pump or subsea pump may be employed to provide supplemental pumping or pressure to facilitate the transfer of desalinated water into the lower elevation reservoir due to, for example, potential pressure losses or efficiency losses of the pressure exchange or pressure exchanger. In some embodiments, low density fluid exiting the pressure exchanger may transfer into the riser or pipe transferring low density fluid from the lower elevation region to the higher elevation region and/or the higher elevation reservoir or higher elevation tank.

In some embodiments, a pressure exchanger may comprise, for example, including, but not limited to, one or more or any combination of the following: a rotary pressure exchanger, or a PX pressure exchanger, or a turbocharger pressure exchanger, or a turbine pressure exchanger, or a mechanically coupled pressure exchanger, or a power exchanger, or a pump and a generator hydraulically interconnected, or a pump and a generator electrically interconnected, or any combination thereof.

Some embodiments may further comprise a subsea pump, which may enable, for example, during charging energy storage or displacing water with a low density fluid, for example, the desalination of desalination feed or seawater. For example, in some embodiments, it may be desirable to maximize the utilization or capacity factor of desalination, and/or may be desirable to utilize power from electrical sources when electricity may be inexpensive, or low carbon emissions, or in excess, or from renewable energy sources, or any combination thereof. For example, in some embodiments, when it may be desirable to consume electricity or power, a desalination process may desalinate water and/or the energy storage system or process may undergo charging. In some embodiments, charging may comprising pumping or otherwise transferring at least a portion of low density fluid into a subsea tank or lower elevation reservoir to displace at least a portion of water, which may require at least a portion of power and/or may store at least a portion of power. In some embodiments, for example, the flow of water in the export pipeline may be equivalent to, for example, both the flow rate of water actively being desalinated and/or the flow rate of water being displaced by low density fluid from the pumping or transfer of low density fluid into the lower elevation reservoir or subsea tank. In some embodiments, during discharging, or wherein water may be desalinated from the hydrostatic pressure difference between the low density fluid and the desalination feed and/or the displacement of low density fluid in a lower elevation reservoir with desalination permeate, at least a portion of desalinated water may transfer or flow into the subsea tank, which may displace at least a portion of low density fluid in the subsea tank or lower elevation reservoir.

In some embodiments, pressure exchangers or pressure equilibrized tanks may be employed in embodiments comprising one lower elevation reservoir or one subsea tank. In some embodiments, pressure exchangers or pressure equilibrized tanks may be employed in embodiments comprising two or more lower elevation reservoirs or two or more subsea tanks.

FIGS. 33-34 Example Figure Key

Example FIGS. 33-34 Key

Label Description

L1 'L1' may comprise a pipe transferring low density fluid between a higher elevation tank or higher elevation reservoir and a pump or a low density fluid pump, P1.

L2 'L2' may comprise a pipe transferring low density fluid between a pump or low density fluid pump, P1, and a valve, 'V1'.

L3 'L3' may comprise a pipe transferring low density fluid between a valve, 'V1,' and a higher elevation reservoir or higher elevation tank, 'T1'.

L4 'L4' may comprise a pipe, or riser, or dynamic pipe, or any combination thereof transferring low density fluid between a valve, 'V1,' and a subsea tank or lower elevation reservoir, T2. 'L4' may transfer low density fluid between the higher elevation reservoir or region and the lower elevation reservoir or region.

L5 'L5' may comprise a pipe transferring low density fluid between a valve, V2, and a lower elevation reservoir or subsea tank, T2.

L6 'L6' may comprise a pipe transferring low density fluid between a pressure exchanger, PX, and a valve, V2. In some embodiments, 'L6' may comprise lower pressure low density fluid, or low density fluid with a pressure about the same as the pressure of low density fluid in the riser pipe or L-4 during discharging, or low density fluid with a pressure about the same as the hydrostatic pressure of low density fluid at the depth or elevation of the lower elevation reservoir or subsea tank plus any pressure drop, or low density fluid after pressure extraction, or low density fluid after pressure exchanging, or any combination thereof.

L7 'L7' (Between T2 and PX) may comprise a pipe transferring low density fluid between a lower elevation reservoir, T2, and a pressure exchanger, PX. In some embodiments, 'L7' may comprise higher pressure low density fluid, or low density fluid with a pressure about the same as the internal pressure of the lower elevation reservoir or subsea tank, or low density fluid with a pressure about the same as the hydrostatic pressure of water at the depth or elevation of the lower elevation reservoir, or low density fluid before pressure extraction, or low density fluid before pressure exchanging, or any combination thereof.

L17 'L17' may comprise a desalination feed intake, or seawater intake, or desalination feed pipe, or desalination feed or any combination thereof. In some embodiments, 'L17' may further comprise desalination pre-treatment systems or methods and/or pre-treated desalination feed pipe transferring pre-treated desalination feed into a desalination system or process. In some embodiments, it may be desirable for the desalination feed to be sourced or intake from an elevation sufficiently higher than the seabed to prevent substantial disturbance of the seabed, or formation of substantial sediments or solids or contaminants which may increase required desalination pre-treatment, or any combination thereof.

L8 'L8' may comprise desalination brine, or a desalination brine outlet pipe, or a desalination brine discharge pipe, or desalination retentate, or desalination concentrate, or any combination thereof. In some embodiments, it may be desirable for 'L8' to comprise diffusers or other systems or methods for facilitating the dissolution or distribution of desalination brine or concentrate. In some embodiments, it may be desirable for 'L8' to be located at an elevation sufficiently higher than the seabed to prevent substantial disturbance of the seabed, or formation of substantial sediments, or prevent substantial accumulation of brine on the seabed. In some embodiments, it may be desirable for 'L8' to be located a sufficient distance from the seawater intake or desalination feed intake to, for example, prevent or reduce a potential localized increase in salinity from the desalination brine from potentially undesirably substantially increasing the salinity of the desalination feed or the intake seawater.

L9 'L9' may comprise desalination permeate, or freshwater, or desalinated water, or water with a lower salinity than desalination feed, or any combination thereof. 'L9' may comprise a pipe transferring and/or fluidly connecting desalination permeate to a valve, 'V5,' or to at least one or more subsea tanks or a lower elevation reservoir.

L10 'L10' may comprise desalination permeate, or freshwater, or desalinated water, or water with a lower salinity than desalination feed, or water, or any combination thereof, which may be transferred from a valve, V5, to a subsea pump, P2, or a subsea tank or lower elevation reservoir, T2, or any combination thereof. In some embodiments, 'L10' may comprise lower pressure desalinated water or water. In some embodiments, for example, 'L10' may comprise desalinated water or water with a pressure less than the pressure of desalination feed by a pressure greater than or equal to the difference in pressure required for desalination, or the osmotic pressure of the desalination feed, or the osmotic pressure difference between the desalination feed and desalination permeate, or any combination thereof.

L11 'L11' may comprise a pipe transferring desalination permeate, or freshwater, or desalinated water, or water with a lower salinity than desalination feed, or water, or any combination thereof from a valve, 'V5' to a pressure exchanger, 'PX'. In some embodiments, 'L11' may comprise lower pressure desalinated water or water. In some embodiments, for example, 'L11' may comprise desalinated water or water with a pressure less than the pressure of desalination feed by a pressure greater than or equal to the difference in pressure required for desalination, or the osmotic pressure of the desalination feed, or the osmotic pressure difference between the desalination feed and desalination permeate, or any combination thereof.

L12 'L12' may comprise desalination permeate, or freshwater, or desalinated water, or water with a lower salinity than desalination feed, or any combination thereof transferred from a pressure exchanger, PX, to a low pressure difference pump, LPP1. 'L12' may comprise desalination permeate, or freshwater, or desalinated water, or water with a lower salinity than desalination feed, or any combination thereof after pressure exchanging with low density fluid. In some embodiments, 'L12' may be at a pressure near the internal pressure of the lower elevation reservoir or subsea tank, or at a pressure less than the pressure of the lower elevation reservoir or subsea tank by an amount about the same as the pressure losses or equivalent pressure losses of the pressure exchanger and/or related equipment. In some embodiments, for example, if the pressure of the low density fluid from the lower elevation reservoir may be 150 Bar, and the pressure of the desalinated water permeate may be 60 Bar, and the efficiency of the pressure exchanger may be 98%, the pressure losses or equivalent pressure losses may be about 1.8 Bar, or may be about 90 Bar (which may comprise 150 Bar–60 Bar=90 Bar) multiplied by the decimal efficiency losses of the pressure exchanger or about 0.02 (1–0.98=0.02) which may be about equal to 1.8 Bar.

L13 'L13' may comprise desalination permeate, or freshwater, or desalinated water, or water with a lower salinity than desalination feed, or water, or any combination thereof, which may be transferred from a low pressure difference pump, LPP2, to a lower elevation reservoir or subsea tank, T2.

L14 'L14' may comprise desalination permeate, or freshwater, or desalinated water, or water with a lower salinity than desalination feed, or water, or any combination thereof, which may be transferred from a lower elevation reservoir, T2, to a valve, V6. For example, in some embodiments, 'L14' may comprise water displaced by low density fluid in the lower elevation reservoir or subsea tank, during or which may comprise, for example, charging or storing energy.

L15 'L15' may comprise desalination permeate, or freshwater, or desalinated water, or water with a lower salinity than desalination feed, or water, or any combination thereof, which may be transferred from a subsea pump, P2, to a valve, V6, or fluidly connected to a water outlet or water export pipe or pipeline, or any combination thereof.

L16 'L16' may comprise a water export pipe or pipeline, or a desalinated water export pipe or pipeline, or water outlet, or any combination thereof. In some embodiments, 'L16' may transfer water to storage, or to an application using or consuming water, or any combination thereof. In some embodiments, it may be desirable to employ one or more subsea or surface pumping systems or methods, for example, if water may be transferred over a long distance, or elevation gain, or any combination thereof.

PX 'PX' may comprise a pressure exchanger, or subsea pressure exchanger, or power exchanger, or pressure extraction system or process, or pressure transfer system or process, or power transfer system or process, or a process or system for transferring kinetic energy or pressure or fluid power from a first fluid to a second fluid, or a process or system for transferring kinetic energy or pressure or fluid power from a second fluid to a first fluid, or any combination thereof. In some embodiments, 'PX' may transfer pressure or power from a higher pressure low density fluid transferred from the lower elevation reservoir, to a lower pressure desalination permeate water or water, forming a lower pressure low density fluid transferred to the higher elevation reservoir and a higher pressure desalination permeate water or water transferred to a low pressure difference pump, LPP1, or a lower elevation reservoir or subsea tank, or any combination thereof. In some embodiments, 'PX' may comprise, including, but not limited to, one or more or any combination of the following: a power extractor, or a generator, or a mechanical pressure exchanger, or a turbine, or a turbocharger pressure exchanger, or a PX pressure exchanger, or a rotary pressure exchanger, or a PX pressure exchanger system or process, or a pressure exchanger system, or a turbine pressure exchanger, or a mechanically coupled pressure exchanger, or a power exchanger, or a pump and a generator hydraulically interconnected, or a pump and a generator electrically interconnected, or any combination thereof.

P1 'P1' may comprise a low density fluid pump. In some embodiments, 'P1' may transfer or pump low density fluid from a higher elevation reservoir or tank, T1, to a valve, V1. In some embodiments, 'P1' may be located in the higher elevation region. In some embodiments, 'P1' may pump low density fluid from the higher elevation reservoir or higher elevation tank to the lower elevation tank or subsea tank to, for example, displace water or desalination permeate and/or power or supply energy or supply stored energy to the desalination system, or process or to power desalination, or any combination thereof. In some embodiments, for example, the pressure difference provided by the low density fluid pump or 'P1' may be about the same as or greater than the hydrostatic pressure of the freshwater or desalinated water at the elevation or depth of the subsea tank or the lower elevation reservoir, plus, for example, any pressure drop in, for example, the water export pipe or pipeline and/or the pressure difference between the hydrostatic pressure of low density fluid at the elevation or depth of the subsea tank or lower elevation reservoir, plus any pressure drop in, for example, the riser or pipe. In some embodiments, P1 may be powered by electricity or power provided by a dynamic power cable, or subsea power cable, or any combination thereof. In some embodiments, P1 may be powered by electricity or mechanical power or power from on-board power. For example, in some embodiments, on-board power may comprise, for example, including, but not limited to, one or more or any combination of the following: nuclear power, or floating nuclear power plant, or combustion power plant, or natural gas power plant, or associated gas power plant, or diesel or oil power plant, or fossil fuel power plant, or renewable fuel power plant, or low carbon fuel power plant, or zero carbon fuel power plant, or hydrogen power plant, or ammonia power plant, or methanol power plant, or e-fuel power plant, or solar power, or wind power, or wave power, or tidal power, or ocean or marine or body of water kinetic energy power, or salinity power, or density difference power, or ocean thermal energy conversion power plant. In some embodiments, 'P1' may operate or be powered when it may be desirable to store power or energy for desalination, such as, for example, including, but not limited to, one or more or any combination of the following: when electricity or power prices are lower, or when renewable energy is available, or when excess renewable energy is available, or when the CO2 intensity of electricity or power is lower, or when power is available, or when desired, or any combination thereof.

P2 'P2' may comprise a subsea pump which may be fluidly connected to, for example, desalination permeate water, or desalinated water, or the desalination permeate side of a desalination process or system, or any combination thereof. In some embodiments, for example, 'P2' may pump or transfer at least a portion of desalinated water from a desalination process or system to a valve, 'V6', or water outlet or water export pipe or pipeline, 'L16', or any combination thereof. In some embodiments, 'P2' may be employed to ensure the desalination process operates continuously or at a high capacity factor or high utilization by, for example, enabling the desalination process or system to operate or produce desalinated water or desalinate desalination feed even if or while the energy storage system or process is charging or may be charging. In some embodiments, 'P2' may operate or be powered when it may be desirable to store power or energy for desalination, such as, for example, including, but not limited to, one or more or any combination of the following: when electricity or power prices are lower, or when renewable energy is available, or when excess renewable energy is available, or when the CO2 intensity of electricity or power is lower, or when power is available, or when desired, or any combination thereof.

LPP1 'LPP1' may comprise a low pressure difference pump, or low pressure difference subsea pump, or any combination thereof. 'LPP1' may increase the pressure of, or provide supplemental pressure to, or facilitate the transfer of, or any combination thereof the desalinated water or water following pressure exchange with low density fluid. For example, in some embodiments, LPP1 may provide pumping or pressure or supplemental pressure about the same as or greater than the pressure losses in the pressure exchanger or related systems or processes.

T1 'T1' may comprise a higher elevation tank, or higher elevation reservoir, or higher elevation storage tank, or high elevation storage reservoir, or any combination thereof. 'T1' may store low density fluid, or water, or any combination thereof. In some embodiments, more than one higher elevation tank may be employed or the higher elevation reservoir may comprise one or more tanks.

T2 'T2' may comprise a subsea tank, or lower elevation tank, or lower elevation reservoir, or lower elevation storage tank, or lower elevation storage reservoir, or lower elevation subsea tank, or any combination thereof. In some embodiments, more than one T2 tank may be located subsea and/or may be interconnected or fluidly connected. T2 may store low density fluid, or water, or any combination thereof. In some embodiments, more than one lower elevation tank may be employed or the lower elevation reservoir may comprise one or more tanks.

V1 'V1' may comprise a valve which may transfer or direct low density fluid between L4 and L3 or L2.

V2 'V2' may comprise a valve which may transfer or direct low density fluid between L4 and L5 or L6.

V5 'V5' may comprise a valve which may transfer or direct desalination permeate, or freshwater, or desalinated water, or water with a lower salinity than desalination feed, or water, or any combination thereof to, for example, a subsea pressure exchanger, PX, or a subsea pump, P2, or a subsea tank or lower elevation reservoir, T2, or any combination thereof, for example, depending on the mode of operation of the system or process. A mode of operation may comprise, for example, including, but not limited to, one or more or any combination of the following: charging or discharging, or low density fluid displacing water in the lower elevation reservoir or subsea tank, or water displacing low density fluid in the lower elevation reservoir or subsea tank.

V6 'V5' may comprise a valve which may transfer or direct desalination permeate, or freshwater, or desalinated water, or water with a lower salinity than desalination feed, or water, or any combination thereof from L14 and/or L15 to L16.

E1 'E1' may comprise a power cable, or power source, or subsea power cable, or submarine power cable, or an electrical cable, or any combination thereof. In some embodiments, 'E1' may power or provide power to a pump, or subsea pump, or subsea water pump, or any combination thereof. In some embodiments, 'E1' may be connected to a power source, or an electrical grid, or a power substation, or any combination thereof.

E2 'E2' may comprise a dynamic power cable, or power source, or subsea power cable, or submarine power cable, or an electrical cable, or any combination thereof. In some embodiments, 'E2' may transfer power from a lower elevation region to a higher elevation region. In some embodiments, 'E2' may power or provide power to a pump, or subsea pump, or subsea water pump, or any combination thereof. In some embodiments, 'E2' may be connected to a power source, or an electrical grid, or a power substation, or any combination thereof.

E3 'E3' may comprise a subsea power cable.

E4 'E4' may comprise a subsea power cable.

RO 'RO' may comprise a desalination system or process. 'RO' may comprise a membrane based desalination system or process, or a pressure driven desalination system or process, or any combination thereof. 'RO', for example, may comprise a reverse osmosis desalination system or process. 'RO' may be located in the lower elevation region, or at an elevation about the same as or near the elevation of the lower elevation reservoir. 'RO' may be located subsea.

Near Surface 'Near Surface' may indicate a higher elevation. For example, in some embodiments, figure components above the 'Near Surface' line may be at a higher elevation, or an elevation about the same as the first reservoir. For example, in some embodiments, figure components above the 'Near Surface' line may comprise 'Near Surface' components.

In some embodiments, the equipment or components above the 'Near Surface' line may comprise an integrated vessel or platform or floating platform. For example, in some embodiments, the equipment or components above 'Near Surface' line may be moored using a spread mooring system, or a tension leg moored system or TLP, or a semisub mooring system, or a turret mooring system, or a disconnectable mooring system, or a disconnectable buoy mooring system, or any combination thereof. For example, in some embodiments, the equipment or components above 'Near Surface' line may comprise a floating storage vessel, or an FSO, or a ship-shaped vessel, or a semi-submersible vessel, or a Tension Leg Platform or TLP vessel, or a cylindrical storage vessel, or any combination thereof.

Seabed to Surface 'Seabed to Surface' may indicate an elevation between the lower elevation and a higher elevation. For example, in some embodiments, 'Seabed to Surface' may comprise an elevation lower than a higher elevation and higher than a lower elevation. For example, in some embodiments, 'Seabed to Surface' may comprise an elevation where risers or pipes transfer fluid between the higher elevation reservoir or first reservoir and the lower elevation reservoir or second reservoir. For example, in some embodiments, 'Seabed to Surface' may comprise an elevation where dynamic power cables or power cables transfer power between the higher elevation reservoir and the lower elevation reservoir.

Near Seabed 'Near Seabed' may indication a lower elevation. For example, in some embodiments, figure components below the 'Near Seabed' line may be at a lower elevation, or an elevation about the same as the second reservoir. For example, in some embodiments, figure components below the 'Near Seabed' line may comprise 'Near Seabed' components. In some embodiments, at least a portion of the 'Near Seabed' components may be skid mounted to, for example, facilitate installation.

Example FIGS. 35-36 Summary

FIGS. 35-36 may comprise an embodiment employing a higher elevation reservoir located subsea, or at least partially underneath or beneath the surface of a body of water, or submerged, or tether, or any combination thereof. In some embodiments, for example, the higher elevation reservoir may be located at an elevation higher than or above the elevation of the lower elevation reservoir. In some embodiments, it may be desirable to locate the higher elevation reservoir below the surface of a body of water to, for example, due to, including, but not limited to, one or more or any combination of the following; reduce dynamic movements, or reduce potential fatigue, or reduce capital cost, or reduce potential riser fatigue, or enable the use of larger diameter pipes or risers, or reduce potential cable fatigue, or increase system or process lifespan, or reduce cost, or reduce potential biofouling, or reduce potential biofouling due to the potentially lower bioactivity at depths beneath the surface of a body of water due to, for example, lower light or dissolved oxygen. In some embodiments, the higher elevation reservoir may be tethered or suspended by a mooring, or anchor-line, or cable, or any combination thereof. In some embodiments, it may be desirable to add ballast or other material or weight or density to reduce the upward buoyancy force of the higher elevation reservoir to, for example, reduce the cost, or required strength of cabling, or any combination thereof of, for example, tethering or suspending the higher elevation reservoir. In some embodiments, it may be desirable for the higher elevation reservoir to be at a depth sufficiently deep to avoid or prevent exposure to at least a portion of ocean or body of water kinetic energy, or surface waves, or storms, or any combination thereof.

In some embodiments, FIGS. 35-36 may employ a subsea pump, or subsea low density fluid pump, or any combination thereof.

In some embodiments, the labels in FIGS. 35-36 may be similar to FIGS. 31-32.

Example FIGS. 37-38 Summary

FIGS. 37-38 may comprise an embodiment employing a higher elevation reservoir located subsea, or at least partially underneath or beneath the surface of a body of water, or submerged, or tether, or any combination thereof. In some embodiments, for example, the higher elevation reservoir may be located at an elevation higher than or above the elevation of the lower elevation reservoir. In some embodiments, it may be desirable to locate the higher elevation reservoir below the surface of a body of water to, for example, due to, including, but not limited to, one or more or any combination of the following; reduce dynamic movements, or reduce potential fatigue, or reduce capital cost, or reduce potential riser fatigue, or enable the use of larger diameter pipes or risers, or reduce potential cable fatigue, or increase system or process lifespan, or reduce cost, or reduce potential biofouling, or reduce potential biofouling due to the potentially lower bioactivity at depths beneath the surface of a body of water due to, for example, lower light or dissolved oxygen. In some embodiments, the higher elevation reservoir may be tethered or suspended by a mooring, or anchor-line, or cable, or any combination thereof. In some embodiments, it may be desirable to add ballast or other material or weight or density to reduce the upward buoyancy force of the higher elevation reservoir to, for example, reduce the cost, or required strength of cabling, or any combination thereof of, for example, tethering or suspending the higher elevation reservoir. In some embodiments, it may be desirable for the higher elevation reservoir to be at a depth sufficiently deep to avoid or prevent exposure to at least a portion of ocean or body of water kinetic energy, or surface waves, or storms, or any combination thereof.

In some embodiments, FIGS. 37-38 may employ a higher elevation pump, or higher elevation low density fluid pump, or any combination thereof.

In some embodiments, the labels in FIGS. 37-38 may be similar to FIGS. 5-6.

Example FIGS. 39-44 Summary

FIGS. 39-44 may show a tank of a storage reservoir which may be configured to store low density fluid and high density fluid. FIGS. 39-42 may show the changes in relative fluid amounts, or fluid-fluid interface level, or floating barrier or divider level, or barrier level, or plunger level, or any combination thereof during charging and discharging of some embodiments.

FIGS. 39 and 40 may provide 'liquid-liquid interface' as an example fluid-fluid interface. In some embodiments, fluid-fluid interfaces instead of, or in addition to, liquid-liquid interfaces may be employed, and may, for example, include, but are not limited to, one or more or any combination of the following: liquid-liquid interfaces, or gas-liquid interfaces, or [solid-liquid]-liquid interfaces, or emulsion-liquid interfaces, or suspension-liquid interfaces, or suspension-suspension interfaces, or [solid-liquid]-[solid-liquid] interfaces, or gas-suspension interfaces, or gas-emulsion interfaces, or interfaces comprising at least one fluid comprising a supercritical fluid, or supercritical fluid-liquid interfaces.

FIG. 39 and FIG. 40 may show a tank of a storage reservoir with a direct fluid-fluid interface or direct contact between the low density fluid and high density fluid within a storage reservoir tank. In some embodiments, it may be desirable to employ tanks configured with a direct fluid-fluid interface when the system may be designed to have the high density fluid and low density fluid practically mutually insoluble, or have the high density fluid and low density fluid mutually nearly fully saturated at solubility limits, or any combination thereof. In some embodiments, tanks configured with direct fluid-fluid interface may employ high density fluid and low density fluid which are mutually soluble. In some embodiments, tanks configured with direct fluid-fluid interface employing a high density fluid and low density fluid which are mutually soluble may possess a stratification layer or cline layer or chemocline at the interface between the low density fluid and high density fluid, which may comprise a varying concentration of high density fluid components and/or low density fluid components depending on location or elevation within the stratification layer or cline layer or chemocline layer. In some embodiments a stratification layer and/or flow stability may be facilitated by diffusions, or laminar flow, or any combination thereof.

FIG. 41 and FIG. 42 may show a tank of a storage reservoir with a divider or barrier which at least partially occupies a region which may otherwise be occupied by a direct fluid-fluid interface within a storage reservoir tank. In some embodiments, a divider or barrier at a fluid-fluid interface or a hypothetical fluid-fluid interface may reduce the surface area of a direct fluid-fluid interface, or reduce the surface area by which a high density fluid is in direct contact with a low density fluid, or any combination thereof. In some embodiments, a divider or barrier at a fluid-fluid interface or a hypothetical fluid-fluid interface may reduce the rate or amount of mixing between the low density fluid and/or high density fluid within a tank relative to embodiments with a direct fluid-fluid interface, which may reduce potential contamination of the high density fluid, or low density fluid, or both. In some embodiments, it may be desirable to employ at least a portion of a barrier or divider at a fluid-fluid interface between a high density fluid and low density fluid wherein the high density fluid may be at least a portion soluble in the low density fluid, or wherein the low density fluid may be at least a portion solution in the high density fluid, or any combination thereof.

FIG. 43 and FIG. 44 may comprise a tank or hydraulic cylinder configured to store low density fluid and high density fluid. In some embodiments, low density fluid may be stored in a first portion of the tank or hydraulic cylinder and the high density fluid may be stored in a second portion of the tank or hydraulic cylinder. In some embodiments, the first portion and second portion may be mechanically or hydraulically connected by a 'Barrier' or plunger. In some embodiments, if low density fluid is transferred into the first portion, then the 'Barrier' or plunger may move to displace high density fluid in the second portion. In some embodiments, if high density fluid is transferred into the second portion, then the 'Barrier' or plunger may move to displace low density fluid in the first portion. In some embodiments, the tank or hydraulic cylinder may be of a fixed volume, and, for example, if low density fluid of a volume is transferred into the tank or hydraulic cylinder, high density fluid of about the same volume may be displaced or transferred out of the tank. In some embodiments, it may be desirable for the wetted surfaces of the first portion and second portion to remain wetted or in contact with their respective fluids during standard operating modes, which may reduce or prevent the mixing or transfer of low density fluid into the high density fluid, or high density fluid into the low density fluid, or any combination thereof.

In some embodiments, a portion of one or more chemical constituents of the higher density fluid may dissolve in the lower density fluid. It may be desirable to regenerate or otherwise remove said one or more chemical constituents of the higher density fluid from the lower density fluid. It may be desirable to employ systems for regenerating or otherwise removing said one or more chemical constituents of the higher density fluid from the lower density fluid using one or more or a combination of separation methods or processes.

In some embodiments, a portion of one or more chemical constituents of the lower density fluid may dissolve in the higher density fluid. It may be desirable to regenerate or otherwise remove said one or more chemical constituents of the lower density fluid from the higher density fluid. It may be desirable to employ systems for regenerating or otherwise removing said one or more chemical constituents of the lower density fluid from the higher density fluid using one or more or a combination of separation methods or processes.

Example FIGS. 39-44 Key

| Example FIGS. 39-44 Key | |
| --- | --- |
| Label in Figure | Description |
| Low Density Fluid | Low density fluid or lower density fluid may comprise a fluid possesses a density less than the density of the higher density fluid within the system or process. In some embodiments, a low density fluid may possess a density less than a higher density fluid which the low density fluid may displace, direct or indirectly, in a reservoir, or tank, or subsea tank. |
| IN | 'IN' may represent the flow or movement or transfer of a fluid into a tank. For example, 'IN' may represent that the amount of a the fluid represented by 'IN' is increasing within a tank. For example, 'IN' may represent that the rate of change of an amount of a fluid labelled by 'IN' within a tank may be net positive. For example, in FIG. 39, or FIG. 41, or FIG. 43, 'IN' may show a low density fluid entering a tank or being added to a tank or flowing into a tank. For example, in FIG. 40, FIG. 42, or FIG. 44, 'IN' may show a high density fluid entering a tank or reservoir, or being added to a tank, or flowing into a tank. |
| High Density Fluid | High density fluid or higher density fluid may comprise a fluid within an fluid displacement energy storage system which possesses a density greater than the density of the lower density fluid within the system or process. In some embodiments, a high density fluid may possess a density greater than a low density fluid which the high density fluid may displace, direct or indirectly, in a reservoir, or tank, or subsea tank. |
| OUT | 'OUT' may represent the flow or movement or transfer of a fluid out of or from a tank. For example, 'OUT' may represent that the amount of a the fluid represented by 'OUT' is decreasing within a tank. For example, 'OUT' may represent that the rate of change of an amount of a fluid labelled by 'OUT' within a tank may be net negative. For example, in FIG. 40, or FIG. 42, or FIG. 44, 'OUT' may show a low density fluid exiting a tank or being transferred from a tank or flowing into a tank. For example, in FIG. 39, FIG. 41, or FIG. 43, 'OUT' may show a high density fluid exiting a tank or reservoir, or being transferred from a tank or flowing from a tank. |
| Liquid-Liquid Interface | A liquid-liquid interface may be provided as an example fluid-fluid interface. In some embodiments, a fluid-fluid interface may comprise where a high density fluid and a low density fluid meet or intersect. In some embodiments, a direct fluid-fluid interface may comprise where a high density fluid and a low density fluid are in direct physical contact. In some |

-continued

| Example FIGS. 39-44 Key | |
| --- | --- |
| Label in Figure | Description |
| | embodiments, a fluid-fluid interface may comprise a stratification or cline layer where high density fluid transitions into low density fluid or vise versa. In some embodiments, the position or elevation of a liquid-liquid interface may change if, for example, including, but not limited to, one or more or any combination of the following changes: the relative volume of high density fluid to low density fluid, or the total volume of high density fluid, or the total volume of low density fluid, or any combination thereof, or the composition of low density fluid, or the composition of high density fluid. Some embodiments may employ or involve a hypothetical fluid-fluid interface or hypothetical liquid-liquid interface. In some embodiments, a hypothetical fluid-fluid interface may comprise where a fluid-fluid interface may exist or be present, if, for example, a barrier or divider was not present, or may comprise the liquid level of the top of the high density fluid layer and the lower liquid level of the bottom of the low density fluid layer. |
| Floating Barrier | A floating barrier may comprise a barrier or divider which may occupy a region between a low density fluid and high density fluid within a tank or other storage vessel and/or may be located at or near a fluid-fluid interface or a hypothetical fluid-fluid interface. In some embodiments, the barrier or divider may be floating, for example, wherein the density of the floating barrier or divider may be greater than the density of the low density fluid and/or less than the density of the high density fluid. In some embodiments, the barrier or divider may be of a greater density than the higher density fluid, or may be of a lesser density than the lower density fluid, or any combination thereof. In some embodiments, the barrier or divider may adjust its position with passive mechanisms, or active mechanisms, or any combination thereof. |
| Barrier (FIGS. 43 and FIG. 44) | For example, in FIG. 43 and FIG. 44, for example, a 'Barrier' may comprise a solid component or solid components which may be located between low density fluid and high density fluid in a tank or hydraulic cylinder. In some embodiments, the Barrier may move when the volume of low density fluid, or high density fluid, or any combination thereof changes. For example, in some embodiments, low density fluid may be transferred into the tank or hydraulic cylinder, resulting in the movement of the barrier and/or resulting in the displacement or transfer of at least a portion of the high density fluid in the tank or hydraulic cylinder. For example, in some embodiments, high density fluid may be transferred into the tank or hydraulic cylinder, resulting in the movement of the barrier and/or resulting in the displacement or transfer of at least a portion of the low density fluid in the tank or hydraulic cylinder. In some embodiments, the portions of the barrier and/or interior of the tank or hydraulic cylinder wetted by or in direct contact with low density fluid may remain wetted by or in contact with low density fluid during, for example, charging or discharging or standard system or process operating modes. In some embodiments, the portions of the barrier and/or interior of the tank or hydraulic cylinder wetted by or in direct contact with high density fluid may remain wetted by or in contact with high density fluid during, for example, charging or discharging or standard system or process operating modes. |

Example FIGS. 39-44 Step-By-Step Description

In some embodiments, at least a portion of low density fluid may be transferred into the top region of a tank, displacing at least a portion of high density fluid below the low density fluid, wherein at least a portion of the displaced high density fluid may exit from the bottom region of the tank. The position of the fluid-fluid interface or hypothetical fluid-fluid interface within the tank may change as at least a portion of low density fluid may enter the tank and at least a portion of high density fluid may be displaced. For example, the position or elevation of the fluid-fluid interface or hypothetical fluid-fluid interface may decrease. If a barrier or divider may be present, the position of the barrier or divider may change and/or match or nearly match the change in position or elevation of the fluid-fluid interface or hypothetical fluid-fluid interface.

In some embodiments, at least a portion of high density fluid may be transferred into the bottom region of a tank, displacing at least a portion of low density fluid above the high density fluid, wherein at least a portion of low density fluid may exit from the top region of the tank. The position of the fluid-fluid interface or hypothetical fluid-fluid interface within the tank may change as high density fluid may enter the tank and low density fluid may be displaced. For example, the position or elevation of the fluid-fluid interface or hypothetical fluid-fluid interface may increase. If a barrier or divider may be present, the position of the barrier or divider may change and/or match or nearly match the change in position or elevation of the fluid-fluid interface or hypothetical fluid-fluid interface.

FIG. 45 and FIG. 46 Example Summary

FIGS. 45 and 46 may comprise a process or system for desalinating water comprising a higher elevation reservoir and a lower elevation reservoir, wherein the higher elevation reservoir may be configured to store high density fluid. In some embodiments, desalination may be conducted by allow at least a portion of high density fluid from the higher elevation reservoir to transfer into the lower elevation reservoir to pressurize and/or displace at least a portion of low density fluid, which may comprise seawater or treated seawater or desalination feed, and transfer at least a portion of said displaced low density fluid into a desalination system or process, forming at least a portion of desalination permeate, which may comprise desalinated water, and/or desalination retentate or concentrate. FIGS. 45 and 46 may show an embodiment employing a subsea pump fluidly connected to the high density fluid. FIG. 45 may show the system or process charging. FIG. 46 may show the system or process discharging or desalinating water.

It may be important to note that, in some embodiments, two or more subsea tanks may be employed. In some embodiments, the operating mode shown in FIG. 45 may be conducted or may occur in at least one tank, while, for example the operating mode shown in FIG. 46 may be conducted or may occur in another tank simultaneously. In some embodiments, the operating modes of tanks may be swapped. For example, in some embodiments, the operating modes of tanks may be swapped to, for example, enable desalination to be conducted continuously.

FIG. 45 and FIG. 46 Example Figure Key

| | Example FIG. 45 and FIG. 46 Key |
|---|---|
| Label | Description |
| L1 | 'L1' may comprise high density fluid transferred between a higher elevation reservoir, T1, and a valve, V1. |
| L2 | 'L2' may comprise high density fluid transferred between a valve, V1, and a higher elevation reservoir, T1. |
| L3 | 'L3' may comprise a pipe, or riser, or riser pipe, or pipeline, or dynamic pipe, or any combination thereof which may transfer high density fluid between a higher elevation reservoir or higher elevation region and a lower elevation reservoir or lower elevation region. |
| L4 | 'L4' may comprise high density fluid transferred between a valve, V3, and a valve, V2. |
| L5 | 'L5' may comprise high density fluid transferred between a pipe, P1, and a valve, V3. |
| L6 | 'L6' may comprise high density fluid transferred between a lower elevation reservoir or tank, T2, and a pump, P1. |
| L7 | 'L7' may comprise a low density fluid, such as seawater or desalination feed, which may be transferred from a valve, V4, and a lower elevation reservoir or tank, T2. |
| L8 | 'L8' may comprise a desalination feed intake. 'L8' may comprise a seawater intake or seawater feed intake. In some embodiments, 'L8' may further comprise one or more or any combination of pre-treatment, or seawater pre-treatment, or desalination pre-treatment, or any combination thereof steps, or processes, or any combination thereof. |
| L9 | 'L9' may comprise desalination feed transferred between a lower elevation reservoir, T2, and a valve, V5. |
| L10 | 'L10' may comprise desalination feed transferred between a valve, V5, and a desalination system or process, 'RO.' |
| L11 | 'L11' may comprise desalination concentrate or retentate. In some embodiments, desalination concentrate or desalination retentate may have a salinity greater than desalination feed. In some embodiments, 'L11' may employed a pressure exchanger, or power exchanger, or power recovery system or process, or pressure recovery system or process, or any combination thereof. |
| L12 | 'L12' may comprise desalination permeate or desalinated water, which may be transferred to an application for desalinated water, or storage, or any combination thereof. |
| T1 | 'T1' may comprise a higher elevation reservoir or higher elevation tank. In some embodiments, T1 may be configured to store high density fluid. In some embodiments, T1 may be configured to store high density fluid and/or low density fluid. In some embodiments, T1 may comprise a floating vessel, or a floating storage vessel. In some embodiments, T1 may be located on land. In some embodiments, T1 may tethered or suspended subsea or may be located at least partially subsea. In some embodiments, T1 may be located at least partially at or above the surface of a body of water. |
| T2 | 'T2' may comprise a lower elevation reservoir or lower elevation tank or subsea tank. In some embodiments, T2 may be configured to store low density fluid and/or high density fluid. In some embodiments, T2 may comprise a tank with a fluid-fluid interface, or a tank with a liquid-liquid interface, or a tank with a floating barrier or divider, or a tank with a barrier or divider, or a tank with a hydraulic cylinder, or a tank with a hydraulic plunger, or tank with a hydraulic piston, or a piston, or any combination thereof. In some embodiments, T2 may be configured to resist the hydrostatic pressure difference between hydrostatic pressure of high density fluid and the hydrostatic pressure of the body of water adjacent to T2. |
| V1 | 'V1' may comprise a valve fluidly connected to high density fluid and/or located at a higher elevation, or in the higher elevation region, or located at about the same elevation as the higher elevation reservoir, or any combination thereof. |
| V2 | 'V2' may comprise a valve fluidly connected to high density fluid and/or located at a lower elevation or in the lower elevation region, or located at about the same elevation as the lower elevation reservoir, or any combination thereof. |
| V3 | 'V3' may comprise a valve fluidly connected to high density fluid and/or located at a lower elevation or in the lower elevation region, or located at about the same elevation as the lower elevation reservoir, or any combination thereof. |

81                                                                                          82

-continued

Example FIG. 45 and FIG. 46 Key

| Label | Description |
| --- | --- |
| V4 | 'V4' may comprise a valve fluidly connected to low density fluid, or desalination feed, or seawater intake, or any combination thereof and/or located in the lower elevation region. |
| V5 | 'V5' may comprise a valve fluidly connected to the low density fluid, or desalination feed, or any combination thereof which may be transferred from the lower elevation reservoir and into the desalination system or process. In some embodiments, 'V5' may control the flow of low density fluid or desalination feed displaced by high density fluid in the lower elevation reservoir. |
| P1 | 'P1' may comprise a pump. P1 may comprise a pump fluidly connected to the high density fluid and/or located subsea and/or located at an elevation or depth about the same as the lower elevation reservoir. P1 may pump or otherwise transfer high density fluid from the lower elevation reservoir to the higher elevation reservoir. In FIG. 45 and FIG. 46, P1 may comprise a bypass or may provide an alternative flow path, for example, such that when high density fluid transfers from the higher elevation reservoir into the lower elevation reservoir the high density fluid may bypass the pump, if desired. |
| E1 | 'E1' may comprise a power cable, or power sources, or subsea power cable, or submarine power cable, or a dynamic power |
| RO | 'RO' may comprise a desalination system or process. 'RO' may comprise a membrane based desalination system or process, or a pressure driven desalination system or process, or any combination thereof. 'RO', for example, may comprise a reverse osmosis desalination system or process. 'RO' may be located in the lower elevation region, or at an elevation about the same as or near the elevation of the lower elevation reservoir. 'RO' may be located subsea. |
| Near Surface | 'Near Surface' may indicate a higher elevation. For example, in some embodiments, figure components above the 'Near Surface' line may be at a higher elevation, or an elevation about the same as the first reservoir. For example, in some embodiments, figure components above the 'Near Surface' line may comprise 'Near Surface' components.<br>In some embodiments, the equipment or components above the 'Near Surface' line may comprise an integrated vessel or platform or floating platform. For example, in some embodiments, the equipment or components above 'Near Surface' line may be moored using a spread mooring system, or a tension leg moored system or TLP, or a semisub mooring system, or a turret mooring system, or a disconnectable mooring system, or a disconnectable buoy mooring system, or any combination thereof. For example, in some embodiments, the equipment or components above 'Near Surface' line may comprise a floating storage vessel, or an FSO, or a ship-shaped vessel, or a semi-submersible vessel, or a Tension Leg Platform or TLP vessel, or a cylindrical storage vessel, or any combination thereof. |
| Seabed to Surface | 'Seabed to Surface' may indicate an elevation between the lower elevation and a higher elevation. For example, in some embodiments, 'Seabed to Surface' may comprise an elevation lower than a higher elevation and higher than a lower elevation. For example, in some embodiments, 'Seabed to Surface' may comprise an elevation where risers or pipes transfer fluid between the higher elevation reservoir or first reservoir and the lower elevation reservoir or second reservoir. For example, in some embodiments, 'Seabed to Surface' may comprise an elevation where dynamic power cables or power cables transfer power between the higher elevation reservoir and the lower elevation reservoir. |
| Near Seabed | 'Near Seabed' may indication a lower elevation. For example, in some embodiments, figure components below the 'Near Seabed' line may be at a lower elevation, or an elevation about the same as the second reservoir. For example, in some embodiments, figure components below the 'Near Seabed' line may comprise 'Near Seabed' components. In some embodiments, at least a portion of the 'Near Seabed' components may be skid mounted to, for example, facilitate installation. |

FIG. 47 and FIG. 48 Example Summary

FIGS. 47 and 48 may comprise a process or system for desalinating water comprising a higher elevation reservoir and a lower elevation reservoir, wherein the higher elevation reservoir may be configured to store high density fluid. In some embodiments, desalination may be conducted by allow at least a portion of high density fluid from the higher elevation reservoir to transfer into the lower elevation reservoir to pressurize and/or displace at least a portion of low density fluid, which may comprise seawater or treated seawater or desalination feed, and transfer at least a portion of said displaced low density fluid into a desalination system or process, forming at least a portion of desalination permeate, which may comprise desalinated water, and/or desalination retentate or concentrate. FIGS. 47 and 48 may show an embodiment employing a subsea pump fluidly connected to the low density fluid, or seawater intake, or desalination feed, or treated desalination feed, or any combination thereof. In some embodiments, low density fluid may be pumped or otherwise transferred into the lower elevation reservoir or subsea tank and/or displace high density fluid in the lower elevation reservoir or subsea tank. FIG. 47 may show the system or process charging. FIG. 48 may show the system or process discharging or desalinating water.

It may be important to note that, in some embodiments, two or more subsea tanks may be employed. In some embodiments, the operating mode shown in FIG. 47 may be conducted or may occur in at least one tank, while, for example the operating mode shown in FIG. 48 may be conducted or may occur in another tank simultaneously. In some embodiments, the operating modes of tanks may be swapped. For example, in some embodiments, the operating modes of tanks may be swapped to, for example, enable desalination to be conducted continuously.

5

FIG. 47 and FIG. 48 Example Figure Key

| | Example FIG. 47 and FIG. 48 Key |
|---|---|
| Label | Description |
| L1 | 'L1' may comprise high density fluid transferred between a higher elevation reservoir, T1, and a valve, V1. |
| L2 | 'L2' may comprise high density fluid transferred between a valve, V1, and a higher elevation reservoir, T1. |
| L3 | 'L3' may comprise a pipe, or riser, or riser pipe, or pipeline, or dynamic pipe, or any combination thereof which may transfer high density fluid between a higher elevation reservoir or higher elevation region and a lower elevation reservoir or lower elevation region. |
| L4 | 'L4' may comprise high density fluid transferred between a valve, V3, and a valve, V2. |
| L5 | 'L5' may comprise high density fluid transferred between a lower elevation reservoir or tank, T2, and a valve, V2. |
| L6 | 'L6' may comprise a low density fluid, such as seawater or desalination feed, which may be transferred from a valve, V4, and a lower elevation reservoir or tank, T2. |
| L7 | 'L7' may comprise desalination feed or seawater intake transferred between a valve, V4, and a pump, P1. |
| L8 | 'L8' may comprise a desalination feed intake, which may comprise low density fluid. 'L8' may comprise a seawater intake or seawater feed intake. 'L8' may transfer into a pump, P1. In some embodiments, 'L8' may further comprise one or more or any combination of pre-treatment, or seawater pre-treatment, or desalination pre-treatment, or any combination thereof steps, or processes, or any combination thereof. |
| L9 | 'L9' may comprise desalination feed transferred between a lower elevation reservoir, T2, and a valve, V5. |
| L10 | 'L10' may comprise desalination feed transferred between a valve, V5, and a desalination system or process, 'RO.' |
| L11 | 'L11' may comprise desalination concentrate or retentate. In some embodiments, desalination concentrate or desalination retentate may have a salinity greater than desalination feed. In some embodiments, 'L11' may employed a pressure exchanger, or power exchanger, or power recovery system or process, or pressure recovery system or process, or any combination thereof. |
| L12 | 'L12' may comprise desalination permeate or desalinated water, which may be transferred to an application for desalinated water, or storage, or any combination thereof. |
| T1 | 'T1' may comprise a higher elevation reservoir or higher elevation tank. In some embodiments, T1 may be configured to store high density fluid. In some embodiments, T1 may be configured to store high density fluid and/or low density fluid. In some embodiments, T1 may comprise a floating vessel, or a floating storage vessel. In some embodiments, T1 may be located on land. In some embodiments, T1 may tethered or suspended subsea or may be located at least partially subsea. In some embodiments, T1 may be located at least partially at or above the surface of a body of water. |
| T2 | 'T2' may comprise a lower elevation reservoir or lower elevation tank or subsea tank. In some embodiments, T2 may be configured to store low density fluid and/or high density fluid. In some embodiments, T2 may comprise a tank with a fluid-fluid interface, or a tank with a liquid-liquid interface, or a tank with a floating barrier or divider, or a tank with a barrier or divider, or a tank with a hydraulic cylinder, or a tank with a hydraulic plunger, or tank with a hydraulic piston, or a piston, or any combination thereof. In some embodiments, T2 may be configured to resist the hydrostatic pressure difference between hydrostatic pressure of high density fluid and the hydrostatic pressure of the body of water adjacent to T2. |
| V1 | 'V1' may comprise a valve fluidly connected to high density fluid and/or located at a higher elevation, or in the higher elevation region, or located at about the same elevation as the higher elevation reservoir, or any combination thereof. |
| V2 | 'V2' may comprise a valve fluidly connected to high density fluid and/or located at a lower elevation or in the lower elevation region, or located at about the same elevation as the lower elevation reservoir, or any combination thereof. |
| V3 | 'V3' may comprise a valve fluidly connected to high density fluid and/or located at a lower elevation or in the lower elevation region, or located at about the same elevation as the lower elevation reservoir, or any combination thereof. |
| V4 | 'V4' may comprise a valve fluidly connected to low density fluid, or desalination feed, or seawater intake, or any combination thereof and/or located in the lower elevation region. |

-continued

| Example FIG. 47 and FIG. 48 Key | |
|---|---|
| Label | Description |
| V5 | 'V5' may comprise a valve fluidly connected to the low density fluid, or desalination feed, or any combination thereof which may be transferred from the lower elevation reservoir and into the desalination system or process. In some embodiments, 'V5' may control the flow of low density fluid or desalination feed displaced by high density fluid in the lower elevation reservoir. |
| P1 | 'P1' may comprise a pump. P1 may comprise a pump fluidly connected to the low density fluid and/or located subsea and/or located at an elevation or depth about the same as the lower elevation reservoir. P1 may pump or otherwise transfer low density fluid, such as desalination feed or seawater into the lower elevation reservoir or tank from a low density fluid source, such as desalination feed intake or seawater intake. |
| E1 | 'E1' may comprise a power cable, or power sources, or subsea power cable, or submarine power cable, or a dynamic power |
| RO | 'RO' may comprise a desalination system or process. 'RO' may comprise a membrane based desalination system or process, or a pressure driven desalination system or process, or any combination thereof. 'RO', for example, may comprise a reverse osmosis desalination system or process. 'RO' may be located in the lower elevation region, or at an elevation about the same as or near the elevation of the lower elevation reservoir. 'RO' may be located subsea. |
| Near Surface | 'Near Surface' may indicate a higher elevation. For example, in some embodiments, figure components above the 'Near Surface' line may be at a higher elevation, or an elevation about the same as the first reservoir. For example, in some embodiments, figure components above the 'Near Surface' line may comprise 'Near Surface' components.<br>In some embodiments, the equipment or components above the 'Near Surface' line may comprise an integrated vessel or platform or floating platform. For example, in some embodiments, the equipment or components above 'Near Surface' line may be moored using a spread mooring system, or a tension leg moored system or TLP, or a semisub mooring system, or a turret mooring system, or a disconnectable mooring system, or a disconnectable buoy mooring system, or any combination thereof. For example, in some embodiments, the equipment or components above 'Near Surface' line may comprise a floating storage vessel, or an FSO, or a ship-shaped vessel, or a semi-submersible vessel, or a Tension Leg Platform or TLP vessel, or a cylindrical storage vessel, or any combination thereof. |
| Seabed to Surface | 'Seabed to Surface' may indicate an elevation between the lower elevation and a higher elevation. For example, in some embodiments, 'Seabed to Surface' may comprise an elevation lower than a higher elevation and higher than a lower elevation. For example, in some embodiments, 'Seabed to Surface' may comprise an elevation where risers or pipes transfer fluid between the higher elevation reservoir or first reservoir and the lower elevation reservoir or second reservoir. For example, in some embodiments, 'Seabed to Surface' may comprise an elevation where dynamic power cables or power cables transfer power between the higher elevation reservoir and the lower elevation reservoir. |
| Near Seabed | 'Near Seabed' may indication a lower elevation. For example, in some embodiments, figure components below the 'Near Seabed' line may be at a lower elevation, or an elevation about the same as the second reservoir. For example, in some embodiments, figure components below the 'Near Seabed' line may comprise 'Near Seabed' components. In some embodiments, at least a portion of the 'Near Seabed' components may be skid mounted to, for example, facilitate installation. |

FIG. 49 and FIG. 50 Example Summary

FIGS. 49 and 50 may comprise a process or system for desalinating water comprising a higher elevation reservoir and a lower elevation reservoir, wherein the higher elevation reservoir may be configured to store high density fluid. In some embodiments, desalination may be conducted by allow at least a portion of high density fluid from the higher elevation reservoir to transfer into the lower elevation reservoir to pressurize and/or displace at least a portion of low density fluid, which may comprise seawater or treated seawater or desalination feed, and transfer at least a portion of said displaced low density fluid into a desalination system or process, forming at least a portion of desalination permeate, which may comprise desalinated water, and/or desalination retentate or concentrate. FIGS. 49 and 50 may show an embodiment employing a pump fluidly connected to the low density fluid, or seawater intake, or desalination feed, or treated desalination feed, or any combination thereof. In some embodiments, low density fluid may be pumped or otherwise transferred into the lower elevation reservoir or subsea tank and/or displace high density fluid in the lower elevation reservoir or subsea tank. In some embodiments, FIGS. 49 and 50 may show a pump located in the higher elevation region, or at an elevation about the same as the higher elevation reservoir, or any combination thereof and/or may show desalination feed pretreatment located in the higher elevation region. FIG. 49 may show the system or process charging. FIG. 50 may show the system or process discharging or desalinating water.

It may be important to note that, in some embodiments, two or more subsea tanks may be employed. In some embodiments, the operating mode shown in FIG. 49 may be conducted or may occur in at least one tank, while, for example the operating mode shown in FIG. 50 may be conducted or may occur in another tank simultaneously. In some embodiments, the operating modes of tanks may be swapped. For example, in some embodiments, the operating modes of tanks may be swapped to, for example, enable desalination to be conducted continuously.

FIG. 49 and FIG. 50 Example Figure Key

| Label | Description |
|---|---|
| | Example FIG. 49 and FIG. 50 Key |
| L1 | 'L1' may comprise high density fluid transferred between a higher elevation reservoir, T1, and a valve, V1. |
| L2 | 'L2' may comprise high density fluid transferred between a valve, V1, and a higher elevation reservoir, T1. |
| L3 | 'L3' may comprise a pipe, or riser, or riser pipe, or pipeline, or dynamic pipe, or any combination thereof which may transfer high density fluid between a higher elevation reservoir or higher elevation region and a lower elevation reservoir or lower elevation region. |
| L4 | 'L4' may comprise high density fluid transferred between a valve, V3, and a valve, V2. |
| L5 | 'L5' may comprise high density fluid transferred between a lower elevation reservoir or tank, T2, and a valve, V2. |
| L6 | 'L6' may comprise a low density fluid, such as seawater or desalination feed, which may be transferred from a valve, V4, and a lower elevation reservoir or tank, T2. |
| L7 | 'L7' may comprise desalination feed or seawater intake transferred between a valve, V4, and a pump, P1. In some embodiments, may comprise a pipe, or riser, or riser pipe, or dynamic pipe, or any combination thereof transferring desalination feed between a pump, P1, which may be located in a higher elevation region or at an elevation about the same as the higher elevation reservoir and a lower elevation reservoir, T2, or a valve, V4, which may be located in the lower elevation region. |
| L8 | 'L8' may comprise a desalination feed intake, which may comprise low density fluid. 'L8' may comprise a seawater intake or seawater feed intake. 'L8' may transfer into a pump, P1. In some embodiments, 'L8' may further comprise one or more or any combination of pre-treatment, or seawater pre-treatment, or desalination pre-treatment, or any combination thereof steps, or processes, or any combination thereof. In some embodiments, L8 may transfer seawater feed or seawater intake from subsea, which may involve the use of a subsea pump, into a higher elevation region for, for example, desalination pretreatment and/or pumping or otherwise transferring the low density fluid or desalination feed to a lower elevation reservoir or tank. |
| L9 | 'L9' may comprise desalination feed transferred between a lower elevation reservoir, T2, and a valve, V5. |
| L10 | 'L10' may comprise desalination feed transferred between a valve, V5, and a desalination system or process, 'RO.' |
| L11 | 'L11' may comprise desalination concentrate or retentate. In some embodiments, desalination concentrate or desalination retentate may have a salinity greater than desalination feed. In some embodiments, 'L11' may employed a pressure exchanger, or power exchanger, or power recovery system or process, or pressure recovery system or process, or any combination thereof. |
| L12 | 'L12' may comprise desalination permeate or desalinated water, which may be transferred to an application for desalinated water, or storage, or any combination thereof. |
| T1 | 'T1' may comprise a higher elevation reservoir or higher elevation tank. In some embodiments, T1 may be configured to store high density fluid. In some embodiments, T1 may be configured to store high density fluid and/or low density fluid. In some embodiments, T1 may comprise a floating vessel, or a floating storage vessel. In some embodiments, T1 may be located on land. In some embodiments, T1 may tethered or suspended subsea or may be located at least partially subsea. In some embodiments, T1 may be located at least partially at or above the surface of a body of water. |
| T2 | 'T2' may comprise a lower elevation reservoir or lower elevation tank or subsea tank. In some embodiments, T2 may be configured to store low density fluid and/or high density fluid. In some embodiments, T2 may comprise a tank with a fluid-fluid interface, or a tank with a liquid-liquid interface, or a tank with a floating barrier or divider, or a tank with a barrier or divider, or a tank with a hydraulic cylinder, or a tank with a hydraulic plunger, or tank with a hydraulic piston, or a piston, or any combination thereof. In some embodiments, T2 may be configured to resist the hydrostatic pressure difference between hydrostatic pressure of high density fluid and the hydrostatic pressure of the body of water adjacent to T2. |
| V1 | 'V1' may comprise a valve fluidly connected to high density fluid and/or located at a higher elevation, or in the higher elevation region, or located at about the same elevation as the higher elevation reservoir, or any combination thereof. |
| V2 | 'V2' may comprise a valve fluidly connected to high density fluid and/or located at a lower elevation or in the lower elevation region, or located at about the same elevation as the lower elevation reservoir, or any combination thereof. |
| V3 | 'V3' may comprise a valve fluidly connected to high density fluid and/or located at a lower elevation or in the lower elevation region, or located at about the same elevation as the lower elevation reservoir, or any combination thereof. |
| V4 | 'V4' may comprise a valve fluidly connected to low density fluid, or desalination feed, or seawater intake, or any combination thereof and/or located in the lower elevation region. |

-continued

| Example FIG. 49 and FIG. 50 Key | |
| --- | --- |
| Label | Description |
| V5 | 'V5' may comprise a valve fluidly connected to the low density fluid, or desalination feed, or any combination thereof which may be transferred from the lower elevation reservoir and into the desalination system or process. In some embodiments, 'V5' may control the flow of low density fluid or desalination feed displaced by high density fluid in the lower elevation reservoir. |
| P1 | 'P1' may comprise a pump. P1 may comprise a pump fluidly connected to the low density fluid and/or located near the surface and/or located in a higher elevation region and/or located at an elevation about the same as the higher elevation reservoir. P1 may pump or otherwise transfer low density fluid, such as desalination feed or seawater into the lower elevation reservoir or tank from a low density fluid source, such as desalination feed intake or seawater intake. |
| E1 | 'E1' may comprise a power cable, or power sources, or subsea power cable, or submarine power cable, or a dynamic power |
| RO | 'RO' may comprise a desalination system or process. 'RO' may comprise a membrane based desalination system or process, or a pressure driven desalination system or process, or any combination thereof. 'RO', for example, may comprise a reverse osmosis desalination system or process. 'RO' may be located in the lower elevation region, or at an elevation about the same as or near the elevation of the lower elevation reservoir. 'RO' may be located subsea. |
| Near Surface | 'Near Surface' may indicate a higher elevation. For example, in some embodiments, figure components above the 'Near Surface' line may be at a higher elevation, or an elevation about the same as the first reservoir. For example, in some embodiments, figure components above the 'Near Surface' line may comprise 'Near Surface' components. In some embodiments, the equipment or components above the 'Near Surface' line may comprise an integrated vessel or platform or floating platform. For example, in some embodiments, the equipment or components above 'Near Surface' line may be moored using a spread mooring system, or a tension leg moored system or TLP, or a semisub mooring system, or a turret mooring system, or a disconnectable mooring system, or a disconnectable buoy mooring system, or any combination thereof. For example, in some embodiments, the equipment or components above 'Near Surface' line may comprise a floating storage vessel, or an FSO, or a ship-shaped vessel, or a semi-submersible vessel, or a Tension Leg Platform or TLP vessel, or a cylindrical storage vessel, or any combination thereof. |
| Seabed to Surface | 'Seabed to Surface' may indicate an elevation between the lower elevation and a higher elevation. For example, in some embodiments, 'Seabed to Surface' may comprise an elevation lower than a higher elevation and higher than a lower elevation. For example, in some embodiments, 'Seabed to Surface' may comprise an elevation where risers or pipes transfer fluid between the higher elevation reservoir or first reservoir and the lower elevation reservoir or second reservoir. For example, in some embodiments, 'Seabed to Surface' may comprise an elevation where dynamic power cables or power cables transfer power between the higher elevation reservoir and the lower elevation reservoir. |
| Near Seabed | 'Near Seabed' may indication a lower elevation. For example, in some embodiments, figure components below the 'Near Seabed' line may be at a lower elevation, or an elevation about the same as the second reservoir. For example, in some embodiments, figure components below the 'Near Seabed' line may comprise 'Near Seabed' components. In some embodiments, at least a portion of the 'Near Seabed' components may be skid mounted to, for example, facilitate installation. |

Example Figure Step by Step Descriptions

FIGS. 1-4 Example Step-By-Step Description

Step 1: Low Density Fluid Displaces Desalinated Water in the Subsea Tank

A valve in the desalinated water or desalination permeate pipe ('8') between the lower elevation reservoir ('2') and the reverse osmosis desalination system ('RO') may be closed, and a valve between the higher elevation reservoir ('1') and the pump ('3') may open in the pipe between '1' and '3', and the valve in the pipe between '1' and the dynamic pipe or riser ('4') bypassing the '3' may be closed, and a valve in the pipe between the higher elevation region and '4' may be open.

Low density fluid may be pumped ('3') from a higher elevation reservoir ('1'), through the dynamic pipe or riser ('4'), into a lower elevation reservoir or subsea tank ('2'), displacing desalinated water from the lower elevation reservoir or subsea tank ('2') into a desalinated water export pipeline ('9').

Before pumping is initiated, it may be desirable to close a valve in the desalinated water or desalination permeate pipe ('8') between 'RO' and '2' to, for example, prevent the transfer of pumping pressure to the desalination permeate.

The internal pressure of the lower elevation reservoir ('2') in step 1 may be, for example, about the same as, or equal to, or greater than, or any combination thereof the gravitational hydrostatic pressure of the desalinated water at the water depth of the lower elevation reservoir ('2') and/or plus any pressure drop associated with transferring desalinated water through the desalinated water export pipeline ('9').

Step 2: Desalinated Water Displaces Low Density Fluid in the Subsea Tank

A valve in the desalinated water or desalination permeate pipe ('8') between the lower elevation reservoir ('2') and the reverse osmosis desalination system ('RO') may be opened, and a valve between the higher elevation reservoir ('1') and the pump ('3') may closed in the pipe between '1' and '3', and the valve in the pipe between '1' and the dynamic pipe or riser ('4') bypassing the '3' may be open, and a valve in the pipe between the higher elevation region and '4' may be open.

Due to, for example, the opening of the valve in the pipe ('4') between the lower elevation reservoir ('2') and the higher elevation reservoir ('1'), the internal pressure of the lower elevation reservoir or subsea tank may decrease to a pressure about the same as the gravitational hydrostatic pressure of the low density fluid at the depth of the lower elevation reservoir or subsea tank ('2') and/or the gravitational hydrostatic pressure the elevation difference between the higher elevation reservoir and the lower elevation reservoir.

A pressure difference may exist between the seawater adjacent to the lower elevation reservoir at about the same elevation or seawater desalination feed ('6') and the internal pressure inside the lower elevation reservoir. The pressure of the desalination permeate pipe ('8') may be about the same as the internal pressure of the lower elevation reservoir ('2') when, for example, the valve in the desalinated water or desalination permeate pipe ('8') between the lower elevation reservoir ('2') and the reverse osmosis desalination system ('RO') may be opened. The pressure difference between '6' and '8' or '2' may be greater than the osmotic pressure of seawater and/or sufficient to drive or power the desalination of the seawater.

For example, seawater desalination feed ('6') may flow into the reverse osmosis desalination system ('RO') at a pressure about the same as the gravitational hydrostatic pressure of seawater at the depth or elevation of the seawater intake, or the RO. In the RO, water in the seawater desalination feed may permeate the semi-permeable desalination membrane while the rejecting at least a portion of the dissolved salts, which may result in the formation of a permeate ('8') comprising desalinated water at about the same pressure as the internal pressure of the lower elevation reservoir ('2') and a retentate or concentrate comprising a concentrated solution of at least a portion of said rejected dissolved salts which may be at about the same pressure as the gravitational hydrostatic pressure adjacent seawater or body of water at the same depth or elevation as RO ('7') if released at about the same elevation or depth as RO. Said permeate transfer through a pipe ('8') into the lower elevation reservoir ('2') displacing low density fluid in the lower elevation reservoir ('2'). Said displaced low density fluid may transfer through the low density fluid pipe between the lower elevation reservoir and higher elevation reservoir ('4') into the higher elevation reservoir ('1').

In some embodiment, low pressure difference subsea pumps may be employed to facilitate the flow of fluid or liquid. For example, a low pressure difference subsea pump may be employed to pump or transfer the retentate or concentrate from 'RO' through '7' into the ocean or body of water.

FIGS. 5-6 Example Step-By-Step Description

Step 1: Low Density Fluid Displaces Desalinated Water in T3, while Desalinated Water Displaces Low Density Fluid in T2

V1 opens to L4, closes to L3. V2 opens to L7 and closes to L6. V3 opens to L4, closes to L6, and allows low density fluid to flow in L8 from the higher elevation region ('Near Surface') to the lower elevation region ('Near Seabed') or from T1 to T3. V4 opens to L7, closes to L3, and allows low density fluid to flow in L9 from the lower elevation region ('Near Seabed') to the higher elevation region ('Near Surface') or from T2 to T1. V5 is open to L12, closes to L13, and opens to L14, allowing desalination permeate to transfer from RO to T2. V6 is open to L17, closes to L16, and opens to L15, allowing desalinated water to transfer from T3 to L17.

Due to, for example, the opening of the V4 to L7 and/or the opening of V2 to L7, the internal pressure of T2 may decrease to a pressure about the same as the gravitational hydrostatic pressure of the low density fluid at the depth of T2 and/or the gravitational hydrostatic pressure the elevation difference T2 and T1 and/or plus any pressure drop associated with displacing or transferring low density fluid. Due to, for example, the opening of the V3 to L4 and/or the opening of V1 to L4 and the applied pressure or pressure increase provided by P1, the internal pressure of T3 may increase to a pressure about the same as the gravitational hydrostatic pressure of the desalinated water at the depth of T3 and/or the gravitational hydrostatic pressure due to the elevation difference between T3 and T1 and/or plus any pressure drop associated with displacing or transferring desalinated water.

Seawater or seawater desalination feed ('L10') may flow into the reverse osmosis desalination system ('RO'). For example, seawater desalination feed ('L10') may flow into the reverse osmosis desalination system ('RO') at a pressure about the same as the gravitational hydrostatic pressure of seawater at the depth or elevation of the seawater intake, or the RO. In the RO, water in the seawater desalination feed may permeate the semi-permeable desalination membrane while the rejecting at least a portion of the dissolved salts, which may result in the formation of a permeate ('L12') comprising desalinated water at about the same pressure as the internal pressure of T2 and a retentate or concentrate comprising a concentrated solution of at least a portion of said rejected dissolved salts which may be at about the same pressure as the gravitational hydrostatic pressure adjacent seawater or body of water at the same depth or elevation as RO ('L11') if released at about the same elevation or depth as RO. Said permeate ('L12') may transfer through a pipe ('L12') through V5, through a pipe ('V14'), and into T2, displacing low density fluid in T2. Said displaced low density fluid may transfer through the low density fluid pipe between T2 and V4 ('L9'), through a valve ('V4'), through a pipe ('L7'), through a valve ('V2'), through a pipe ('L5'), and into T1.

Low density fluid may be pumped ('P1') from T1, through a pipe ('L2'), through a valve ('V1') through a pipe ('L4'), through a valve ('V3'), through the low density fluid pipe between V3 and T3 ('L8'), and into T3, displacing desalinated water from T3 into a pipe ('L15'), through a valve ('V6'), and into a desalinated water export pipeline ('L17').

In some embodiment, low pressure difference subsea pumps may be employed to facilitate the flow of fluid or liquid. For example, a low pressure difference subsea pump may be employed to pump or transfer the retentate or concentrate from 'RO', through 'L11', and into the ocean or body of water.

Potential Example Simplified Description of Step 1

Desalinated water permeate is generated by the reverse osmosis system due to the pressure difference between the seawater desalination feed and the internal pressure of T2, and said generated desalinated water displaces low density fluid from T2. Said displaced low density fluid transfers through or travels through a pipe into T1.

Low density fluid is pumped from T1 to T3, displacing desalinated water in T3. Said displaced desalinated water transfers into a water export pipe or pipeline.

Step 2: Low Density Fluid Displaces Desalinated Water in T2, while Desalinated Water Displaces Low Density Fluid in T3

V1 opens to L3, closes to L4. V2 opens to L6 and closes to L7. V3 opens to L6, closes to L4, and allows low density fluid to flow in L8 from the lower elevation region ('Near Seabed') to the higher elevation region ('Near Surface') or from T3 to T1. V4 opens to L3, closes to L7, and allows low density fluid to flow in L9 from the higher elevation region ('Near Surface') to the lower elevation region ('Near Seabed') or from T1 to T2. V5 is open to L12, closes to L14, and opens to L13, allowing desalination permeate to transfer from RO to T3. V6 is open to L17, closes to L15, and opens to L16, allowing desalinated water to transfer from T3 to L17.

Due to, for example, the opening of the V3 to L6 and/or the opening of V2 to L6, the internal pressure of T3 may decrease to a pressure about the same as the gravitational hydrostatic pressure of the low density fluid at the depth of T3 and/or the gravitational hydrostatic pressure the elevation difference T3 and T1 and/or plus any pressure drop associated with displacing or transferring low density fluid. Due to, for example, the opening of the V4 to L3 and/or the opening of V1 to L3 and the applied pressure or pressure increase provided by P1, the internal pressure of T2 may increase to a pressure about the same as the gravitational hydrostatic pressure of the desalinated water at the depth of T2 and/or the gravitational hydrostatic pressure due to the elevation difference between T2 and T1 and/or plus any pressure drop associated with displacing or transferring desalinated water.

Seawater or seawater desalination feed ('L10') may flow into the reverse osmosis desalination system ('RO'). For example, seawater desalination feed ('L10') may flow into the reverse osmosis desalination system ('RO') at a pressure about the same as the gravitational hydrostatic pressure of seawater at the depth or elevation of the seawater intake, or the RO. In the RO, water in the seawater desalination feed may permeate the semi-permeable desalination membrane while the rejecting at least a portion of the dissolved salts, which may result in the formation of a permeate ('L12') comprising desalinated water at about the same pressure as the internal pressure of T3 and a retentate or concentrate comprising a concentrated solution of at least a portion of said rejected dissolved salts which may be at about the same pressure as the gravitational hydrostatic pressure adjacent seawater or body of water at the same depth or elevation as RO ('L11') if released at about the same elevation or depth as RO. Said permeate ('L12') may transfer through a pipe ('L12') through V5, through a pipe ('V13'), and into T3, displacing low density fluid in T3. Said displaced low density fluid may transfer through the low density fluid pipe between T3 and V3 ('L8'), through a valve ('V3'), through a pipe ('L6'), through a valve ('V2'), through a pipe ('L5'), and into T1.

Low density fluid may be pumped ('P1') from T1, through a pipe ('L2'), through a valve ('V1') through a pipe ('L3'), through a valve ('V4'), through the low density fluid pipe between V4 and T2 ('L9'), and into T2, displacing desalinated water from T2 into a pipe ('L16'), through a valve ('V6'), and into a desalinated water export pipeline ('L17').

In some embodiment, low pressure difference subsea pumps may be employed to facilitate the flow of fluid or liquid. For example, a low pressure difference subsea pump may be employed to pump or transfer the retentate or concentrate from 'RO', through 'L11', and into the ocean or body of water.

Potential Example Simplified Description of Step 2

Desalinated water permeate is generated by the reverse osmosis system due to the pressure difference between the seawater desalination feed and the internal pressure of T3, and said generated desalinated water displaces low density fluid from T3. Said displaced low density fluid transfers through or travels through a pipe into T1.

Low density fluid is pumped from T1 to T2, displacing desalinated water in T2. Said displaced desalinated water transfers into a water export pipe or pipeline.

FIGS. 7-10 Example Step-By-Step Description

Step 1: Low Density Fluid Displaces Desalinated Water in the Subsea Tank

A valve in the desalinated water or desalination permeate pipe ('8') between the lower elevation reservoir ('2') and the reverse osmosis desalination system ('RO') may be closed, and a valve between the higher elevation reservoir ('1') and the pump ('3') may open in the pipe between '1' and '3', and the valve in the pipe between '1' and the dynamic pipe or riser ('4') bypassing the '3' may be closed, and a valve in the pipe between the higher elevation region and '4' may be open, and a valve in the pipe between the lower elevation region and '9' may be open, and a valve in the desalinated water export pipe or pipeline '10' may be closed.

Low density fluid may be pumped ('3') from a higher elevation reservoir ('1'), through the dynamic pipe or riser ('4'), into the lower elevation reservoir or subsea tank ('2'), displacing desalinated water from the lower elevation reservoir or subsea tank ('2') through a dynamic pipe or riser ('9'), and into the higher elevation reservoir ('1').

Before pumping is initiated, it may be desirable to close a valve in the desalinated water or desalination permeate pipe ('8') between 'RO' and '2' to, for example, prevent the transfer of pumping pressure to the desalination permeate.

The internal pressure of the lower elevation reservoir ('2') in step 1 may be, for example, about the same as, or equal to, or greater than, or any combination thereof the gravitational hydrostatic pressure of the desalinated water at the water depth of the lower elevation reservoir ('2') and/or plus any pressure drop associated with transferring desalinated water through the pipe or dynamic pipe or riser pipe ('9') into the higher elevation reservoir ('1').

Step 2: Desalinated Water Displaces Low Density Fluid in the Subsea Tank

A valve in the desalinated water or desalination permeate pipe ('8') between the lower elevation reservoir ('2') and the reverse osmosis desalination system ('RO') may be opened, and a valve between the higher elevation reservoir ('1') and the pump ('3') may closed in the pipe between '1' and '3', and the valve in the pipe between '1' and the dynamic pipe or riser ('4') bypassing the '3' may be open, and a valve in the pipe between the higher elevation region and '4' may be open, and a valve in the pipe between the lower elevation region and '9' may be closed, and a valve in the desalinated water export pipe or pipeline '10' may be open.

Due to, for example, the opening of the valve in the pipe ('4') between the lower elevation reservoir ('2') and the higher elevation reservoir ('1'), the internal pressure of the lower elevation reservoir or subsea tank may decrease to a pressure about the same as the gravitational hydrostatic pressure of the low density fluid at the depth of the lower elevation reservoir or subsea tank ('2') and/or the gravitational hydrostatic pressure the elevation difference between the higher elevation reservoir and the lower elevation reservoir.

A pressure difference may exist between the seawater adjacent to the lower elevation reservoir at about the same elevation or seawater desalination feed ('6') and the internal pressure inside the lower elevation reservoir ('2'). The pressure of the desalination permeate pipe ('8') may be about the same as the internal pressure of the lower elevation reservoir ('2') when, for example, the valve in the desalinated water or desalination permeate pipe ('8') between the lower elevation reservoir ('2') and the reverse osmosis desalination system ('RO') may be opened. The pressure difference between '6' and '8' or '2' may be greater than the osmotic pressure of seawater and/or sufficient to drive or power the desalination of the seawater.

For example, seawater desalination feed ('6') may flow into the reverse osmosis desalination system ('RO') at a pressure about the same as the gravitational hydrostatic pressure of seawater at the depth or elevation of the seawater intake, or the RO. In the RO, water in the seawater desalination feed may permeate the semi-permeable desalination membrane while the rejecting at least a portion of the dissolved salts, which may result in the formation of a permeate ('8') comprising desalinated water at about the same pressure as the internal pressure of the lower elevation reservoir ('2') and a retentate or concentrate comprising a concentrated solution of at least a portion of said rejected dissolved salts which may be at about the same pressure as the gravitational hydrostatic pressure adjacent seawater or body of water at the same depth or elevation as RO ('7') if released at about the same elevation or depth as RO. Said permeate transfer through a pipe ('8') into the lower elevation reservoir ('2') displacing low density fluid in the lower elevation reservoir ('2'). Said displaced low density fluid may transfer through the low density fluid pipe between the lower elevation reservoir and higher elevation reservoir ('4') into the higher elevation reservoir ('1'), displacing desalinated water from the higher elevation reservoir ('1') into or through a desalinated water export pipe or pipeline ('10').

In some embodiment, low pressure difference subsea pumps may be employed to facilitate the flow of fluid or liquid. For example, a low pressure difference subsea pump may be employed to pump or transfer the retentate or concentrate from 'RO' through '7' into the ocean or body of water.

FIGS. 11-14 Example Step-By-Step Description

FIGS. 11-14 may be similar to FIGS. 1-4, except, for example, may employ a low density fluid pump, or subsea low density fluid pump located, or any combination thereof at an elevation below the higher elevation reservoir, or an elevation or depth near the lower elevation reservoir or subsea tank, or an elevation or depth about the same as the lower elevation reservoir or subsea tank, or any combination thereof.

FIGS. 15-18 Example Step-By-Step Description

FIGS. 15-18 may be similar to FIGS. 7-10, except, for example, may employ a pretreatment process or system which may be located, for example, near or at about the same elevation as the higher elevation reservoir, or at an elevation near or about same as the elevation of the body of water surface, or the may be located within the same vessel or structure as the higher elevation reservoir, or any combination thereof.

FIGS. 19-22 Example Step-By-Step Description

Step 1: A valve between a subsea tank or lower elevation reservoir ('2') and a desalination system or process ('RO') may be closed. A valve fluidly connected to the low density fluid pipe or riser pipe '4' may be open. A valve between the lower elevation reservoir ('2') and the subsea pump ('3') fluidly connected to the water outlet or water export pipeline ('9') may be open.

The subsea pump ('3') may pump water from the lower elevation reservoir ('2') into the water export pipeline ('9'). Low density fluid may transfer from the higher elevation reservoir ('1') through the low density fluid riser or pipe ('4') and into the lower elevation reservoir or subsea tank ('2'), wherein the low density fluid may displace water in the lower elevation reservoir or may occupy volume in the lower elevation reservoir previously occupied by water. In some embodiments, the pressure inside the lower elevation reservoir may be about the same as the hydrostatic pressure of the low density fluid, minus any pressure drop.

Step 2: A valve between a subsea tank or lower elevation reservoir ('2') and a desalination system or process ('RO') may be open. A valve fluidly connected to low density fluid pipe or riser pipe ('4') may be open. A valve between the lower elevation reservoir ('2') and the subsea pump ('3') fluidly connected to the water outlet or water export pipeline ('9') may be closed.

Desalination feed ('6') may transfer into a desalination system or process ('RO'), which may comprise a pressure driven or membrane-based process. In some embodiments, the desalination feed may be at a pressure about the same as the hydrostatic pressure of seawater at the depth or elevation of the desalination system or process, or lower elevation reservoir, or any combination thereof. The desalination feed may be transferred and/or contacted with the 'feed' side of a desalination membrane. On the opposing side of the desalination membrane, or desalination permeate side, freshwater or desalinated water may exist or may be in contact. In some embodiments, the desalination permeate side may be in contact with or fluidly connected to the lower elevation reservoir or subsea tank ('2'). In some embodiments, the internal pressure of the lower elevation reservoir or subsea tank may be at about the same pressure as the hydrostatic pressure of low density fluid at depth or elevation of the lower elevation reservoir, which may be due to, for example, a valve open in '4'. The internal pressure of the subsea tank or lower elevation reservoir may be significantly less than the pressure of the desalination feed due to, for example, the significant difference in hydrostatic pressure between the desalination feed and the low density fluid, due to, for example, the significant difference in density between the low density fluid and the desalination feed. For example, in some embodiments, the pressure of the desalination permeate may be about the same as the internal pressure of the subsea tank or lower elevation reservoir. For example, in some embodiments, the pressure of the desalination permeate may be about the same as the internal pressure of the subsea tank or lower elevation reservoir, if, for example, a valve between the permeate side of the desalination system or process and the subsea tank or lower elevation reservoir may be open or a valve in '8' may be open. In some embodiments, the water may permeate the desalination membrane from the feed side to the permeate side, forming, for example desalinated water or desalinated water permeate which may transfer into the lower elevation reservoir, displacing at least a portion of the low density fluid in the lower elevation reservoir, and/or a retentate or concentrated comprising saline water or brine, which may be discharged or released in a brine outlet pipe or brine outlet or brine outflow ('7').

In some embodiments, the pressure inside the lower elevation reservoir may be about the same as the hydrostatic pressure of the low density fluid, minus any pressure drop.

FIGS. 23-26 Example Step-By-Step Description

FIGS. 23-26 may be similar to FIGS. 7-10, except, for example, FIGS. 23-26 may show the higher elevation reservoir be located on land, or on a fixed structure, or any combination thereof. In some embodiments, it may be desirable for the higher elevation reservoir, or pump, or low density fluid pump, or any combination thereof to be located on land, or on a fixed structure, or on a fixed platform, or any combination thereof. For example, in some embodiments, by locating the higher elevation reservoir, or pump, or low density fluid pump, or any combination thereof on land, a subsea power cable, or dynamic power cable, or submarine power cable, or any combination thereof may be avoided or the power or capacity required of said cable may be reduced or lowered, if desired.

FIGS. 27-28 Example Step-By-Step Description

FIGS. 27-28 may be similar to FIGS. 5-6, except, for example, a pump may be fluidly connected to water or the water outlet pipeline or water export pipeline and/or may comprise a subsea pump. In some embodiments, FIGS. 27-28 may enable subsea tanks, or the lower elevation reservoir, or T2 and T3, or any combination thereof to operate at a pressure near or about the same as the hydrostatic pressure of low density fluid, during, for example, system or process charging and/or discharging.

FIGS. 29-30 Example Step-By-Step Description

FIGS. 29-30 may be similar to FIGS. 5-6, except, for example, desalination feed may be transferred from a higher elevation region, or desalination pre-treatment or pre-treatment systems or process may be conducted at a higher elevation or in the higher elevation region, or any combination thereof.

FIGS. 31-32 Example Step-By-Step Description

FIGS. 29-30 may be similar to FIGS. 5-6, except, for example, the low density fluid pump may comprise a subsea pump, or may comprise a pump located at an elevation near the lower elevation region or near seabed, or may comprise a pump located at an elevation about the same as the desalination system or process, or may comprise a pump located at an elevation about the same as the lower elevation reservoir or subsea tank(s), or any combination thereof.

FIGS. 33-34 Example Step-By-Step Description

Step 1: Storing Energy by Displacing Water in a Subsea Tank or Lower Elevation Reservoir Using a Low Density Fluid and/or Simultaneously Producing Desalinated Water Desalination Feed Power or electricity is transferred to a low density fluid pump (P1) by a power cable, or a dynamic power cable (E2), or subsea power cable (E1), or an on-board power source, or any combination thereof. Low density fluid is pumped from a higher elevation reservoir (T1) by a low density fluid pump (P1), to a valve (L2, V1), through a pipe, or riser pipe, or dynamic pipe (L4), through a valve (V2) and into the lower elevation reservoir or subsea tank (L5, T2). In the lower elevation reservoir or subsea tank (T2), low density fluid displaces water or desalinated water from the lower elevation reservoir or subsea tank (T2) into a pipe (L14) and/or into a desalinated water export pipe or pipeline (L16).

In some embodiments, desalination feed may be desalinated by a desalination process or system simultaneously. For example, in some embodiments, it may be desirable to power desalination at the same time as powering the charging of the integrated fluid displacement energy storage, for example, because energy storage may be typically charged when the power is lower cost, or available, or renewable, or lower carbon intensity, or desired to be consumed, or any combination thereof. For example, in some embodiments, desalination permeate side of a desalination process may be pumped by a pump or subsea pump (P2), which may cause the pressure of desalination permeate or desalination permeate side (L9 and L10) to decrease, which, may result in the permeation of water through a desalination membrane or desalination process or system (RO) from a desalination feed (L7). For example, desalination feed (L7) may enter the desalination system or process (RO), desalinated water may permeate from the desalination feed through a membrane to the desalination permeate side (L9), while the remaining solution comprising salt or other solute rejected by the membrane may comprise a concentrate or brine (L8) and/or may be discharged or released (L8).

In some embodiments, water from the desalination process or system (L15) may be merged with desalinated water stored in and displaced from the lower elevation reservoir (L14) in, for example, a valve (V6) and/or the desalinated water may be transferred in a water export pipe or pipeline (L16), which may transfer desalinated water to an application for water.

In some embodiments, desalinated water generated during discharging may be stored in the lower elevation reservoir or subsea tank. For example, in some embodiments, the discharging of the energy storage may inherently involve desalinating water and/or the desalination occurring due to the displacement of low-density fluid with desalinated water in the lower elevation reservoir or subsea tank, which may inherently involve the storage or storing of water in a subsea tank or lower elevation reservoir. During charging, stored desalinated water may be displaced or transferred from storage to other storage, or to any application using water, or any combination thereof. If desired, additional water may be desalinated during charging, which may be desirable to enable, for example, greater utilization of the desalination process or system, or greater total desalinated water production, or any combination thereof.

Step 2: Generating Desalinated Water from Stored Energy by Allowing Desalinated Water Permeate to Displace Low Density Fluid in the Subsea Tank or Lower Elevation Reservoir A valve, V6, may be closed, which may, for example, prevent desalinated water or water from exiting the lower elevation reservoir or subsea tank into the water export pipe or pipeline.

Valve, V2, may be closed flow to or from L5 and may be opened to flow from L6. The pressure of L6 may decrease to a pressure about the same as the pressure of L4, which may be a pressure about the same as the hydrostatic pressure of low density fluid in at the depth or elevation of the lower elevation region, or lower elevation reservoir, or 'near seabed', or any combination thereof. Low density fluid may transfer from the lower elevation reservoir or subsea tank (T2), through a pipe (L7 entering PX) into the pressure exchanger (PX). In some embodiments, the pressure of low density fluid in L7 entering PX may be about the same as the internal pressure of the lower elevation reservoir or subsea tank (T2). High pressure low density fluid (L7 entering PX), which may comprise low density fluid with a pressure about the same as the internal pressure of the lower elevation reservoir or subsea tank, may enter the pressure exchanger (PX) and exit the pressure exchanger as a lower pressure low density fluid (L6) which may comprise low density fluid with a pressure about the same as the hydrostatic pressure of low density fluid at the depth or elevation of the lower elevation reservoir. Simultaneously, desalinated water permeate (L11) may enter the pressure exchanger (PX) at a pressure about the same as the hydrostatic pressure of the low density fluid or about the same pressure as L6 plus or minus any pressure losses in the pressure exchanger (PX), and/or the desalinated water permeate (L12) may exit the pressure exchanger (PX) at a pressure about the same as the internal pressure of the lower elevation reservoir or subsea tank (T2) minus any pressure losses in the pressure exchanger (PX). The pressure exchanger may extract the pressure difference or power in the pressure difference between low density fluid at the internal pressure of the lower elevation reservoir or subsea tank (T2) and the hydrostatic pressure of low density fluid at about the same the depth or elevation of the lower elevation reservoir or subsea tank (L4). In some embodiments, the internal pressure of the lower elevation reservoir or subsea tank (T2) may be about the same as, for example, the pressure of the adjacent seawater or body of water at the same elevation or depth plus or minus a tolerance pressure, or the hydrostatic pressure of desalinated water at the depth or elevation or the lower elevation reservoir or subsea tank (T2), or the hydrostatic pressure of desalinated water at the depth or elevation or the lower elevation reservoir or subsea tank (T2) plus or minus a pressure drop associated with the transfer of fluids such as low density fluid or desalinated water, or any combination thereof.

In some embodiments, the pressure exchanger may function as a type of pump, wherein the pump may be powered by, or mechanically or hydraulically driven by, for example, low density fluid moving from a higher pressure (T2, L7 entering PX), or a pressure about the same as the internal pressure of the lower elevation reservoir or subsea tank, to a lower pressure (L6, L4), or a pressure about the same as the hydrostatic pressure of low density fluid at the depth or elevation of the lower elevation reservoir or subsea tank. For example, in some embodiments, the difference in pressure between L7 (entering PX) and L6 may power the pumping or transfer of desalination permeate, for example, reducing the pressure of PX water input or desalinated water permeate (L9 and L11) to a pressure near the pressure of L6 plus any pressure losses in the pressure exchanger, which may result in the permeation of water in RO or production of desalination permeate from the difference in pressure between desalination feed (L17), which may have a pressure about the same as the hydrostatic pressure of seawater or body of water at the depth of the desalination process or system or lower elevation region, and the PX desalinated water permeate (L9 and L11). The desalinated water exiting the PX (L12) may be at a pressure about the same as the internal pressure of the lower elevation reservoir or subsea tank minus any pressure losses in the pressure exchanger. In some embodiments, a low pressure difference pump (LPP1) may pump or increase the pressure of the desalinated water exiting the PX (L12) from a pressure about the same as internal pressure of the lower elevation reservoir or subsea tank minus any pressure losses in the pressure exchanger (pressure of L12) to a pressure about the same as internal pressure of the lower elevation reservoir or subsea tank (pressure of L13). For example, the low pressure difference pump (LPP1) may provide supplemental pressure, or power, or pumping to, for example, make up at least for any pressure losses in the pressure exchanger (PX). The desalinated water (L13) may be transferring into the lower elevation reservoir or subsea tank (T2), and may displace low density fluid in the subsea tank. Low density fluid exiting the pressure exchanger (L6) may be transferred through a riser or pipe (L4) to the higher elevation reservoir or tank (T1).

EXAMPLE EMBODIMENTS

1. A system for desalination comprising:
A first storage reservoir configured to be near the surface of a body of water and configured to store a low density fluid;
A second storage reservoir configured to be located below the surface of the body of water; and
A desalination system;
Wherein desalinated water is produced by allowing desalination permeate to displace low density fluid in the second reservoir and transfer the low density fluid from the second reservoir to the first reservoir; and
Wherein desalinated water is exported by transferring low density fluid from the first reservoir into the second reservoir to displace desalinated water from the second reservoir into a water export pipeline.

2. The system of example embodiment 1 wherein the low density fluid comprises a liquid with a density less than the density of water.

3. The system of example embodiment 1 further comprising a pump fluidly connected to the low density fluid.

4. The system of example embodiment 3 wherein the pump is located at an elevation about the same as the first reservoir.

5. The system of example embodiment 3 wherein the pump is located at an elevation about the same as the second reservoir.

6. The system of example embodiment 3 wherein the pump is located at an elevation above first reservoir and below the second reservoir.

7. The system of example embodiment 1 further comprising a desalinated water export pipe transferring said displaced desalinated water from the second reservoir to an application for desalinated water.

8. The system of example embodiment 7 further comprising a pump fluidly connected to the desalinated water export pipe to facilitate the transfer of desalinated water through the desalinated water export pipe.

9. The system of example embodiment 7 further comprising a pump fluidly connected to the desalinated water export pipe to pump desalinated water from the second reservoir and allow low density fluid to displace desalinated water in the second reservoir.

10. The system of example embodiment 1 wherein the second reservoir comprises at least two tanks comprising a first tank and a second tank.

11. The system of example embodiment 10 wherein desalination permeate displaces low density fluid in the first tank; and Wherein low density fluid displaces desalination permeate in the second tank.

12. The system of example embodiment 11 wherein said displacing in the first tank is conducted simultaneously to said displacing in the second tank.

13. The system of example embodiment 11 wherein the operating mode of the first tank and second tank are periodically swapped such that low density fluid displaces desalination permeate in the first tank; and Wherein desalination permeate displaces low density fluid in the second tank.

14. The system of example embodiment 13 wherein said swapping enables desalination to be conducted continuously.

15. The system of example embodiment 13 wherein said swapping occurs when the volume of low density fluid or desalinated water in the first tank, or second tank, or both reach a desired percentage of tank volumetric capacity.

16. The system of example embodiment 15 wherein the desired percentage of tank volumetric capacity is greater than 70 volume percentage of tank volumetric capacity.

17. The system of example embodiment 1 wherein the desalination system comprises reverse osmosis.

18. A process for desalination comprising:

Exposing a permeate side of a desalination membrane to the hydrostatic pressure of a low density fluid in a second reservoir; Exposing a desalination feed side of a desalination membrane to the hydrostatic pressure of a body of water;

Allowing at least a portion of the water in the desalination feed to permeate the desalination membrane from the desalination feed side to the desalination permeate side;

Allowing the transfer of the desalination permeate into the second reservoir, displacing at least a portion of low density fluid in the second reservoir and transferring the low density fluid from the second reservoir to a first reservoir; and Wherein the elevation of the first reservoir is above the elevation of the second reservoir.

19. The process of example embodiment 18 wherein the desalination membrane comprises a reverse osmosis process or nanofiltration process.

20. The process of example embodiment 18 wherein the desalination membrane is located at an elevation or depth about the same as the elevation or depth of the second reservoir.

21. The process of example embodiment 18 further comprising regenerating the process by pumping low density fluid into the second reservoir displacing desalinated water in the second reservoir; and transferring said desalinated water displaced from the second reservoir to an application for desalinated water.

22. The process of example embodiment 18 wherein the hydrostatic pressure of low density fluid is less than the hydrostatic pressure of the body of water by a pressure difference greater than the osmotic pressure of the desalination feed.

23. The process of example embodiment 18 wherein the hydrostatic pressure of low density fluid includes any pressure losses or pressure drop associated with the transfer of low density fluid.

24. The process of example embodiment 18 wherein the hydrostatic pressure of the body of water includes any pressure losses or pressure drop associated with the transfer or pretreatment of seawater intake.

25. The process of example embodiment 18 wherein a pipe or riser pipe transfers low density fluid between the first reservoir and second reservoir.

26. The process of example embodiment 18 wherein the low density fluid has a solubility in water of less than 1 gram of low density fluid per 100 grams of water.

27. The process of example embodiment 18 wherein the body of water comprises a sea or ocean.

29. The process of example embodiment 18 wherein the elevation difference between the first reservoir and second reservoir is greater than or equal to 500 meters.

30. The process of example embodiment 18 wherein the desalination feed comprises seawater.

31. The process of example embodiment 18 wherein the desalination feed comprises produced water.

¬32. The process of example embodiment 18 wherein the body of water comprises desalination feed in a pipe or conduit.

33. The process of example embodiment 18 wherein the low density fluid comprises a liquid.

34. The process of example embodiment 18 wherein the low density fluid comprises n-Butane.

35. A process for desalination comprising:

Producing desalinated water by allowing desalinated water from a desalination process to displace low density fluid from a second reservoir into a first reservoir;

Exporting desalinated water from the second reservoir by transferring low density fluid from a first reservoir into the second reservoir to displace at least a portion of the desalinated water in the second reservoir; and Wherein said first reservoir is located subsea; and Wherein said second reservoir is located above the first reservoir.

Example Embodiment which may be independent, if desired:

A system for desalinating water comprising:

A first storage reservoir configured to be near the surface of a body of water and configured to store a low density fluid;

A second storage reservoir configured to be located below the surface of the body of water; and A desalination system;

Wherein desalinated water is produced by allowing desalination permeate to displace low density fluid in the second reservoir to return the low density fluid to the first reservoir; and Wherein desalinated water is exported by transferring low density fluid from the first reservoir into the second reservoir to displace desalinated water from the second reservoir.

Example Embodiment which may be independent, if desired:

A process for desalinating water comprising:

Producing desalinated water by allowing desalinated water permeate from a desalination process to displace low density fluid from a first reservoir into a second reservoir;

Exporting desalinated water from the first reservoir by transferring low density fluid from a second reservoir into the first reservoir to displace at least the desalinated water in the first reservoir;

Wherein said first reservoir is located subsea; and

Wherein said second reservoir is located above the first reservoir.

A process for desalination comprising:

Exposing a permeate side of a desalination membrane to the hydrostatic pressure of a low density fluid in a second reservoir;

Exposing a desalination feed side of a desalination membrane to the hydrostatic pressure of a body of water;

Allowing at least a portion of the water in the desalination feed to permeate the desalination membrane from the desalination feed side to the desalination permeate side;

Allowing the transfer of the desalination permeate into the first reservoir, displacing at least a portion of low density fluid in the first reservoir and transferring the low density fluid from the second reservoir to a first reservoir; and Wherein the elevation of the first reservoir is above the elevation of the second reservoir. Example Embodiment which may be dependent, if desired:

The process or system of embodiment _____ wherein the low density fluid comprises a liquid The process or system of embodiment _____ wherein the low density fluid comprises a liquid with a density less than the density of water.

Pump on LDF

Pump on LDF located at an elevation about the same as the second reservoir

Pump on LDF located at an elevation about the same as the first reservoir

Pump on LDF located at an elevation above first reservoir and below the second reservoir Further comprising a desalinated water export pipe transferring said displaced desalinated water from the first reservoir to an application for desalinated water Pump fluidly connected to the desalinated water export pipe to facilitate the transfer of desalinated water through the pipeline Pump fluidly connected to the desalinated water export pipe to facilitate the transfer of desalinated water through the pipeline Pump fluidly connected to the desalinated water export pipe to facilitate the transfer of desalinated water from the first reservoir Pump fluidly connected to the desalinated water export pipe to pump desalinated water from the first reservoir and allow low density fluid displace desalinated water Wherein said application for desalinated water comprises a municipal water system A system for desalinating water comprising:

A first storage reservoir configured to be near the surface of a body of water and configured to store a low density fluid;

A second storage reservoir configured to be located below the surface of the body of water;

A pump; and

A desalination system;

Wherein the pump, desalination system, and the first and second reservoirs are operatively connected such that desalinated water is produced by allowing desalinated water permeate to displace low density fluid from the second reservoir to return to the first storage reservoir.

A system for desalinating water comprising:

A first storage reservoir configured to be near the surface of a body of water and configured to store a low density fluid;

A second storage reservoir configured to be located below the surface of the body of water;

A pump; and

A desalination system;

Wherein the pump, desalination system, and the first and second reservoirs are operatively connected such that desalinated water is transferred from the second reservoir by displacing water with the low density fluid and desalinated water is produced by allowing desalinated water permeate to displace low density fluid from the second reservoir to return to the first storage reservoir.

A system or method for desalinating water comprising:

A first reservoir configured to store a low density fluid at a higher elevation

A second reservoir configured to store desalinated water at a lower elevation

Transferring low density fluid from the first reservoir to the second reservoir to displace desalinated water from the second reservoir Desalinating water by allowing desalination permeate to displace low density fluid in the second reservoir Notes Note: In some embodiments, the volume or amount of low density fluid in the higher elevation reservoir may remain relatively constant due to, for example, the flow rate of low density fluid entering or being transferred into at least a first subsea tank being about the same as the flow rate of low density fluid exiting or being transferred out of at least a second subsea tank, which may be occurring simultaneously.

Note: In some embodiments, gases dissolved in the seawater may be released or form gas during desalination due to, for example, the potential reduction in pressure. In some embodiments, systems and methods for releasing or removing formed gases may be employed. For example, gases may accumulate in upper portions of equipment or tanks and may be periodically released or pumped out. In some embodiments, the dissolved gases released may comprise, for example, including, but not limited to, one or more or any combination of the following: oxygen, or nitrogen, or carbon dioxide, or argon, or hydrogen sulfide, or methane, or any combination thereof.

Note: A constant volume tank may comprise, for example, a storage tank in which the total stored fluid inside the tank at changes by less than or equal to one or more or any combination of the following: 0.1%, or 0.5%, or 1%, or 1.5%, or 2%, or 3%, or 4%, or 5%, or 6%, or 7%, or 8%, or 9%, or 10%, or 20%, or 30%, or 40%, or 50%, or 60%, or 70%. For example, a storage tank in which the total stored liquid inside the tank at changes by less than or equal to one or more or any combination of the following: 0.1%, or 0.5%, or 1%, or 1.5%, or 2%, or 3%, or 4%, or 5%, or 6%, or 7%, or 8%, or 9%, or 10%, or 20%, or 30%, or 40%, or 50%, or 60%, or 70%. For example, a storage tank in which the total stored fluid inside the tank at changes less than or equal to one or more or any combination of the following: 0.1%, or 0.5%, or 1%, or 1.5%, or 2%, or 3%, or 4%, or 5%, or 6%, or 7%, or 8%, or 9%, or 10%, or 20%, or 30%, or 40%, or 50%, or 60%, or 70%, during the storing of power, or generating of power, or any combination thereof. For example, a storage tank in which the total stored fluid inside the tank changes by less than the total volume of fluid entering and/or exiting the tank when the energy storage system is charged from 10% to 90% energy storage capacity, or when the energy storage system is discharged from 90% to 10% energy storage capacity.

Note: Applications of water or desalinated water may comprise, including, but not limited to, one or more or any combination of the following: municipal water, or water system, or cooling, or evaporative cooling, or agriculture, or city water, or drinking water, or livestock water, or industrial water, or water treatment, or chemical production, or pulp & paper production, or manufacturing, or power generation, or data centers, or direct to chip cooling, or thermal management, or cleaning, or residential water consumption, or commercial water consumption, or industrial water consumption, or oil & gas production, or mining, or separations, or processing, or gas processing, or steam reforming, or hydrogen production, or gas separations, or CO2 capture, or e-fuel production, or fuel production, or chemical feedstock, or waste management, or wastewater, or waste transfer, or waste disposal, or sewerage system, or rocket fuel, or proponent, or propulsion, or applications described herein, or applications known in the art, or any combination thereof.

Note: "About the same as" may compare a property of two or more objects or things. "About the same as" may indicate a property of a first object is within +/−0.1%, or +/−0.5%, or +/−1%, or +/−1.5%, or +/−2%, or +/−3%, or +/−4%, or +/−5%, or +/−6%, or +/−7%, or +/−8%, or +/−9%, or +/−10%, or +/−20%, or +/−30%, or +/−40%, or +/50% of said property of a second object. "About the same as" may indicate a property of a second object is within +/−0.1%, or +/−0.5%, or +/−1%, or +/−1.5%, or +/−2%, or +/−3%, or +/−4%, or +/−5%, or +/−6%, or +/−7%, or +/−8%, or +/−9%, or +/−10%, or +/−20%, or +/−30%, or +/−40%, or +/50% of said property of a first object. In some embodiments, said +/− percentages may be percentages or portions of the maximum difference in the property within the system. For example, in some embodiments, if the elevation difference between a first reservoir and a second reservoir is 1,000 meters, and the elevation of a pump is at about the same elevation as the second reservoir, said pump may be at an elevation within +/−0 to 50% of 1,000 meters of the elevation of the second reservoir, or +/−0 to 500 meters from the second reservoir.

Note: In some embodiments, one or more or any combination of components or subsea components or unit operations may be suspended or floating or tethered using, for example, buoyancy modules and/or anchoring or mooring systems or methods.

Note: In some embodiments, one or more or any combination of, for example, the subsea tank, or subsea desalination system, or subsea pipeline, or subsea cable, or risers, or pipes, or pressure exchangers, or pumps, or seawater intake, or brine discharge outlet, or seawater intake inlet, or any combination thereof may be suspended or floating or tethered using, for example, buoyancy modules and/or anchoring or mooring systems or methods.

Note: Desalination system instead of or in addition to reverse osmosis may be employed. For example, other pressure driven desalination systems may be employed instead of or in addition to reverse osmosis. For example, in some embodiments, including, but not limited to, one or more or any combination of the following may be employed: vapor-gap membrane distillation, or nanofiltration, or osmotically assisted reverse osmosis, or alternative membrane reverse osmosis, or phase change desalination, or temperature change desalination, or pressure drop desalination, or electrodialysis reversal, or electrodialysis.

Note: It may be desirable for the density of the low density fluid to be less than 0.95 kg/L.

Note: [Solubility of low density fluid in water]

Note: The gravitational hydrostatic pressure or the pressure applied by the low density fluid in the subsea tank may reduce or minimize the potential for subsea cavitation and/or the substantial generation or release of dissolved gases during the formation and/or transfer of desalination permeate or desalinated water.

Note: It may be desirable to minimize the potential of low density fluid to dissolve or mix with desalinated water. For example, in some embodiments, it may be desirable for the low density fluid to be insoluble or practically insoluble in water. For example, in some embodiments, the dissolution of low density fluid in the desalinated water may be further minimized by, for example, including, but not limit to, one or more or any combination of the following: the stability of the liquid-liquid interface in the lower elevation reservoir or subsea tank, the limited residence time of desalinated water in the subsea tank, the rate of diffusion from the liquid-liquid interface, the design of the subsea tank.

Note: In some embodiments, if any low density fluid dissolves in the desalinated water or permeate, it may be desirable to recover at least a portion of the dissolved low density fluid, or destroy or oxidize at least a portion of the dissolved low density fluid, or any combination thereof. For example, the dissolved low density fluid may be recovered or removed by, for example, a stripping gas or vacuum recovery. For example, the dissolved low density fluid may be recovered or removed by, for example, aeration or air stripping gas. For example, in some embodiments, dissolved low density fluid may be destroyed or oxidized by, for example, ozone oxidation, or catalytic oxidation, or chemical reaction, or any combination thereof.

Note: In some embodiments, it may be desirable to employ a low density fluid which may be less prone to biological growth or biofouling or degradation or oxidation. For example, n-Butane, or Pentane, or Hexane, or any combination thereof may be generally not or less prone to biological growth or biofouling or degradation or oxidation. For example, in some embodiments, a low density fluid which may be otherwise prone to biological growth or biofouling or degradation or oxidation, may be employed by employing, for example, treatments or inhibitors to prevent or reduce biological growth or biofouling or degradation or oxidation.

Note: In some embodiments, the lower elevation reservoir or subsea tank(s) may comprise tanks not prone or less prone to degradation, such as, for example, including, but not limited to, one or more or any combination of the following: lined tanks, or steel tanks with lining, or steel tanks with plastic lining, or coated tanks, or stainless steel tanks, or aluminum tanks, or plastic lined tanks, or fiberglass tanks, or carbon fiber tanks, or composite tanks, or concrete tanks, or any combination thereof. It may be desirable for any lining or tank material to be compatible with the low density fluid and/or desalinated water and/or seawater. For example, if n-Butane is employed and the tank employs a plastic lining, it may be desirable for the plastic lining to comprise a Teflon or fluorinated plastic. In some embodiments, the lower elevation reservoir or subsea tank(s) may comprise steel tanks with anticorrosion coating and/or cathodic protection.

Note: In some embodiments, the desirable depth may comprise a water depth wherein a liquid column comprising low density liquid may have a hydrostatic pressure less than the hydrostatic pressure of desalination feed or seawater by a pressure difference sufficient to enable the desalination of at least a portion of desalination feed.

Note: In some embodiments, for example, the operating mode of subsea tanks or lower elevation reservoir tanks may be swapped when the stored volume of low density fluid, or water or desalinated water in reaches a desired percentage of tank volumetric capacity. In some embodiments, it may be desirable to swap the operating mode of a tank from displacing water with low density fluid to displacing low density fluid with water, when, for example, low density fluid is fully displaced or no longer substantially present in a tank. In some embodiments, it may be desirable to swap the operating mode of a tank from displacing water with low density fluid to displacing low density fluid with water, when, for example, volume of low density fluid in the tank is near a lower limit to prevent water from substantially entering low density fluid piping or other equipment. In some embodiments, it may be desirable to swap the operating mode of a tank from displacing low density fluid with water or desalinated water to displacing water with a low density fluid, when, for example, water is fully displaced or no longer substantially present in a tank. In some embodiments, it may be desirable to swap the operating mode of a tank from displacing low density fluid with water or desalinated water to displacing desalinated water or water with a low density fluid, when, for example, volume of water in the tank is near a lower limit to prevent low density fluid from substantially entering water or desalinated water piping or other equipment. In some embodiments, the desired percentage of tank volumetric capacity may comprise, including, not limited to, less than, or greater than, or equal to, or any combination thereof one or more or any combination of the following percentages: 10%, or 20%, or 30%, or 40%, or 50%, or 55%, or 60%, or 65%, or 70%, or 75%, or 80%, or 85%, or 90%, or 95%, or 96%, or 97%, or 98%, or 99%, or 99.5%, or 99.7%, or 99.8%, or 99.9%.

Note: In some embodiments, electricity or power may be supplied by a subsea power cable, or submarine power cable, or dynamic power cable, or offshore substation, or umbilical, or suspended power cable, or tethered power cable, or floating power cable, or underground power cable, or any combination thereof. In some embodiments, electricity or power may be provided by an offshore power source, or an onshore power source, or any combination thereof, which may include, but is not limited to, one or more or any combination of the following: offshore wind turbine, or offshore floating wind turbine, or onshore wind turbine, or offshore wind farm, or onshore wind farm, or onshore solar farm, or offshore solar farm, or hydropower, or geothermal power, or solar power, or wind power, or solar PV, or solar thermal, or tidal power, or wave power, or ocean thermal energy conversion (OTEC), or ocean kinetic energy power, or floating solar power, or osmotic power, or power from differences in salinity, or power from differences in density, or power from differences in density of fluids, or nuclear power, or floating nuclear power, or combustion of one or more or any combination of hydrocarbons, or combustion of hydrogen, or hydrogen, or ammonia, or methanol, or energy carrier fuel, or formic acid, or dimethyl ether, or renewable fuel, or biomass, or biogas, or biofuel, or sustainable aviation fuel, or ethanol, or biological electricity source, or hydropower, or hydrokinetic power, or natural gas power, or diesel power, or bunker oil power, or LNG power, or coal power, or sulfur power, or waste heat to power, or nuclear fission power, or nuclear fusion power, or energy storage power, or stored power, or light power, or transferred power. In some embodiments, electricity or power may be supplied from an onshore electricity grid, or onshore power source, or any combination thereof.

Note: In some embodiments, at least a portion of power may be generated from the depressurization or opening of a valve in the LDL pipe or riser between the subsea tank or lower elevation tank and the higher elevation or surface tank. In some embodiments, the pressure of the LDL may be reduced from near or about the same as or equal to or greater than the hydrostatic pressure of freshwater, or desalinated water, or seawater, or desalination feed, or any combination thereof, to a pressure near or about the same as the pressure of the hydrostatic pressure of LDL at the elevation or depth. The reduction of pressure may result in at least a portion of expansion of the low density fluid. Even, for example, if the low density fluid is a liquid, the potential expansion or increase in volume due to the reduction in pressure and/or, for example, the bulk modulus of the low density fluid, may result in an increase in volume.

Note: In some embodiments, at least a portion of power may be generated from the flow of fluid or a fluid pressure difference using, for example, including, but not limited to, one or more or any combination of the following: a generator, or turbine, or hydraulic power recovery turbine, or a pump, or a pump-turbine, or a turbocharger, or a turbocharger-style pressure exchanger, or a mechanical exchange, or a pressure exchanger, or a PX pressure exchanger, or a pressure exchanger configuration, or a desalination membrane, or a semi-permeable membrane, or a pressure driven separation process, or a pressure-difference driven desalination process, or a reverse osmosis system, or a nanofiltration system, or any combination thereof.

Note: In some embodiments, the desalination system or process may comprise including, but not limited to, one or more or any combination of the following: reverse osmosis, or nanofiltration, or ultrafiltration, or osmotically assisted reverse osmosis, or high pressure reverse osmosis, or disc and tube reverse osmosis, or membrane distillation, or pressure driven distillation, or vapor-gap membrane, or membrane-based process, or pressure-difference driven desalination, or any combination thereof.

Note: In some embodiments, a pipe may comprise a conduit. For example, where the word 'pipe' and the word 'conduit' may be employed interchangeably.

Note: In some embodiments, sensors or other devices may be employed to measure and/or monitor and/or control the level of liquid-liquid interfaces in tanks, such as the liquid-liquid interface between desalinated water and low density fluid. Some embodiments may employ flow meters and/or flow controllers to measure and/or monitor and/or control the flow rate of low density fluid and/or desalinated water and/or seawater desalination feed.

Note: In some embodiments, pumping or supplemental pumping may be provided on the desalination feed side, or desalination permeate side, or water output side, or any combination thereof to, for example, facilitate desalination or process operations.

Note: In some embodiments, a low density fluid valve opens, a desalination permeate water valve opens, and a desalinated water output or export valve closes, to, for example, enable the subsea tank to have an internal pressure about the same as the gravitational hydrostatic pressure of the low density fluid, enabling desalination and displacement of low density fluids with freshwater due to the pressure difference between the internal pressure of the tank and the hydrostatic pressure of the adjacent seawater (which may be about the same pressure as the RO inlet or feed seawater pressure).

Note: In some embodiments, a lower elevation reservoir, or lower elevation tank, or subsea tank may comprise a tank with a fluid-fluid interface, or a tank with a liquid-liquid interface, or a tank with a floating barrier or divider, or a tank with a barrier or divider, or a tank with a hydraulic cylinder, or a tank with a hydraulic plunger, or tank with a hydraulic piston, or a piston, or any combination thereof.

Note: In some embodiments, when the system is neither charging or discharging, the position of the fluid-fluid interface or hypothetical fluid-fluid interface may remain relatively constant. In some embodiments, a portion of high density fluid may diffuse into the low density fluid, or a portion of low density fluid may diffuse into the high density fluid, which may change the relative amounts of high density fluid or low density fluid, or position or elevation of the fluid-fluid interface, or any combination thereof. In some embodiments, a portion of high density fluid, or low density fluid, or any combination thereof may be treated, or may undergo a process to recover or remove contaminants, or undergo a process to recover or remove constituents of the other fluid, or any combination thereof, which may result in changes to the position or elevation of a fluid-fluid interface, or may result in changes to the relative volumes or amounts of fluids in the tank, or any combination thereof.

In some embodiments, a floating or suspended barrier or plate or physical divider may be located between the low density liquid layer and the high density liquid layer. If said physical divider is floating, it may be desirable for said physical divider to comprise a material or combination of materials and/or may have an overall density less than the density of the high density liquid and a density greater than the density of the low density liquid.

In some embodiments, the high density fluid may be soluble in the low density fluid, or the low density fluid may be soluble in the high density fluid, or any combination thereof. In some embodiments, high density fluid and/or low density fluid may mix. In some embodiments, said mixing of the high density fluid and/or low density fluid may be inadvertent. In some embodiments, said mixing of the high density fluid and/or low density fluid may be an aspect of the design or within the nature of the process. For example, some mixing of the high density fluid and/or low density fluid may occur in, including, but not limited to, one or more or any combination of the following: in a pressure exchanger, or in the higher elevation reservoir, or in the lower elevation reservoir, or in another location in the system or process, or any combination thereof. In some embodiments, the rate of mixing between the low density fluid and high density fluid may be unpredictable. In some embodiments, the rate of mixing between the low density fluid and high density fluid may be predictable. In some embodiments, mixing of the low density fluid and high density fluid may not result in a dissolution of low density fluid into the high density fluid, or high density fluid into the low density fluid, or any combination thereof. In some embodiments, mixing of the low density fluid and high density fluid may result in a dissolution of low density fluid into the high density fluid, or high density fluid into the low density fluid, or any combination thereof. In some embodiments, the high density fluid may be regenerated or purified, or the low density fluid may be regenerated or purified, or any combination thereof. In some embodiments, regeneration or purification may be conducted in a manner which is batch, or semi-batch, or continuous, or any combination thereof. For example, the high density fluid may be regenerated or purified, or the low density fluid may be regenerated or purified, or any combination thereof using, for example, including, but not limited to, one or more or any combination of desalination or separation processes described herein or known in the art.

In some embodiments, regeneration or purification may involve treating, or concentrating, or purifying only a portion of the high density fluid or the low density fluid.

Reverse Osmosis or Nanofiltration or Membrane Based Process

For example, in some embodiments, the high density fluid may comprise a salt brine and the low density fluid may comprise freshwater or seawater. In some embodiments, a portion of high density fluid comprising a salt brine may mix with a portion of low density fluid comprising freshwater or seawater, which may result in the low density fluid comprising a higher salinity or salt concentration and/or the brine comprising a lower salinity or salt concentration. In some embodiments, at least a portion of the low density fluid comprising freshwater or seawater with a higher salinity may be transferred into a reverse osmosis desalination system as the feed solution, forming a salt solution retentate and freshwater with a lower salinity or desalinated water with lower salinity.

In some embodiments, the retentate may be further concentrated or the brine may be concentrated, using, for example, including, but not limited to, one or more or any combination of the following: high pressure reverse osmosis, or high pressure nanofiltration, or DTRO, or forward osmosis, or osmotically assisted reverse osmosis, or distillation, or membrane distillation, or evaporation, or salting out, or solventing out, or cryodesalination, or zero liquid discharge techniques. If or when said further concentrated retentate possesses a salt concentration, or salinity, or osmotic pressure, or any combination thereof near, or equal to, or greater than the high density fluid, said further concentrated retentate may be transferred to or mixed with the high density fluid comprising salt brine.

For example, in some embodiments, the low density fluid may comprise salt water with a lower salinity or salt concentration than a high density fluid, which may comprise, for example, a salt brine. For example, in some embodiments, the salt concentration or osmotic pressure or density of the low density fluid may be designed to be similar to, or less than, or greater than the salinity or osmotic pressure or density of ocean water or seawater or desalination feed. If or when the salinity or osmotic pressure of at least a portion of low density fluid increases due to mixing with the high density fluid comprising salt brine, it may be desirable to add water or other dilutant to the low density fluid. In some embodiments, the excess volume of low density fluid due to the dilution may be discharged into the ocean if, for example, the low density fluid comprises the same or similar composition as ocean water. In some embodiments, seawater or treated seawater may comprise a dilutant.

In some embodiments, it may be desirable to concentrate the brine and/or add any makeup salt or brine solution from any potential losses. Concentrating using evaporation, or distillation, or membrane distillation, or membrane based process, or any combination thereof.

In some embodiments, if brine is employed as a high density fluid, it may be desirable to concentrate the brine or remove water from the brine. In some embodiments, concentrating of the brine or removing water from the brine may comprise concentrating or removing water from at least a portion of the brine using, for example, including, but not limited to, one or more or any combination of the following: evaporation, or distillation, or membrane distillation, or membrane based process, or freeze desalination, or cryodesalination, or solventing out, or precipitation.

In some embodiments, one or more or a combination of mechanisms may be employed to ensure physical dividers are in the appropriate location, or are near or in or providing a barrier at a liquid-liquid interface or other fluid-fluid interface, or any combination thereof. In some embodiments, the placement or movement of a physical divider may be enabled or facilitated by a passive mechanism. For example, a passive mechanism may involve a mechanism which enables the physical divider to move, such as rise or fall, with the level of layers or the level of a liquid-liquid interface or other fluid-fluid interface utilizing the change in position of the liquid-liquid interface or the position or volume of a liquid layer. It is important to note one or more or any combination of passive mechanisms may be combined. It is important to note one or more or any combination of passive mechanisms may be combined and/or may be combined with one or more or any combination of active mechanisms.

In some embodiments, a hypothetical fluid-fluid interface may comprise where a fluid-fluid interface may exist or be present, if, for example, a barrier or divider was not present. For example a passive mechanism may comprise, including, but not limited to, one or more or any combination of the following:

A physical divider with a density less than the density of one layer and greater than the density of another layer, which may enable the physical divider to naturally gravitate to a position between the lower density layer and the higher density layer due to intrinsic buoyancy properties and/or may enable the physical divider to be positioned at the liquid-liquid or other fluid-fluid interface between two layers.

A physical divider which may utilize hydrophobicity and/or hydrophilicity and/or surface tension to facilitate its position within a tank and/or to minimize mixing between layers. For example, a physical divider may be located between two liquid phases wherein both liquid phases are hydrophilic and, by employing hydrophobic surfaces on at least one side of the physical divider and/or hydrophilic surfaces on at least one side of the physical divider, the physical divider may gravitate to a position between the two liquid phases or a position at the liquid-liquid interface between two liquid phases. For example, a physical divider may be located between two liquid phases wherein both liquid phases are hydrophobic and, by employing hydrophobic surfaces on at least one side of the physical divider and/or hydrophilic surfaces on at least one side of the physical divider, the physical divider may gravitate to a position between the two liquid phases or a position at the liquid-liquid interface between two liquid phases. For example, a physical divider may be located between two liquid phases wherein at least one liquid phase is hydrophilic in a temperature range and at least one liquid phase is hydrophilic in a different temperature range, and, by employing hydrophobic surfaces on at least one side of the physical divider and/or hydrophilic surfaces on at least one side of the physical divider, the physical divider may gravitate to a position between the two liquid phases or a position at the liquid-liquid interface between two liquid phases. For example, a physical divider may be located between two liquid phases and the physical divider may be hydrophilic. For example, a physical divider may be located between two liquid phases and the physical divider may be hydrophobic.

A physical divider which may utilize surface tension. For example, a physical divider may utilize the surface tension at a liquid-liquid interface or other fluid-fluid interface to enable positioning at a liquid-liquid interface or other fluid-fluid interface. For example, a physical divider may utilize the difference in surface tension between two liquid phases. For example, a physical divider may employ material surface properties, such as surface geometry, to utilize surface tension to position a physical divider at a liquid-liquid interface. For example, surface tension or capillary forces may be employed to enable positioning of the physical divider. For example, the surface tension or capillary forces utilized may not be limited to surface tension or capillary forces at a liquid-liquid interface, and may also include, but is not limited to, surface tension or capillary forces between the physical divider and the tank wall, or the physical divider and tank wall in the presence of a liquid-liquid interface, or any combination thereof.

A physical divider may employ geometry and/or initial placement or positioning to maintain position or maintain a position at a liquid-liquid interface or at a hypothetical liquid-liquid interface. For example, a physical divider may employ a convex or concave geometric which may prevent the physical barrier from rising into an upper liquid layer or falling into a lower liquid layer. For example surface tension or suction forces or the inability for another liquid phase or fluid to enter the concave region may facilitate placement of a cup at a liquid-liquid interface. For example, in some embodiments, a physical divider may employ at least one concave surface and at least one convex surface. For example, in some embodiments, a physical divider may employ convex surfaces or external siding. For example, in some embodiments, a physical divider may employ concave surfaces or external siding. For example, in some embodiments, a physical divider may employ an internal compartment with storing at least one liquid phase and/or with an opening to a layer comprising at least a portion of said stored liquid phase. For example, a practical demonstration of an example of phenomena at a fluid interface involving physical divider geometry may involve submerging a cup in water, filling the cup with water, then lifting the bottom of the cup above the surface of the water with the cup in an inverted or upside-down position. If the opening of the cup remains beneath the air-water interface or the water's surface, the water will remain in the cup. In such a scenario, even if the density of the cup is less than the density of the water, the cup may not fully float above the surface of the water or may not substantially rise above the surface of the water if the cup remains in an inverted or upside-down position because of the water occupying the cup and the associated density of the water relative to the air.

A physical divider may employ a difference in viscosity between two liquid phases or liquid layers at a liquid-liquid interface or hypothetical liquid-liquid interface or other fluids or other fluid interfaces. One liquid phase may possess a substantially different viscosity than another liquid phase, and said substantially different viscosity may be employed to help facilitate the placement of or maintain the position of a physical divider and/or to maintain a separation between two liquid phases.

A physical divider may employ electrostatic properties to maintain a position and/or maintain/or enable a separation of liquid phases. For example, two liquid phases or layers may possess different electrostatic properties or electrostatic charge, which may be utilized to ensure liquid-liquid separation in a tank with a physical barrier. For example, two liquid phases or layers may possess similar electrostatic properties or electrostatic charge, which may be utilized to ensure liquid-liquid separation in a tank with a physical divider. For example, a physical divider may be designed with electrostatic properties which may prevent the physical divider from undesirably floating or sinking and/or may enable the physical divider to maintain proper placement and/or maintain a position at a liquid-liquid interface and/or prevent or minimize mixing between liquid phases.

A physical divider may employ magnetic properties to maintain a position and/or maintain/or enable a separation of liquid phases. For example, two liquid phases or layers may possess different magnetic properties, which may be utilized to ensure liquid-liquid separation in a tank with a physical divider. For example, two liquid phases or layers may possess similar magnetic properties, which may be utilized to ensure liquid-liquid separation in a tank with a physical divider. For example, a physical divider may be designed with magnetic properties which may prevent the physical divider from undesirably floating or sinking and/or may enable the physical divider to maintain proper placement and/or maintain a position at a liquid-liquid interface and/or prevent or minimize mixing between liquid phases.

In some embodiments, the percentage of surface area or cross sectional area or both of a liquid-liquid interface or fluid-fluid interface covered or occupied by a physical divider may be greater than, or equal to, or less than, one or more or any combination of the following: 1%, or 5%, or 10%, or 15%, or 20%, or 25%, or 30%, or 35%, or 40%, or 45%, or 50%, or 55%, or 60%, or 65%, or 70%, or 75%, or 80%, or 85%, or 90%, or 95%, or 99%, or 99.5%.

For example an active mechanism may comprise, including, but is not limited to, one or more or any combination of the following:

In some embodiments, the physical divider's position, or shape, or any combination thereof may be adjusted using a mechanical device or a mechanical mechanism.

Density—In some embodiments, a physical divider may possess a density greater than the density of one or more or all the liquid phases in a thermal storage tank.

In some embodiments, a length adjustment mechanism may be located, for example, at or near the top of the tank.

In some embodiments, a physical divider may possess a density less than the density of one or more or all the liquid phases in a thermal storage tank.

In some embodiments, a length adjustment mechanism may be located, for example, at or near the bottom of the tank.

In some embodiments a system may possess at least one physical divider with a density greater than the density of one or more or all the liquid phases.

Controlling Position of a Physical Divider: In some embodiments, a system may employ information on system operations to determine the appropriate or desired position of the physical divider and instruct the adjustment mechanism to move the physical divider to said appropriate or desired position. A liquid-liquid interface or hypothetical liquid-liquid interface may move at one, or more, or any combination of rates of change based on, including, but not limited to, one or more or a combination of the following: the flow rate, or material or chemical or physical properties, or geometry, or the geometry of the physical divider, or the geometry of the tank or vessel, or any combination thereof. In some embodiments, the desired position of a physical divider may change in connection with or correlation with the change in position of a liquid-liquid interface. A system may determine or compute the relationship between the liquid flow rate of one or more liquid phases and the rate of change in position of a liquid-liquid interface or a hypothetical liquid-liquid interface and/or employ information on said relationship to determine the desired position of a physical divider. In some embodiments, said relationship may be an established equation or algorithm. In some embodiments, said relationship, or live or semi-live information on system operations, or other information, or any combination thereof may be employed to determine the desired location of the physical divider at any desired time interval and/or a predicted rate of change of the desired location of the physical divider. In some embodiments, the adjustment mechanism may be controlled or instructed to adjust the position of a physical divider at a specific rate of change or direction based on said information. Information may include, but is not limited to, for example, information on the flow rate of one or more liquid phases entering or exiting a thermal storage system and/or information on the geometry of the thermal storage tank. Information may be computational or digital. In some embodiments, information may be gathered from one or more equipment or sensors, or information may be stored in a digital or physical storage mechanism, or any combination thereof. In some embodiments control or actions made by a system may be at least partially automated or fully automated.

Cable or Thread Based Adjustment Mechanism:

In some embodiments, the location or elevation or position of the physical divider in a tank may be controlled or maintained or adjusted using threads or cables attached to the physical divider, or indirectly connected to the physical divider, or connected to the physical divider using a magnetic coupling, or indirectly connected to the physical divider using a magnetic force, or any combination thereof. Said threads or cables may comprise, including, but not limited to, one or more or a combination of the following: synthetic material, or organic material, or natural fiber, or composite material, or metallic material, or ceramic material, or carbon material, or hydrocarbon material, or plastic, or metal, or fibrous material, or nylon, or polyvinylidene fluoride, or polyethylene, or polyester, or Dacron, or UHMWPE, or PTFE, or fluorocarbon, or carbon fibre, or cotton, or Dyneema, or Kevlar. Said threads or cables may be connected to an adjustment mechanism or a length adjustment mechanism. Said threads or cables may be connected to an adjustment mechanism or a length adjustment mechanism. Said adjustment mechanism may comprise, for example, including, but not limited to, one or more or a combination of the following: a pulley, or reel, or actuator. Said adjustment mechanism may adjust the position of a liquid-liquid separator by adjusting the length of one or more cables or lines.

Some embodiments may employ one cable. Some embodiments may employ one cable with a cable split near a physical divider, which may split or branch one cable into multiple cables, wherein each of said multiples cables or branch cables may anchor or be connected to the physical divider, or may anchor to distributed points or locations on the physical divider, or any combination thereof. Some embodiments may employ multiple cables. Some embodiments may employ one cable and one adjustment mechanism. Some embodiments may employ multiple adjustment mechanisms and one cable. Some embodiments may employ one adjustment mechanism and multiple cables. Some embodiments may employ multiple adjustment mechanisms and multiple cables.

In some embodiments, such as, for example, in embodiments with at least one physical divider positioned at an elevation below another physical divider and/or where a cable length adjustment mechanism is located near the top of the tank, it may be desirable for the threads or cables connected to the lower elevation physical divider to pass through the higher elevation physical divider, which may require holes in the higher elevation physical divider which allow said threads or cables of the lower elevation physical divider to pass through the higher elevation physical divider, while allowing the higher elevation physical divider to operate. In some embodiments, such as, for example, in embodiments with at least one physical divider positioned at an elevation above another physical divider and/or where a cable length adjustment mechanism is located near the bottom of the tank, it may be desirable for the threads or cables connected to the higher elevation physical divider to pass through the lower elevation physical divider, which may require holes in the higher elevation physical divider which allow said threads or cables of the lower elevation physical divider to pass through the higher elevation physical divider, while allowing the higher elevation physical divider to operate. It may be desirable for said threads or cables to be as small in diameter as possible and said holes in the higher elevation physical divider to be as small in diameter as possible to minimize mixing between liquid phases and/or minimize surface area of direct contact liquid-liquid interface. It may be desirable to employ surface geometry, or specific geometry of the cable or thread or hole, or any combination thereof to, for example to, for example, minimize potential mixing between different liquid phases at said holes and/or at said threads or lines. It may be desirable to employ hydrophilic, or hydrophobic, or other material property coating or material at or in said holes and/or on said threads or cables to, for example, minimize potential mixing between different liquid phases at said holes and/or at said threads or lines.

In some embodiments, a physical divider may be connected to at least a portion of an adjustment mechanism by a magnetic coupling, or magnetic force, or magnetic interaction, or magnetic mechanism. For example, at least a portion of the siding or perimeter of a physical divider may be magnetic or may comprise a magnet and/or an actuator outside of the tank may comprise a magnet and/or said actuator may control the position of a physical divider due to the magnetic force connecting the actuator to the physical divider. In some embodiments, employing a magnetic mechanism may prevent or reduce mixing of layers because, for example, a magnetic mechanism may enable control or movement of the physical divider with less moving parts or holes in the tank or physical divider. In some embodiments, the use of a magnetic mechanism may reduce the tank volume occupied by the adjustment mechanism and/or tank divider, which may increase the available volume or percentage of volume available for or occupied by a low density fluid, or high density fluid, or any combination thereof.

In some embodiments, the position of a physical divider may be adjusted by one or more or any combination of a physical bolt or screw or a threaded rod. A rotation mechanism, such as an electric motor, may be connected to said physical bolt or screw or a threaded rod. The physical bolt or screw or a threaded rod may be connected to a physical divider. In some embodiments, the physical bolt or screw or a threaded rod may be attached to the top of a physical divider. In some embodiments, a physical divider may possess complementary threads to the threads of the physical bolt or screw or a threaded rod and the physical bolt or screw or a threaded rod may pass through the physical divider. Depending on the direction of rotation, the position or elevation of a physical divider may change based on the rotation of the physical bolt or screw or a threaded rod in the presence of complementary threads in the physical divider. In some embodiments, a single physical bolt or screw or a threaded rod may be employed. In some embodiments, a physical bolt or screw or a threaded rod may be employed, however multiple non-threaded or threaded guide posts or rods, which may ensure a physical divider remains aligned or in a proper position, may also be employed. In some embodiments, multiple physical bolts or screws or threaded rods may be employed. In some embodiments with more than one physical divider, it may be desirable to employ different physical bolts or screws or threaded rods to adjust the position of each physical divider. In some embodiments with more than one physical divider, it may be desirable to employ the same physical bolts or screws or threaded rods to adjust the position of each physical divider.

In some embodiments, an adjustment mechanism may help maintain the position of a physical divider, for example, by preventing the physical divider from becoming misaligned or crooked.

In some embodiments, physical dividers may possess an electrostatic change. In some embodiments, physical dividers an electrostatic charge may be provided to a physical divider and/or electricity or an electric charge from an energy source may be provided to a physical divider. In some embodiments, an electrostatic charge or electrical charge may be employed to facilitate the position of a physical divider at a liquid-liquid interface or hypothetical liquid-liquid interface. In some embodiments, an electrostatic charge or electrical charge may be employed to further minimize mixing between liquid layers near a physical divider.

In some embodiments, the higher elevation reservoir may be integrated with a power transformer, or crew quarters, or any combination thereof. For example, in some embodiments, the higher elevation reservoir may comprise a floating power transformer or may incorporate or be adjacent to a floating power transformer.

Active mechanism may involve physical movement requiring power input to operate and/or may involve using mechanical device, for example, which may include, but is not limited to, a cable, or actuator, or rotating bolt or screw, or magnetism, or magnetic bearing, or magnetic actuator, or powered electrostatic charge, or electrical charge.

Note: 'To attempt to at least partially match' may mean ensuring the position of a physical divider is within the tolerance amount of a liquid-liquid interface or hypothetical liquid-liquid interface.

Note: A hypothetical liquid-liquid interface may be determined, for example, based on, including, but not limited to, one or more or a combination thereof: the volume of a liquid layer or the volume of each liquid layer in the tank and the geometry of the tank, or by sensors employing light, or viscosity, or density, or color, or other means to determine the location of a layer and the transition from one layer to another layer, or any combination thereof.

Note: In some embodiments, dividers may be located in liquid-liquid interfaces due to customized densities which may be greater than the density of a layer above the divider and less than the density of the layer below the divider. Buoyancy based placement of dividers may comprise passive placement of dividers.

Note: In some embodiments, dividers may be located in liquid-liquid interfaces due to mechanical or other active mechanisms. Said active mechanism placement may involve moving the location or elevation or placement of the divider by means independent of the buoyancy of the divider in the layers or liquid phases. Said active mechanism placement may involve moving the location or elevation or placement of the divider in response to changes in the energy storage system, such as, including, but not limited to, fluids entering or exiting the storage tank, or changes in the volume of one or more fluids in the storage tank, or any combination thereof.

Some embodiments may involve both active and/or passive physical placement or movement of dividers.

Note: In some embodiments, 'high density fluid' or 'higher density fluid' may comprise the same. In some embodiments, 'High density fluid' or 'higher density fluid' may comprise a fluid with a density greater than the 'low density fluid' or 'lower density fluid.'

Note: In some embodiments, 'low density fluid' or 'lower density fluid' may comprise the same. In some embodiments, 'low density fluid' or 'lower density fluid' may comprise a fluid with a density less than the 'high density fluid' or 'higher density fluid.'

Note: The elevation difference between the lower elevation reservoir and the higher elevation reservoir, or the lower elevation region and the higher elevation region, or any combination thereof may be greater than or equal to one or more or any combination of the following: 10 meters, or 50 meters, or 100 meters, or 150 meters, or 200 meters, or 250 meters, or 300 meters, or 350 meters, or 400 meters, or 450 meters, or 500 meters, or 550 meters, or 600 meters, or 650 meters, or 700 meters, or 750 meters, or 800 meters, or 850 meters, or 900 meters, or 950 meters, or 1,000 meters, or 1,100 meters, or 1,250 meters, or 1,500 meters, or 1,750 meters, or 2,000 meters, or 2,250 meters, or 2,500 meters, or 2,750 meters, or 3,000 meters, 3,250 meters, or 3,500 meters, or 3,750 meters, or 4,000 meters, or 5,000 meters, or 6,000 meters, or 7,000 meters, or 8,000 meters, or 9,000 meters, or 10,000 meters.

Example Summary of Potential Benefits and Advantages of Some Embodiments

Some embodiments may reduce cost, or reduce mechanical complexity, or reduce system or process complexity, or reduce required maintenance, or reduce biofouling, or increase scalability, or increase accessibility, or improve energy efficiency, or increase system or process longevity or lifespan, or reducing the fundamental energy consumption requirement of desalination, or enable integrated energy storage, or any combination thereof.

Some embodiments may fundamentally require lower energy consumption per m3 of desalinated water. For example, some embodiments may possess a lower thermodynamic energy consumption or gibbs free energy of desalination due to the difference in hydrostatic pressure between desalination feed, which may comprise a saline water with a higher density than desalinated water, and desalination permeate, which may comprise desalinated water. Some embodiments may operate at a significant depth or elevation difference, which may enable the hydrostatic pressure difference from the density difference between desalination feed and desalination permeate to significantly reduce the required applied pressure or required power or required energy consumption for desalination. For example, in some embodiments, the deeper the water depth of the desalination or lower elevation reservoir, the lower the theoretical minimum energy required for desalination due to the greater hydrostatic pressure difference between desalination feed and desalination permeate the deeper the depth or the greater the elevation difference.

Some embodiments may further increase energy efficiency or reduce power requirement or energy consumption by enabling desalination to operate with a lower recovery ratio due to, for example, lower or less desalination feed or seawater pre-treatment energy consumption or cost. For example, a lower recovery ratio may enable lower desalination energy consumption or power requirement by lowering the required concentration of the produced desalination reject or desalination concentrate or desalination brine, which may mean the desalination reject, or concentrate, or brine may have a lower osmotic pressure, which may reduce the required applied pressure difference required to produce the desalinated water. In some embodiments, for example, a lower recovery ratio may be desirable if the desalination feed pretreatment costs are lower due to, for example, a lower recovery ratio potentially requiring greater volume of desalination feed per m3 of desalination permeate.

Some embodiments may comprise a desalination with energy storage in the nature of its operations. In some embodiments, the displacement of water with a low density fluid in a lower elevation reservoir or subsea tank may comprise stored potential energy. In some embodiments, desalination may occur from or be driven by the hydrostatic pressure difference between low density fluid and desalination feed across an elevation difference or across the elevation difference between the higher elevation reservoir and the lower elevation reservoir, and/or power generation or energy discharge may occur from the exposure of the permeate side of a desalination system or process to the lower pressure of low density fluid in a subsea tank and/or desalinated water or permeate displacing at least a portion of the low density fluid in the subsea tank. In some embodiments, the energy storage may enable use of lower cost electricity or power sources, or store power from excess renewable energy, or enable powering desalination from intermittent power sources, such as solar or wind, or reduce the cost of energy for desalination, or enable demand response, or any combination thereof. Additionally, in some embodiments, energy storage may be inherent to the operation of the process or system, which may prevent or avoid typical conversion losses or conversion steps or complexity typically associated with integrating energy storage in a system or process.

For example, in some embodiments, example benefits or advantages may include, but are not limited to, one or more or any combination of the following:

Fundamental Reduction in Desalination Power/Energy Consumption: For example, in some embodiments, the significant depth of the desalination system or process and the density difference between the desalination feed and/or desalination permeate or desalinated water may significantly reduce the fundamental energy consumption required in desalination. The density of desalination feed may be greater than the density of desalination permeate. In deeper water depths, the density difference between desalination feed and desalination permeate may result in a significant reduction in the fundamental energy consumption of desalination due to, for example, the hydrostatic pressure difference between desalination feed and desalinated seawater at depth, which may reduce the required power or pressure difference to perform desalination. For example, if desalination feed comprises seawater with a density of 1,028 kg/m3 and desalination permeate comprises freshwater with a density of 1,000 kg/m3, at a 2,000 meter water depth, hydrostatic pressure difference between desalination feed and desalination permeate may be 5.5 Bar, which, if seawater has a osmotic pressure of 27 Bar, may comprise an over 20% reduction in the fundamental power required or energy required for desalination. Importantly, some embodiments may enable scalable use or accessibility of the deeper water depths by the use of low density fluid displacement to drive or power desalination because, for example, in some embodiments, low density fluid displacement may enable the use of pump(s) and/or other moving parts located at higher elevations than the desalination process, and/or enable the use of pumps which may be wetted by non-corrosive, low-biofouling low density fluids which may reduce required maintenance or increase reliability and/or enable the use of subsea pumps or pumps located in the lower elevation region which are wetted by non-corrosive, low-biofouling low density fluids which may reduce required maintenance or increase reliability, or any combination thereof, and/or enable subsea water storage or water storage and/or enable subsea water storage in a rigid tank.

Scalability: For example, some embodiments may enable the use of larger scale, more widely produced pumps and/or related equipment. For example, in some embodiments, a pump located at a higher elevation and/or situated in an air environment may enable the use of larger scale, more widely produced pumps and/or related equipment. For example, in some embodiments, the use of pumps located at a higher elevation may enable the use of pumps and related equipment which may be manufactured or currently manufactured at a large scale or quantity or size and/or may enable the use of highly optimized, or more energy efficient, or higher performing, or any combination thereof pumps.

Reliability: For example, some embodiments may enable greater reliability. For example, in some embodiments, a pump and/or related equipment located at a higher elevation and/or situated in an air environment may enable greater reliability. For example, in some embodiments, pumping a low density fluid comprising a fluid with less propensity for biofouling and/or lower solubility of corrosives may improve system or process reliability and/or reduce required system or process maintenance and/or increase system or process lifespan.

Maintenance and Accessibility: For example, some embodiments may enable greater accessibility for maintenance, or part replacement, or inspection, or modification, or adjustment, or any combination thereof. For example, in some embodiments, a pump and/or related equipment located at a higher elevation and/or situated in an air environment may enable greater accessibility for maintenance, or part replacement, or inspection, or modification, or adjustment, or any combination thereof.

Enable Installation and Operation Deeper Water: For example, some embodiments may enable or facilitate installation and operation in deeper water depths. For example, in some embodiments, by enabling pumps to be located at an elevation near the surface of a body of water or a more accessible elevation, desalination may be performed at deeper water depths while avoiding the complexities or costs associated with installing and/or operating pumps at deeper water depths. For example, some embodiments may enable or facilitate the installation and operation in deeper water depths by enabling pumping to be performed with wetted materials being wetted by a fluid comprising a low density fluid, which may be less prone to scaling or biofouling, which may longevity and reliability and reduce required maintenance. For example, some embodiments may enable or facilitate the installation and operation in deeper water depths by enabling pumping to be performed with wetted materials being wetted by a fluid comprising a low density fluid, which may be less prone to scaling or biofouling, which may longevity and reliability and reduce required maintenance, which may be beneficial if pumps are located in deep water depths where accessibility for maintenance may be limited. Deeper water depths may be advantageous due to greater potential desalination energy efficiency or lower power consumption from the density difference between desalination feed and desalinated water, or ability to desalinate higher salinity or osmotic pressure desalination feed due to the greater total pressure and/or pressure difference, or the lower concentration of suspended solids or dissolved oxygen or microbial activity or biofoulants in deeper water depths, or any combination thereof.

Biofouling, Scaling, Corrosion: For example, some embodiments may greatly reduce potential biofouling. For example, in some embodiments, pumps may be wetted by a low density fluid, which may, if desired, comprise a fluid with a low propensity for biofouling, or low solubility or practical insolubility of most scalants or scaling salts, or dielectric or low conductivity properties which may inhibit or prevent corrosion, or any combination thereof. For example, in some embodiments, the pressure provided by the hydrostatic pressure of the low density fluid on, for example, the permeate side of the desalination system or process may reduce or prevent the release of dissolved gas bubbles, or the substantial reduction in solubility of scaling salts, or any combination thereof which may foul membranes, or process or system equipment, or any combination thereof. For example, the solubility of some dissolved solids, such as calcium carbonate, may increase with pressure and dissolved carbon dioxide concentration. For example, the solubility of some dissolved solids, such as calcium carbonate, may increase with pressure and dissolved carbon dioxide concentration, wherein the solubility of calcium carbonate may greatly decrease with the evolution or formation of $CO_2$ gas from dissolved $CO_2$, which may begin to occur at pressures closer to 1 atm pressure, which may be at least partially avoided or prevented from occurring near the lower elevation reservoir or subsea tank due to the hydrostatic pressure provided by the low density fluid in the lower elevation reservoir or subsea tank. In some embodiments, subsea low density fluid (LDF) pump may be employed, which may reduce required maintenance due to the lower propensity of the LDF for Biofouling, or the LDF operating in a closed loop, or most scalants or corrosives being insoluble in LDF, or the LDF being potentially electrically non-conductive or dielectric, or any combination thereof.

Complexity: For example, some embodiments may reduce mechanical complexity, or system or process complexity. In some embodiments, for example, locating a pump at a higher elevation, or above or near the sea surface, or any combination thereof may reduce mechanical complexity, or system or process complexity, by potentially avoiding the need for a potentially complex or costly subsea pumping system or process, which may be especially costly or complex in deep water depths, and/or by enabling the use of potentially more widely available and/or reliable pumps designed for operation in less harsh external environments. In some embodiments, for example, some embodiments may reduce mechanical complexity, or system or process complexity by enabling a pump or subsea pump to operate with positive or high pressure inlet or input fluid pressure, which may reduce potentially challenges, or equipment, or efficiency losses in handling cavitation or formation of desorbed dissolved gas bubbles.

CAPEX Cost: For example, some embodiments may greatly reduce the CAPEX or capital cost of offshore desalination, or subsea desalination, or desalination, or any combination thereof. In some embodiments, for example, locating a pump at a higher elevation, or above or near the sea surface, or any combination thereof may reduce total system cost for example, by avoiding or reducing the cost of potentially expensive and complex subsea pumping processes or systems, or by enabling the use of larger or more scalable pumps or pumping systems or processes, or by enabling easier accessibility for maintenance, or by enabling greater scale, or by enabling the use of more widely available or manufactured pumps and pumps systems or processes, or reducing or preventing potential biofouling, or scaling or corrosion, or any combination thereof in pumping systems or processes, or any combination thereof. For example, some embodiments, CAPEX cost may be reduced by enabling subsea pumping systems operating with a stable or more stable inlet or fluid inlet pressure, or by enabling a high fluid inlet pressure, or by pumping a fluid potentially less prone to scaling, or biofouling, or corrosion, or any combination thereof, or by reducing potential formation of dissolved gas bubbles or scalants, or by reducing potential formation of dissolved gas bubbles or scalants due to the hydro-static pressure provided by low density fluid, or any combination thereof.

For example, some embodiments may enable the pump for powering or driving subsea desalination to be located at a higher elevation, or above or near the sea surface, or any combination thereof.

For example, some embodiments may enable the pump for powering or driving subsea desalination to be located at a lower elevation, or elevation near the lower elevation reservoir or tank, or an elevation between the lower elevation reservoir and higher elevation reservoir, or an elevation above the lower elevation reservoir and below the higher elevation reservoir, or any combination thereof. For example, some embodiments may enable the pump for powering or driving subsea desalination to be located at a lower elevation, or elevation near the lower elevation reservoir or tank, or an elevation between the lower elevation reservoir and higher elevation reservoir, or an elevation above the lower elevation reservoir and below the higher elevation reservoir, or any combination thereof, to, for example, pump low density fluid into a lower elevation reservoir or subsea tank.

In some embodiments, a subsea pump may be fluidly connected to the water export pipe. In some embodiments, a subsea pump may be fluidly connected to the water export pipe and/or may function to transfer water from the lower elevation reservoir or subsea tank and/or allow low density fluid to displace water in the lower elevation reservoir or subsea tank. In some embodiments, the water inlet pressure into the subsea pump may be relatively consistent due to, for example, the hydrostatic pressure of low density fluid which may displace water in the lower elevation reservoir, which may improve pump efficiency, or pump lifespan, or any combination thereof. In some embodiments, high fluid inlet pressure, which may be enabled or facilitated by the hydro-static pressure of low density fluid which may displace water in the lower elevation reservoir, may improve pump effi-ciency, or reduce potential scale formation, or reduce poten-tial scale formation due to the change in solubility of some compounds which may occur changes in total fluid pressure, or improve pump longevity, or prevent or reduce potential cavitation, or prevent or reduce potential dissolved gas evolution into gaseous state, or any combination thereof. In some embodiments, a subsea pump may be fluidly con-nected to the water export pipe may enable the lower elevation reservoir or subsea tank to operate at a relatively consistent pressure. Some embodiments may enable subsea water storage or subsea desalinated water storage. Some embodiments may enable subsea water storage or subsea desalinated water storage within, for example, a rigid tank, which may possess a greater lifespan, or less fatigue, or more reliable.

In some embodiments, a subsea pump may be fluidly connected to either water or LDF. In some embodiments, the pump may operate more efficiently, or more efficiently due to high inlet fluid pressure, or more efficiently due to at least partially stable inlet fluid pressure which may be enabled by the hydrostatic pressure of the low density fluid, or with less cavitation, or with less evolution of gas from dissolved gases, or from the formation of scalants from reduced solubility of dissolved solids, or any combination thereof. For example, in some embodiments, feed pressure into the pump or the liquid inlet pressure may be provided at least in part by the pressure of the low density fluid, such as a pressure near the gravitational hydrostatic pressure of the subsea tank. In some embodiments, high inlet pressure, or relatively consistent inlet pressure, or any combination thereof may greatly improve subsea pump energy efficiency.

In some embodiments, LDF hydrostatic pressure may provide stable inlet pressure, which may significantly improve pump energy efficiency and reliability, and/or reduce potential cavitation.

The invention claimed is:

1. A system for desalination comprising:
   a first storage reservoir configured to be near the surface of a body of water and configured to store a low density fluid;

a second storage reservoir operably connected to the first storage reservoir wherein the second storage reservoir is configured to be located below the surface of the body of water; and an offshore desalination system operatively coupled to the second reservoir wherein the offshore desalination system comprises a brine discharge outlet to release brine into the body of water; and a water export pipeline operably connected to the second reservoir;

wherein the system is configured such that:

desalinated water is produced by allowing a desalination permeate from the desalination system to displace a low density fluid in the second reservoir and transfer the low density fluid from the second reservoir to the first reservoir; and desalinated water is exported by transferring low density fluid from the first reservoir into the second reservoir to displace desalinated water from the second reservoir into the water export pipeline.

2. The system of claim 1 wherein the low density fluid comprises a liquid with a density at 20° C. which is less than the density of water at 20° C.

3. The system of claim 1 further comprising a pump fluidly connected to the low density fluid.

4. The system of claim 3 wherein the pump is located at an elevation about the same as the first storage reservoir.

5. The system of claim 3 wherein the pump is located at an elevation about the same as the second storage reservoir.

6. The system of claim 1 wherein the water export pipeline is configured to transfer said displaced desalinated water from the second reservoir to an application for desalinated water.

7. The system of claim 6 further comprising a pump fluidly connected to the desalinated water export pipeline to transfer desalinated water from the second reservoir and allow low density fluid to displace desalinated water in the second reservoir.

8. The system of claim 1 wherein the second reservoir comprises a first tank and a second tank.

9. The system of claim 8 wherein the desalination permeate displaces low density fluid in the first tank and wherein low density fluid displaces desalination permeate in the second tank.

10. The system of claim 9 wherein said displacing in the first tank is conducted simultaneously to said displacing in the second tank.

11. The system of claim 9 wherein an operating mode of the first tank and second tank are periodically swapped such that low density fluid displaces desalination permeate in the first tank; and wherein desalination permeate displaces low density fluid in the second tank.

12. The system of claim 11 wherein said periodic swapping is configured to enable continuous desalination.

13. The system of claim 11 wherein said periodic swapping is configured to occur when a volume of low density fluid or desalinated water in the first tank, or second tank, or both reach a predetermined percentage of tank volumetric capacity.

14. The system of claim 13 wherein the predetermined percentage of tank volumetric capacity is greater than about 70 volume percentage of tank volumetric capacity.

15. The system of claim 1 wherein the desalination system comprises a reverse osmosis membrane.

\* \* \* \* \*